(12) United States Patent
Balsamo

(10) Patent No.: US 12,335,569 B2
(45) Date of Patent: Jun. 17, 2025

(54) SETUP PROCEDURES FOR AN ELECTRONIC DEVICE

(71) Applicant: Apple Inc., Cupertino, CA (US)

(72) Inventor: Tito Lloyd Balsamo, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/168,490

(22) Filed: Feb. 13, 2023

(65) Prior Publication Data

US 2023/0300415 A1    Sep. 21, 2023

Related U.S. Application Data

(63) Continuation of application No. 17/000,112, filed on Aug. 21, 2020, now Pat. No. 11,582,517, which is a
(Continued)

(51) Int. Cl.
*G06F 8/61* (2018.01)
*G06F 21/44* (2013.01)
(Continued)

(52) U.S. Cl.
CPC .......... *H04N 21/4586* (2013.01); *G06F 8/61* (2013.01); *G06F 21/44* (2013.01); *G06F 21/57* (2013.01); *G06Q 30/0631* (2013.01); *H04M 1/72409* (2021.01); *H04N 21/441* (2013.01); *H04N 21/4432* (2013.01); *H04N 21/4516* (2013.01); *H04M 1/72412* (2021.01); *H04M 1/72415* (2021.01)

(58) Field of Classification Search
CPC ............. H04N 21/4586; H04N 21/441; H04N 21/4432; H04N 21/4516; H04M 1/72409; H04M 1/72412; H04M 1/72415; G06F 21/44; G06F 21/57; G06F 8/61; G06Q 30/0631
See application file for complete search history.

(56) References Cited

U.S. PATENT DOCUMENTS

| 2,718,550 A | 9/1955 | Hoyt et al. |
| 4,672,677 A | 6/1987 | Yamakawa |

(Continued)

FOREIGN PATENT DOCUMENTS

| AU | 2009255409 B2 | 7/2012 |
| AU | 2016100476 A4 | 5/2016 |

(Continued)

OTHER PUBLICATIONS

Applicant Initiated Interview Summary received for U.S. Appl. No. 17/210,352, mailed on Feb. 28, 2022, 4 pages.
(Continued)

*Primary Examiner* — Beau D Spratt
(74) *Attorney, Agent, or Firm* — Kubota & Basol LLP

(57) ABSTRACT

In some embodiments, an electronic device can guide the user in setting up the device for the first time or after a factory reset. In some embodiments, an electronic device facilitates suggesting and installing applications on the electronic device during device setup. In some embodiments, an electronic device facilitates transferring settings and information from another electronic device during device setup.

42 Claims, 86 Drawing Sheets

Related U.S. Application Data continuation of application No. 16/144,077, filed on Sep. 27, 2018, now Pat. No. 10,771,847.

(60) Provisional application No. 62/679,840, filed on Jun. 3, 2018.

(51) Int. Cl.

| | | |
|---|---|---|
| *G06F 21/57* | (2013.01) | |
| *G06Q 30/0601* | (2023.01) | |
| *H04M 1/72409* | (2021.01) | |
| *H04N 21/441* | (2011.01) | |
| *H04N 21/443* | (2011.01) | |
| *H04N 21/45* | (2011.01) | |
| *H04N 21/458* | (2011.01) | |
| *H04M 1/72412* | (2021.01) | |
| *H04M 1/72415* | (2021.01) | |

(56) References Cited

U.S. PATENT DOCUMENTS

| | | |
|---|---|---|
| 5,029,223 A | 7/1991 | Fujisaki |
| 5,483,261 A | 1/1996 | Yasutake |
| 5,488,204 A | 1/1996 | Mead et al. |
| 5,585,866 A | 12/1996 | Miller et al. |
| 5,596,373 A | 1/1997 | White et al. |
| 5,621,456 A | 4/1997 | Florin et al. |
| 5,677,708 A | 10/1997 | Matthews et al. |
| 5,818,439 A | 10/1998 | Nagasaka et al. |
| 5,825,352 A | 10/1998 | Bisset et al. |
| 5,835,079 A | 11/1998 | Shieh |
| 5,880,411 A | 3/1999 | Gillespie et al. |
| 5,886,690 A | 3/1999 | Pond et al. |
| 5,926,230 A | 7/1999 | Niijima et al. |
| 6,021,320 A | 2/2000 | Bickford et al. |
| 6,028,600 A | 2/2000 | Rosin et al. |
| 6,049,333 A | 4/2000 | Lajoie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,405,371 B1 | 6/2002 | Oosterhout et al. |
| 6,487,722 B1 | 11/2002 | Okura et al. |
| 6,570,557 B1 | 5/2003 | Westerman et al. |
| 6,628,304 B2 | 9/2003 | Mitchell et al. |
| 6,677,932 B1 | 1/2004 | Westerman |
| 6,690,387 B2 | 2/2004 | Zimmerman et al. |
| 6,745,391 B1 | 6/2004 | Macrae et al. |
| 6,909,837 B1 | 6/2005 | Unger |
| 6,928,433 B2 | 8/2005 | Goodman et al. |
| 7,015,894 B2 | 3/2006 | Morohoshi |
| 7,039,879 B2 | 5/2006 | Bergsten et al. |
| 7,103,906 B1 | 9/2006 | Katz et al. |
| 7,134,089 B2 | 11/2006 | Celik et al. |
| 7,184,064 B2 | 2/2007 | Zimmerman et al. |
| 7,213,255 B2 | 5/2007 | Markel et al. |
| 7,293,275 B1 | 11/2007 | Krieger et al. |
| 7,324,953 B1 | 1/2008 | Murphy |
| 7,330,192 B2 | 2/2008 | Brunner et al. |
| 7,596,761 B2 | 9/2009 | Lemay et al. |
| 7,614,008 B2 | 11/2009 | Ording |
| 7,631,278 B2 | 12/2009 | Miksovsky et al. |
| 7,633,076 B2 | 12/2009 | Huppi et al. |
| 7,636,897 B2 | 12/2009 | Koralski et al. |
| 7,649,526 B2 | 1/2010 | Ording et al. |
| 7,650,569 B1 | 1/2010 | Allen et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,665,022 B1 | 2/2010 | Bednarz, Jr. |
| 7,694,231 B2 | 4/2010 | Kocienda et al. |
| 7,712,051 B2 | 5/2010 | Chadzelek et al. |
| 7,783,892 B2 | 8/2010 | Russell et al. |
| 7,810,043 B2 | 10/2010 | Ostojic et al. |
| 7,814,023 B1 | 10/2010 | Rao et al. |
| 7,827,483 B2 | 11/2010 | Unbedacht et al. |
| 7,836,475 B2 | 11/2010 | Angiolillo et al. |
| 7,844,914 B2 | 11/2010 | Andre et al. |
| 7,849,487 B1 | 12/2010 | Vosseller |
| 7,856,605 B2 | 12/2010 | Ording et al. |
| 7,917,477 B2 | 3/2011 | Hutson et al. |
| 7,956,846 B2 | 6/2011 | Ording et al. |
| 7,957,762 B2 | 6/2011 | Herz et al. |
| 7,970,379 B2 | 6/2011 | White et al. |
| 8,006,002 B2 | 8/2011 | Kalayjian et al. |
| 8,026,805 B1 | 9/2011 | Rowe |
| 8,082,523 B2 | 12/2011 | Forstall et al. |
| 8,094,132 B1 | 1/2012 | Frischling et al. |
| 8,115,731 B2 | 2/2012 | Varanda |
| 8,145,617 B1 | 3/2012 | Verstak et al. |
| 8,170,931 B2 | 5/2012 | Ross et al. |
| 8,205,240 B2 | 6/2012 | Ansari et al. |
| 8,239,784 B2 | 8/2012 | Hotelling et al. |
| 8,279,180 B2 | 10/2012 | Hotelling et al. |
| 8,291,452 B1 | 10/2012 | Yong et al. |
| 8,299,889 B2 | 10/2012 | Kumar et al. |
| 8,301,484 B1 | 10/2012 | Kumar |
| 8,312,484 B1 | 11/2012 | Mccarty et al. |
| 8,312,486 B1 | 11/2012 | Briggs et al. |
| 8,316,394 B2 | 11/2012 | Yates |
| 8,325,160 B2 | 12/2012 | St. Pierre et al. |
| 8,346,798 B2 | 1/2013 | Spiegelman et al. |
| 8,370,874 B1 | 2/2013 | Chang et al. |
| 8,381,135 B2 | 2/2013 | Hotelling et al. |
| 8,386,588 B1 | 2/2013 | Cooley |
| 8,407,737 B1 | 3/2013 | Ellis |
| 8,416,217 B1 | 4/2013 | Eriksson et al. |
| 8,418,202 B2 | 4/2013 | Ahmad-Taylor |
| 8,424,048 B1 | 4/2013 | Lyren et al. |
| 8,479,122 B2 | 7/2013 | Hotelling et al. |
| 8,495,499 B1 | 7/2013 | Denise |
| 8,509,599 B2 | 8/2013 | Itakura |
| 8,516,063 B2 | 8/2013 | Fletcher |
| 8,516,525 B1 | 8/2013 | Jerding et al. |
| 8,560,398 B1 | 10/2013 | Few et al. |
| 8,584,165 B1 | 11/2013 | Kane et al. |
| 8,607,163 B2 | 12/2013 | Plummer |
| 8,607,268 B2 | 12/2013 | Migos |
| 8,613,015 B2 | 12/2013 | Gordon et al. |
| 8,613,023 B2 | 12/2013 | Narahara et al. |
| 8,625,974 B1 | 1/2014 | Pinson |
| 8,674,958 B1 | 3/2014 | Kravets et al. |
| 8,683,362 B2 | 3/2014 | Shiplacoff et al. |
| 8,683,517 B2 | 3/2014 | Carpenter et al. |
| 8,730,190 B2 | 5/2014 | Moloney |
| 8,742,885 B2 | 6/2014 | Brodersen et al. |
| 8,754,862 B2 | 6/2014 | Zaliva |
| 8,762,852 B2 | 6/2014 | Davis et al. |
| 8,769,408 B2 | 7/2014 | Madden et al. |
| 8,782,706 B2 | 7/2014 | Ellis |
| 8,850,471 B2 | 9/2014 | Kilar et al. |
| 8,850,490 B1 | 9/2014 | Thomas et al. |
| 8,869,207 B1 | 10/2014 | Earle |
| 8,887,202 B2 | 11/2014 | Hunter et al. |
| 8,930,839 B2 | 1/2015 | He et al. |
| 8,952,987 B2 | 2/2015 | Momeyer et al. |
| 8,963,847 B2 | 2/2015 | Hunt |
| 8,983,950 B2 | 3/2015 | Askey et al. |
| 8,988,356 B2 | 3/2015 | Tseng |
| 8,990,857 B2 | 3/2015 | Yong et al. |
| 9,007,322 B1 | 4/2015 | Young |
| 9,066,146 B2 | 6/2015 | Suh et al. |
| 9,081,421 B1 | 7/2015 | Lai et al. |
| 9,092,057 B2 | 7/2015 | Varela et al. |
| 9,116,569 B2 | 8/2015 | Stacy et al. |
| 9,118,967 B2 | 8/2015 | Sirpal et al. |
| 9,129,656 B2 | 9/2015 | Prather et al. |
| 9,141,200 B2 | 9/2015 | Bernstein et al. |
| 9,196,309 B2 | 11/2015 | Schultz et al. |
| 9,214,290 B2 | 12/2015 | Xie et al. |
| 9,215,273 B2 | 12/2015 | Jonnala et al. |
| 9,219,634 B1 | 12/2015 | Morse et al. |
| 9,235,317 B2 | 1/2016 | Matas et al. |
| 9,241,121 B2 | 1/2016 | Rudolph |

(56) References Cited

U.S. PATENT DOCUMENTS

| | | |
|---|---|---|
| 9,244,600 B2 | 1/2016 | Mcintosh et al. |
| 9,247,014 B1 | 1/2016 | Rao |
| 9,247,174 B2 | 1/2016 | Sirpal et al. |
| 9,285,977 B1 | 3/2016 | Greenberg et al. |
| 9,319,727 B2 | 4/2016 | Phipps et al. |
| 9,348,458 B2 | 5/2016 | Hotelling et al. |
| 9,357,250 B1 | 5/2016 | Newman et al. |
| 9,380,343 B2 | 6/2016 | Webster et al. |
| 9,414,108 B2 | 8/2016 | Sirpal et al. |
| 9,454,288 B2 | 9/2016 | Raffle et al. |
| 9,509,798 B1 | 11/2016 | Thomas et al. |
| 9,514,476 B2 | 12/2016 | Kay et al. |
| 9,532,111 B1 | 12/2016 | Christie et al. |
| 9,538,310 B2 | 1/2017 | Fjeldsoe-nielsen et al. |
| 9,542,060 B1 | 1/2017 | Brenner et al. |
| 9,560,399 B2 | 1/2017 | Kaya et al. |
| 9,575,944 B2 | 2/2017 | Neil et al. |
| 9,591,339 B1 | 3/2017 | Christie et al. |
| 9,600,159 B2 | 3/2017 | Lawson et al. |
| 9,602,566 B1 | 3/2017 | Lewis et al. |
| 9,639,241 B2 | 5/2017 | Penha et al. |
| 9,652,118 B2 | 5/2017 | Hill et al. |
| 9,652,448 B2 | 5/2017 | Pasquero et al. |
| 9,658,740 B2 | 5/2017 | Chaudhri |
| 9,774,917 B1 | 9/2017 | Christie et al. |
| 9,792,018 B2 | 10/2017 | Van Os et al. |
| 9,807,462 B2 | 10/2017 | Wood |
| 9,864,508 B2 | 1/2018 | Dixon et al. |
| 9,864,509 B2 | 1/2018 | Howard et al. |
| 9,871,905 B1 | 1/2018 | Habiger et al. |
| 9,913,142 B2 | 3/2018 | Folse et al. |
| 9,933,937 B2 | 4/2018 | Lemay et al. |
| 9,940,454 B2 * | 4/2018 | Richardson ............. H04L 63/14 |
| 9,973,800 B2 | 5/2018 | Yellin et al. |
| 9,992,025 B2 * | 6/2018 | Mahaffey ................ G06F 21/57 |
| 10,019,142 B2 | 7/2018 | Van Os et al. |
| 10,025,499 B2 | 7/2018 | Howard et al. |
| 10,079,872 B1 | 9/2018 | Thomas et al. |
| 10,091,558 B2 | 10/2018 | Christie et al. |
| 10,114,631 B2 * | 10/2018 | Shin .......................... G06F 8/65 |
| 10,116,996 B1 | 10/2018 | Christie et al. |
| 10,126,904 B2 | 11/2018 | Agnetta et al. |
| 10,168,871 B2 | 1/2019 | Wallters et al. |
| 10,200,761 B1 | 2/2019 | Christie et al. |
| 10,205,985 B2 | 2/2019 | Lue-Sang et al. |
| 10,209,866 B2 | 2/2019 | Johnston et al. |
| 10,237,599 B1 | 3/2019 | Gravino et al. |
| 10,275,148 B2 | 4/2019 | Matas et al. |
| 10,282,088 B2 | 5/2019 | Kim et al. |
| 10,303,422 B1 | 5/2019 | Woo et al. |
| 10,405,015 B2 | 9/2019 | Kite et al. |
| 10,521,188 B1 | 12/2019 | Christie et al. |
| 10,551,995 B1 | 2/2020 | Ho et al. |
| 10,552,470 B2 | 2/2020 | Todd et al. |
| 10,564,823 B1 | 2/2020 | Dennis et al. |
| 10,601,808 B1 | 3/2020 | Nijim et al. |
| 10,606,539 B2 | 3/2020 | Bernstein et al. |
| 10,631,042 B2 | 4/2020 | Zerr et al. |
| 10,650,052 B2 | 5/2020 | Van Os et al. |
| 10,795,490 B2 | 10/2020 | Chaudhri et al. |
| 10,827,007 B2 | 11/2020 | Kode et al. |
| 11,062,358 B1 | 7/2021 | Lewis et al. |
| 11,461,397 B2 | 10/2022 | Van Os et al. |
| 11,843,838 B2 | 12/2023 | Ellingford et al. |
| 11,863,837 B2 | 1/2024 | Payne |
| 11,962,836 B2 | 4/2024 | Domm et al. |
| 2002/0015024 A1 | 2/2002 | Westerman et al. |
| 2002/0026637 A1 | 2/2002 | Markel et al. |
| 2002/0029170 A1 | 3/2002 | Gasser et al. |
| 2002/0042920 A1 | 4/2002 | Thomas et al. |
| 2002/0060750 A1 | 5/2002 | Istvan et al. |
| 2002/0085045 A1 | 7/2002 | Vong et al. |
| 2002/0100063 A1 | 7/2002 | Herigstad et al. |
| 2002/0112239 A1 | 8/2002 | Goldman |
| 2002/0113816 A1 | 8/2002 | Mitchell et al. |
| 2002/0144269 A1 | 10/2002 | Connelly |
| 2002/0171686 A1 | 11/2002 | Kamen et al. |
| 2002/0178446 A1 | 11/2002 | Sie et al. |
| 2003/0001907 A1 | 1/2003 | Bergsten et al. |
| 2003/0005445 A1 | 1/2003 | Schein et al. |
| 2003/0009757 A1 | 1/2003 | Kikinis |
| 2003/0011641 A1 | 1/2003 | Totman et al. |
| 2003/0013483 A1 | 1/2003 | Ausems et al. |
| 2003/0044162 A1 | 3/2003 | Angel |
| 2003/0088872 A1 | 5/2003 | Maissel et al. |
| 2003/0093790 A1 | 5/2003 | Logan et al. |
| 2003/0126600 A1 | 7/2003 | Heuvelman |
| 2003/0149628 A1 | 8/2003 | Abbosh et al. |
| 2003/0158950 A1 | 8/2003 | Sako |
| 2003/0167471 A1 | 9/2003 | Roth et al. |
| 2003/0177075 A1 | 9/2003 | Burke |
| 2003/0177498 A1 | 9/2003 | Ellis et al. |
| 2003/0192060 A1 | 10/2003 | Levy |
| 2003/0221191 A1 | 11/2003 | Khusheim |
| 2003/0228130 A1 | 12/2003 | Tanikawa et al. |
| 2003/0234804 A1 | 12/2003 | Parker et al. |
| 2004/0019497 A1 | 1/2004 | Volk et al. |
| 2004/0046801 A1 | 3/2004 | Lin et al. |
| 2004/0070573 A1 | 4/2004 | Graham |
| 2004/0088328 A1 | 5/2004 | Cook et al. |
| 2004/0090463 A1 | 5/2004 | Celik et al. |
| 2004/0093262 A1 | 5/2004 | Weston et al. |
| 2004/0133909 A1 | 7/2004 | Ma |
| 2004/0139401 A1 | 7/2004 | Unbedacht et al. |
| 2004/0161151 A1 | 8/2004 | Iwayama et al. |
| 2004/0168184 A1 | 8/2004 | Steenkamp et al. |
| 2004/0193421 A1 | 9/2004 | Blass |
| 2004/0252120 A1 | 12/2004 | Hunleth et al. |
| 2004/0254883 A1 | 12/2004 | Kondrk et al. |
| 2004/0254958 A1 | 12/2004 | Volk |
| 2004/0267715 A1 | 12/2004 | Polson et al. |
| 2005/0012599 A1 | 1/2005 | Dematteo |
| 2005/0024545 A1 | 2/2005 | Borden, IV |
| 2005/0055710 A1 | 3/2005 | Aoki et al. |
| 2005/0063670 A1 | 3/2005 | Arai |
| 2005/0071761 A1 | 3/2005 | Kontio |
| 2005/0071785 A1 | 3/2005 | Chadzelek et al. |
| 2005/0076363 A1 | 4/2005 | Dukes et al. |
| 2005/0091254 A1 | 4/2005 | Stabb et al. |
| 2005/0091597 A1 | 4/2005 | Ackley |
| 2005/0134625 A1 | 6/2005 | Kubota |
| 2005/0162398 A1 | 7/2005 | Eliasson et al. |
| 2005/0162402 A1 | 7/2005 | Watanachote |
| 2005/0186988 A1 | 8/2005 | Lim et al. |
| 2005/0190059 A1 | 9/2005 | Wehrenberg |
| 2005/0223335 A1 | 10/2005 | Ichikawa |
| 2005/0235316 A1 | 10/2005 | Ahmad-taylor |
| 2005/0257166 A1 | 11/2005 | Tu |
| 2005/0283358 A1 | 12/2005 | Stephanick et al. |
| 2006/0017692 A1 | 1/2006 | Wehrenberg et al. |
| 2006/0020904 A1 | 1/2006 | Aaltonen et al. |
| 2006/0026521 A1 | 2/2006 | Hotelling et al. |
| 2006/0029374 A1 | 2/2006 | Park |
| 2006/0031872 A1 | 2/2006 | Hsiao et al. |
| 2006/0033724 A1 | 2/2006 | Chaudhri et al. |
| 2006/0053449 A1 | 3/2006 | Gutta |
| 2006/0053470 A1 | 3/2006 | Colter et al. |
| 2006/0069998 A1 | 3/2006 | Artman et al. |
| 2006/0071905 A1 | 4/2006 | Varanda |
| 2006/0080352 A1 | 4/2006 | Boubez et al. |
| 2006/0097991 A1 | 5/2006 | Hotelling et al. |
| 2006/0107304 A1 | 5/2006 | Cleron et al. |
| 2006/0112346 A1 | 5/2006 | Miksovsky et al. |
| 2006/0112352 A1 | 5/2006 | Tseng et al. |
| 2006/0117267 A1 | 6/2006 | Koralski et al. |
| 2006/0120624 A1 | 6/2006 | Jojic et al. |
| 2006/0195479 A1 | 8/2006 | Spiegelman et al. |
| 2006/0195512 A1 | 8/2006 | Rogers et al. |
| 2006/0197753 A1 | 9/2006 | Hotelling |
| 2006/0224987 A1 | 10/2006 | Caffarelli |
| 2006/0236847 A1 | 10/2006 | Withop |
| 2006/0248113 A1 | 11/2006 | Leffert et al. |
| 2006/0265637 A1 | 11/2006 | Marriott et al. |
| 2006/0271968 A1 | 11/2006 | Zellner |

(56) References Cited

U.S. PATENT DOCUMENTS

| | | |
|---|---|---|
| 2006/0282856 A1 | 12/2006 | Errico et al. |
| 2006/0288848 A1 | 12/2006 | Gould et al. |
| 2006/0294545 A1 | 12/2006 | Morris et al. |
| 2007/0005569 A1 | 1/2007 | Hurst-hiller et al. |
| 2007/0009229 A1 | 1/2007 | Liu |
| 2007/0011702 A1 | 1/2007 | Vaysman |
| 2007/0024594 A1 | 2/2007 | Sakata et al. |
| 2007/0028267 A1 | 2/2007 | Ostojic et al. |
| 2007/0038957 A1 | 2/2007 | White |
| 2007/0073596 A1 | 3/2007 | Alexander et al. |
| 2007/0092204 A1 | 4/2007 | Wagner et al. |
| 2007/0094602 A1 | 4/2007 | Murabayashi |
| 2007/0150802 A1 | 6/2007 | Wan et al. |
| 2007/0150918 A1 | 6/2007 | Carpenter et al. |
| 2007/0154163 A1 | 7/2007 | Cordray |
| 2007/0157220 A1 | 7/2007 | Cordray et al. |
| 2007/0157249 A1 | 7/2007 | Cordray et al. |
| 2007/0168413 A1 | 7/2007 | Barletta et al. |
| 2007/0186254 A1 | 8/2007 | Tsutsui et al. |
| 2007/0199035 A1 | 8/2007 | Schwartz et al. |
| 2007/0204057 A1 | 8/2007 | Shaver et al. |
| 2007/0220580 A1 | 9/2007 | Putterman et al. |
| 2007/0229465 A1 | 10/2007 | Sakai et al. |
| 2007/0233880 A1 | 10/2007 | Nieh et al. |
| 2007/0244902 A1 | 10/2007 | Seide et al. |
| 2007/0248317 A1 | 10/2007 | Bahn |
| 2008/0046928 A1 | 2/2008 | Poling et al. |
| 2008/0046931 A1 | 2/2008 | Corbett et al. |
| 2008/0059884 A1 | 3/2008 | Ellis et al. |
| 2008/0065989 A1 | 3/2008 | Conroy et al. |
| 2008/0066010 A1 | 3/2008 | Brodersen et al. |
| 2008/0077562 A1 | 3/2008 | Schleppe |
| 2008/0092168 A1 | 4/2008 | Logan et al. |
| 2008/0092173 A1 | 4/2008 | Shannon et al. |
| 2008/0111822 A1 | 5/2008 | Horowitz et al. |
| 2008/0120668 A1 | 5/2008 | Yau |
| 2008/0127281 A1 | 5/2008 | Van et al. |
| 2008/0155475 A1 | 6/2008 | Duhig |
| 2008/0163053 A1 | 7/2008 | Hwang et al. |
| 2008/0189740 A1 | 8/2008 | Carpenter et al. |
| 2008/0189742 A1 | 8/2008 | Ellis et al. |
| 2008/0208844 A1 | 8/2008 | Jenkins |
| 2008/0216020 A1 | 9/2008 | Plummer |
| 2008/0222677 A1 | 9/2008 | Woo et al. |
| 2008/0235331 A1 | 9/2008 | Melamed et al. |
| 2008/0235588 A1 | 9/2008 | Gonze et al. |
| 2008/0243817 A1 | 10/2008 | Chan et al. |
| 2008/0250312 A1 | 10/2008 | Curtis |
| 2008/0260252 A1 | 10/2008 | Borgaonkar et al. |
| 2008/0270886 A1 | 10/2008 | Gossweiler et al. |
| 2008/0276278 A1 | 11/2008 | Krieger et al. |
| 2008/0276279 A1 | 11/2008 | Gossweiler et al. |
| 2008/0301260 A1 | 12/2008 | Goldeen et al. |
| 2008/0301579 A1 | 12/2008 | Jonasson et al. |
| 2008/0301734 A1 | 12/2008 | Goldeen et al. |
| 2008/0307343 A1 | 12/2008 | Robert et al. |
| 2008/0307458 A1 | 12/2008 | Kim et al. |
| 2008/0307459 A1 | 12/2008 | Migos |
| 2008/0320391 A1 | 12/2008 | Lemay et al. |
| 2008/0320532 A1 | 12/2008 | Lee |
| 2009/0055385 A1 | 2/2009 | Jeon et al. |
| 2009/0055873 A1 | 2/2009 | Kim et al. |
| 2009/0063521 A1 | 3/2009 | Bull et al. |
| 2009/0063975 A1 | 3/2009 | Rottler et al. |
| 2009/0089837 A1 | 4/2009 | Momosaki |
| 2009/0094662 A1 | 4/2009 | Chang et al. |
| 2009/0106110 A1* | 4/2009 | Stannard ............. G06F 16/178 705/14.1 |
| 2009/0119754 A1 | 5/2009 | Schubert |
| 2009/0158325 A1 | 6/2009 | Johnson |
| 2009/0158326 A1 | 6/2009 | Hunt et al. |
| 2009/0161868 A1 | 6/2009 | Chaudhry |
| 2009/0164944 A1 | 6/2009 | Webster et al. |
| 2009/0165054 A1 | 6/2009 | Rudolph |
| 2009/0174679 A1 | 7/2009 | Westerman |
| 2009/0177301 A1 | 7/2009 | Hayes |
| 2009/0177989 A1 | 7/2009 | Ma et al. |
| 2009/0178083 A1 | 7/2009 | Carr et al. |
| 2009/0228491 A1 | 9/2009 | Malik |
| 2009/0228807 A1 | 9/2009 | Lemay |
| 2009/0228919 A1 | 9/2009 | Zott et al. |
| 2009/0239587 A1 | 9/2009 | Negron et al. |
| 2009/0256807 A1 | 10/2009 | Nurmi |
| 2009/0259957 A1 | 10/2009 | Slocum et al. |
| 2009/0278916 A1 | 11/2009 | Ito |
| 2009/0282444 A1 | 11/2009 | Laksono et al. |
| 2009/0288079 A1 | 11/2009 | Zuber et al. |
| 2009/0313100 A1 | 12/2009 | Ingleshwar |
| 2009/0322962 A1 | 12/2009 | Weeks |
| 2009/0327952 A1 | 12/2009 | Karas et al. |
| 2010/0003007 A1 | 1/2010 | Itakura |
| 2010/0009629 A1 | 1/2010 | Jung et al. |
| 2010/0009719 A1 | 1/2010 | Oh et al. |
| 2010/0017713 A1 | 1/2010 | Igarashi |
| 2010/0031162 A1 | 2/2010 | Wiser et al. |
| 2010/0046608 A1 | 2/2010 | Mccrossan et al. |
| 2010/0053220 A1 | 3/2010 | Ozawa et al. |
| 2010/0053432 A1 | 3/2010 | Cheng et al. |
| 2010/0057696 A1 | 3/2010 | Miyazawa et al. |
| 2010/0064313 A1 | 3/2010 | Beyabani |
| 2010/0080163 A1 | 4/2010 | Krishnamoorthi et al. |
| 2010/0083181 A1 | 4/2010 | Matsushima et al. |
| 2010/0095240 A1 | 4/2010 | Shiplacoff et al. |
| 2010/0100899 A1 | 4/2010 | Bradbury et al. |
| 2010/0104269 A1 | 4/2010 | Prestenback et al. |
| 2010/0115060 A1 | 5/2010 | Julia et al. |
| 2010/0115592 A1 | 5/2010 | Belz et al. |
| 2010/0121714 A1 | 5/2010 | Bryant et al. |
| 2010/0146442 A1 | 6/2010 | Nagasaka et al. |
| 2010/0153881 A1 | 6/2010 | Dinn |
| 2010/0153999 A1 | 6/2010 | Yates |
| 2010/0159898 A1 | 6/2010 | Krzyzanowski et al. |
| 2010/0162172 A1 | 6/2010 | Aroner |
| 2010/0175079 A1 | 7/2010 | Braun et al. |
| 2010/0194998 A1 | 8/2010 | Lee et al. |
| 2010/0198822 A1 | 8/2010 | Glennon et al. |
| 2010/0205628 A1 | 8/2010 | Davis et al. |
| 2010/0211636 A1 | 8/2010 | Starkenburg et al. |
| 2010/0211884 A1 | 8/2010 | Kashyap et al. |
| 2010/0223646 A1 | 9/2010 | Goldeen et al. |
| 2010/0229194 A1 | 9/2010 | Blanchard et al. |
| 2010/0235744 A1 | 9/2010 | Schultz et al. |
| 2010/0251304 A1 | 9/2010 | Donoghue et al. |
| 2010/0257005 A1 | 10/2010 | Phenner et al. |
| 2010/0269145 A1 | 10/2010 | Ingrassia et al. |
| 2010/0275143 A1 | 10/2010 | Fu et al. |
| 2010/0277337 A1 | 11/2010 | Brodersen et al. |
| 2010/0293190 A1 | 11/2010 | Kaiser et al. |
| 2010/0293586 A1 | 11/2010 | Simoes et al. |
| 2010/0299606 A1 | 11/2010 | Morita |
| 2010/0312824 A1 | 12/2010 | Smith et al. |
| 2010/0325660 A1 | 12/2010 | Holden |
| 2010/0333142 A1 | 12/2010 | Busse et al. |
| 2010/0333143 A1 | 12/2010 | Civanlar et al. |
| 2011/0004831 A1 | 1/2011 | Steinberg et al. |
| 2011/0033168 A1 | 2/2011 | Iyer |
| 2011/0047513 A1 | 2/2011 | Onogi et al. |
| 2011/0052146 A1 | 3/2011 | Murthy et al. |
| 2011/0054649 A1 | 3/2011 | Sarkis et al. |
| 2011/0055762 A1 | 3/2011 | Jung et al. |
| 2011/0055870 A1 | 3/2011 | Yum et al. |
| 2011/0071977 A1 | 3/2011 | Nakajima et al. |
| 2011/0078739 A1 | 3/2011 | Grad |
| 2011/0080935 A1 | 4/2011 | Kim et al. |
| 2011/0087992 A1 | 4/2011 | Wang et al. |
| 2011/0090402 A1 | 4/2011 | Huntington et al. |
| 2011/0093415 A1 | 4/2011 | Rhee et al. |
| 2011/0099519 A1 | 4/2011 | Ma et al. |
| 2011/0107220 A1 | 5/2011 | Perlman |
| 2011/0119710 A1 | 5/2011 | Jang et al. |
| 2011/0119715 A1 | 5/2011 | Chang et al. |
| 2011/0122315 A1 | 5/2011 | Schweiger et al. |
| 2011/0126102 A1 | 5/2011 | Archer |
| 2011/0131607 A1 | 6/2011 | Thomas et al. |

(56) References Cited

U.S. PATENT DOCUMENTS

| | | |
|---|---|---|
| 2011/0154194 A1 | 6/2011 | Mathai et al. |
| 2011/0154305 A1 | 6/2011 | Leroux et al. |
| 2011/0157029 A1 | 6/2011 | Tseng |
| 2011/0162022 A1 | 6/2011 | Xia |
| 2011/0163971 A1 | 7/2011 | Wagner et al. |
| 2011/0167339 A1 | 7/2011 | Lemay |
| 2011/0175930 A1 | 7/2011 | Hwang et al. |
| 2011/0179388 A1 | 7/2011 | Fleizach et al. |
| 2011/0179453 A1 | 7/2011 | Poniatowski |
| 2011/0197153 A1 | 8/2011 | King et al. |
| 2011/0209177 A1 | 8/2011 | Sela et al. |
| 2011/0218948 A1 | 9/2011 | De et al. |
| 2011/0231280 A1 | 9/2011 | Farah |
| 2011/0231823 A1 | 9/2011 | Fryc et al. |
| 2011/0231872 A1 | 9/2011 | Gharachorloo et al. |
| 2011/0231878 A1 | 9/2011 | Hunter et al. |
| 2011/0246332 A1 | 10/2011 | Alcodray et al. |
| 2011/0255840 A1 | 10/2011 | Bornsen |
| 2011/0281517 A1 | 11/2011 | Ukkadam |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289452 A1 | 11/2011 | Jordan et al. |
| 2011/0289531 A1 | 11/2011 | Moonka et al. |
| 2011/0289534 A1 | 11/2011 | Jordan et al. |
| 2011/0296351 A1 | 12/2011 | Ewing et al. |
| 2011/0302532 A1 | 12/2011 | Missig |
| 2011/0307631 A1 | 12/2011 | Park et al. |
| 2011/0312278 A1 | 12/2011 | Matsushita et al. |
| 2011/0314497 A1 | 12/2011 | Warrick et al. |
| 2011/0321072 A1 | 12/2011 | Patterson et al. |
| 2012/0019674 A1 | 1/2012 | Ohnishi et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054679 A1 | 3/2012 | Ma et al. |
| 2012/0054797 A1 | 3/2012 | Skog et al. |
| 2012/0059910 A1 | 3/2012 | Cassidy |
| 2012/0060092 A1 | 3/2012 | Hill et al. |
| 2012/0064204 A1 | 3/2012 | Davila et al. |
| 2012/0084136 A1 | 4/2012 | Seth et al. |
| 2012/0093481 A1 | 4/2012 | Mcdowell et al. |
| 2012/0096011 A1 | 4/2012 | Kay et al. |
| 2012/0102573 A1 | 4/2012 | Spooner et al. |
| 2012/0105367 A1 | 5/2012 | Son et al. |
| 2012/0110616 A1 | 5/2012 | Kilar et al. |
| 2012/0110621 A1 | 5/2012 | Gossweiler, III |
| 2012/0114303 A1 | 5/2012 | Chung et al. |
| 2012/0117584 A1 | 5/2012 | Gordon |
| 2012/0124615 A1 | 5/2012 | Lee |
| 2012/0131615 A1 | 5/2012 | Kobayashi et al. |
| 2012/0139938 A1 | 6/2012 | Khedouri et al. |
| 2012/0141095 A1 | 6/2012 | Schwesinger et al. |
| 2012/0144003 A1 | 6/2012 | Rosenbaum et al. |
| 2012/0158524 A1 | 6/2012 | Hintz et al. |
| 2012/0159543 A1 | 6/2012 | Jin et al. |
| 2012/0166998 A1 | 6/2012 | Cotterill et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0215684 A1 | 8/2012 | Kidron |
| 2012/0216113 A1 | 8/2012 | Li |
| 2012/0216117 A1 | 8/2012 | Arriola et al. |
| 2012/0216296 A1 | 8/2012 | Kidron |
| 2012/0221498 A1 | 8/2012 | Kaszynski et al. |
| 2012/0222056 A1 | 8/2012 | Donoghue et al. |
| 2012/0233640 A1 | 9/2012 | Odryna et al. |
| 2012/0242704 A1 | 9/2012 | Bamford et al. |
| 2012/0260291 A1 | 10/2012 | Wood |
| 2012/0260293 A1 | 10/2012 | Young et al. |
| 2012/0262371 A1 | 10/2012 | Lee et al. |
| 2012/0262407 A1 | 10/2012 | Hinckley et al. |
| 2012/0266069 A1 | 10/2012 | Moshiri et al. |
| 2012/0272261 A1 | 10/2012 | Reynolds et al. |
| 2012/0284753 A1 | 11/2012 | Roberts et al. |
| 2012/0290933 A1 | 11/2012 | Rajaraman et al. |
| 2012/0291079 A1 | 11/2012 | Gordon et al. |
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0317482 A1 | 12/2012 | Barraclough et al. |
| 2012/0323938 A1 | 12/2012 | Skeen et al. |
| 2012/0324504 A1 | 12/2012 | Archer et al. |
| 2012/0327125 A1 | 12/2012 | Kutliroff et al. |
| 2013/0007656 A1 | 1/2013 | Li et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Itagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0061267 A1 | 3/2013 | Cansino et al. |
| 2013/0067366 A1 | 3/2013 | Almosnino |
| 2013/0073403 A1 | 3/2013 | Tuchman et al. |
| 2013/0080968 A1 | 3/2013 | Hanson et al. |
| 2013/0083076 A1 | 4/2013 | Liu et al. |
| 2013/0097009 A1 | 4/2013 | Akadiri |
| 2013/0110978 A1 | 5/2013 | Gordon et al. |
| 2013/0124998 A1 | 5/2013 | Pendergast et al. |
| 2013/0132874 A1 | 5/2013 | He et al. |
| 2013/0132966 A1 | 5/2013 | Chanda et al. |
| 2013/0151300 A1 | 6/2013 | Le et al. |
| 2013/0173034 A1 | 7/2013 | Reimann et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0198686 A1 | 8/2013 | Kawai et al. |
| 2013/0205312 A1 | 8/2013 | Huang |
| 2013/0212531 A1 | 8/2013 | Yoshida |
| 2013/0227482 A1 | 8/2013 | Thorsander et al. |
| 2013/0247105 A1 | 9/2013 | Jovanovski et al. |
| 2013/0254308 A1 | 9/2013 | Rose et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1 | 10/2013 | Sasakura |
| 2013/0283168 A1 | 10/2013 | Brown et al. |
| 2013/0283317 A1 | 10/2013 | Guntupalli et al. |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |
| 2013/0332871 A1 | 12/2013 | Bucur et al. |
| 2013/0332960 A1 | 12/2013 | Young et al. |
| 2013/0339877 A1 | 12/2013 | Skeen et al. |
| 2013/0340006 A1 | 12/2013 | Kwan |
| 2013/0346564 A1 | 12/2013 | Warrick et al. |
| 2013/0347044 A1 | 12/2013 | Lee et al. |
| 2014/0006635 A1 | 1/2014 | Braness et al. |
| 2014/0006795 A1 | 1/2014 | Han et al. |
| 2014/0006951 A1 | 1/2014 | Hunter |
| 2014/0012859 A1 | 1/2014 | Heilprin et al. |
| 2014/0013283 A1 | 1/2014 | Matas et al. |
| 2014/0020017 A1 | 1/2014 | Stern et al. |

(56) References Cited

U.S. PATENT DOCUMENTS

| | | |
|---|---|---|
| 2014/0024341 A1 | 1/2014 | Johan |
| 2014/0028780 A1 | 1/2014 | Croen et al. |
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059625 A1 | 2/2014 | Dourado et al. |
| 2014/0059635 A1 | 2/2014 | Sirpal et al. |
| 2014/0067425 A1 | 3/2014 | Dudar et al. |
| 2014/0068654 A1 | 3/2014 | Marlow et al. |
| 2014/0071068 A1 | 3/2014 | Shih et al. |
| 2014/0074454 A1 | 3/2014 | Brown et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0082660 A1 | 3/2014 | Zhang et al. |
| 2014/0088952 A1 | 3/2014 | Fife et al. |
| 2014/0089816 A1 | 3/2014 | Dipersia et al. |
| 2014/0098102 A1 | 4/2014 | Raffle et al. |
| 2014/0101706 A1 | 4/2014 | Kardatzke |
| 2014/0104646 A1 | 4/2014 | Nishiyama |
| 2014/0109204 A1 | 4/2014 | Papillon et al. |
| 2014/0111416 A1 | 4/2014 | Sugiura |
| 2014/0115636 A1 | 4/2014 | Stuckman |
| 2014/0123006 A1 | 5/2014 | Chen et al. |
| 2014/0129232 A1 | 5/2014 | Jones et al. |
| 2014/0130097 A1 | 5/2014 | Londero |
| 2014/0136946 A1 | 5/2014 | Matas |
| 2014/0137029 A1 | 5/2014 | Stephenson et al. |
| 2014/0137030 A1 | 5/2014 | Matas |
| 2014/0143260 A1 | 5/2014 | Simonson et al. |
| 2014/0143683 A1 | 5/2014 | Underwood et al. |
| 2014/0156792 A1 | 6/2014 | Roberts et al. |
| 2014/0157204 A1 | 6/2014 | Roberts et al. |
| 2014/0157329 A1 | 6/2014 | Roberts et al. |
| 2014/0164966 A1 | 6/2014 | Kim et al. |
| 2014/0168071 A1 | 6/2014 | Ahmed et al. |
| 2014/0171153 A1 | 6/2014 | Kienzle et al. |
| 2014/0172622 A1 | 6/2014 | Baronshin |
| 2014/0172953 A1 | 6/2014 | Blanksteen |
| 2014/0173660 A1 | 6/2014 | Correa et al. |
| 2014/0184471 A1 | 7/2014 | Martynov et al. |
| 2014/0189523 A1 | 7/2014 | Shuttleworth et al. |
| 2014/0189574 A1 | 7/2014 | Stallings et al. |
| 2014/0189606 A1 | 7/2014 | Shuttleworth et al. |
| 2014/0196064 A1 | 7/2014 | Kennedy et al. |
| 2014/0196069 A1 | 7/2014 | Ahmed et al. |
| 2014/0208268 A1 | 7/2014 | Jimenez |
| 2014/0208360 A1 | 7/2014 | Kardatzke |
| 2014/0219637 A1 | 8/2014 | Mcintosh et al. |
| 2014/0224867 A1 | 8/2014 | Werner et al. |
| 2014/0244751 A1 | 8/2014 | Tseng |
| 2014/0245148 A1 | 8/2014 | Silva et al. |
| 2014/0245186 A1 | 8/2014 | Tseng |
| 2014/0245222 A1 | 8/2014 | Kovacevic et al. |
| 2014/0250465 A1 | 9/2014 | Mulholland et al. |
| 2014/0250479 A1 | 9/2014 | Lee et al. |
| 2014/0253463 A1 | 9/2014 | Hicks |
| 2014/0259074 A1 | 9/2014 | Ansari et al. |
| 2014/0278072 A1 | 9/2014 | Fino et al. |
| 2014/0278940 A1 | 9/2014 | Wade |
| 2014/0280728 A1 | 9/2014 | Szerlip Joyce et al. |
| 2014/0282208 A1 | 9/2014 | Chaudhri |
| 2014/0282636 A1 | 9/2014 | Petander et al. |
| 2014/0282677 A1 | 9/2014 | Mantell et al. |
| 2014/0288686 A1 | 9/2014 | Sant et al. |
| 2014/0289226 A1 | 9/2014 | English et al. |
| 2014/0289751 A1 | 9/2014 | Hsu et al. |
| 2014/0310742 A1 | 10/2014 | Kim |
| 2014/0317653 A1 | 10/2014 | Mlodzinski |
| 2014/0325357 A1 | 10/2014 | Sant et al. |
| 2014/0333530 A1 | 11/2014 | Agnetta et al. |
| 2014/0337607 A1 | 11/2014 | Peterson et al. |
| 2014/0340358 A1 | 11/2014 | Martinoli |
| 2014/0341109 A1 | 11/2014 | Cartmell et al. |
| 2014/0344247 A1 | 11/2014 | Procopio et al. |
| 2014/0344291 A9 | 11/2014 | Simonson et al. |
| 2014/0344294 A1 | 11/2014 | Skeen et al. |
| 2014/0351691 A1 | 11/2014 | Neil et al. |
| 2014/0359598 A1 | 12/2014 | Oliver et al. |
| 2014/0364056 A1 | 12/2014 | Belk et al. |
| 2014/0365479 A1 | 12/2014 | Lyons et al. |
| 2014/0365481 A1 | 12/2014 | Novosel et al. |
| 2014/0365604 A1 | 12/2014 | Lewis et al. |
| 2014/0365919 A1 | 12/2014 | Shaw et al. |
| 2014/0366040 A1 | 12/2014 | Parker et al. |
| 2014/0366047 A1 | 12/2014 | Thomas et al. |
| 2015/0020127 A1 | 1/2015 | Doshi et al. |
| 2015/0039685 A1 | 2/2015 | Lewis et al. |
| 2015/0046866 A1 | 2/2015 | Shimadate |
| 2015/0067582 A1 | 3/2015 | Donnelly et al. |
| 2015/0067724 A1 | 3/2015 | Johnson et al. |
| 2015/0074522 A1 | 3/2015 | Harned et al. |
| 2015/0074552 A1 | 3/2015 | Chai et al. |
| 2015/0074603 A1 | 3/2015 | Abe et al. |
| 2015/0082187 A1 | 3/2015 | Wallters et al. |
| 2015/0095460 A1 | 4/2015 | Berger et al. |
| 2015/0095845 A1 | 4/2015 | Chun et al. |
| 2015/0106856 A1 | 4/2015 | Rankine |
| 2015/0113000 A1 | 4/2015 | Scheer et al. |
| 2015/0113429 A1 | 4/2015 | Edwards et al. |
| 2015/0121408 A1 | 4/2015 | Jacoby et al. |
| 2015/0134653 A1 | 5/2015 | Bayer et al. |
| 2015/0135049 A1 | 5/2015 | Murphy |
| 2015/0135071 A1 | 5/2015 | Glotzer |
| 2015/0150049 A1 | 5/2015 | White |
| 2015/0150066 A1 | 5/2015 | Park et al. |
| 2015/0153571 A1 | 6/2015 | Ballard et al. |
| 2015/0161251 A1 | 6/2015 | Ramanarayanan et al. |
| 2015/0169705 A1 | 6/2015 | Korbecki et al. |
| 2015/0169975 A1 | 6/2015 | Kienzle et al. |
| 2015/0186002 A1 | 7/2015 | Suzuki et al. |
| 2015/0189347 A1 | 7/2015 | Oztaskent et al. |
| 2015/0193119 A1 | 7/2015 | Chai et al. |
| 2015/0193192 A1 | 7/2015 | Kidron |
| 2015/0195624 A1 | 7/2015 | Gossweiler, III |
| 2015/0205591 A1 | 7/2015 | Jitkoff et al. |
| 2015/0237389 A1 | 8/2015 | Grouf et al. |
| 2015/0296072 A1 | 10/2015 | Zhou et al. |
| 2015/0301729 A1 | 10/2015 | Wang et al. |
| 2015/0309670 A1 | 10/2015 | Wheeler et al. |
| 2015/0312603 A1 | 10/2015 | Singh et al. |
| 2015/0317343 A1 | 11/2015 | Cselle et al. |
| 2015/0318020 A1 | 11/2015 | Pribula |
| 2015/0331685 A1* | 11/2015 | Bourke .................. G06F 8/61 717/174 |
| 2015/0334464 A1 | 11/2015 | Shin |
| 2015/0346975 A1 | 12/2015 | Lee et al. |
| 2015/0350741 A1 | 12/2015 | Rajaraman et al. |
| 2015/0355816 A1 | 12/2015 | Shim |
| 2015/0363035 A1 | 12/2015 | Hinckley et al. |
| 2015/0365729 A1 | 12/2015 | Kaya et al. |
| 2015/0370435 A1 | 12/2015 | Kirmse et al. |
| 2015/0370455 A1 | 12/2015 | Van Os et al. |
| 2015/0370920 A1 | 12/2015 | Van Os et al. |
| 2015/0373107 A1 | 12/2015 | Chan et al. |
| 2015/0382047 A1 | 12/2015 | Van Os et al. |
| 2015/0382066 A1 | 12/2015 | Heeter et al. |
| 2016/0004425 A1 | 1/2016 | Yoon et al. |
| 2016/0004772 A1 | 1/2016 | Kim et al. |
| 2016/0004773 A1 | 1/2016 | Jannink et al. |
| 2016/0005013 A1 | 1/2016 | Perry |
| 2016/0014461 A1 | 1/2016 | Leech et al. |
| 2016/0021412 A1 | 1/2016 | Zito, Jr. |
| 2016/0035119 A1 | 2/2016 | Lee et al. |
| 2016/0036897 A1 | 2/2016 | Kim et al. |
| 2016/0041702 A1 | 2/2016 | Wang |
| 2016/0043962 A1 | 2/2016 | Kim et al. |
| 2016/0066004 A1 | 3/2016 | Lieu et al. |

(56) References Cited

U.S. PATENT DOCUMENTS

| | | |
|---|---|---|
| 2016/0066021 A1 | 3/2016 | Thomas et al. |
| 2016/0066040 A1 | 3/2016 | Webster et al. |
| 2016/0066049 A1 | 3/2016 | Mountain |
| 2016/0078465 A1 | 3/2016 | Chai et al. |
| 2016/0078526 A1 | 3/2016 | Nations et al. |
| 2016/0080815 A1 | 3/2016 | Ruffini et al. |
| 2016/0092042 A1 | 3/2016 | Yenigalla et al. |
| 2016/0092559 A1 | 3/2016 | Lind et al. |
| 2016/0096113 A1 | 4/2016 | Decoufle |
| 2016/0099991 A1 | 4/2016 | Lonkar et al. |
| 2016/0105540 A1 | 4/2016 | Kwon et al. |
| 2016/0110064 A1 | 4/2016 | Shapira |
| 2016/0127783 A1 | 5/2016 | Garcia Navarro |
| 2016/0127789 A1 | 5/2016 | Roberts et al. |
| 2016/0133230 A1 | 5/2016 | Daniels et al. |
| 2016/0142783 A1 | 5/2016 | Bagga et al. |
| 2016/0165307 A1 | 6/2016 | Lavender et al. |
| 2016/0188902 A1 | 6/2016 | Jin |
| 2016/0191639 A1 | 6/2016 | Dai et al. |
| 2016/0192017 A1 | 6/2016 | Tirpak |
| 2016/0231885 A1 | 8/2016 | Lee et al. |
| 2016/0249105 A1 | 8/2016 | Carney Landow |
| 2016/0255379 A1 | 9/2016 | Langan et al. |
| 2016/0277785 A1 | 9/2016 | Newman et al. |
| 2016/0345070 A1 | 11/2016 | Beeson et al. |
| 2016/0357305 A1 | 12/2016 | Wells et al. |
| 2016/0357352 A1 | 12/2016 | Matas et al. |
| 2016/0357355 A1 | 12/2016 | Carrigan et al. |
| 2016/0357366 A1 | 12/2016 | Migos et al. |
| 2016/0370982 A1 | 12/2016 | Penha et al. |
| 2016/0378283 A1 | 12/2016 | Cockcroft et al. |
| 2017/0010846 A1 | 1/2017 | Bernstein et al. |
| 2017/0010847 A1 | 1/2017 | Bernstein et al. |
| 2017/0013295 A1 | 1/2017 | Wertheimer et al. |
| 2017/0046039 A1 | 2/2017 | Karunamuni et al. |
| 2017/0046339 A1 | 2/2017 | Bhat et al. |
| 2017/0068402 A1 | 3/2017 | Lochhead et al. |
| 2017/0068511 A1 | 3/2017 | Brown et al. |
| 2017/0070786 A1 | 3/2017 | Keene et al. |
| 2017/0094360 A1 | 3/2017 | Keighran et al. |
| 2017/0097969 A1 | 4/2017 | Stein et al. |
| 2017/0115867 A1 | 4/2017 | Bargmann |
| 2017/0124594 A1 | 5/2017 | Naiga et al. |
| 2017/0132659 A1 | 5/2017 | Dirks et al. |
| 2017/0132829 A1 | 5/2017 | Blas et al. |
| 2017/0134778 A1 | 5/2017 | Christie et al. |
| 2017/0140748 A1 | 5/2017 | Roberts et al. |
| 2017/0185240 A1 | 6/2017 | Delrosario et al. |
| 2017/0188116 A1 | 6/2017 | Major et al. |
| 2017/0192642 A1 | 7/2017 | Fishman et al. |
| 2017/0195736 A1 | 7/2017 | Chai et al. |
| 2017/0201850 A1 | 7/2017 | Raleigh et al. |
| 2017/0214975 A1 | 7/2017 | Schmidt et al. |
| 2017/0220228 A1 | 8/2017 | Sang et al. |
| 2017/0242913 A1 | 8/2017 | Tijssen et al. |
| 2017/0243244 A1 | 8/2017 | Trabelsi et al. |
| 2017/0245017 A1 | 8/2017 | Chaudhri et al. |
| 2017/0251257 A1 | 8/2017 | Obrien |
| 2017/0272543 A1 | 9/2017 | Lo et al. |
| 2017/0300151 A1 | 10/2017 | Lue-sang et al. |
| 2017/0339443 A1 | 11/2017 | Lue-sang et al. |
| 2017/0344553 A1 | 11/2017 | Evnine et al. |
| 2017/0345040 A1 | 11/2017 | Pirnack et al. |
| 2017/0353603 A1 | 12/2017 | Grunewald et al. |
| 2017/0357387 A1 | 12/2017 | Clarke |
| 2017/0359722 A1 | 12/2017 | Folse et al. |
| 2017/0364246 A1 | 12/2017 | Van Os et al. |
| 2017/0364274 A1* | 12/2017 | Hammons ........... G06F 11/3438 |
| 2018/0011580 A1 | 1/2018 | Lebowitz et al. |
| 2018/0027279 A1 | 1/2018 | Templeman |
| 2018/0041814 A1 | 2/2018 | Christie et al. |
| 2018/0053094 A1 | 2/2018 | Patel et al. |
| 2018/0063591 A1 | 3/2018 | Newman et al. |
| 2018/0070121 A1 | 3/2018 | Zimmerman et al. |
| 2018/0070138 A1 | 3/2018 | Chai et al. |
| 2018/0107353 A1 | 4/2018 | Lee |
| 2018/0113579 A1 | 4/2018 | Johnston et al. |
| 2018/0130097 A1 | 5/2018 | Tran et al. |
| 2018/0136800 A1 | 5/2018 | Johnston et al. |
| 2018/0146377 A1 | 5/2018 | Folse et al. |
| 2018/0189076 A1 | 7/2018 | Liston et al. |
| 2018/0253900 A1 | 9/2018 | Finding et al. |
| 2018/0275855 A1 | 9/2018 | Van Os et al. |
| 2018/0293210 A1 | 10/2018 | Xue et al. |
| 2018/0293771 A1 | 10/2018 | Piemonte et al. |
| 2018/0295403 A1 | 10/2018 | Christie et al. |
| 2018/0302680 A1 | 10/2018 | Cormican |
| 2018/0343497 A1 | 11/2018 | Brown et al. |
| 2018/0349509 A1 | 12/2018 | Abou Mahmoud et al. |
| 2018/0367834 A1 | 12/2018 | Carpenter et al. |
| 2018/0367863 A1 | 12/2018 | Newman et al. |
| 2019/0012048 A1 | 1/2019 | Johnston et al. |
| 2019/0020925 A1 | 1/2019 | Christie et al. |
| 2019/0028769 A1 | 1/2019 | Jeon et al. |
| 2019/0045271 A1 | 2/2019 | Christie et al. |
| 2019/0052744 A1 | 2/2019 | Jung et al. |
| 2019/0058921 A1 | 2/2019 | Christie et al. |
| 2019/0066672 A1 | 2/2019 | Wood et al. |
| 2019/0073104 A1 | 3/2019 | Wang |
| 2019/0073680 A1 | 3/2019 | Knox |
| 2019/0129588 A1 | 5/2019 | Johnston et al. |
| 2019/0138163 A1 | 5/2019 | Howland et al. |
| 2019/0141399 A1* | 5/2019 | Auxer ............... H04N 21/4753 |
| 2019/0258373 A1 | 8/2019 | Davydov et al. |
| 2019/0272853 A1 | 9/2019 | Moore |
| 2019/0324614 A1 | 10/2019 | Brillon et al. |
| 2019/0342616 A1 | 11/2019 | Domm et al. |
| 2019/0354264 A1 | 11/2019 | Van Os et al. |
| 2019/0373320 A1 | 12/2019 | Balsamo |
| 2020/0034792 A1 | 1/2020 | Rogers et al. |
| 2020/0068274 A1 | 2/2020 | Aher et al. |
| 2020/0084488 A1 | 3/2020 | Christie et al. |
| 2020/0099985 A1 | 3/2020 | Keighran et al. |
| 2020/0133631 A1 | 4/2020 | Christie et al. |
| 2020/0137175 A1 | 4/2020 | Ganci et al. |
| 2020/0145726 A1 | 5/2020 | Ciuca et al. |
| 2020/0213642 A1 | 7/2020 | Bartos et al. |
| 2020/0257415 A1 | 8/2020 | Clarke |
| 2020/0272666 A1 | 8/2020 | Van Os et al. |
| 2020/0301567 A1 | 9/2020 | Park et al. |
| 2020/0301575 A1 | 9/2020 | Lindholm et al. |
| 2020/0304863 A1 | 9/2020 | Domm et al. |
| 2020/0304876 A1 | 9/2020 | Cielak et al. |
| 2020/0304879 A1 | 9/2020 | Ellingford |
| 2020/0304880 A1 | 9/2020 | Diaz Delgado et al. |
| 2020/0344531 A1 | 10/2020 | Soundararajan et al. |
| 2020/0356160 A1 | 11/2020 | Kosugi et al. |
| 2020/0363934 A1 | 11/2020 | Van Os et al. |
| 2020/0374595 A1 | 11/2020 | Yang et al. |
| 2020/0380029 A1 | 12/2020 | Chen |
| 2020/0382845 A1 | 12/2020 | Payne |
| 2020/0396507 A1 | 12/2020 | Balsamo |
| 2021/0021903 A1 | 1/2021 | Christie et al. |
| 2021/0092489 A1 | 3/2021 | Dutta et al. |
| 2021/0168424 A1 | 6/2021 | Sharma |
| 2021/0181901 A1 | 6/2021 | Johnston et al. |
| 2021/0195277 A1 | 6/2021 | Thurlow et al. |
| 2021/0286454 A1 | 9/2021 | Beaumier et al. |
| 2021/0306711 A1 | 9/2021 | Ellingford et al. |
| 2021/0337280 A1 | 10/2021 | Diaz Delgado et al. |
| 2021/0345004 A1 | 11/2021 | Christie et al. |
| 2021/0365134 A1 | 11/2021 | Beaumier et al. |
| 2021/0397306 A1 | 12/2021 | Rajam et al. |
| 2021/0406995 A1 | 12/2021 | Peters et al. |
| 2021/0409822 A1 | 12/2021 | Aher et al. |
| 2022/0057984 A1 | 2/2022 | Yang et al. |
| 2022/0132215 A1 | 4/2022 | Venugopal et al. |
| 2022/0179526 A1 | 6/2022 | Schöberl |
| 2022/0244824 A1 | 8/2022 | Cielak |
| 2022/0321940 A1 | 10/2022 | Christie et al. |
| 2022/0329891 A1 | 10/2022 | Christie et al. |
| 2022/0337914 A1 | 10/2022 | Christie et al. |
| 2022/0360858 A1 | 11/2022 | Christie et al. |
| 2022/0413796 A1 | 12/2022 | Christie et al. |

(56) References Cited

U.S. PATENT DOCUMENTS

| | | | |
|---|---|---|---|
| 2023/0022781 A1 | 1/2023 | Lindholm et al. |
| 2023/0033604 A1 | 2/2023 | Diaz Delgado et al. |
| 2023/0096458 A1 | 3/2023 | Van Os et al. |
| 2023/0127228 A1 | 4/2023 | Clarke |
| 2023/0132595 A1 | 5/2023 | Van Os et al. |
| 2023/0328327 A1 | 10/2023 | Cielak et al. |
| 2024/0037144 A1 | 2/2024 | Chen |
| 2024/0089550 A1 | 3/2024 | Ellingford et al. |
| 2024/0089553 A1 | 3/2024 | Payne |
| 2024/0126401 A1 | 4/2024 | Rajam et al. |
| 2024/0220195 A1 | 7/2024 | Christie et al. |
| 2024/0267583 A1 | 8/2024 | Domm et al. |
| 2024/0302952 A1 | 9/2024 | Wood et al. |
| 2024/0323473 A1 | 9/2024 | Newman et al. |
| 2024/0388761 A1 | 11/2024 | Christie et al. |
| 2024/0402899 A1 | 12/2024 | Sart et al. |
| 2024/0419736 A1 | 12/2024 | Van Os et al. |
| 2024/0422394 A1 | 12/2024 | Keighran et al. |
| 2025/0021218 A1 | 1/2025 | Os et al. |

FOREIGN PATENT DOCUMENTS

| | | |
|---|---|---|
| AU | 2017101431 A4 | 11/2017 |
| AU | 2018100810 A4 | 7/2018 |
| CN | 1295419 A | 5/2001 |
| CN | 1391765 A | 1/2003 |
| CN | 1985277 A | 6/2007 |
| CN | 1985327 A | 6/2007 |
| CN | 101160932 A | 4/2008 |
| CN | 101228570 A | 7/2008 |
| CN | 101317149 A | 12/2008 |
| CN | 101370104 A | 2/2009 |
| CN | 101405679 A | 4/2009 |
| CN | 101436110 A | 5/2009 |
| CN | 101465993 A | 6/2009 |
| CN | 101529437 A | 9/2009 |
| CN | 101641662 A | 2/2010 |
| CN | 101699505 A | 4/2010 |
| CN | 101706704 A | 5/2010 |
| CN | 101719125 A | 6/2010 |
| CN | 101860447 A | 10/2010 |
| CN | 102098537 A | 6/2011 |
| CN | 102103460 A | 6/2011 |
| CN | 102187338 A | 9/2011 |
| CN | 102265586 A | 11/2011 |
| CN | 102325144 A | 1/2012 |
| CN | 102541419 A | 7/2012 |
| CN | 102819715 A | 12/2012 |
| CN | 102859484 A | 1/2013 |
| CN | 102880404 A | 1/2013 |
| CN | 102890615 A | 1/2013 |
| CN | 102939515 A | 2/2013 |
| CN | 102955653 A | 3/2013 |
| CN | 102981695 A | 3/2013 |
| CN | 103037265 A | 4/2013 |
| CN | 103177738 A | 6/2013 |
| CN | 103399967 A | 11/2013 |
| CN | 103516933 A | 1/2014 |
| CN | 103546816 A | 1/2014 |
| CN | 103562848 A | 2/2014 |
| CN | 103562947 A | 2/2014 |
| CN | 103620531 A | 3/2014 |
| CN | 103620541 A | 3/2014 |
| CN | 103620639 A | 3/2014 |
| CN | 103686418 A | 3/2014 |
| CN | 103985045 A | 8/2014 |
| CN | 103999017 A | 8/2014 |
| CN | 104508618 A | 4/2015 |
| CN | 104822098 A | 8/2015 |
| CN | 105190590 A | 12/2015 |
| CN | 105247526 A | 1/2016 |
| CN | 105264479 A | 1/2016 |
| CN | 105303372 A | 2/2016 |
| CN | 105308634 A | 2/2016 |
| CN | 105308923 A | 2/2016 |
| CN | 105336350 A | 2/2016 |
| CN | 105657554 A | 6/2016 |
| CN | 105812849 A | 7/2016 |
| CN | 105828098 A | 8/2016 |
| CN | 105955520 A | 9/2016 |
| CN | 105955607 A | 9/2016 |
| CN | 105989085 A | 10/2016 |
| CN | 105992068 A | 10/2016 |
| CN | 106101982 A | 11/2016 |
| CN | 107710131 A | 2/2018 |
| CN | 108292190 A | 7/2018 |
| CN | 109313491 A | 2/2019 |
| CN | 109313651 A | 2/2019 |
| DE | 202016003233 U1 | 8/2016 |
| EP | 0608708 A2 | 8/1994 |
| EP | 0624853 A2 | 11/1994 |
| EP | 2386984 A2 | 11/2011 |
| EP | 2453667 A1 | 5/2012 |
| EP | 2535844 A2 | 12/2012 |
| EP | 2574089 A1 | 3/2013 |
| EP | 2605203 A1 | 6/2013 |
| EP | 2642402 A2 | 9/2013 |
| EP | 2672703 A1 | 12/2013 |
| EP | 2679017 A2 | 1/2014 |
| EP | 2704032 A2 | 3/2014 |
| EP | 2725531 A1 | 4/2014 |
| EP | 2879398 A1 | 6/2015 |
| JP | 2000-112977 A | 4/2000 |
| JP | 2000-163031 A | 6/2000 |
| JP | 2001-197445 A | 7/2001 |
| JP | 2002-027381 A | 1/2002 |
| JP | 2002-342033 A | 11/2002 |
| JP | 2003-099452 A | 4/2003 |
| JP | 2003-534737 A | 11/2003 |
| JP | 2004-062237 A | 2/2004 |
| JP | 2006-031219 A | 2/2006 |
| JP | 2007-124465 A | 5/2007 |
| JP | 2007-512640 A | 5/2007 |
| JP | 2007-140910 A | 6/2007 |
| JP | 2007-294068 A | 11/2007 |
| JP | 2008-071112 A | 3/2008 |
| JP | 2008-135911 A | 6/2008 |
| JP | 2009-060328 A | 3/2009 |
| JP | 2009-206957 A | 9/2009 |
| JP | 2009-260947 A | 11/2009 |
| JP | 2009276557 A | 11/2009 |
| JP | 2010-028437 A | 2/2010 |
| JP | 2010-056595 A | 3/2010 |
| JP | 2010-509684 A | 3/2010 |
| JP | 2010-114733 A | 5/2010 |
| JP | 2011-512701 A | 4/2011 |
| JP | 2011076588 A | 4/2011 |
| JP | 2011-123750 A | 6/2011 |
| JP | 2011-154455 A | 8/2011 |
| JP | 2011-182146 A | 9/2011 |
| JP | 2011-205562 A | 10/2011 |
| JP | 2011-257930 A | 12/2011 |
| JP | 2012-095123 A | 5/2012 |
| JP | 2012-123685 A | 6/2012 |
| JP | 2012-208622 A | 10/2012 |
| JP | 2013-008369 A | 1/2013 |
| JP | 2013-12021 A | 1/2013 |
| JP | 2013-223150 A | 10/2013 |
| JP | 2013-235523 A | 11/2013 |
| JP | 2013-242610 A | 12/2013 |
| JP | 2014-081740 A | 5/2014 |
| JP | 2014-102660 A | 6/2014 |
| JP | 2015-050655 A | 3/2015 |
| JP | 2015-70404 A | 4/2015 |
| KR | 10-2001-0005939 A | 1/2001 |
| KR | 10-2001-0035356 A | 5/2001 |
| KR | 10-2002-0010151 A | 2/2002 |
| KR | 10-2007-0114329 A | 12/2007 |
| KR | 10-2009-0106104 A | 10/2009 |
| KR | 10-2010-0039194 A | 4/2010 |
| KR | 10-2011-0036408 A | 4/2011 |
| KR | 10-2011-0061811 A | 6/2011 |
| KR | 10-20120076682 A | 7/2012 |
| KR | 10-20120124445 A | 11/2012 |

(56) References Cited

FOREIGN PATENT DOCUMENTS

| | | | |
|---|---|---|---|
| KR | 10-2013-0014712 A | 2/2013 | |
| KR | 10-2013-0058034 A | 6/2013 | |
| KR | 10-20130137969 A | 12/2013 | |
| KR | 10-20140041939 A | 4/2014 | |
| KR | 10-2019-0033658 A | 3/2019 | |
| KR | 10-2022-0041231 A | 3/2022 | |
| TW | 200622893 A | 7/2006 | |
| TW | 200719204 A | 5/2007 | |
| TW | 201337717 A | 9/2013 | |
| TW | 201349049 A | 12/2013 | |
| TW | 201351261 A | 12/2013 | |
| WO | 1994/009438 A2 | 4/1994 | |
| WO | 1999/040728 A1 | 8/1999 | |
| WO | 2004/063862 A2 | 7/2004 | |
| WO | 2004/102285 A2 | 11/2004 | |
| WO | 2005/050652 A1 | 6/2005 | |
| WO | 2005/109345 A1 | 11/2005 | |
| WO | 2007/078623 A2 | 7/2007 | |
| WO | 2008/005135 A1 | 1/2008 | |
| WO | 2008/060486 A2 | 5/2008 | |
| WO | 2009/016607 A2 | 2/2009 | |
| WO | 2009/039786 A1 | 4/2009 | |
| WO | 2009/148781 A1 | 12/2009 | |
| WO | 2010/022570 A1 | 3/2010 | |
| WO | 2010/025168 A1 | 3/2010 | |
| WO | 2010/118690 A1 | 10/2010 | |
| WO | 2011/095693 A1 | 8/2011 | |
| WO | 2011/158475 A1 | 12/2011 | |
| WO | 2012/012446 A2 | 1/2012 | |
| WO | 2012/061760 A2 | 5/2012 | |
| WO | 2012/088665 A1 | 7/2012 | |
| WO | 2013/000741 A1 | 1/2013 | |
| WO | 2013/149128 A2 | 10/2013 | |
| WO | 2013/169849 A2 | 11/2013 | |
| WO | 2013/169877 A2 | 11/2013 | |
| WO | 2013/187370 A1 | 12/2013 | |
| WO | 2013/149128 A3 | 2/2014 | |
| WO | 2014/105276 A1 | 7/2014 | |
| WO | 2014/144908 A1 | 9/2014 | |
| WO | 2014/177929 A2 | 11/2014 | |
| WO | 2014/200730 A1 | 12/2014 | |
| WO | 2015/200227 A1 | 12/2015 | |
| WO | 2015/200228 A1 | 12/2015 | |
| WO | 2015/200537 A2 | 12/2015 | |
| WO | 2016/030437 A1 | 3/2016 | |
| WO | 2016/048308 A1 | 3/2016 | |
| WO | 2016/048310 A1 | 3/2016 | |
| WO | 2016/111065 A1 | 7/2016 | |
| WO | 2017/008079 A1 | 1/2017 | |
| WO | 2017/124116 A1 | 7/2017 | |
| WO | 2017/200923 A1 | 11/2017 | |
| WO | 2017/218104 A1 | 12/2017 | |
| WO | 2018/081157 A1 | 5/2018 | |

OTHER PUBLICATIONS

Corrected Notice of Allowability received for U.S. Appl. No. 16/108,519, mailed on Dec. 22, 2021, 3 pages.
Corrected Notice of Allowance received for U.S. Appl. No. 15/876,715, mailed on Apr. 11, 2022, 4 Pages.
Corrected Notice of Allowance received for U.S. Appl. No. 15/876,715, mailed on Apr. 19, 2022, 4 Pages.
Corrected Notice of Allowance received for U.S. Appl. No. 15/876,715, mailed on Oct. 20, 2021, 2 pages.
Corrected Notice of Allowance received for U.S. Appl. No. 16/142,635, mailed on Mar. 10, 2022, 2 Pages.
Corrected Notice of Allowance received for U.S. Appl. No. 16/233,990, mailed on Mar. 8, 2022, 4 pages.
Corrected Notice of Allowance received for U.S. Appl. No. 16/827,931, mailed on Dec. 6, 2021, 4 pages.
Corrected Notice of Allowance received for U.S. Appl. No. 16/872,274, mailed on Aug. 12, 2022, 5 pages.
Corrected Notice of Allowance received for U.S. Appl. No. 16/945,724, mailed on Aug. 31, 2022, 2 pages.
Corrected Notice of Allowance received for U.S. Appl. No. 17/000,112, mailed on Jun. 17, 2022, 2 pages.
Corrected Notice of Allowance received for U.S. Appl. No. 17/065,387, mailed on Mar. 30, 2022, 2 Pages.
Cover Flow, Wikipedia, Available online at: <https://en.wikipedia.org/w/index.php?title=Cover_Flow&oldid=879285208>, Jan. 20, 2019, 3 pages.
Examiner's Answer to Appeal Brief received for U.S. Appl. No. 15/876,715, mailed on Aug. 18, 2020, 16 pages.
Extended European Search Report received for European Patent Application No. 20190698.9, mailed on Oct. 30, 2020, 6 pages.
Extended European Search Report received for European Patent Application No. 20199219.5, mailed on Apr. 22, 2021, 8 pages.
Extended European Search Report received for European Patent Application No. 22167405.4, mailed on Jul. 4, 2022, 11 Pages.
Final Office Action received for U.S. Appl. No. 15/272,397, mailed on Mar. 7, 2017, 23 pages.
Final Office Action received for U.S. Appl. No. 15/719,404, mailed on Mar. 30, 2021, 19 pages.
Final Office Action received for U.S. Appl. No. 15/876,715, mailed on Nov. 5, 2018, 15 pages.
Final Office Action received for U.S. Appl. No. 16/108,519, mailed on Nov. 25, 2020, 12 pages.
Final Office Action received for U.S. Appl. No. 16/142,635, mailed on Feb. 3, 2021, 23 pages.
Final Office Action received for U.S. Appl. No. 16/144,077, mailed on Jul. 12, 2019, 22 pages.
Final Office Action received for U.S. Appl. No. 16/175,565, mailed on May 27, 2022, 33 pages.
Final Office Action received for U.S. Appl. No. 16/175,565, mailed on Nov. 12, 2020, 40 pages.
Final Office Action received for U.S. Appl. No. 16/233,990, mailed on Jan. 11, 2021, 17 pages.
Final Office Action received for U.S. Appl. No. 16/584,790, mailed on Jun. 14, 2022, 37 pages.
Final Office Action received for U.S. Appl. No. 16/584,790, mailed on Jun. 15, 2021, 30 pages.
Final Office Action received for U.S. Appl. No. 16/682,443, mailed on Mar. 9, 2021, 9 pages.
Final Office Action received for U.S. Appl. No. 16/697,090, mailed on Feb. 23, 2022, 25 pages.
Final Office Action received for U.S. Appl. No. 16/697,090, mailed on Jan. 27, 2021, 18 pages.
Final Office Action received for U.S. Appl. No. 16/827,910, mailed on Feb. 28, 2022, 17 pages.
Final Office Action received for U.S. Appl. No. 16/827,918, mailed on Jul. 8, 2021, 31 pages.
Final Office Action received for U.S. Appl. No. 16/827,926, mailed on Mar. 17, 2021, 44 pages.
Final Office Action received for U.S. Appl. No. 16/865,172, mailed on Feb. 12, 2021, 29 pages.
Final Office Action received for U.S. Appl. No. 16/872,274, mailed on Dec. 23, 2021, 20 pages.
Final Office Action received for U.S. Appl. No. 16/888,453, mailed on Apr. 8, 2022, 39 pages.
Final Office Action received for U.S. Appl. No. 16/888,478, mailed on Nov. 15, 2021, 27 pages.
Final Office Action received for U.S. Appl. No. 17/133,550, mailed on Feb. 11, 2022, 18 pages.
Final Office Action received for U.S. Appl. No. 17/210,352, mailed on Jun. 3, 2022, 21 pages.
Final Office Action received for U.S. Appl. No. 17/353,527, mailed on May 11, 2022, 17 Pages.
International Search Report received for PCT Patent Application No. PCT/US2017/031764, mailed on Aug. 7, 2017, 2 pages.
International Search Report received for PCT Patent Application No. PCT/US2019/034921, mailed on Nov. 19, 2019, 5 pages.
International Search Report received for PCT Patent Application No. PCT/US2020/024452, mailed on Aug. 6, 2020, 6 pages.
International Search Report received for PCT Patent Application No. PCT/US2020/024485, mailed on Aug. 3, 2020, 6 pages.

(56) References Cited

OTHER PUBLICATIONS

International Search Report received for PCT Patent Application No. PCT/US2020/024486, mailed on Aug. 11, 2020, 6 pages.
International Search Report received for PCT Patent Application No. PCT/US2020/024492, mailed on Aug. 10, 2020, 6 pages.
International Search Report received for PCT Patent Application No. PCT/US2020/035423, mailed on Oct. 13, 2020, 4 pages.
Invitation to Pay Additional Fees received for PCT Patent Application No. PCT/US2019/034921, mailed on Sep. 24, 2019, 12 pages.
Invitation to Pay Additional Fees received for PCT Patent Application No. PCT/US2020/024452, mailed on Jun. 15, 2020, 13 pages.
Invitation to Pay Additional Fees received for PCT Patent Application No. PCT/US2020/024485, mailed on Jun. 8, 2020, 11 pages.
Invitation to Pay Additional Fees received for PCT Patent Application No. PCT/US2020/024486, mailed on Jun. 3, 2020, 11 pages.
Invitation to Pay Additional Fees received for PCT Patent Application No. PCT/US2020/024492, mailed on Jun. 8, 2020, 10 pages.
Non-Final Office Action received for U.S. Appl. No. 15/167,801, mailed on Dec. 11, 2020, 18 pages.
Non-Final Office Action received for U.S. Appl. No. 15/167,801, mailed on May 18, 2022, 17 Pages.
Non-Final Office Action received for U.S. Appl. No. 15/167,801, mailed on Sep. 3, 2021, 17 pages.
Non-Final Office Action received for U.S. Appl. No. 15/272,397, mailed on Nov. 22, 2016, 20 pages.
Non-Final Office Action received for U.S. Appl. No. 15/719,404, mailed on Nov. 26, 2021, 19 pages.
Non-Final Office Action received for U.S. Appl. No. 15/719,404, mailed on Oct. 16, 2020, 18 pages.
Non-Final Office Action received for U.S. Appl. No. 15/876,715, mailed on Jun. 4, 2018, 12 pages.
Non-Final Office Action received for U.S. Appl. No. 15/876,715, mailed on Sep. 10, 2019, 13 pages.
Non-Final Office Action received for U.S. Appl. No. 16/108,519, mailed on Apr. 5, 2021, 13 pages.
Non-Final Office Action received for U.S. Appl. No. 16/126,962, mailed on Aug. 25, 2020, 22 pages.
Non-Final Office Action received for U.S. Appl. No. 16/136,005, mailed on Sep. 9, 2020, 10 pages.
Non-Final Office Action received for U.S. Appl. No. 16/142,635, mailed on Jun. 11, 2021, 23 pages.
Non-Final Office Action received for U.S. Appl. No. 16/144,077, mailed on Feb. 19, 2019, 24 pages.
Non-Final Office Action received for U.S. Appl. No. 16/144,077, mailed on Nov. 27, 2019, 40 pages.
Non-Final Office Action received for U.S. Appl. No. 16/175,565, mailed on Sep. 20, 2021, 33 pages.
Non-Final Office Action received for U.S. Appl. No. 16/233,990, mailed on Jul. 9, 2021, 18 pages.
Non-Final Office Action received for U.S. Appl. No. 16/584,790, mailed on Dec. 23, 2020, 30 pages.
Non-Final Office Action received for U.S. Appl. No. 16/584,790, mailed on Feb. 1, 2022, 33 pages.
Non-Final Office Action received for U.S. Appl. No. 16/682,443, mailed on Sep. 23, 2020, 10 pages.
Non-Final Office Action received for U.S. Appl. No. 16/697,090, mailed on Aug. 3, 2021, 16 pages.
Non-Final Office Action received for U.S. Appl. No. 16/697,090, mailed on Jul. 7, 2022, 25 pages.
Non-Final Office Action received for U.S. Appl. No. 16/827,910, mailed on Jun. 17, 2021, 16 pages.
Non-Final Office Action received for U.S. Appl. No. 16/827,918, mailed on Dec. 10, 2020, 28 pages.
Non-Final Office Action received for U.S. Appl. No. 16/827,926, mailed on Apr. 25, 2022, 27 pages.
Non-Final Office Action received for U.S. Appl. No. 16/827,926, mailed on Oct. 29, 2020, 45 pages.
Non-Final Office Action received for U.S. Appl. No. 16/827,931, mailed on Mar. 3, 2021, 24 pages.
Non-Final Office Action received for U.S. Appl. No. 16/865,172 mailed on Jun. 29, 2021, 29 pages.
Non-Final Office Action received for U.S. Appl. No. 16/865,172, mailed on Aug. 20, 2020, 19 pages.
Non-Final Office Action received for U.S. Appl. No. 16/872,274, mailed on Jul. 9, 2021, 19 pages.
Non-Final Office Action received for U.S. Appl. No. 16/888,453, mailed on Jun. 4, 2021, 37 pages.
Non-Final Office Action received for U.S. Appl. No. 16/888,478, mailed on Feb. 8, 2021, 24 pages.
Non-Final Office Action received for U.S. Appl. No. 16/888,478, mailed on May 2, 2022, 29 pages.
Non-Final Office Action received for U.S. Appl. No. 16/945,724, mailed on Jul. 19, 2021, 8 pages.
Non-Final Office Action received for U.S. Appl. No. 17/000,112, mailed on Dec. 7, 2021, 15 pages.
Non-Final Office Action received for U.S. Appl. No. 17/065,387, mailed on Jan. 28, 2021, 28 pages.
Non-Final Office Action received for U.S. Appl. No. 17/065,387, mailed on Jun. 1, 2021, 25 pages.
Non-Final Office Action received for U.S. Appl. No. 17/133,550, mailed on Jun. 8, 2021, 23 pages.
Non-Final Office Action received for U.S. Appl. No. 17/210,352, mailed on Oct. 18, 2021, 18 pages.
Non-Final Office Action received for U.S. Appl. No. 17/353,527, mailed on Oct. 5, 2021, 14 pages.
Non-Final Office Action received for U.S. Appl. No. 17/379,785, mailed on Mar. 30, 2022, 18 Pages.
Non-Final Office Action received for U.S. Appl. No. 17/457,901, mailed on Apr. 28, 2022, 24 Pages.
Non-Final Office Action received for U.S. Appl. No. 16/175,565, mailed on Mar. 4, 2020, 36 pages.
Notice of Allowance received for Chinese Patent Application No. 201780003477.7, mailed on Nov. 8, 2019, 3 page (Official Copy only).
Notice of Allowance received for U.S. Appl. No. 15/272,397, mailed on Oct. 18, 2017, 8 pages.
Notice of Allowance received for U.S. Appl. No. 15/719,404, mailed on Jul. 13, 2022, 8 Pages.
Notice of Allowance received for U.S. Appl. No. 15/876,715, mailed on Apr. 4, 2022, 7 pages.
Notice of Allowance received for U.S. Appl. No. 15/876,715, mailed on Aug. 3, 2022, 7 Pages.
Notice of Allowance received for U.S. Appl. No. 15/876,715, mailed on Oct. 14, 2021, 7 pages.
Notice of Allowance received for U.S. Appl. No. 16/108,519, mailed on Sep. 21, 2021, 8 pages.
Notice of Allowance received for U.S. Appl. No. 16/136,005, mailed on Feb. 24, 2021, 8 pages.
Notice of Allowance received for U.S. Appl. No. 16/136,005, mailed on Jun. 9, 2021, 7 pages.
Notice of Allowance received for U.S. Appl. No. 16/142,635, mailed on Nov. 10, 2021, 8 pages.
Notice of Allowance received for U.S. Appl. No. 16/144,077, mailed on May 8, 2020, 15 pages.
Notice of Allowance received for U.S. Appl. No. 16/233,990, mailed on Feb. 22, 2022, 8 pages.
Notice of Allowance received for U.S. Appl. No. 16/233,990, mailed on May 26, 2022, 5 pages.
Notice of Allowance received for U.S. Appl. No. 16/682,443, mailed on Aug. 20, 2021, 7 pages.
Notice of Allowance received for U.S. Appl. No. 16/682,443, mailed on Nov. 17, 2021, 8 pages.
Notice of Allowance received for U.S. Appl. No. 16/726,179, mailed on Jun. 17, 2021, 9 pages.
Notice of Allowance received for U.S. Appl. No. 16/726,179, mailed on Sep. 30, 2021, 8 pages.
Notice of Allowance received for U.S. Appl. No. 16/827,918, mailed on Feb. 7, 2022, 9 pages.
Notice of Allowance received for U.S. Appl. No. 16/827,918, mailed on Jun. 8, 2022, 9 Pages.

(56) References Cited

OTHER PUBLICATIONS

Notice of Allowance received for U.S. Appl. No. 16/827,926, mailed on Nov. 1, 2021, 35 pages.
Notice of Allowance received for U.S. Appl. No. 16/827,931, mailed on Apr. 19, 2022, 7 Pages.
Notice of Allowance received for U.S. Appl. No. 16/827,931, mailed on Jan. 5, 2022, 7 pages.
Notice of Allowance received for U.S. Appl. No. 16/827,931, mailed on Sep. 15, 2021, 11 pages.
Notice of Allowance received for U.S. Appl. No. 16/827,942, mailed on Apr. 28, 2021, 5 pages.
Notice of Allowance received for U.S. Appl. No. 16/827,942, mailed on Jan. 22, 2021, 5 pages.
Notice of Allowance received for U.S. Appl. No. 16/827,942, mailed on Oct. 5, 2022, 10 pages.
Notice of Allowance received for U.S. Appl. No. 16/865,172, mailed on Apr. 13, 2022, 8 pages.
Notice of Allowance received for U.S. Appl. No. 16/865,172, mailed on Aug. 25, 2022, 8 Pages.
Notice of Allowance received for U.S. Appl. No. 16/865,172, mailed on Dec. 16, 2021, 10 pages.
Notice of Allowance received for U.S. Appl. No. 16/872,274, mailed on Apr. 19, 2022, 10 Pages.
Notice of Allowance received for U.S. Appl. No. 16/945,724, mailed on Apr. 4, 2022, 8 Pages.
Notice of Allowance received for U.S. Appl. No. 16/945,724, mailed on Dec. 20, 2021, 7 pages.
Notice of Allowance received for U.S. Appl. No. 16/945,724, mailed on Jul. 20, 2022, 8 Pages.
Notice of Allowance received for U.S. Appl. No. 17/000,112, mailed on Jun. 3, 2022, 14 pages.
Notice of Allowance received for U.S. Appl. No. 17/000,112, mailed on Oct. 18, 2022, 10 pages.
Notice of Allowance received for U.S. Appl. No. 17/065,387, mailed on Dec. 1, 2021, 10 pages.
Office Action received for Australian Patent Application No. 2019100574, mailed on Sep. 17, 2019, 6 pages.
Patent Board Decision received for U.S. Appl. No. 15/876,715, mailed on Aug. 3, 2021, 8 pages.
Search Report received for Chinese Patent Application No. 201680050096.X, mailed on Jan. 10, 2022, 4 pages (2 pages of English Translation and 2 pages of Official Copy).
Search Report received for Chinese Patent Application No. 201780033590.X, mailed on Mar. 24, 2021, 4 pages (2 page of English Translation and 2 pages of Official Copy).
Search Report received for Chinese Patent Application No. 201910469185.3, mailed on Feb. 23, 2021, 6 pages (3 page of English Translation and 3 page of Official Copy).
Search Report received for Chinese Patent Application No. 201910587972.8, mailed on Jan. 4, 2022, 4 pages (2 pages of English Translation and 2 pages of Official Copy).
Search Report received for Danish Patent Application No. PA 201670581, mailed on Apr. 4, 2017, 2 pages.
Search Report received for Danish Patent Application No. PA 201670581, mailed on Feb. 5, 2018, 1 page.
Search Report received for Danish Patent Application No. PA 201670581, mailed on Nov. 3, 2016, 1 page.
Search Report received for Danish Patent Application No. PA 201870354, mailed on Sep. 26, 2018, 4 pages.
Supplemental Notice of Allowability received for U.S. Appl. No. 16/827,942, mailed on Nov. 4, 2020, 3 pages.
Akhtar Iyaz, "Movies Anywhere: Everything You Need to Know", Available online at: <https://www.cnet.com/how-to/movies-anywhere-ultraviolet-movies-locker-streaming-redeem-faq/>, [Retrieved May 4, 2020], 2017, 8 pages.
Cheredar Tom, "Verizon's Viewdini Lets You Watch Netflix, Comcast, & Hulu Videos from a Single App", Available online at: <venturebeat.com>, [Retrieved Jun. 10, 2021], May 22, 2012, 6 pages.
Fingas Roger, "Walmart's Vudu to get Native Apple TV", AppleInsider, 2017, pp. 1-4.

Kaijser Martijn, "Mimic Skin for Kodi 15.x: Installation and Showcase", Time 2:23-2:28, Available online at: <https://www.youtube.com/watch?v=RGfpbUWVkgQ&t=143s>, [Retrieved Jun. 10, 2021], Aug. 3, 2015, 1 page.
Lee et al., "A Multi-Touch Three Dimensional Touch-Sensitive Tablet", CHI'85 Proceedings, Apr. 1985, pp. 21-25.
Li Xiaoshan, "CNTV, HULU, BBC iPlayer Comparative Study on User Interface of Three Network TV Stations", Modern Communication (Journal of Communication University of China), Issue 11, Nov. 5, 2010, pp. 156-158.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Corrected Notice of Allowance received for U.S. Appl. No. 16/888,453, mailed on Jul. 26, 2023, 5 pages.
Corrected Notice of Allowance received for U.S. Appl. No. 17/210,352, mailed on Sep. 20, 2023, 5 pages.
Corrected Notice of Allowance received for U.S. Appl. No. 17/367,227, mailed on Jul. 27, 2023, 2 pages.
Final Office Action received for U.S. Appl. No. 15/167,801, mailed on Sep. 19, 2023, 19 pages.
Final Office Action received for U.S. Appl. No. 16/827,926, mailed on Apr. 18, 2023, 32 pages.
Final Office Action received for U.S. Appl. No. 17/379,785, mailed on Aug. 23, 2023, 13 pages.
Final Office Action received for U.S. Appl. No. 17/586,625, mailed on May 4, 2023, 15 pages.
Final Office Action received for U.S. Appl. No. 17/660,622, mailed on May 24, 2023, 20 pages.
Final Office Action received for U.S. Appl. No. 17/937,410, mailed on Aug. 3, 2023, 15 pages.
Final Office Action received for U.S. Appl. No. 17/937,704, mailed on Aug. 31, 2023, 18 pages.
Final Office Action received for U.S. Appl. No. 18/060,902, mailed on Aug. 25, 2023, 8 pages.
Non-Final Office Action received for U.S. Appl. No. 15/719,404, mailed on May 10, 2023, 14 pages.
Non-Final Office Action received for U.S. Appl. No. 17/651,731, mailed on Apr. 25, 2023, 9 pages.
Non-Final Office Action received for U.S. Appl. No. 17/656,610, mailed on Jul. 26, 2023, 10 pages.
Non-Final Office Action received for U.S. Appl. No. 17/657,913, mailed on Jul. 21, 2023, 16 pages.
Non-Final Office Action received for U.S. Appl. No. 17/937,704, mailed on Mar. 30, 2023, 18 pages.
Non-Final Office Action received for U.S. Appl. No. 18/146,336, mailed on Aug. 3, 2023, 23 pages.
Notice of Allowance received for U.S. Appl. No. 16/827,910, mailed on Aug. 3, 2023, 21 pages.
Notice of Allowance received for U.S. Appl. No. 16/827,926, mailed on Sep. 13, 2023, 9 pages.
Notice of Allowance received for U.S. Appl. No. 16/888,453, mailed on Jun. 21, 2023, 7 pages.
Notice of Allowance received for U.S. Appl. No. 16/888,478, mailed on Aug. 2, 2023, 9 pages.
Notice of Allowance received for U.S. Appl. No. 17/353,527, mailed on Jul. 21, 2023, 7 pages.
Notice of Allowance received for U.S. Appl. No. 17/367,227, mailed on Mar. 23, 2023, 12 pages.
Notice of Allowance received for U.S. Appl. No. 17/654,578, mailed on Jun. 13, 2023, 7 pages.
Notice of Allowance received for U.S. Appl. No. 17/651,731, mailed on Oct. 3, 2023, 5 pages.
Notice of Allowance received for U.S. Appl. No. 17/353,527, mailed on Oct. 4, 2023, 7 pages.

(56) References Cited

OTHER PUBLICATIONS

Search Report received for Chinese Patent Application No. 201911313497.1, mailed on Apr. 11, 2023, 5 pages (2 pages of English Translation and 3 pages of Official Copy).
Search Report received for Chinese Patent Application No. 202010011436.6 mailed on Aug. 30, 2023, 4 pages (2 pages of English Translation and 2 pages of Official Copy).
Search Report received for Chinese Patent Application No. 202010662190.9, mailed on Apr. 28, 2023, 5 pages (2 pages of English Translation and 3 pages of Official Copy).
Search Report received for Chinese Patent Application No. 202010662206.6, mailed on Apr. 28, 2023, 5 pages (2 pages of English Translation and 3 pages of Official Copy).
Search Report received for Chinese Patent Application No. 202010662994.9, mailed on Apr. 28, 2023, 5 pages (2 pages of English Translation and 3 pages of Official Copy).
Search Report received for Chinese Patent Application No. 202210799020.4, mailed on Jul. 27, 2023, 5 pages (1 page of English Translation and 4 pages of Official Copy).
Search Report received for European Patent Application No. 20718506.7, mailed on Mar. 21, 2023, 2 pages.
Anonymous, "Video Progress Bar—YouTube Help", Retrieved from the Internet: <https://web.archive.org/web/20190317001501/https://support.google.com/youtube/answer/7174115?hl=en>, [retrieved on Mar. 22, 2023], Mar. 17, 2019, 2 pages.
Beer et al., "The Odds of Running a Nonlinear TV Program Using Web Technologies", IEEE International Symposium on Broadband Multimedia Systems and Broadcasting (BMSB), 2011, 4 pages.
Biao et al., "Research on UI Optimization of Chinese Network Television Stations", Southeast Communications, 2013, 4 pages. See attached Communication 37 CFR § 1.98(a)(3).
Budhraja et al., "Probability Based Playlist Generation Based on Music Similarity and User Customization", National Conference on Computing and Communication Systems, 2012, 5 pages.
Cai, Chongshan, "Analysis of Copyright Infringement Problems of Video Aggregation App", China Copyright, vol. 02, Apr. 15, 2015.
Cheng, Luo, "The Designing of Dynamic Play-list Based on Flash Streaming Media Technology", Computer and Telecommunication, 2008, 3 pages. See attached Communication 37 CFR § 1.98(a)(3).
Liu, Chang, "Functions and Design of Multi-Screen Playing System in TV Variety Studio", Modern TV Technology, 2013, 5 pages. See attached Communication 37 CFR § 1.98(a)(3).
Tinari, George, "What's New in the Netflix Redesign and How to Use It", Retrieved from the Internet: <https://web.archive.org/web/20161110092133/https://www.guidingtech.com/48443/netflix-redesign-overview/ >, [retrieved on Mar. 22, 2023], Nov. 10, 2016, 9 pages.
Zhang et al., "Music Playlist Prediction Via Detecting Song Moods", IEEE China Summit and International Conference on Signal and Information Processing, 2013, pp. 174-178.
Advisory Action received for U.S. Appl. No. 15/167,801, mailed on Feb. 16, 2018, 4 pages.
Applicant Initiated Interview Summary received for U.S. Appl. No. 15/167,801, mailed on Apr. 23, 2018, 3 pages.
Applicant Initiated Interview Summary received for U.S. Appl. No. 15/167,801, mailed on Jul. 29, 2019, 3 pages.
Corrected Notice of Allowance received for U.S. Appl. No. 14/749,288, mailed on Sep. 21, 2017, 5 pages.
Corrected Notice of Allowance received for U.S. Appl. No. 15/695,880, mailed on Jun. 11, 2018, 6 pages.
Corrected Notice of Allowance received for U.S. Appl. No. 15/714,904, mailed on Sep. 7, 2018, 5 pages.
Corrected Notice of Allowance received for U.S. Appl. No. 16/010,280, mailed on Aug. 6, 2019, 2 pages.
Corrected Notice of Allowance received for U.S. Appl. No. 16/036,810, mailed on Nov. 19, 2018, 6 pages.
Corrected Notice of Allowance received for U.S. Appl. No. 16/233,990, mailed on Oct. 20, 2022, 2 pages.
Extended European Search Report received for European Patent Application No. 17813728.7, mailed on Feb. 11, 2019, 8 pages.
Final Office Action received for U.S. Appl. No. 14/746,095, mailed on Jul. 16, 2018, 33 pages.
Final Office Action received for U.S. Appl. No. 14/746,662, mailed on Apr. 24, 2017, 8 pages.
Final Office Action received for U.S. Appl. No. 14/746,662, mailed on Jun. 27, 2017, 9 pages.
Final Office Action received for U.S. Appl. No. 15/167,801, mailed on Apr. 5, 2019, 18 pages.
Final Office Action received for U.S. Appl. No. 15/167,801, mailed on May 28, 2020, 17 pages.
Final Office Action received for U.S. Appl. No. 15/167,801, mailed on Nov. 29, 2017, 12 pages.
Final Office Action received for U.S. Appl. No. 15/235,000, mailed on Dec. 19, 2018, 33 pages.
Final Office Action received for U.S. Appl. No. 15/235,000, mailed on Mar. 13, 2018, 31 pages.
Final Office Action received for U.S. Appl. No. 15/272,393, mailed on Mar. 25, 2019, 54 pages.
Final Office Action received for U.S. Appl. No. 15/507,229, mailed on Jul. 15, 2020, 20 pages.
Final Office Action received for U.S. Appl. No. 15/507,229, mailed on Sep. 18, 2019, 15 pages.
Final Office Action received for U.S. Appl. No. 15/719,404, mailed on Aug. 8, 2019, 19 pages.
Final Office Action received for U.S. Appl. No. 16/108,519, mailed on Dec. 12, 2019, 10 pages.
Final Office Action received for U.S. Appl. No. 16/126,962, mailed on Apr. 8, 2020, 20 pages.
Final Office Action received for U.S. Appl. No. 16/136,005, mailed on Mar. 9, 2020, 9 pages.
Final Office Action received for U.S. Appl. No. 16/584,790, mailed on May 27, 2020, 27 pages.
Final Office Action received for U.S. Appl. No. 16/697,090, mailed on Dec. 14, 2022, 28 pages.
Final Office Action received for U.S. Appl. No. 17/379,785, mailed on Oct. 28, 2022, 14 pages.
Final Office Action received for U.S. Appl. No. 16/888,478, mailed on Feb. 13, 2023, 27 pages.
Final Office Action received for U.S. Appl. No. 17/133,550, mailed on Feb. 15, 2023, 22 pages.
International Search Report received for PCT Patent Application No. PCT/US2014/057272, mailed on May 28, 2015, 4 pages.
International Search Report received for PCT Patent Application No. PCT/US2014/057280, mailed on May 27, 2015, 4 pages.
International Search Report received for PCT Patent Application No. PCT/US2015/037027, mailed on Sep. 28, 2015, 3 pages.
International Search Report received for PCT Patent Application No. PCT/US2015/037030, mailed on Dec. 10, 2015, 6 pages.
International Search Report received for PCT Patent Application No. PCT/US2015/037520, mailed on Mar. 7, 2016, 6 pages.
International Search Report received for PCT Patent Application No. PCT/US2017/029448, mailed on Jul. 13, 2017, 3 pages.
International Search Report received for PCT Patent Application No. PCT/US2017/058132, mailed on Mar. 27, 2018, 6 pages.
Non-Final Office Action received for U.S. Appl. No. 14/746,095, mailed on Dec. 1, 2017, 34 pages.
Non-Final Office Action received for U.S. Appl. No. 14/746,095, mailed on Jul. 25, 2019, 33 pages.
Non-Final Office Action received for U.S. Appl. No. 14/746,620, mailed on Jan. 11, 2017, 16 pages.
Non-Final Office Action received for U.S. Appl. No. 14/746,662, mailed on Aug. 9, 2016, 8 pages.
Non-Final Office Action received for U.S. Appl. No. 14/749,288, mailed on Oct. 12, 2016, 11 pages.
Non-Final Office Action received for U.S. Appl. No. 15/167,801 mailed on Mar. 24, 2017, 12 pages.
Non-Final Office Action received for U.S. Appl. No. 15/167,801, mailed on Aug. 30, 2018, 15 pages.
Non-Final Office Action received for U.S. Appl. No. 15/167,801, mailed on Sep. 26, 2019, 18 pages.
Non-Final Office Action received for U.S. Appl. No. 15/235,000, mailed on Jul. 14, 2017, 31 pages.

(56) References Cited

OTHER PUBLICATIONS

Non-Final Office Action received for U.S. Appl. No. 15/235,000, mailed on Jul. 25, 2018, 31 pages.
Non-Final Office Action received for U.S. Appl. No. 15/235,000, mailed on Jun. 26, 2019, 31 pages.
Non-Final Office Action received for U.S. Appl. No. 15/272,393, mailed on Oct. 2, 2018, 52 pages.
Non-Final Office Action received for U.S. Appl. No. 15/414,493, mailed on Oct. 6, 2017, 15 pages.
Non-Final Office Action received for U.S. Appl. No. 15/507,229, mailed on Feb. 27, 2020, 16 pages.
Non-Final Office Action received for U.S. Appl. No. 15/507,229, mailed on Jun. 3, 2019, 14 pages.
Non-Final Office Action received for U.S. Appl. No. 15/674,992, mailed on May 11, 2018, 8 pages.
Non-Final Office Action received for U.S. Appl. No. 15/719,404, mailed on Dec. 14, 2018, 14 pages.
Non-Final Office Action received for U.S. Appl. No. 15/798,092, mailed on Dec. 20, 2017, 20 pages.
Non-Final Office Action received for U.S. Appl. No. 15/990,327, mailed on Jul. 31, 2018, 8 pages.
Non-Final Office Action received for U.S. Appl. No. 16/010,280, mailed on Mar. 7, 2019, 5 pages.
Non-Final Office Action received for U.S. Appl. No. 16/108,519, mailed on Aug. 2, 2019, 10 pages.
Non-Final Office Action received for U.S. Appl. No. 16/108,519, mailed on May 8, 2020, 11 pages.
Non-Final Office Action received for U.S. Appl. No. 16/126,962, mailed on Sep. 3, 2019, 16 pages.
Non-Final Office Action received for U.S. Appl. No. 16/136,005, mailed on Sep. 18, 2019, 9 pages.
Non-Final Office Action received for U.S. Appl. No. 16/142,635, mailed on Jun. 8, 2020, 19 pages.
Non-Final Office Action received for U.S. Appl. No. 16/175,565, mailed on Feb. 17, 2023, 33 pages.
Non-Final Office Action received for U.S. Appl. No. 16/233,990, mailed on Jun. 18, 2020, 17 pages.
Non-Final Office Action received for U.S. Appl. No. 16/392,467, mailed on Sep. 27, 2019, 5 pages.
Non-Final Office Action received for U.S. Appl. No. 16/584,790, mailed on Dec. 26, 2019, 24 pages.
Non-Final Office Action received for U.S. Appl. No. 16/697,090, mailed on Jul. 6, 2020, 14 pages.
Non-Final Office Action received for U.S. Appl. No. 16/827,910, mailed on Sep. 14, 2022, 18 pages.
Non-Final Office Action received for U.S. Appl. No. 17/133,550, mailed on Sep. 9, 2022, 23 pages.
Non-Final Office Action received for U.S. Appl. No. 17/353,527, mailed on Dec. 8, 2022, 17 pages.
Non-Final Office Action received for U.S. Appl. No. 17/586,625, mailed on Sep. 1, 2022, 13 pages.
Non-Final Office Action received for U.S. Appl. No. 17/656,610, mailed on Feb. 6, 2023, 10 pages.
Non-Final Office Action received for U.S. Appl. No. 17/660,622, mailed on Dec. 20, 2022, 17 pages.
Non-Final Office Action received for U.S. Appl. No. 15/167,801, mailed on Feb. 8, 2023, 23 pages.
Notice of Allowance received for U.S. Appl. No. 14/746,095, mailed on Dec. 31, 2019, 8 pages.
Notice of Allowance received for U.S. Appl. No. 14/746,620, mailed on Sep. 25, 2017, 8 pages.
Notice of Allowance received for U.S. Appl. No. 14/746,662, mailed on Sep. 25, 2017, 7 pages.
Notice of Allowance received for U.S. Appl. No. 14/749,288, mailed on May 25, 2017, 8 pages.
Notice of Allowance received for U.S. Appl. No. 15/272,393, mailed on Jan. 15, 2020, 7 pages.
Notice of Allowance received for U.S. Appl. No. 15/272,393, mailed on Sep. 18, 2019, 10 pages.
Notice of Allowance received for U.S. Appl. No. 15/414,493, mailed on Mar. 14, 2018, 7 pages.
Notice of Allowance received for U.S. Appl. No. 15/674,992, mailed on Oct. 1, 2018, 7 pages.
Notice of Allowance received for U.S. Appl. No. 15/695,880, mailed on Feb. 28, 2018, 10 pages.
Notice of Allowance received for U.S. Appl. No. 15/695,880, mailed on Oct. 18, 2017, 9 pages.
Notice of Allowance received for U.S. Appl. No. 15/714,904, mailed on May 22, 2018, 8 pages.
Notice of Allowance received for U.S. Appl. No. 15/719,404, mailed on Nov. 9, 2022, 7 pages.
Notice of Allowance received for U.S. Appl. No. 15/798,092, mailed on Jun. 7, 2018, 9 pages.
Notice of Allowance received for U.S. Appl. No. 15/798,092, mailed on Oct. 9, 2018, 5 pages.
Notice of Allowance received for U.S. Appl. No. 15/833,618, mailed on Mar. 14, 2018, 9 pages.
Notice of Allowance received for U.S. Appl. No. 15/990,327, mailed on Jan. 11, 2019, 7 pages.
Notice of Allowance received for U.S. Appl. No. 16/010,280, mailed on Jul. 29, 2019, 7 pages.
Notice of Allowance received for U.S. Appl. No. 16/036,810, mailed on Oct. 31, 2018, 9 pages.
Notice of Allowance received for U.S. Appl. No. 16/233,990, mailed on Jan. 31, 2023, 5 pages.
Notice of Allowance received for U.S. Appl. No. 16/233,990, mailed on Oct. 5, 2022, 5 pages.
Notice of Allowance received for U.S. Appl. No. 16/392,467, mailed on Mar. 23, 2020, 9 pages.
Notice of Allowance received for U.S. Appl. No. 16/584,790, mailed on Feb. 3, 2023, 9 pages.
Notice of Allowance received for U.S. Appl. No. 17/210,352, mailed on Dec. 5, 2022, 9 pages.
Notice of Allowance received for U.S. Appl. No. 17/457,901, mailed on Nov. 16, 2022, 9 pages.
Notice of Allowance received for U.S. Appl. No. 17/654,578, mailed on Oct. 25, 2022, 8 pages.
Notice of Allowance received for U.S. Appl. No. 17/654,578, mailed on Feb. 15, 2023., 8 pages.
Search Report received for Chinese Patent Application No. 201780066823.6, mailed on Nov. 1, 2022, 4 pages (2 pages of English Translation and 2 pages of Official Copy).
Search Report received for Chinese Patent Application No. 201911313496.7 mailed on Jan. 20, 2023, 4 pages (2 pages of English Translation and 2 pages of Official Copy).
Search Report received for Chinese Patent Application No. 201580028382.1, mailed on Oct. 12, 2018, 5 pages (2 pages of English Translation & 3 pages of Official copy).
Search Report received for Chinese Patent Application No. 201811143102.3, mailed on Nov. 22, 2022, 5 pages (2 pages of English Translation and 3 pages of Official Copy).
Search Report received for Chinese Patent Application No. 201911313497.1, mailed on Dec. 14, 2022, 3 pages (1 pages of English Translation and 2 pages of Official Copy).
Search Report received for Chinese Patent Application No. 202010011436.6, mailed on Dec. 15, 2022, 9 pages (4 pages of English Translation and 5 pages of Official Copy).
Search Report received for Danish Patent Application No. PA201670582, mailed on Feb. 9, 2017, 1 pages.
Search Report received for Danish Patent Application No. PA201670582, mailed on Mar. 6, 2018, 2 pages.
Search Report received for Danish Patent Application No. PA201670582, mailed on Oct. 28, 2016, 4 pages.
Search Report received for Danish Patent Application No. PA201770200, Completed on Jul. 12, 2017, 4 pages.
Search Report received for Taiwanese Patent Application No. 104120369, mailed on Aug. 8, 2016, 2 pages (1 page of official copy & 1 page of English translation).
Search Report received for Taiwanese Patent Application No. 104120385, mailed on Nov. 25, 2016, 2 pages (1 page of official copy & 1 page of English translation).

(56) References Cited

OTHER PUBLICATIONS

Supplemental Notice of Allowance received for U.S. Appl. No. 15/798,092, mailed on Jan. 9, 2019, 2 pages.
Alvarez Edgar, "Sling TV Redesign Makes It Easy to Find Your Favorite Content", Engadget, Available online at: <https://www.engadget.com/2016/01/05/sling-tv-major-redesign/>, [Retrieved Aug. 5, 2019], May 1, 2016, pp. 1-12.
Apple, "The control is all yours", Available online at : <https://www.apple.com.cn/privacy/control/>, [Retrieved Dec. 29, 2022], Nov. 30, 2022, 12 pages. See attached Communication 37 CFR § 1.98(a)(3).
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Bohn Dieter, "Rebooting WebOS: How LG Rethought the Smart TV", The Verge, Available online at: <http://www.theverge.com/2014/1/6/5279220/rebooting-webos-how-lg-rethought-the-smart-tv>, [Retrieved Aug. 26, 2019], Jan. 6, 2014, 5 pages.
Drews et al., "Virtual Jukebox—Reviving a Classic", Proceedings of the 35th Hawaii International Conference on System Sciences, 2022, 7 pages.
Episodecalendar.com, "Keep track of your favorite TV shows!—TV Episode Calendar", Available Online At: <https://web.archive.org/web/20140517060612/https://episodecalendar.com/>, [Retrieved Oct. 18, 2017], May 17, 2014, 6 pages.
Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Jin et al., "Pricing Sponsored Content in Wireless Networks with Multiple Content Providers", The Fourth IEEE Workshop on Smart Data Pricing 2015, 2015, pp. 668-673.
Kimbler Kristofer, "App Store Strategies for Service Providers", 2010 4th International Conference on Intelligence in Next Generation Networks, Nov. 18, 2010, 5 pages.
Meng et al., "Role Authorization Based Web Service Access Control Model", Journal of Lanzhou University (Natural Science Edition), vol. 42, No. 2, 2007, pp. 84-88. See attached Communication 37 CFR § 1.98(a)(3).
Ng Gary, "New Netflix User Interface Coming This Month, First Redesign in Four Years", iPhone in Canada, Available online at: <https://www.iphoneincanada.ca/news/new-netflix-user-interface/>, [Retrieved Jul. 7, 2020], Jun. 1, 2015, 3 pages.
Panzarino Matthew, "Apple Announces Voice Activated Siri Assistant Feature for iOS 5, Integrates Wolfram Alpha and Wikipedia", Available online at: <www.thenextweb.com>, Oct. 4, 2011, pp. 1-6.
Pierce David, "Got Hulu and Netflix? You Need an App to Search It All", Wired, Available online at: <https://www.wired.com/2016/03/got-hulu-netflix-need-app-search/>, [Retrieved Mar. 10, 2016], Mar. 10, 2016, pp. 1-4.
Wang et al., "Authorization Management Mechanism of Web application system", Network and Information Technology, vol. 25, No. 11, 2006, 3 pages. See attached Communication 37 CFR § 1.98(a)(3).
Final Office Action received for U.S. Appl. No. 16/827,910, mailed on Mar. 15, 2023, 18 pages.
Non-Final Office Action received for U.S. Appl. No. 17/379,785, mailed on Mar. 9, 2023, 14 pages.
Non-Final Office Action received for U.S. Appl. No. 17/937,410, mailed on Mar. 2, 2023, 15 pages.
Non-Final Office Action received for U.S. Appl. No. 18/060,902, mailed on Mar. 10, 2023, 8 pages.
Notice of Allowability received for U.S. Appl. No. 17/457,901, mailed on Mar. 8, 2023, 9 pages.
Notice of Allowance received for U.S. Appl. No. 16/888,453, mailed on Mar. 1, 2023, 8 pages.
Notice of Allowance received for U.S. Appl. No. 17/210,352, mailed on Mar. 16, 2023, 7 pages.
Search Report received for Chinese Patent Application No. 201911313480.6, mailed on Jan. 20, 2023, 4 pages (2 pages of English Translation and 2 pages of Official Copy).
Advisory Action received for U.S. Appl. No. 18/060,902, mailed on Nov. 13, 2023, 2 pages.
Applicant Initiated Interview Summary received for U.S. Appl. No. 17/656,610, mailed on Apr. 10, 2024, 2 pages.
Corrected Notice of Allowability received for U.S. Appl. No. 15/719,404, mailed on Mar. 22, 2024, 2 pages.
Corrected Notice of Allowability received for U.S. Appl. No. 17/586,625, mailed on Feb. 20, 2024, 2 pages.
Corrected Notice of Allowability received for U.S. Appl. No. 17/937,704, mailed on Jul. 31, 2024, 8 pages.
Corrected Notice of Allowance received for U.S. Appl. No. 16/888,478, mailed on Oct. 31, 2023, 6 pages.
Examiner's Answer to Appeal Brief received for U.S. Appl. No. 16/175,565, mailed on Dec. 15, 2023, 27 pages.
Examiner's Answer to Appeal Brief received for U.S. Appl. No. 16/697,090, mailed on Oct. 26, 2023, 10 pages.
Extended European Search Report received for European Patent Application No. 24152097.2, mailed on Jul. 23, 2024, 9 pages.
Final Office Action received for U.S. Appl. No. 17/656,610, mailed on Jan. 16, 2024, 12 pages.
Final Office Action received for U.S. Appl. No. 18/146,336, mailed on Feb. 23, 2024, 23 pages.
Non-Final Office Action received for U.S. Appl. No. 17/133,550, mailed on Dec. 18, 2023, 25 pages.
Non-Final Office Action received for U.S. Appl. No. 17/379,785, mailed on Feb. 15, 2024, 14 pages.
Non-Final Office Action received for U.S. Appl. No. 17/656,610, mailed on Apr. 30, 2024, 12 pages.
Non-Final Office Action received for U.S. Appl. No. 17/657,913, mailed on Jan. 11, 2024, 20 pages.
Non-Final Office Action received for U.S. Appl. No. 17/930,703, mailed on May 16, 2024, 36 pages.
Non-Final Office Action received for U.S. Appl. No. 17/937,410, mailed on Feb. 29, 2024, 16 pages.
Non-Final Office Action received for U.S. Appl. No. 17/937,704, mailed on Feb. 1, 2024, 21 pages.
Non-Final Office Action received for U.S. Appl. No. 18/060,902, mailed on Dec. 1, 2023, 9 pages.
Non-Final Office Action received for U.S. Appl. No. 18/518,109, mailed on Jul. 9, 2024, 26 pages.
Notice of Allowance received for U.S. Appl. No. 15/719,404, mailed on Dec. 8, 2023, 10 pages.
Notice of Allowance received for U.S. Appl. No. 16/827,910, mailed on Dec. 13, 2023, 19 pages.
Notice of Allowance received for U.S. Appl. No. 16/827,926, mailed on Feb. 2, 2024, 8 pages.
Notice of Allowance received for U.S. Appl. No. 17/586,625, mailed on Oct. 26, 2023, 7 pages.
Notice of Allowance received for U.S. Appl. No. 17/651,731, mailed on Jan. 25, 2024, 5 pages.
Notice of Allowance received for U.S. Appl. No. 17/651,731, mailed on Jul. 10, 2024, 5 pages.
Notice of Allowance received for U.S. Appl. No. 17/660,622, mailed on Jan. 24, 2024, 11 pages.
Notice of Allowance received for U.S. Appl. No. 17/937,704, mailed on Apr. 25, 2024, 12 pages.
Notice of Allowance received for U.S. Appl. No. 18/060,902, mailed on May 21, 2024, 8 pages.
Notice of Allowance received for U.S. Appl. No. 18/487,837, mailed on May 30, 2024, 8 pages.
Notice of Allowance received for U.S. Appl. No. 18/503,515, mailed on Jun. 13, 2024, 8 pages.
Notice of Allowance received for U.S. Appl. No. 18/518,365, mailed on Jul. 3, 2024, 8 pages.
Patent Board Decision received for U.S. Appl. No. 16/175,565, mailed on Jul. 31, 2024, 19 pages.
Patent Board Decision received for U.S. Appl. No. 16/697,090, mailed on Jul. 26, 2024, 33 pages.

(56) References Cited

OTHER PUBLICATIONS

Search Report received for Chinese Patent Application No. 201811143102.3, mailed on Nov. 2, 2023, 5 pages (3 pages of English Translation and 2 pages of Official Copy).
Search Report received for Chinese Patent Application No. 202010662994.9, mailed on Sep. 28, 2023, 3 pages (1 page of English Translation and 2 pages of Official Copy).
Search Report received for Chinese Patent Application No. 202080040260.5, mailed on Apr. 4, 2024, 8 pages (4 pages of English Translation and 4 pages of Official Copy).
Search Report received for Chinese Patent Application No. 202110201931.8, mailed on Oct. 16, 2023, 3 pages (1 page of English Translation and 2 pages of Official Copy).
Search Report received for Chinese Patent Application No. 202111293833.8, mailed on Dec. 9, 2023, 4 pages (2 pages of English Translation and 2 pages of Official Copy).
Search Report received for Chinese Patent Application No. 202111314528.2, mailed on Mar. 30, 2024, 4 pages (2 pages of English Translation and 2 pages of Official Copy).
Search Report received for Chinese Patent Application No. 202111635535.2, mailed on Dec. 21, 2023, 5 pages (2 pages of English Translation and 3 pages of Official Copy).
Usainbolt.com, Available online at: <https://usainbolt.com/>; <https://web.archive.org>, Archived on Mar. 15, 2015 in Wayback Machine, 2015, 4 pages.
Chen et al., "What a Juke! A Collaborative Music Sharing System", IEEE, 2012, 6 pages.
Cunningham et al., "An Ethnographic Study of Music Information Seeking: Implications for the Design of a Music Digital Library", IEEE, 2003, 13 pages.
Kim et al., "Towards Optimal Navigation Through Video Content on Interactive TV", Interacting with Computers, vol. 18, No. 4, Mar. 3, 2006, pp. 723-746.
Matejka et al., "Swifter: Improved Online Video Scrubbing", Proceedings of the SIGCHI Conference on Human Factors in Computing Systems, Apr. 27-May 2, 2013, 10 pages.
Schmidt, Alexander, "Graphical User Interface for Video on Demand Navigation from an IPTV Set Top Box", Jun. 16, 2009, 52 pages.
Corrected Notice of Allowance received for U.S. Appl. No. 18/060,902, mailed on Sep. 5, 2024, 4 pages.
Final Office Action received for U.S. Appl. No. 17/379,785, mailed on Aug. 16, 2024, 14 pages.
Notice of Allowance received for U.S. Appl. No. 17/656,610, mailed on Sep. 11, 2024, 7 pages.
Notice of Allowance received for U.S. Appl. No. 17/657,913, mailed on Aug. 30, 2024, 7 pages.
Notice of Allowance received for U.S. Appl. No. 17/660,622, mailed on Aug. 22, 2024, 9 pages.
Search Report received for Chinese Patent Application No. 202210608296.X, mailed on Aug. 15, 2024, 4 pages (1 page of English Translation and 3 pages of Official Copy).
Corrected Notice of Allowability received for U.S. Appl. No. 17/657,913, mailed on Sep. 16, 2024, 2 pages.
Corrected Notice of Allowability received for U.S. Appl. No. 17/657,913, mailed on Sep. 26, 2024, 2 pages.
European Search Report received for European Patent Application No. 20718505.9, mailed on Sep. 27, 2024, 5 pages.
Examiner's Answer to Appeal Brief received for U.S. Appl. No. 17/133,550, mailed on Sep. 23, 2024, 26 pages.
Final Office Action received for U.S. Appl. No. 17/930,703, mailed on Nov. 6, 2024, 39 pages.
Non-Final Office Action received for U.S. Appl. No. 18/336,569, mailed on Oct. 23, 2024, 22 pages.
Non-Final Office Action received for U.S. Appl. No. 18/391,448, mailed on Sep. 24, 2024, 12 pages.
Non-Final Office Action received for U.S. Appl. No. 18/602,342 mailed on Sep. 24, 2024, 19 pages.
Notice of Allowance received for U.S. Appl. No. 16/175,565, mailed on Oct. 24, 2024, 5 pages.
Notice of Allowance received for U.S. Appl. No. 17/937,410, mailed on Sep. 26, 2024, 8 pages.
Notice of Allowance received for U.S. Appl. No. 18/503,515, mailed on Oct. 1, 2024, 8 pages.
Notice of Allowance received for U.S. Appl. No. 18/518,365, mailed on Nov. 6, 2024, 8 pages.
Tech Life Unity, How to Use Netflix | Netflix Guide Part 2, Available online at: <https://www.youtube.com/watch?v=Hg4IC_BIHss> [Retrieved Sep. 16, 2024], Aug. 19, 2017, 2 pages.
Corrected Notice of Allowability received for U.S. Appl. No. 17/656,610, mailed on Dec. 19, 2024, 2 pages.
Corrected Notice of Allowability received for U.S. Appl. No. 17/656,610, mailed on Jan. 13, 2025, 2 pages.
Corrected Notice of Allowability received for U.S. Appl. No. 17/657,913, mailed on Jan. 23, 2025, 2 pages.
Extended European Search Report received for European Patent Application No. 24195286.0, mailed on Nov. 5, 2024, 9 pages.
Final Office Action received for U.S. Appl. No. 18/336,569, mailed on Feb. 4, 2025, 24 pages.
Final Office Action received for U.S. Appl. No. 18/391,448, mailed on Jan. 29, 2025, 14 pages.
Notice of Allowance received for U.S. Appl. No. 17/657,913, mailed on Jan. 14, 2025, 5 pages.
Notice of Allowance received for U.S. Appl. No. 17/937,410, mailed on Jan. 29, 2025, 8 pages.
Notice of Allowance received for U.S. Appl. No. 18/146,336, mailed on Nov. 22, 2024, 11 pages.
Notice of Allowance received for U.S. Appl. No. 18/395,268, mailed on Dec. 2, 2024, 8 pages.
Notice of Allowance received for U.S. Appl. No. 18/487,837, mailed on Nov. 8, 2024, 7 pages.
Notice of Allowance received for U.S. Appl. No. 18/518,109, mailed on Jan. 17, 2025, 8 pages.
Anonymous, YouTube(TM) On Hover : add0n.com, Retrieved from the Internet: <URL: https://web.archive.org/web/20180713134812/https://add0n.com/youtube-hover.html>, [retrieved on Nov. 8, 2024], Jul. 13, 2018, 4 pages.
Leonard, Sengere, You can now hover over videos on Youtube to get GIF like previews—Techzim, Retrieved from the Internet: URL: <https://web.archive.org/web/20171007193435/https://www.techzim.co.zw/2017/07/can-now-hover-videos-youtube-get-gif-like-previews/>, [retrieved on Nov. 8, 2024], Oct. 7, 2017, 6 pages.
Non-Final Office Action received for U.S. Appl. No. 18/668,008, mailed on Feb. 11, 2025, 14 pages.
Notice of Allowance received for U.S. Appl. No. 16/175,565, mailed on Feb. 12, 2025, 5 pages.

\* cited by examiner

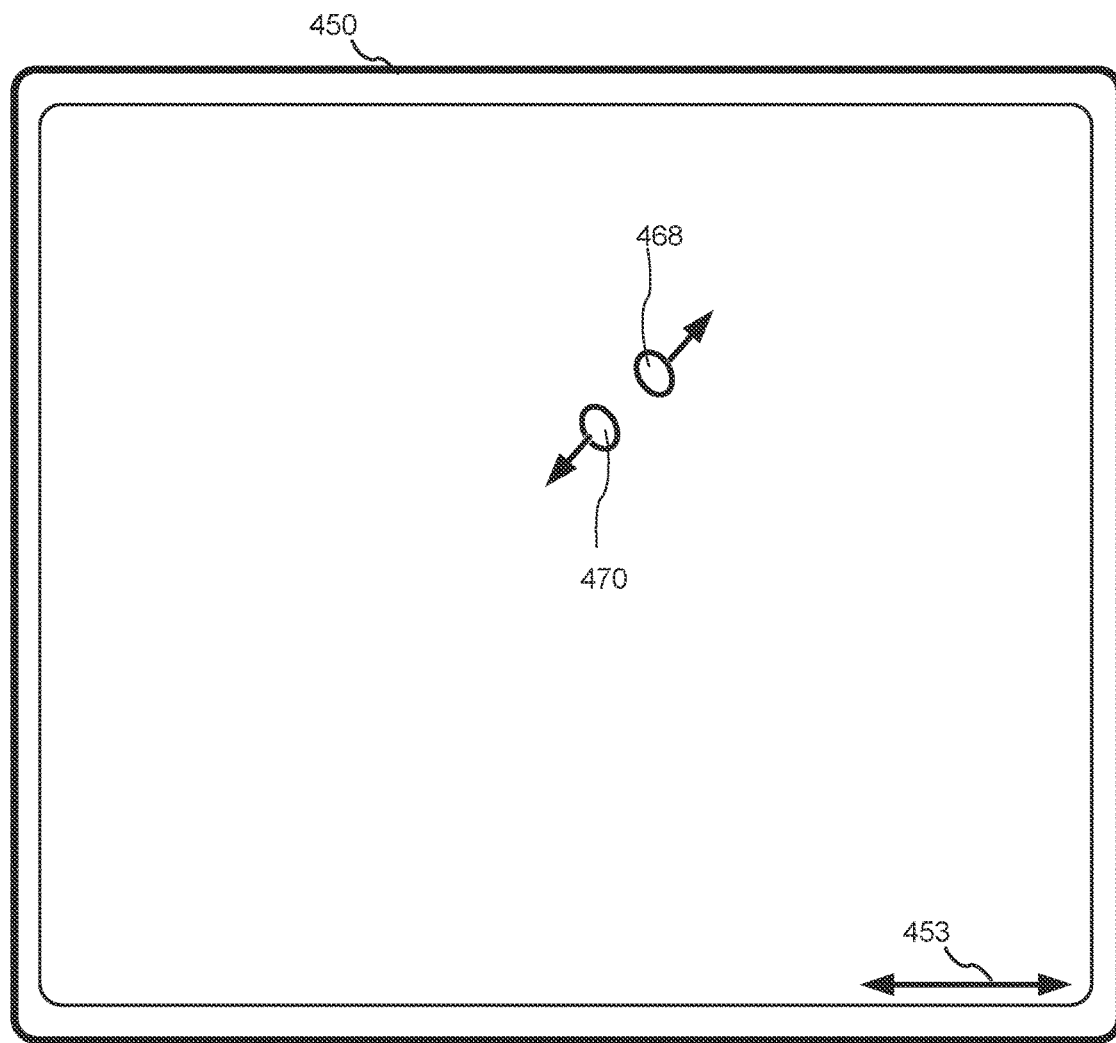
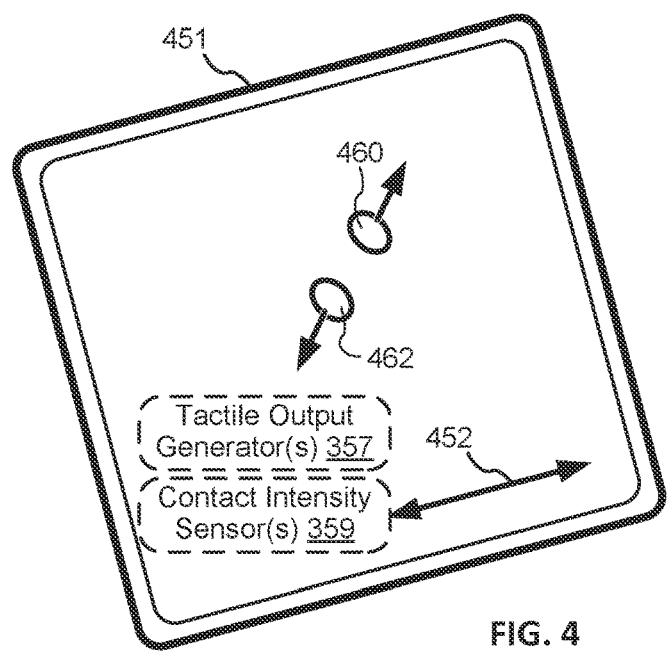
FIG. 4

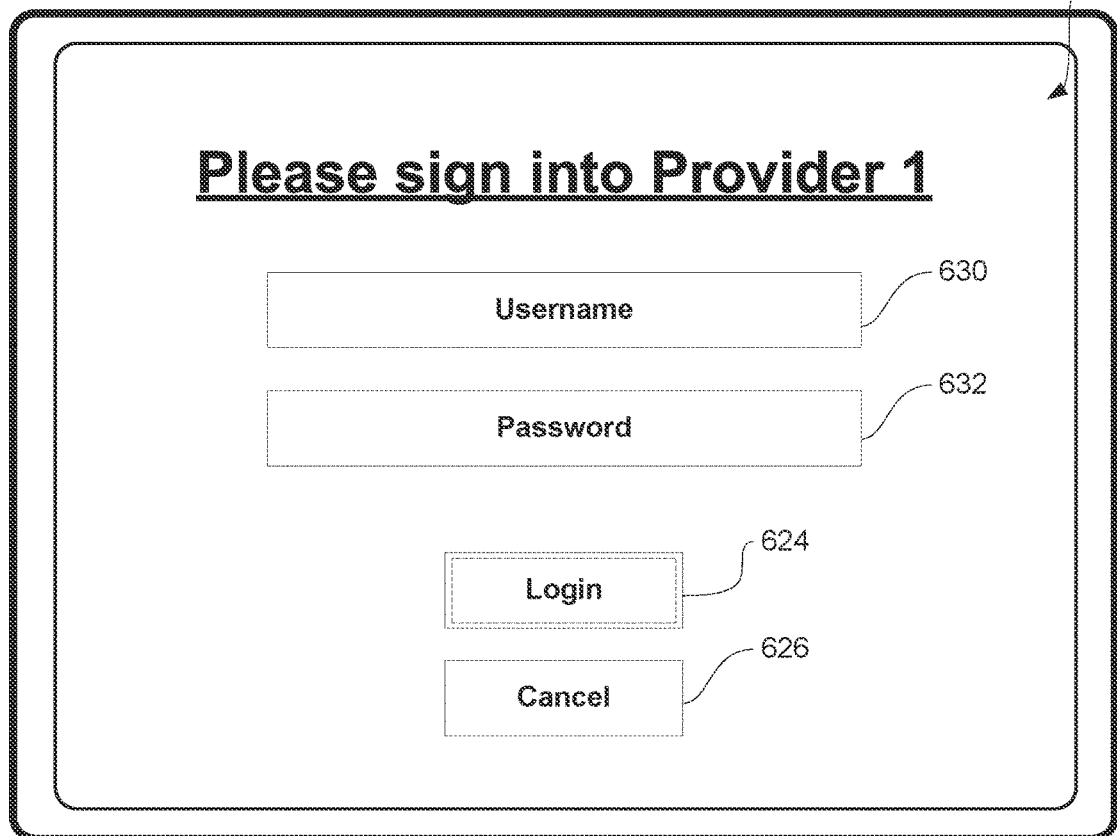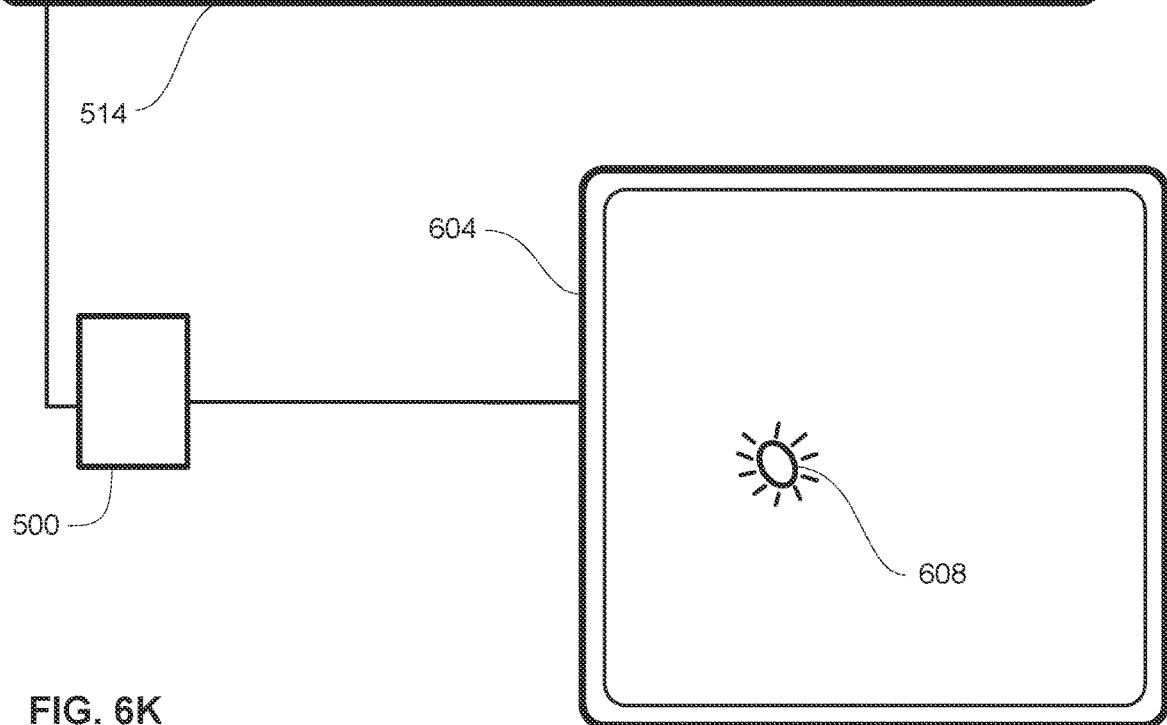
FIG. 6K

SETUP PROCEDURES FOR AN ELECTRONIC DEVICE

CROSS-REFERENCE TO RELATED APPLICATIONS

This application is a continuation of U.S. application Ser. No. 17/000,112, filed Aug. 21, 2020, and published on Dec. 17, 2020 as U.S. Publication No. 2020-0396507, which is a continuation of U.S. application Ser. No. 16/144,077, filed Sep. 27, 2018, and issued on Sep. 8, 2020 as U.S. Pat. No. 10,771,847, which claims the benefit of U.S. Provisional Patent Application No. 62/679,840, filed Jun. 3, 2018, the contents of which are hereby incorporated by reference in their entireties for all purposes.

FIELD OF THE DISCLOSURE

This relates generally to setup procedures for electronic devices, and user interactions with such devices during the same.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device can guide the user in setting up the device for the first time or after a factory reset. Enhancing these procedures and the user's interactions with the device improves the user's experience with the device and decreases user interaction time, which is particularly important where input devices are battery-operated.

SUMMARY OF THE DISCLOSURE

Some embodiments described in this disclosure are directed to one or more electronic devices that suggest and install applications on the electronic device and transfer settings and information from another electronic device during device setup. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4 illustrates an exemplary user interface for a multifunction device with a touch-sensitive surface that is separate from the display in accordance with some embodiments of the disclosure.

FIGS. 7A-7J are flow diagrams illustrating a method of facilitating suggesting and installing applications on the electronic device during device setup in accordance with some embodiments of the disclosure.

DETAILED DESCRIPTION

Figure 1A:
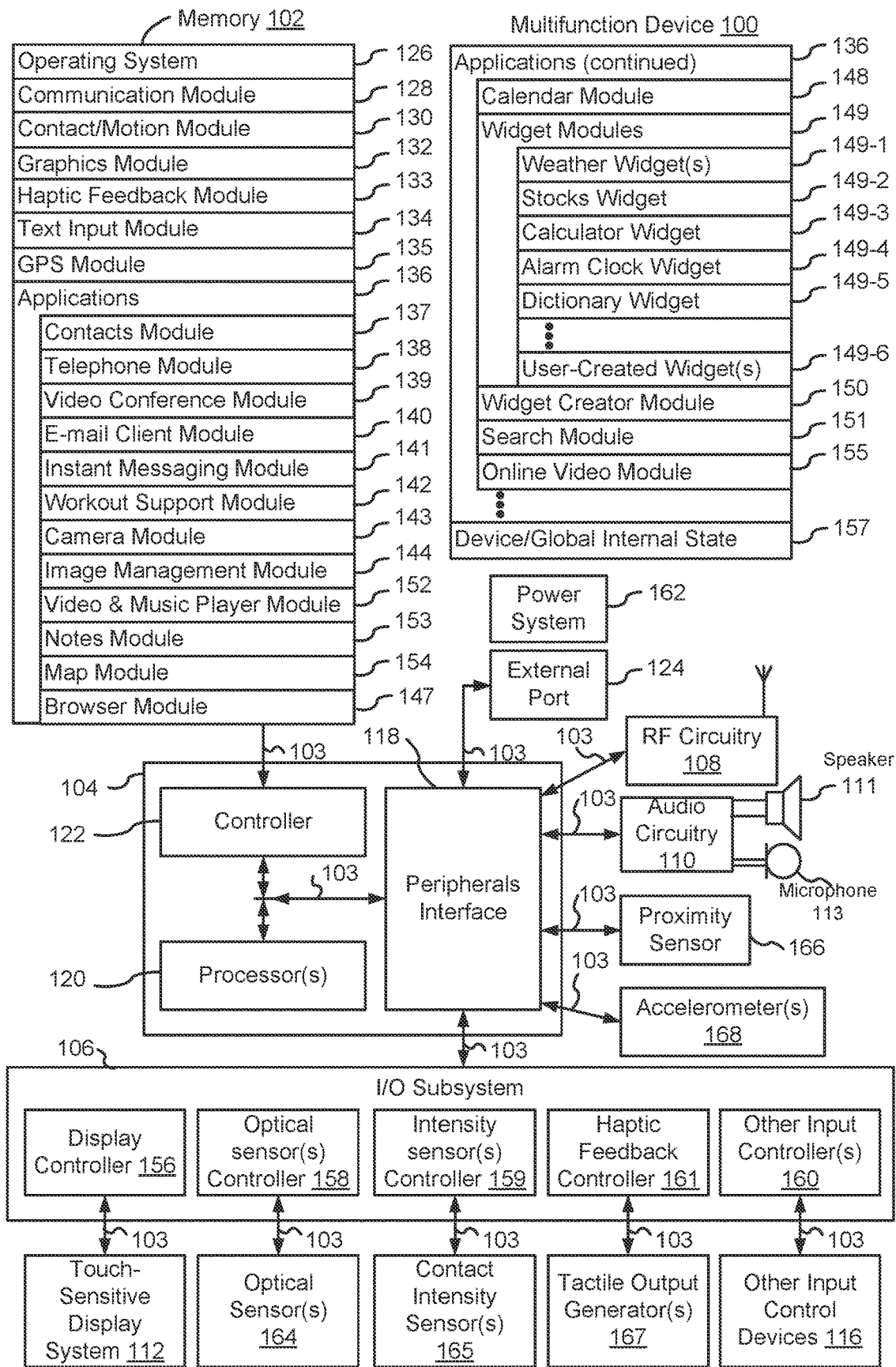
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

EXEMPLARY DEVICES

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety.

In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
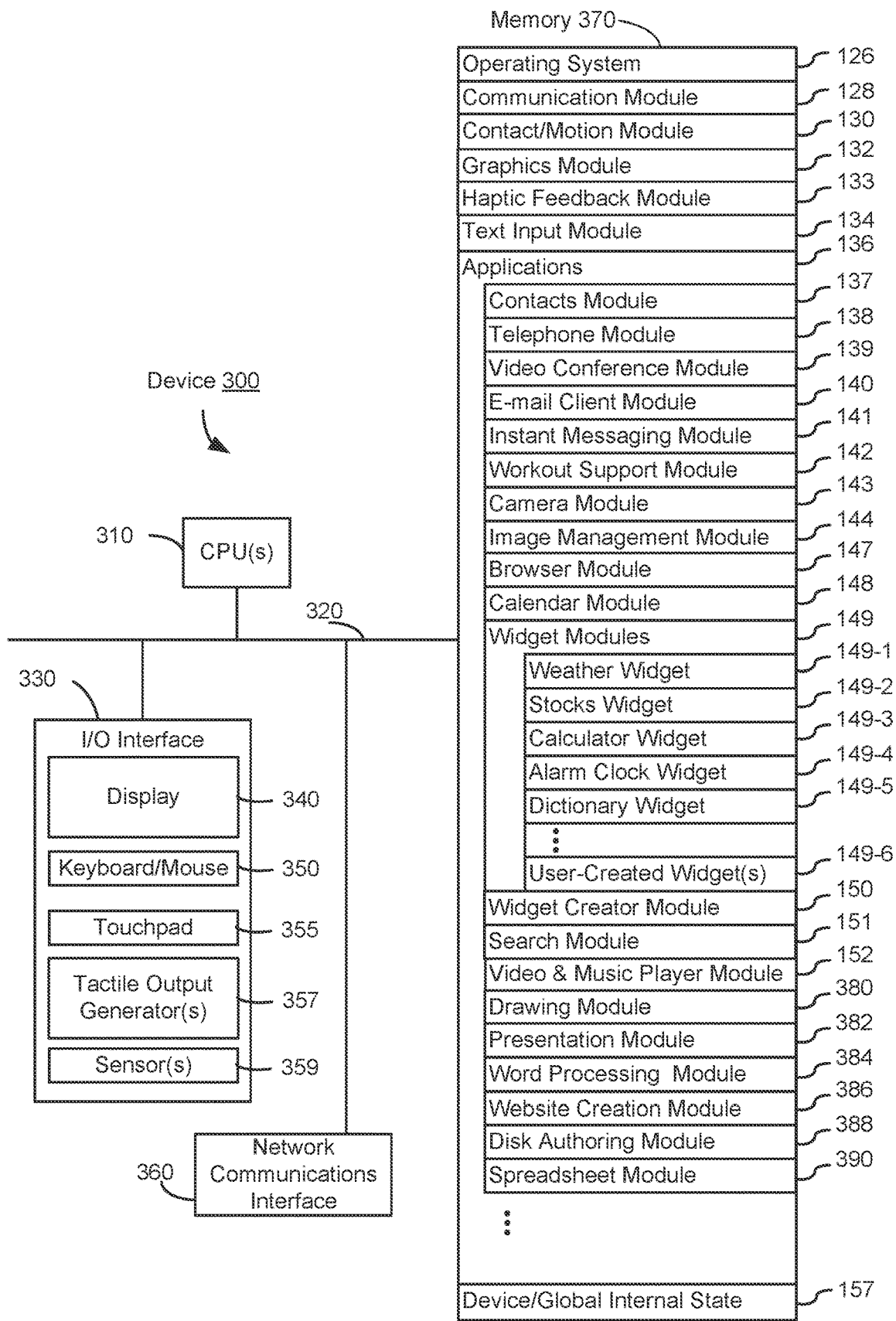
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:
contacts module 137 (sometimes called an address book or contact list);
telephone module 138;
video conferencing module 139;
e-mail client module 140;
instant messaging (IM) module 141;
workout support module 142;
camera module 143 for still and/or video images;
image management module 144;
video player module;
music player module;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which merges video player module and music player module;
notes module 153;
map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
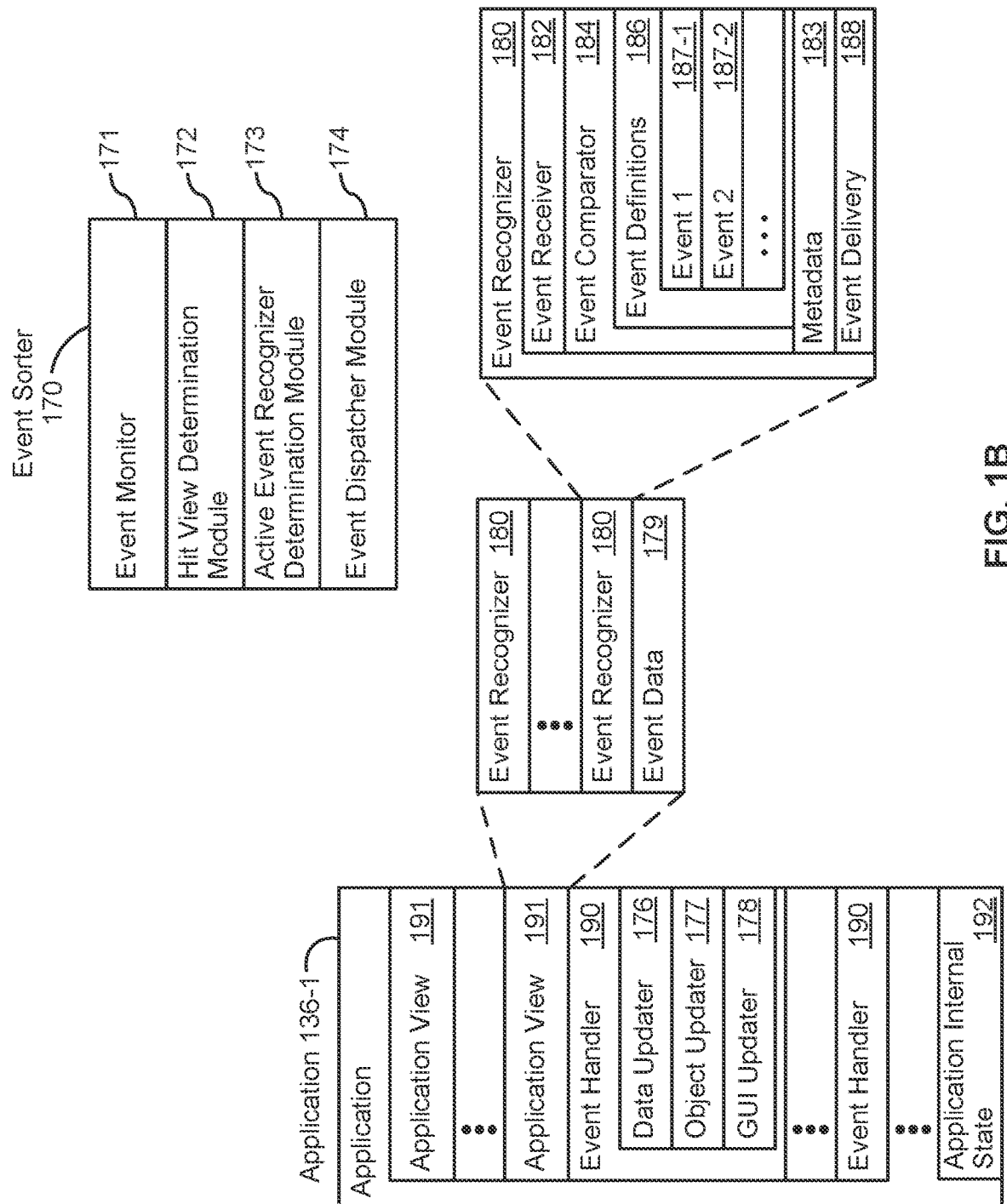
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
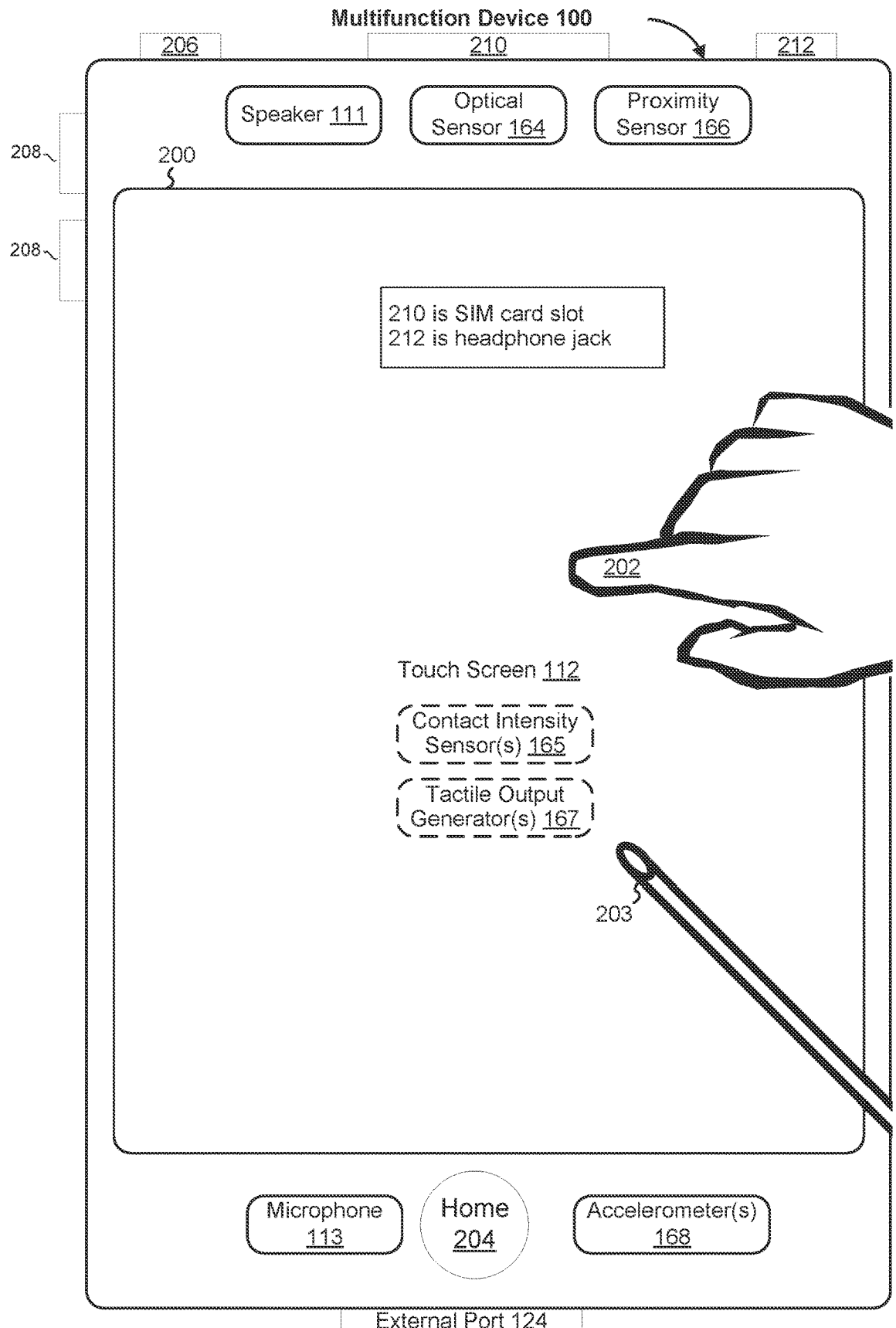
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
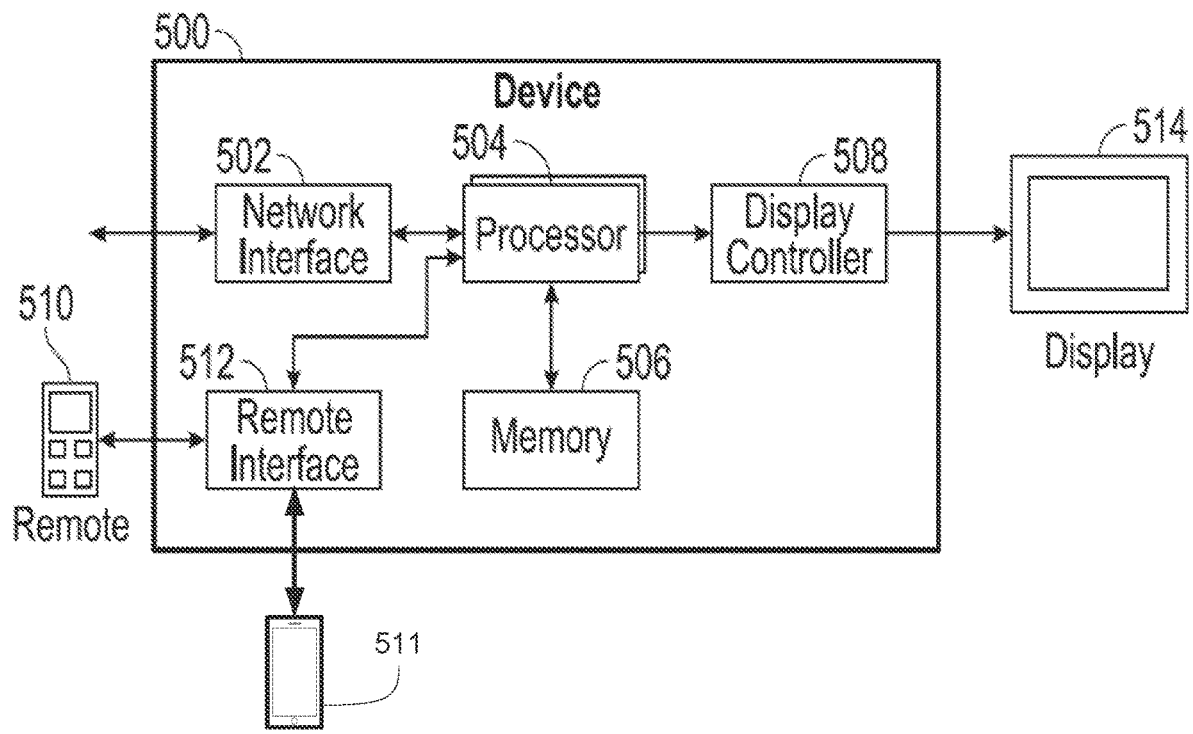
FIGS. 5A-5B illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700 and 900).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 510 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
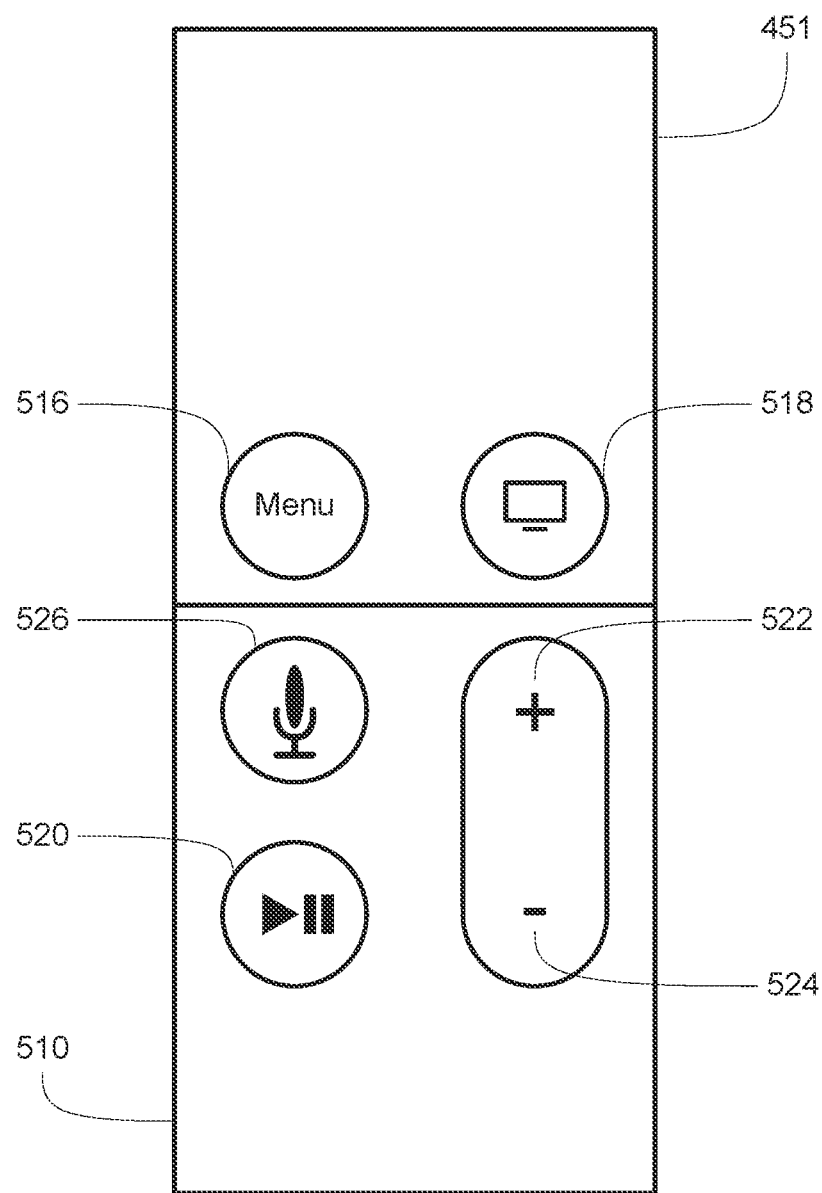

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

User Interfaces and Associated Processes

Set Top Box Provider-Based Setup

Users interact with electronic devices in many different manners, including interacting with media (e.g., music, movies, etc.) that may be available (e.g., stored or otherwise accessible) on the electronic devices. For example, a user may browse and play media that is accessible on an electronic device. In some circumstances, the electronic device is able to host a number of applications for consuming media. The applications may be native to the electronic device or may need to be installed by the user. In some circumstances, the electronic device can guide the user in setting up the device for the first time or after a factory reset. In these circumstances, the user may desire to quickly set up the electronic device by installing applications relevant to and recommended for the user's particular subscriptions to content. The embodiments described below provide ways in which an electronic device facilitates suggesting and installing applications on the electronic device during device setup, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6GG illustrate exemplary ways in which an electronic device facilitates suggesting and installing applications on the electronic device during device setup in accordance with some embodiments of the disclosure. The embodiments in these figures are used to illustrate the processes described below, including the processes described with reference to FIGS. 7A-7J.

Figure 6A:
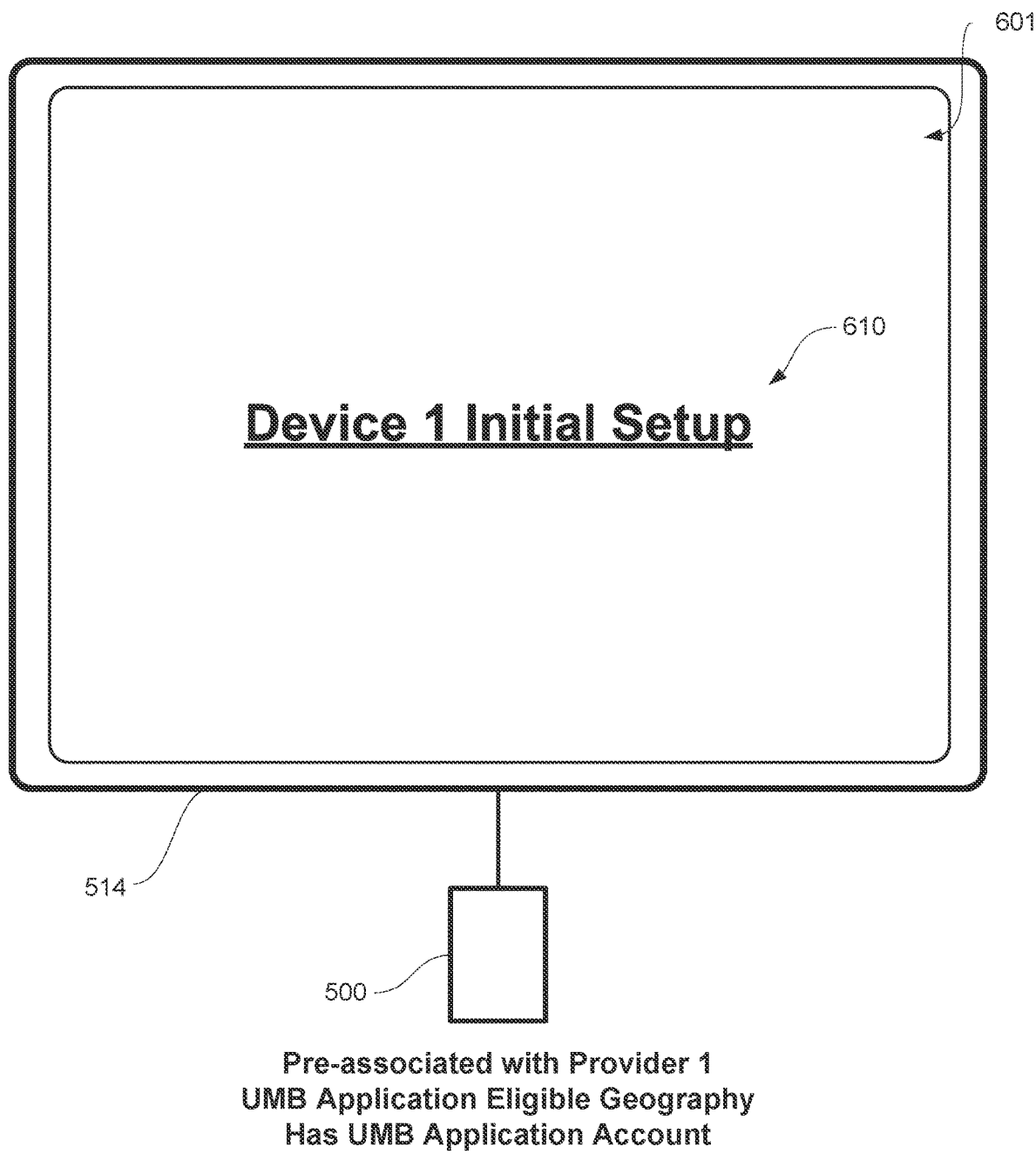
FIGS. 6A-6GG illustrate exemplary ways in which an electronic device facilitates suggesting and installing applications on the electronic device during device setup in accordance with some embodiments of the disclosure.
Figure 6B:
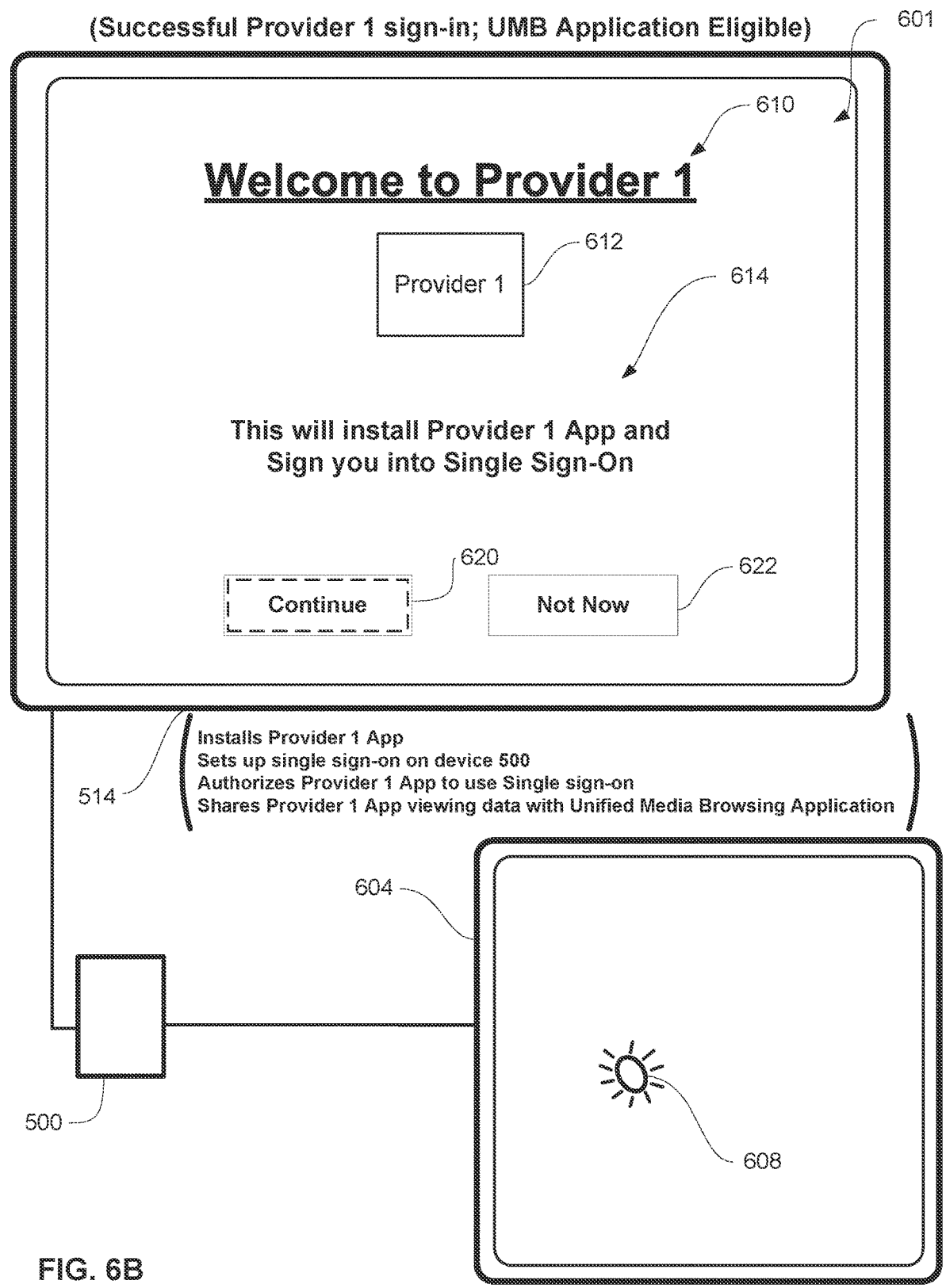
Figure 6C:
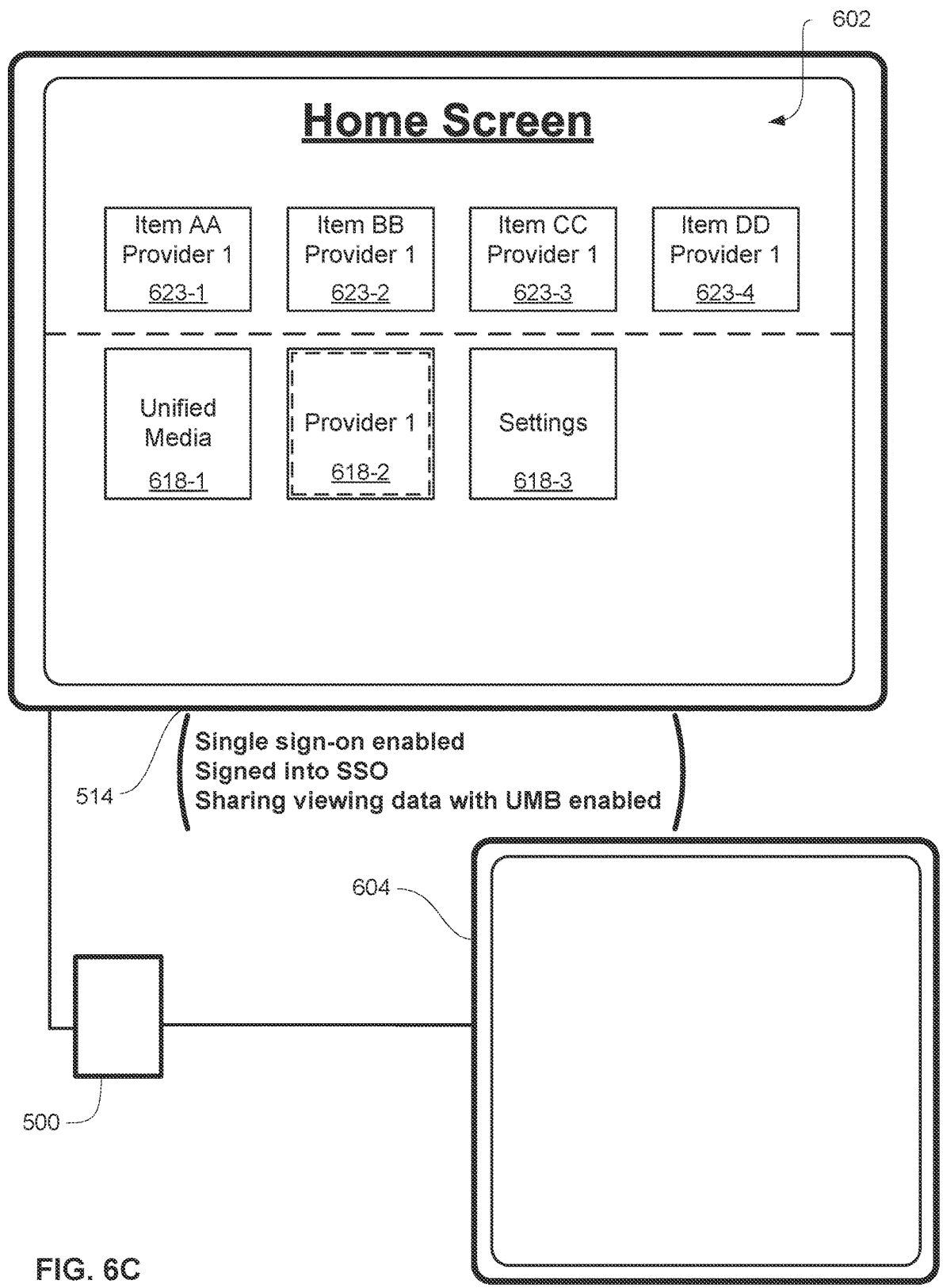

FIGS. 6A-6C illustrate one exemplary setup process for an electronic device (e.g., electronic device 500 of FIG. 5A). In FIG. 6A, exemplary display 514 optionally displays one or more user interfaces that include various content. In the example illustrated in FIG. 6A, display 514 displays setup interface 601 of an electronic device (e.g., electronic device 500 of FIG. 5A) of which display 514 is a part, or to which display 514 is connected. In some embodiments, device 500 enters a device setup procedure and display 514 displays a setup interface 601 (e.g., in response to the device being powered on or booted up for the first time or after a factory reset). In FIG. 6A, the initial setup splash screen is displayed in setup interface 601. The initial setup splash screen optionally includes a title 610 conveying to the user that the device is entering the device setup procedure. In some embodiments, title 610 is a text title or artwork (e.g., a logo, a picture, an illustration, etc.).

In some embodiments, device 500 is pre-associated with a primary content provider (e.g., provider 1). A primary content provider is optionally a content provider (e.g., cable provider, satellite provider, etc.) that gives the user access (e.g., via a subscription with the primary content provider) to content from a number of secondary content providers (e.g., CBS, Fox, HBO, etc. or any other content provider) as part of a bundled service to the user. In some embodiments, a pre-association with a primary content provider exists when the device's serial number is registered with the primary content provider (e.g., if the device was purchased from the primary content provider). The pre-association is optionally set before the end-user or consumer of the electronic device receives the electronic device. In other words, the pre-association is independent of any user input to the electronic device and is optionally a setting set by the vendor or manufacturer of the electronic device. The user optionally purchased the electronic device from the primary content provider (e.g., as opposed to purchasing the device directly from the manufacturer, who is optionally is not associated with the primary content provider) and the primary content provider associated the serial number with the primary content provider and with the user's account credentials.

In some embodiments, a unified media browsing application is installed on device 500 (e.g., pre-installed on device 500 by default or installed during the setup process). A unified media browsing application optionally provides a centralized location for browsing, viewing, or otherwise accessing content on the electronic device. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate ESPN application, etc.). In some embodiments, the unified media browsing application aggregates all the shared information to provide a better and more cohesive interface and dataset for the user. In some embodiments, the unified media browsing application allows the user to browse the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device). In some embodiments, the unified media browsing application provides an interface for the user to select content items that the user desires to view. Upon selection of the content item, the electronic device optionally determines the respective application from where the content item is available, launches the respective application, and causes playback of the selected content item.

In some embodiments, device 500 is located in a unified media browsing (UMB) application eligible geography. The location or geography of device 500 optionally does not support the functionality of the unified media browsing application (e.g., the servers to support the application optionally have not been set up for a particular country or region). In some embodiments, the user of device 500 has a unified media browsing application account. A unified media browsing application account is optionally a content access account. A content access account is optionally an account or subscription with a respective entity corresponding to the unified media browsing application (e.g., an account the allows the user to login to and use the unified media browsing application, which is optionally created by and/or controlled by the respective entity), where the respective entity is different than the primary content provider and/or the second content providers. Examples of content access accounts are iCloud accounts and/or iTunes accounts and/or Apple IDs by Apple Inc. of Cupertino, California In some embodiments, the setup process includes a setup interface for requesting the user to provide content access account information (e.g., log into content access account or register for a new content access account).

After device 500 displays the initial setup splash screen, device 500 optionally automatically determines the primary content provider as provider 1 using the device's pre-association with provider 1 (e.g., looking up a database using device 500's serial number, without user input indicating or selecting primary content provider 1). Device 500 also optionally verifies that device 500 resides in a unified media browsing application eligible geography (e.g., the user optionally selects his or her location or device 500 optionally determines the device's location and determines that the geography supports the unified media browsing application) and the user's unified media browsing application account is valid (e.g., the user optionally enters in his or her unified media browsing application account credentials and successfully logs in). After successfully signing into the primary content provider and determining the eligibility of the unified media browsing application, device 500 optionally displays a primary content provider welcome page. For example, in FIG. 6B, display 514 displays setup interface 601 with title 610 indicating to the user that device 500 will be set up with provider 1 as the primary content provider. Setup interface 601 optionally includes a representation 612 of provider 1 (e.g., a logo, a picture, a video clip, etc.) and setup description 614. Setup description 614 optionally informs the user of the steps that the setup will perform. For example, in FIG. 6B, setup description 614 indicates that assenting to the setup will install the provider 1 application and sign device 500 into single sign-on (as will be described below) using the user's credentials with the primary content provider.

Setup interface 601 optionally includes two buttons: continue button 620 and cancel button 622. In FIG. 6B, continue button 620 has the current focus, as indicated by the dashed-line box within continue button 620. Clicking cancel button 622 optionally exits the setup process and performs no further setup steps. Clicking continue button 620 optionally continues setup and performs the setup steps. For example, in FIG. 6B, because device 500 has successfully signed into provider 1 and is eligible to use the unified media browsing application, continuing setup will install the provider 1 application (e.g., an application for the user's cable company via which the user is able to access content from the user's cable company), set up single sign-on on device 500 (e.g., authorize device 500 with provider 1), authorize the provider 1 application to use single sign-on (e.g., grant access to the single sign-on authorization of the electronic device with provider 1 to the provider 1 application), and configure the provider 1 application to share viewing data with the unified media browsing application (e.g., a catalog of content available from provider 1, content the user has previously watched, content the user is currently watching, the user's viewing preference data, etc.).

In some embodiments, single sign-on is a feature in which a user's login credentials to a particular service is authenticated and authorized. As a result of successful authorization, device 500 optionally creates an authentication token and stores the authentication token on device 500 itself or optionally on an external server. In some embodiments, the authorization is performed independent of any application and is specific to a particular service. For instance device 500 optionally authorizes with provider 1 as the primary content provider and the authorization is optionally agnostic to the provider 1 application being installed or not on device 500. In some embodiments, device 500 is able to grant access to the single sign-on authentication token to different applications or services on device 500. Granting access to the authentication token optionally allows the respective application or service to access the authentication token to authenticate itself using the stored authentication credentials, without requiring to individually authenticate the respective application with the primary content provider. Authenticating the respective application using the authentication token optionally provides the respective application verification that the user has a valid credential with the primary content provider, and optionally enables the respective application to access its respective content using the credential with the primary content provider.

In some embodiments, configuring a content provider application to share viewing data with the unified media browsing application shares a catalog of content that is available from the content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns) with the unified media browsing application.

Turning back to FIG. 6B, in some embodiments, device 500 detects a click input of contact 608 on touch-sensitive surface 604 while displaying setup interface 601, indicating selection of continue button 620. As a result of detecting the click input, device 500 optionally performs the above-mentioned setup steps (e.g., installs the provider 1 application (indicated by icon 618-2), sets up single sign-on, authorizes the provider 1 app to use the single sign-on credentials, and configures the provider 1 app to share viewing data with the unified media browsing application) and completes the setup process. In some embodiments, upon completion of the setup process, device 500 replaces display of setup interface 601 with display of a home screen user interface 602, as shown in FIG. 6C. In FIG. 6C, user interface 602 is an application-browsing user interface of the operating system of the electronic device that includes icons for different applications installed on the electronic device, the icons selectable to launch their corresponding applications on the electronic device. For example, user interface 602 includes icons 618-1 to 618-3 that are selectable to launch different applications on the electronic device. Icon 618-1 is selectable to launch a unified media browsing application, icon 618-2 is selectable to launch a media application corresponding to media provider 1, and icon 618-3 is selectable to launch a settings application. In some embodiments, icons 618-1 to 618-3 are arranged in a scrollable grid pattern and user interface 602 is scrollable to display more rows of icons beyond 618-3. In some embodiments, the provider 1 application icon 618-2 is placed in a prioritized location on user interface 602. For instance, in FIG. 6C, icon 618-2 is placed in the second location on user interface 602, behind the unified media browsing application icon 618-1.

User interface 602 optionally also includes a region above icons 618 (e.g., a "top shelf" region) that optionally displays one or more user interface elements corresponding to the application whose icon 618 has the current focus (in some embodiments, only for those icons in the top row of icons in user interface 602). For example, in FIG. 6C, icon 618-2 corresponding to media provider 1 has the current focus. As a result, the electronic device displays representations 623-1 to 623-4 of media items accessible from media provider 1 in the "top shelf" region of user interface 602. Representations 623 optionally include information identifying each media item (e.g., textual information) and/or information about the content of each media item (e.g., video previews of the media items, still images of the media items, etc.). The "top shelf" region is, in some embodiments, a scrollable region that includes representations of suggested media items for the currently highlighted application in the home screen, and an upward swipe causes the current focus to move to a representation of one of the suggested media items that, upon selection (e.g., with a tap or click input on a remote control), will cause the device to start playing a media item that corresponds to the representation of a suggested media item that has current focus.

In some embodiments, as shown in FIG. 6C, as a result of the setup process, device 500 installed the provider 1 application, enabled single sign-on (e.g., authorized device 500 with provider 1), signed into the single sign-on (e.g., granted access to the single sign-on authentication to the provider 1 application), and enabled sharing view data with the unified media browsing application. Although FIGS. 6A-6C illustrate certain setup interfaces and steps as one following the other, this is meant to be illustrative and not limiting. For example, the device setup process optionally includes other setup interfaces and steps before, after, or between any of the above-described setup interfaces and steps without departing from the scope of the disclosure.

Figure 6D:
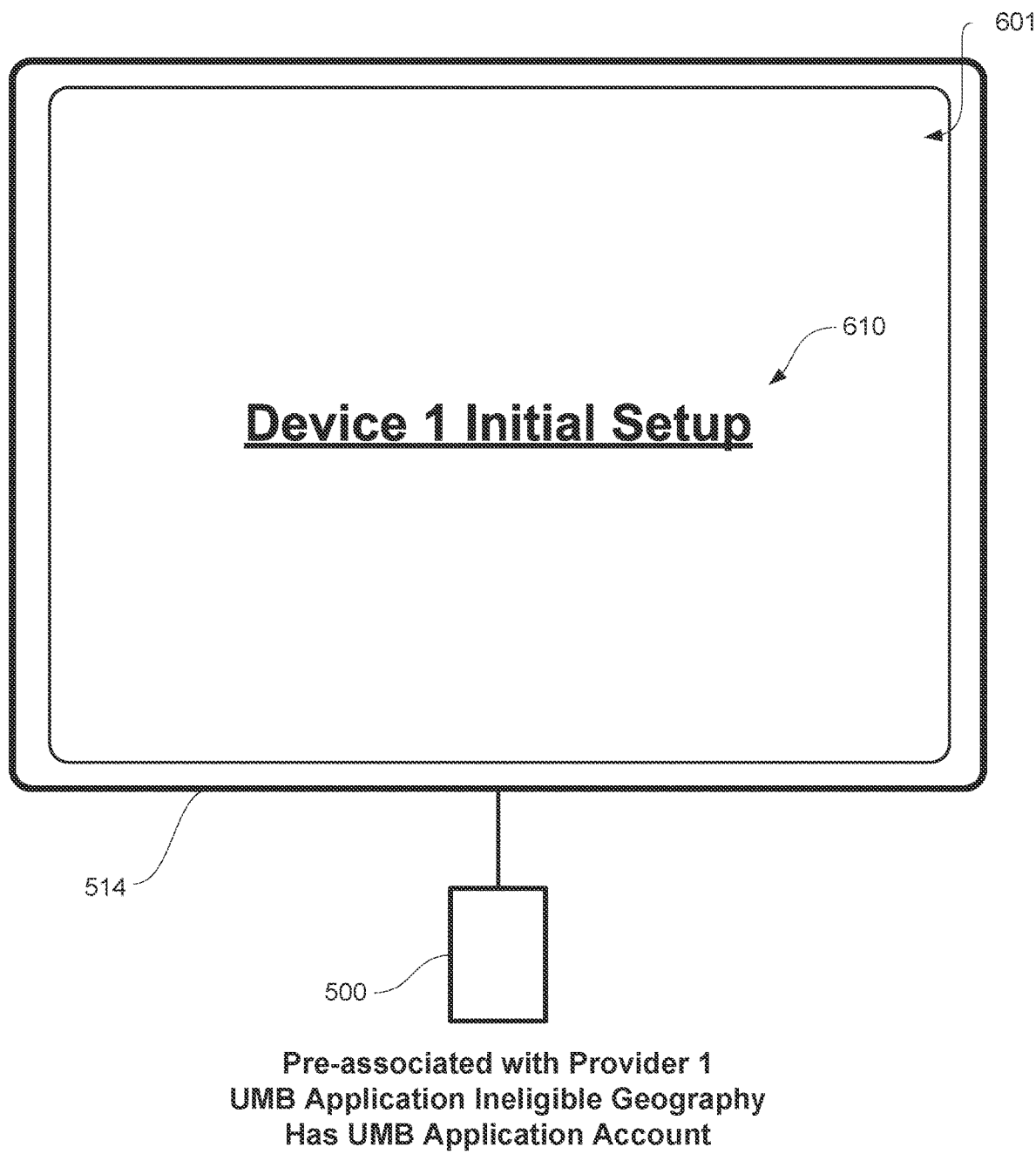
Figure 6E:
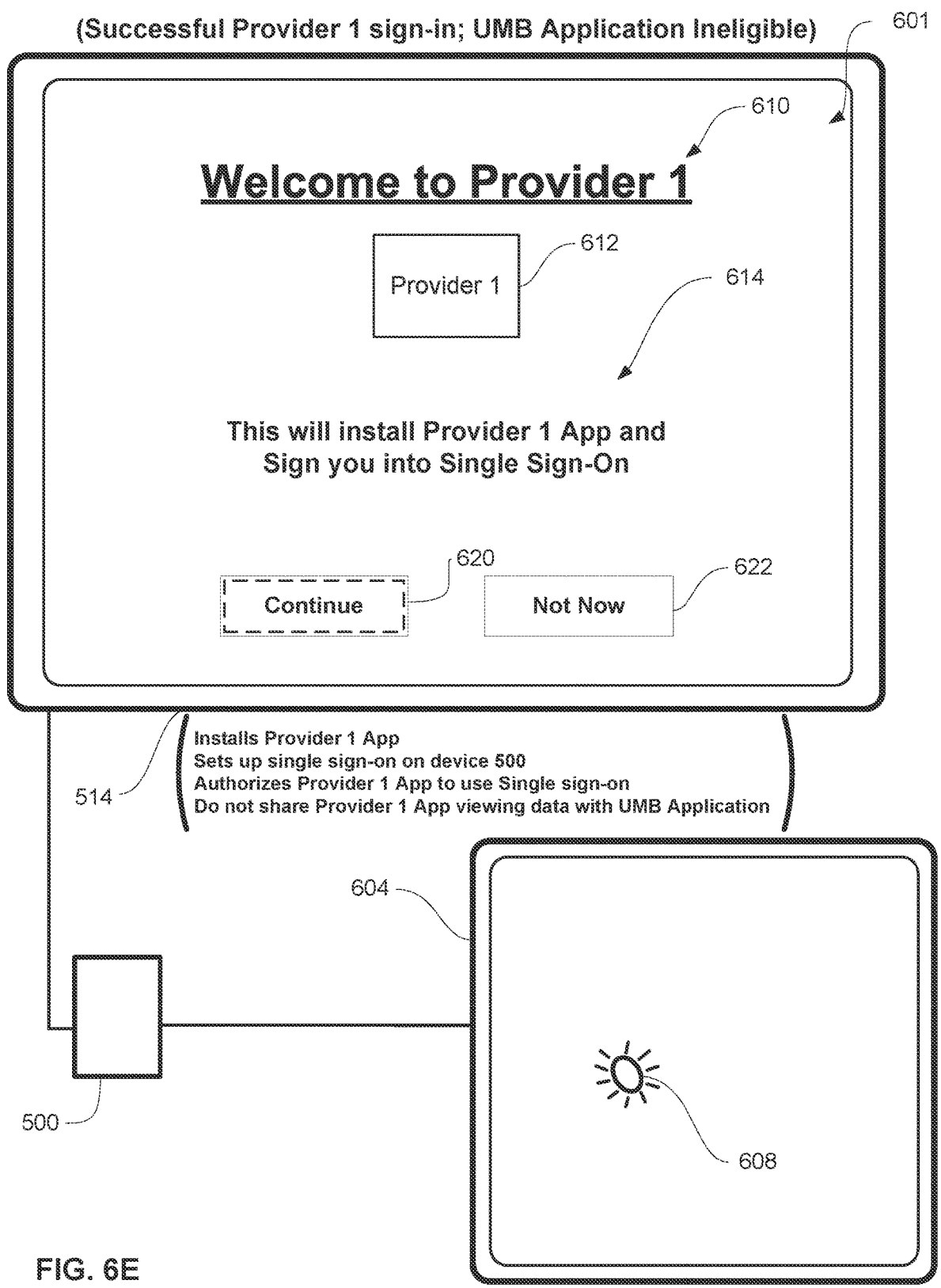
Figure 6F:
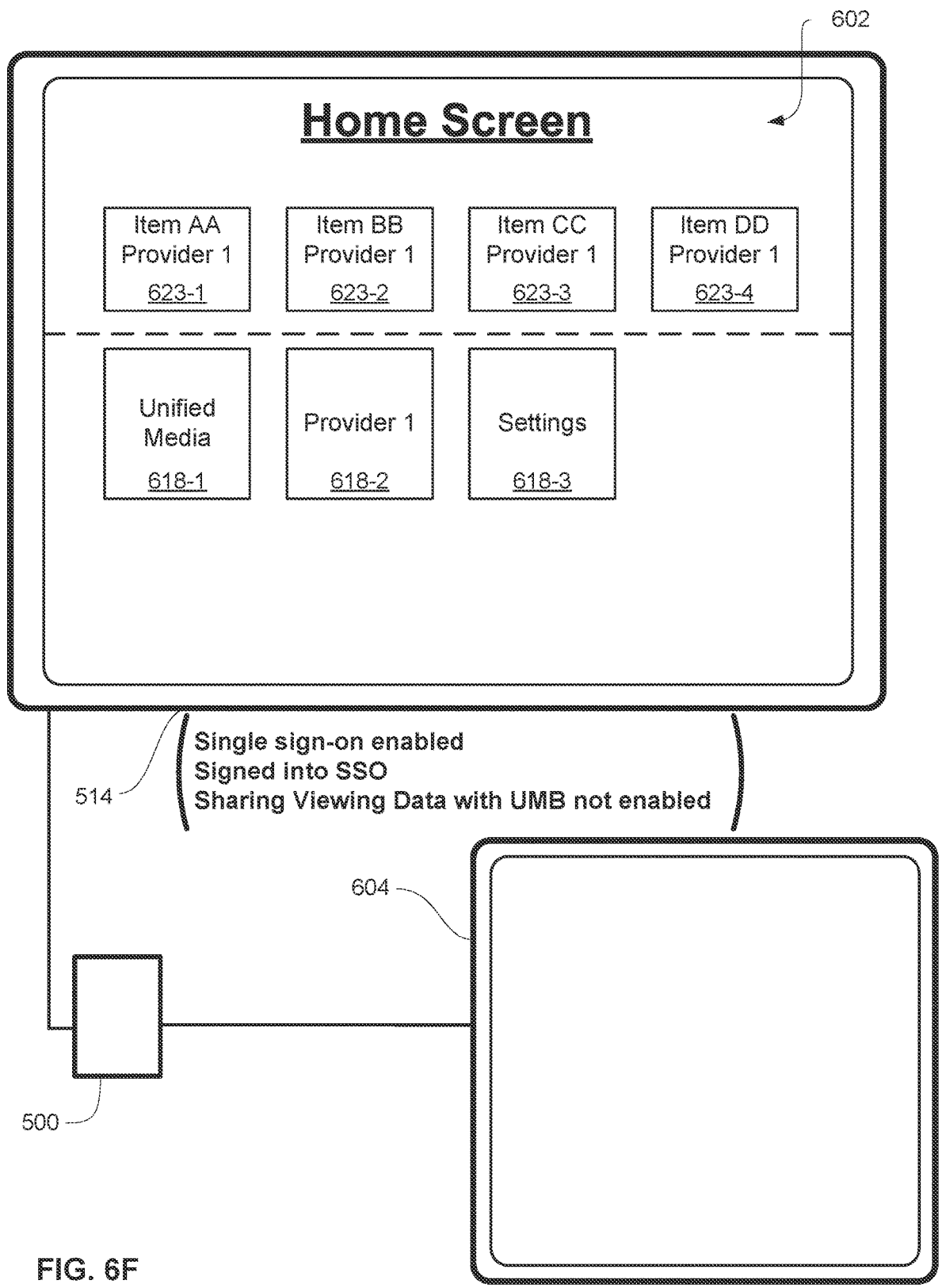

FIGS. 6D-6F illustrate another exemplary setup process for device 500. In the example illustrated in FIG. 6D, display 514 displays setup interface 601 of an electronic device (e.g., electronic device 500 of FIG. 5A) of which display 514 is a part, or to which display 514 is connected. In some embodiments, device 500 enters a device setup procedure and display 514 displays a setup interface 601 (e.g., in response to the device being powered on or booted up for the first time or after a factory reset), similar to that described in FIG. 6A. In some embodiments, as illustrated in FIG. 6D, device 500 is pre-associated with a primary content provider (e.g., the serial number of device 500 is pre-associated with provider 1), device 500 is not located in a unified media browsing application eligible geography (e.g., device 500 is located in a location that does not support the use of a unified media browsing application), and the user of device 500 has a valid unified media browsing application account.

After device 500 displays the initial setup splash screen, device 500 optionally automatically determines the primary content provider as provider 1 using the device's pre-association with provider 1 (e.g., looking up a database using device 500's serial number, without user input indicating or selecting primary content provider 1). Device 500 optionally attempts to verify that device 500 resides in a unified media browsing application eligible geography (e.g., the user optionally selects his or her location or device 500 optionally determines the device's location and determines that the geography supports the unified media browsing application) and that the user's unified media browsing application account is valid (e.g., the user optionally enters in his or her unified media browsing application account credentials and successfully logs in). Because device 500 does not reside in a geography that supports a unified media browsing application, device 500 determines that it is ineligible to use the unified media browsing application. After successfully signing into the primary content provider and determining the ineligibility of the unified media browsing application, device 500 optionally displays a primary content provider welcome page, similar to that shown in FIG. 6B. For example, in FIG. 6E, display 514 displays setup interface 601 with title 610 indicating to the user that device 500 will be set up with provider 1 as the primary content provider and setup description 614 indicates that assenting to the setup will install the provider 1 application and sign device 500 into single sign-on.

In FIG. 6E, because device 500 has successfully signed into provider 1, but is ineligible to use the unified media browsing application, continuing setup (e.g. clicking continue button 620) will install the provider 1 application (e.g., an application for the user's cable company via which the user is able to access content from the user's cable company), set up single sign-on on device 500 (e.g., authorize device 500 with provider 1), and authorize the provider 1 application to use single sign-on (e.g., grant access to the single sign-on authorization of the electronic device with provider 1 to the provider 1 application), but will not configure the provider 1 application to share viewing data with the unified media browsing application.

In FIG. 6E, device 500 detects a click input of contact 608 on touch-sensitive surface 604 while displaying setup interface 601, indicating selection of continue button 620. As a result of detecting the click input, device 500 optionally performs the above-mentioned setup steps (e.g., installs the provider 1 application, sets up single sign-on, and authorizes the provider 1 app to use the single sign-on credentials, but does not configure the provider 1 app to share viewing data with the unified media browsing application) and completes the setup process. In some embodiments, upon completion of the setup process, device 500 replaces display of setup interface 601 with display of a home screen user interface 602, as shown in FIG. 6F.

In some embodiments, as shown in FIG. 6F, as a result of the setup process, device 500 installed the provider 1 application, enabled single sign-on (e.g., authorized device 500 with provider 1), signed into the single sign-on (e.g., granted access to the single sign-on authentication to the provider 1 application), but did not enable sharing view data with the unified media browsing application. Although FIGS. 6D-6F illustrate certain setup interfaces and steps as one following the other, this is meant to be illustrative and not limiting. For example, the device setup process optionally includes other setup interfaces and steps before, after, or between any of the above-described setup interfaces and steps without departing from the scope of the disclosure.

Figure 6G:
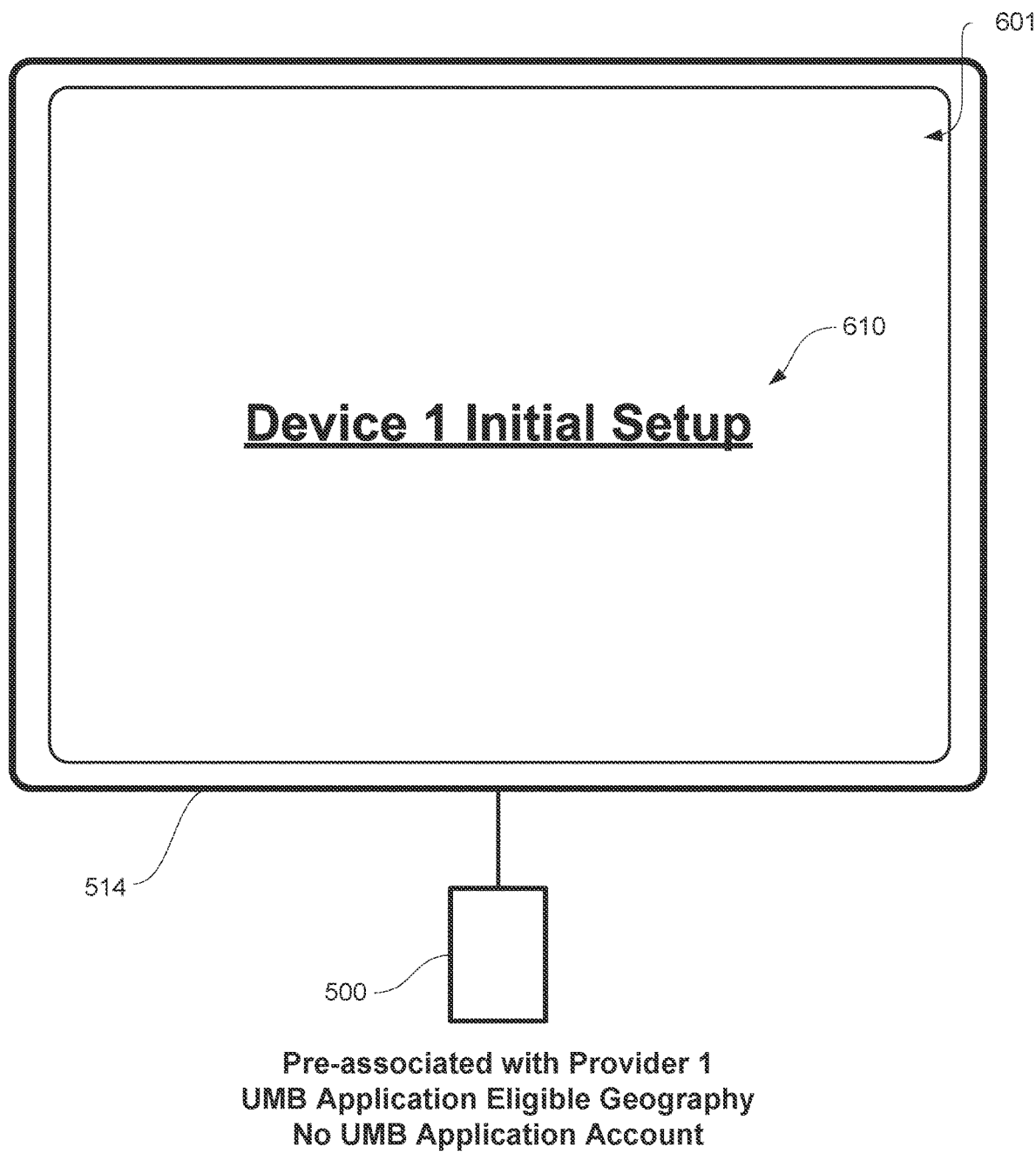
Figure 6H:
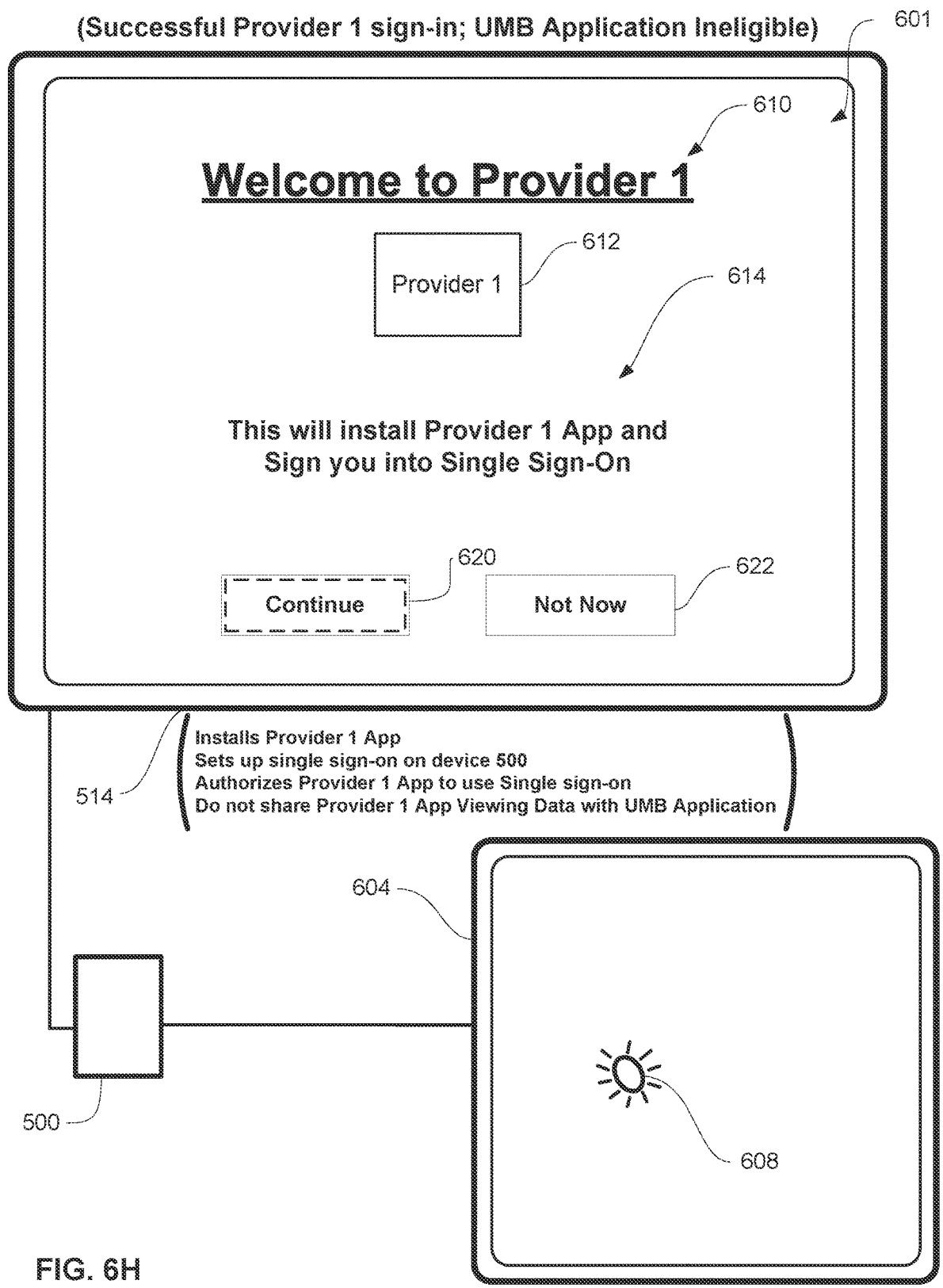
Figure 6I:
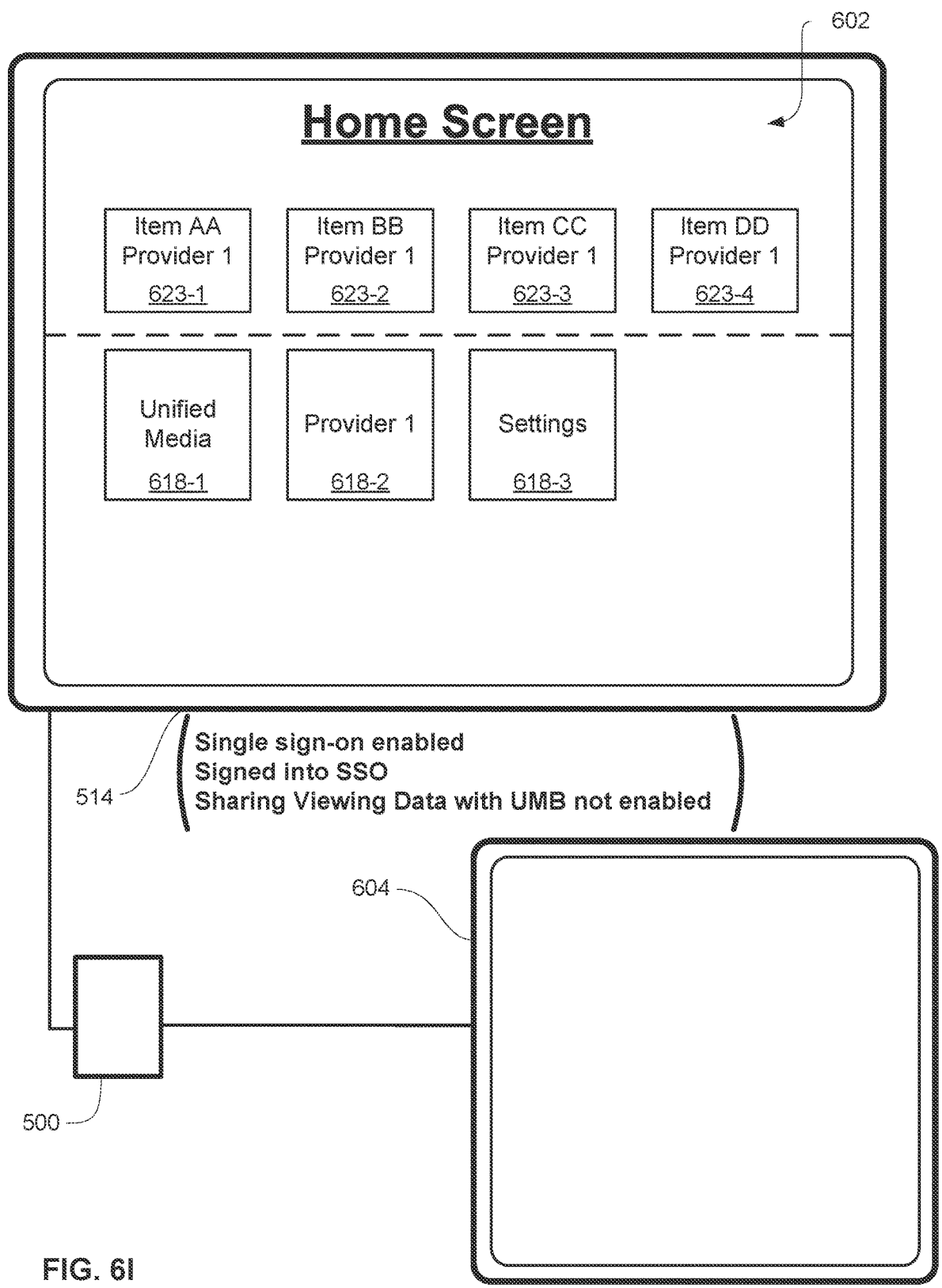

FIGS. 6G-6I illustrate another exemplary setup process for device 500, similar to that described in FIGS. 6A-6C, but in which the user of device 500 does not have a valid unified media browsing application account. After device 500 displays the initial setup splash screen, device 500 optionally automatically determines the primary content provider as provider 1 using the device's pre-association with provider 1 (e.g., looking up a database using device 500's serial number, without user input indicating or selecting primary content provider 1). Device 500 optionally verifies that device 500 resides in a unified media browsing application eligible geography (e.g., the user optionally selects his or her location or device 500 optionally determines the device's location and determines that the geography supports the unified media browsing application) and attempts to verify that the user's has a valid unified media browsing application account. In FIGS. 6G-6I, because the user of device 500 does have a valid unified media browsing application account, device 500 determines that it is ineligible to use the unified media browsing application. After successfully signing into the primary content provider and determining the ineligibility of the unified media browsing application, device 500 optionally displays a primary content provider welcome page, similar to that shown in FIG. 6B. For example, in FIG. 6H, display 514 displays setup interface 601 with title 610 indicating to the user that device 500 will be set up with provider 1 as the primary content provider and setup description 614 indicates that assenting to the setup will install the provider 1 application and sign device 500 into single sign-on.

In FIG. 6H, because device 500 has successfully signed into provider 1, but is ineligible to use the unified media browsing application, continuing setup (e.g. clicking continue button 620) will install the provider 1 application (e.g., an application for the user's cable company via which the user is able to access content from the user's cable company), set up single sign-on on device 500 (e.g., authorize device 500 with provider 1), and authorize the provider 1 application to use single sign-on (e.g., grant access to the single sign-on authorization of the electronic device with provider 1 to the provider 1 application), but will not configure the provider 1 application to share viewing data with the unified media browsing application.

In FIG. 6H, device 500 detects a click input of contact 608 on touch-sensitive surface 604 while displaying setup interface 601, indicating selection of continue button 620. As a result of detecting the click input, device 500 optionally performs the above-mentioned setup steps (e.g., installs the provider 1 application, sets up single sign-on, and authorizes the provider 1 app to use the single sign-on credentials, but does not configure the provider 1 app to share viewing data with the unified media browsing application) and completes the setup process. In some embodiments, upon completion of the setup process, device 500 replaces display of setup interface 601 with display of a home screen user interface 602, as shown in FIG. 6I.

In some embodiments, as shown in FIG. 6I, as a result of the setup process, device 500 installed the provider 1 application, enabled single sign-on (e.g., authorized device 500 with provider 1), signed into the single sign-on (e.g., granted access to the single sign-on authentication to the provider 1 application), but did not enable sharing view data with the unified media browsing application. Although FIGS. 6G-6I illustrate certain setup interfaces and steps as one following the other, this is meant to be illustrative and not limiting. For example, the device setup process optionally includes other setup interfaces and steps before, after, or between any of the above-described setup interfaces and steps without departing from the scope of the disclosure.

FIGS. 6J-6M illustrate another exemplary setup process for device 500, similar to that described in FIGS. 6A-6C, but in which device 500 was unsuccessful in signing into the primary content provider. In some embodiments, device 500 was unsuccessful in signing into the primary content provider because the serial number of the device is optionally associated with the wrong primary content provider, the user no longer has a valid account with the primary content provider, or any other scenarios that would cause an unsuccessful authentication such as the electronic device being unable to communicate with the primary content provider at this time due to connectivity issues.

After unsuccessfully signing into the primary content provider, device 500 optionally displays a primary content provider login page. For example, in FIG. 6K, display 514 displays setup interface 601 with login fields (e.g., username field 630 and password field 632) for the user to provide login credentials for provider 1, login confirmation button 624, and login cancellation button 626. In FIG. 6K, device 500 detects a click input of contact 608 on touch-sensitive surface 604 while displaying setup interface 601 with login fields 630 and 632 and while login confirmation button 624 is currently highlighted. As a result, device 500 logs into provider 1 and verifies the user's login credentials (if correct). Device 500 also optionally verifies that device 500 resides in a unified media browsing application eligible geography (e.g., the user optionally selects his or her location or device 500 optionally determines the device's location and determines that the geography supports the unified media browsing application) and verifies that the user's has a valid unified media browsing application account.

After successfully signing into the primary content provider using the user-provided credentials (e.g., not the pre-association) and determining the eligibility of the unified media browsing application, device 500 optionally continues the setup process similar to when the device successfully signs into the primary content provider using the pre-association. For example, in FIG. 6L, display 514 displays setup interface 601 similar to that in FIG. 6B. After detecting a click input of contact 608, device 500 optionally performs the setup steps of installing the provider 1 application (indicated by icon 618-2), setting up single sign-on, authorizing the provider 1 application to use the single sign-on credentials, and configuring the provider 1 app to share viewing data with the unified media browsing application, thus completing the setup process. In some embodiments, upon completion of the setup process, device 500 replaces display of setup interface 601 with display of a home screen user interface 602, as shown in FIG. 6M.

Figure 6J:
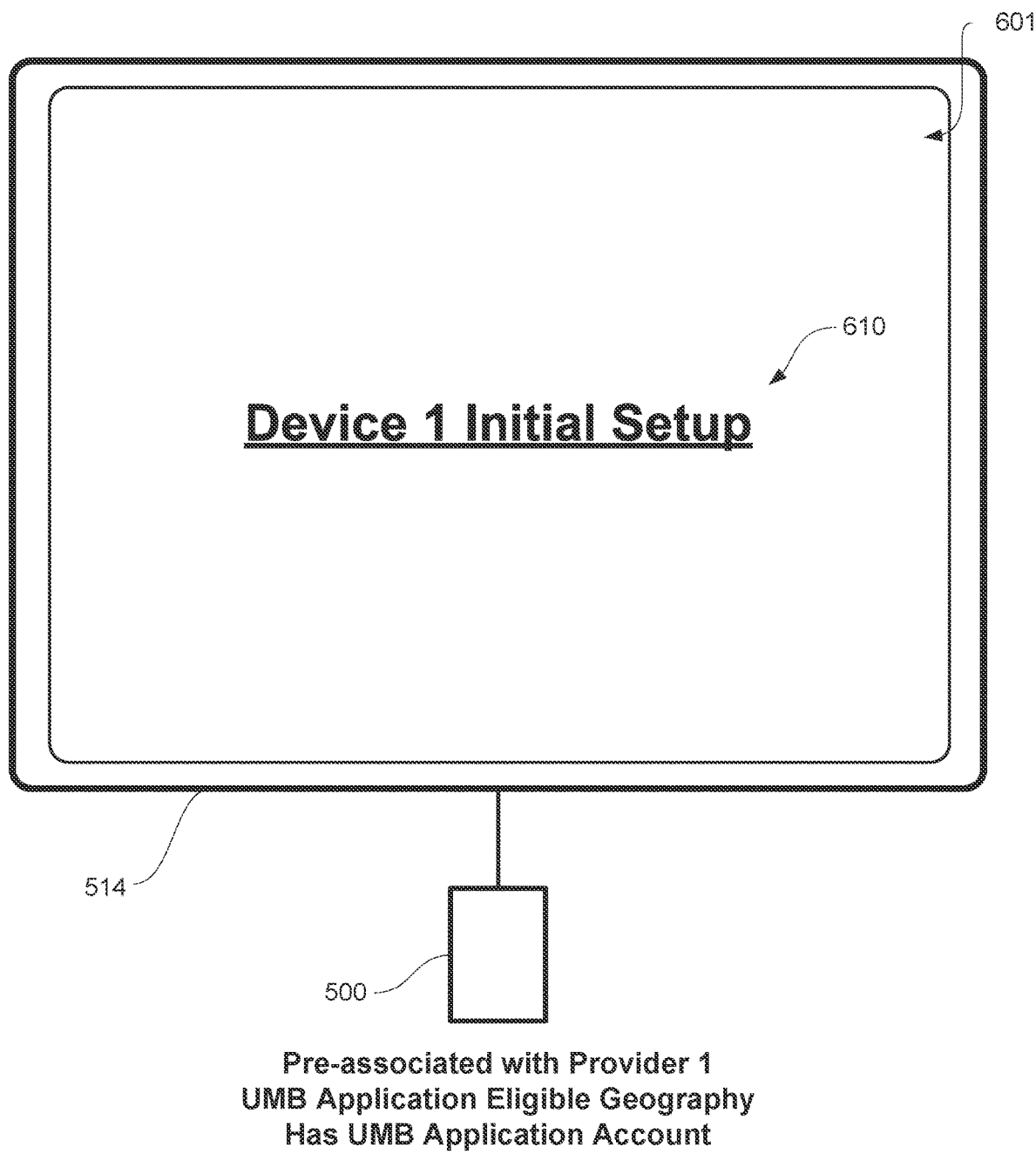
Figure 6L:
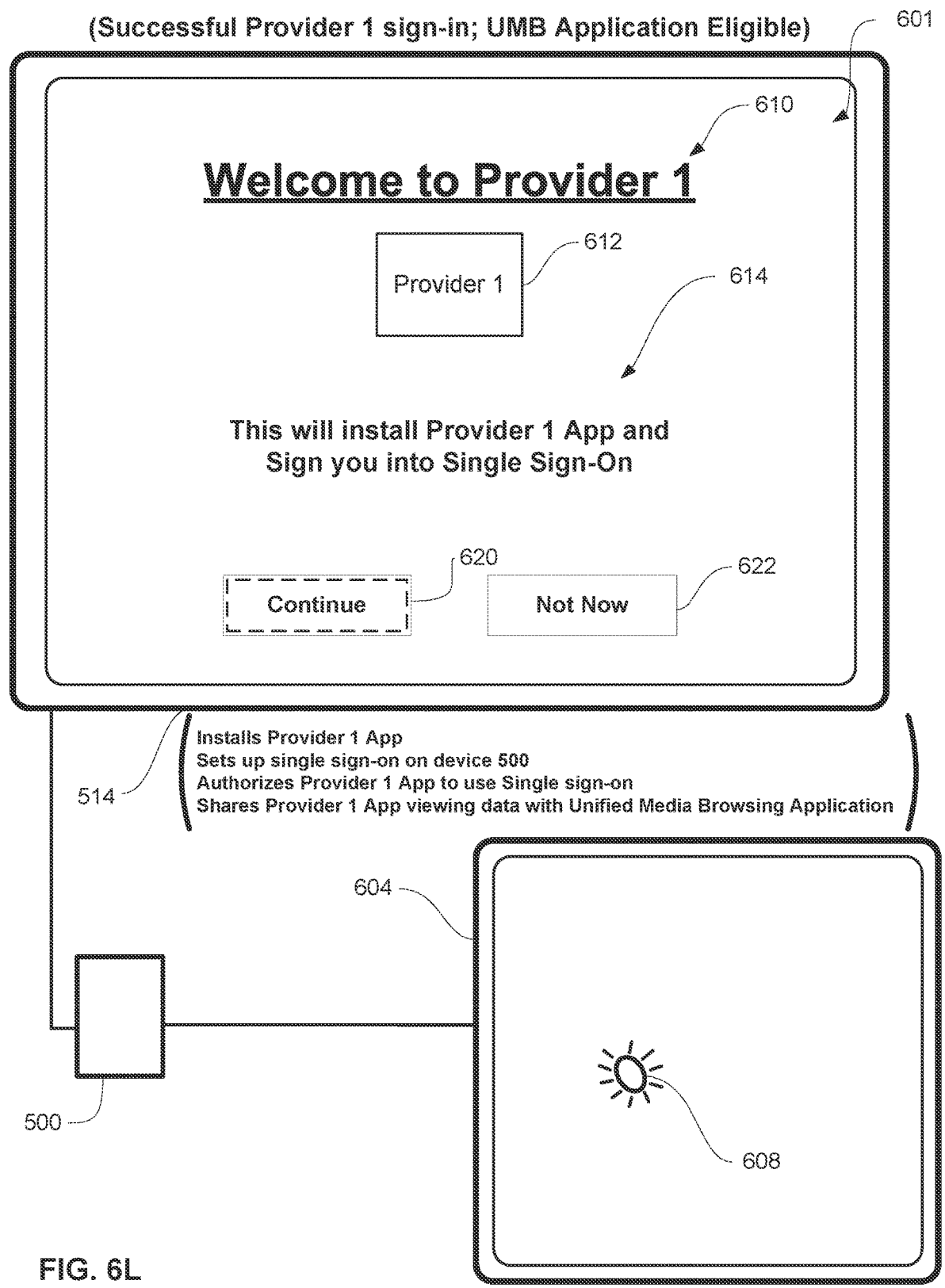
Figure 6M:
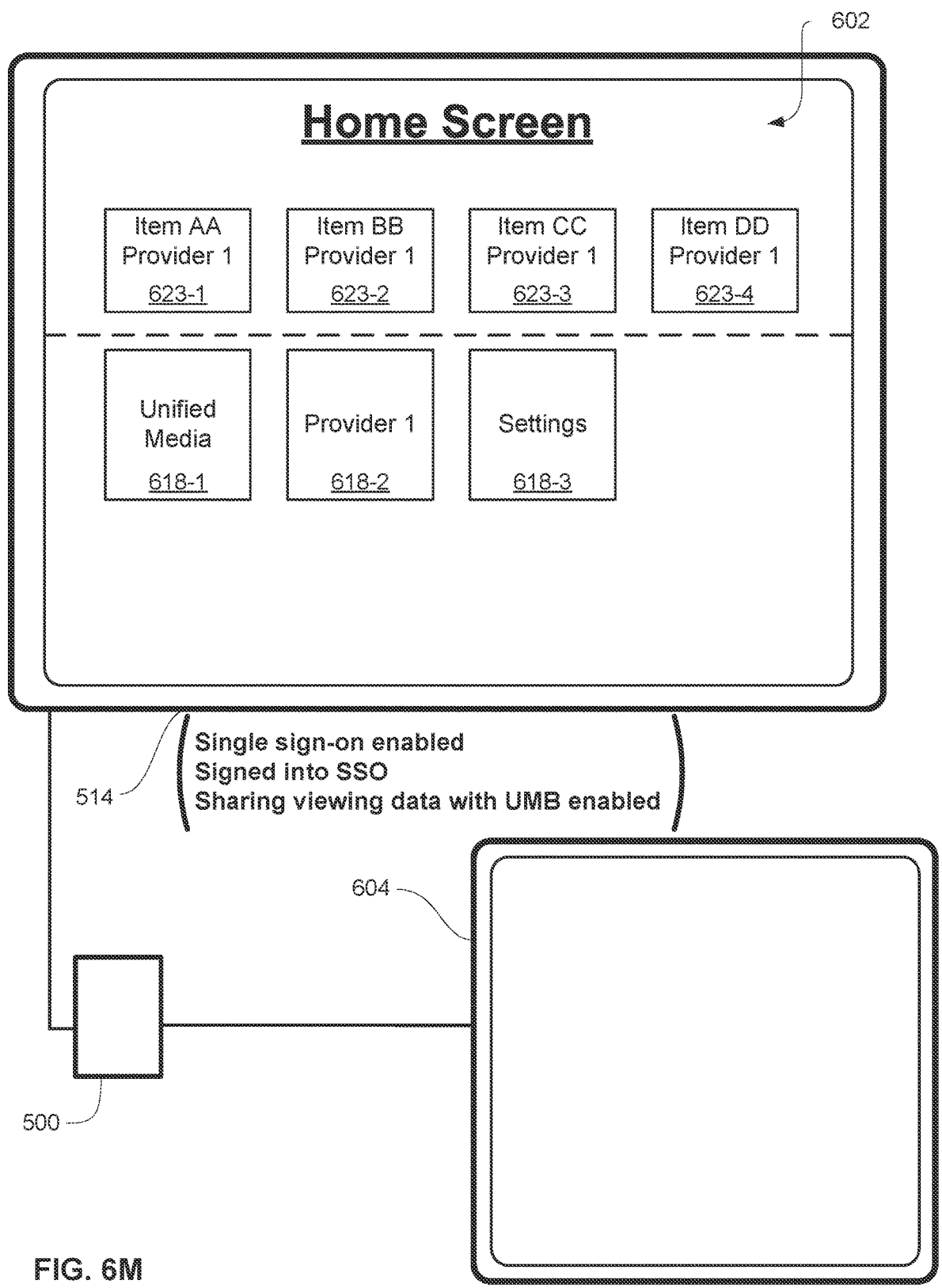

In some embodiments, as shown in FIG. 6M, as a result of the setup process, device 500 installed the provider 1 application, enabled single sign-on (e.g., authorized device 500 with provider 1), signed into the single sign-on (e.g., granted access to the single sign-on authentication to the provider 1 application), and enabled sharing view data with the unified media browsing application. Although FIGS. 6J-6M illustrate certain setup interfaces and steps as one following the other, this is meant to be illustrative and not limiting. For example, the device setup process optionally includes other setup interfaces and steps before, after, or between any of the above-described setup interfaces and steps without departing from the scope of the disclosure.

Figure 6N:
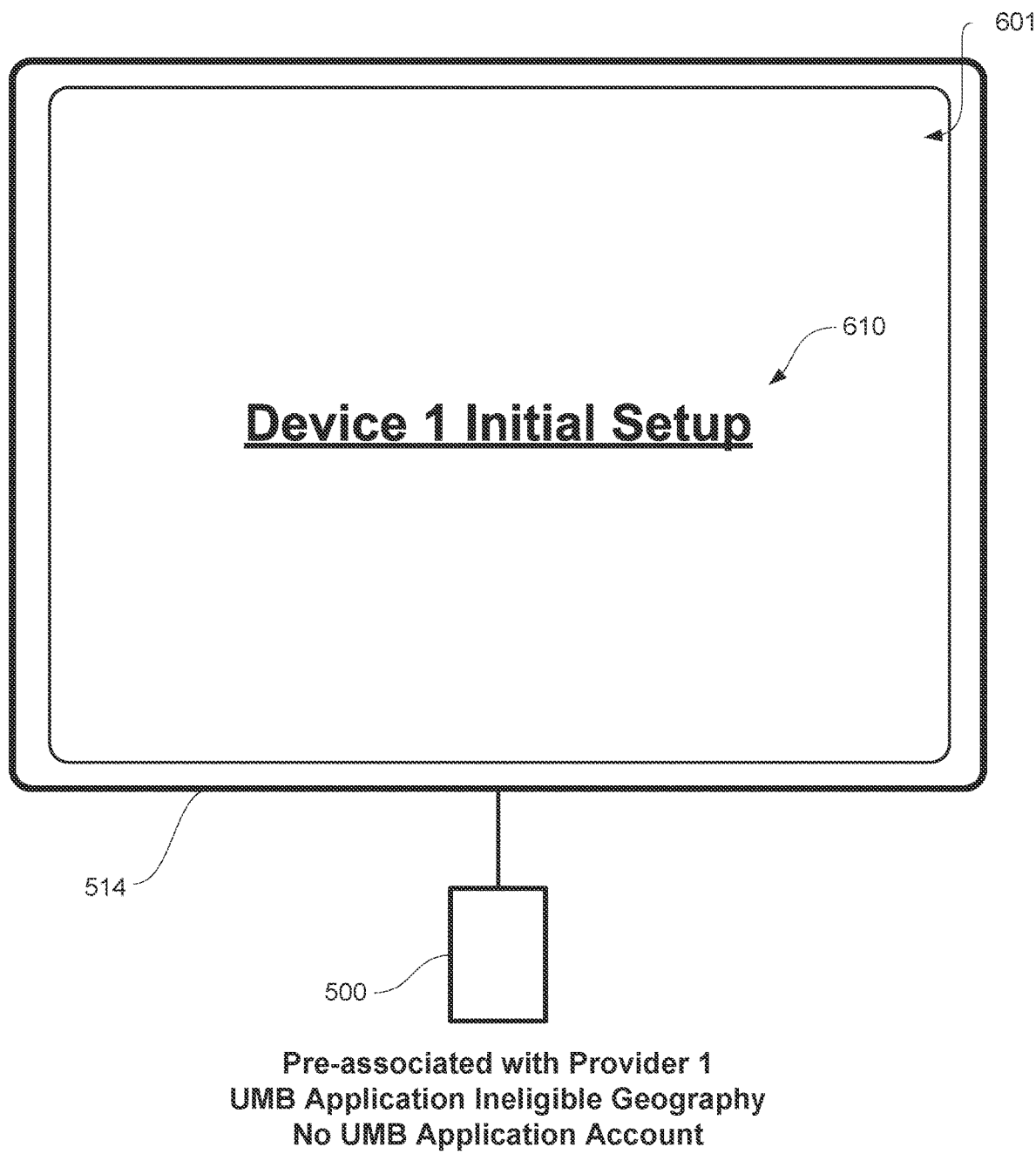
Figure 6O:
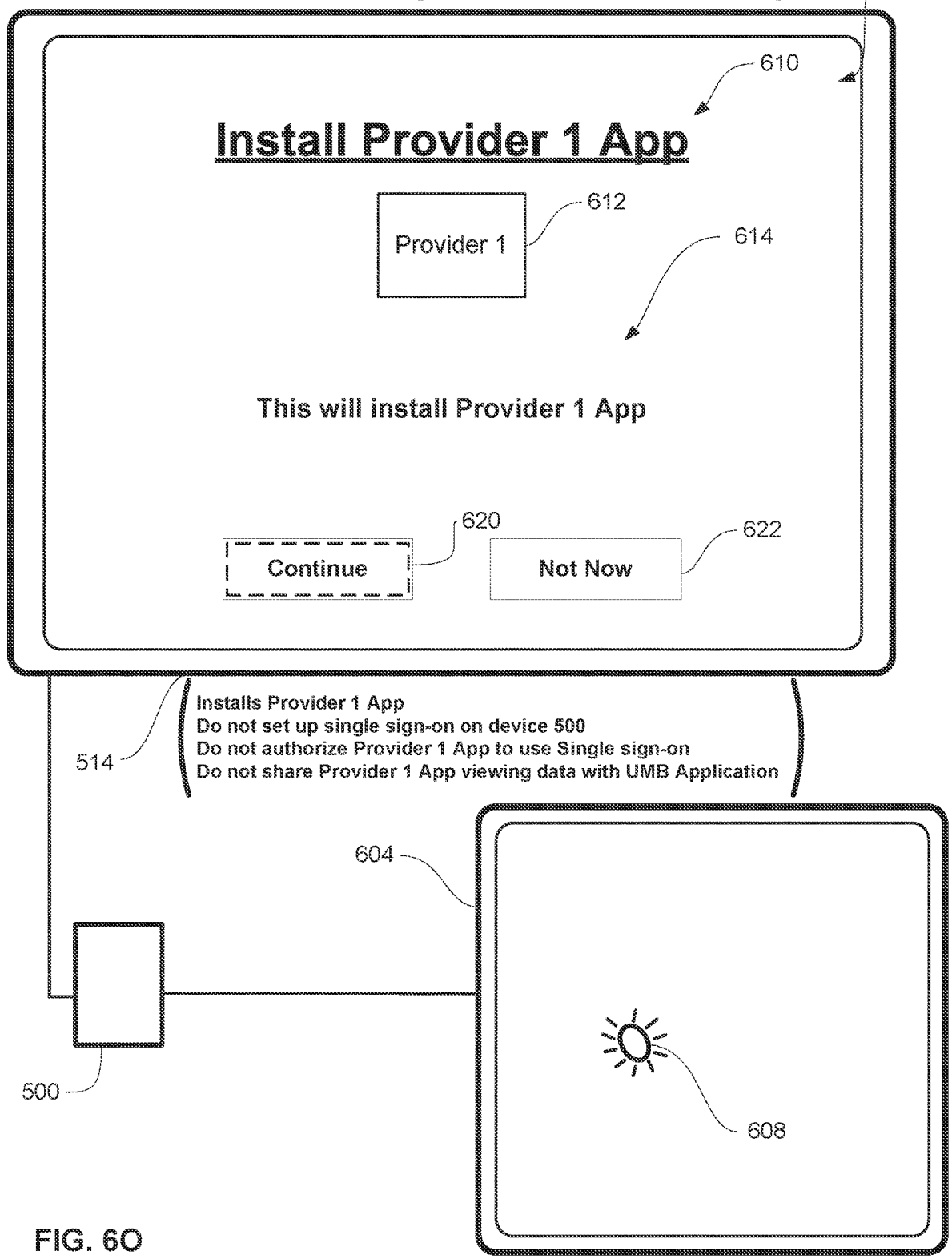
Figure 6P:
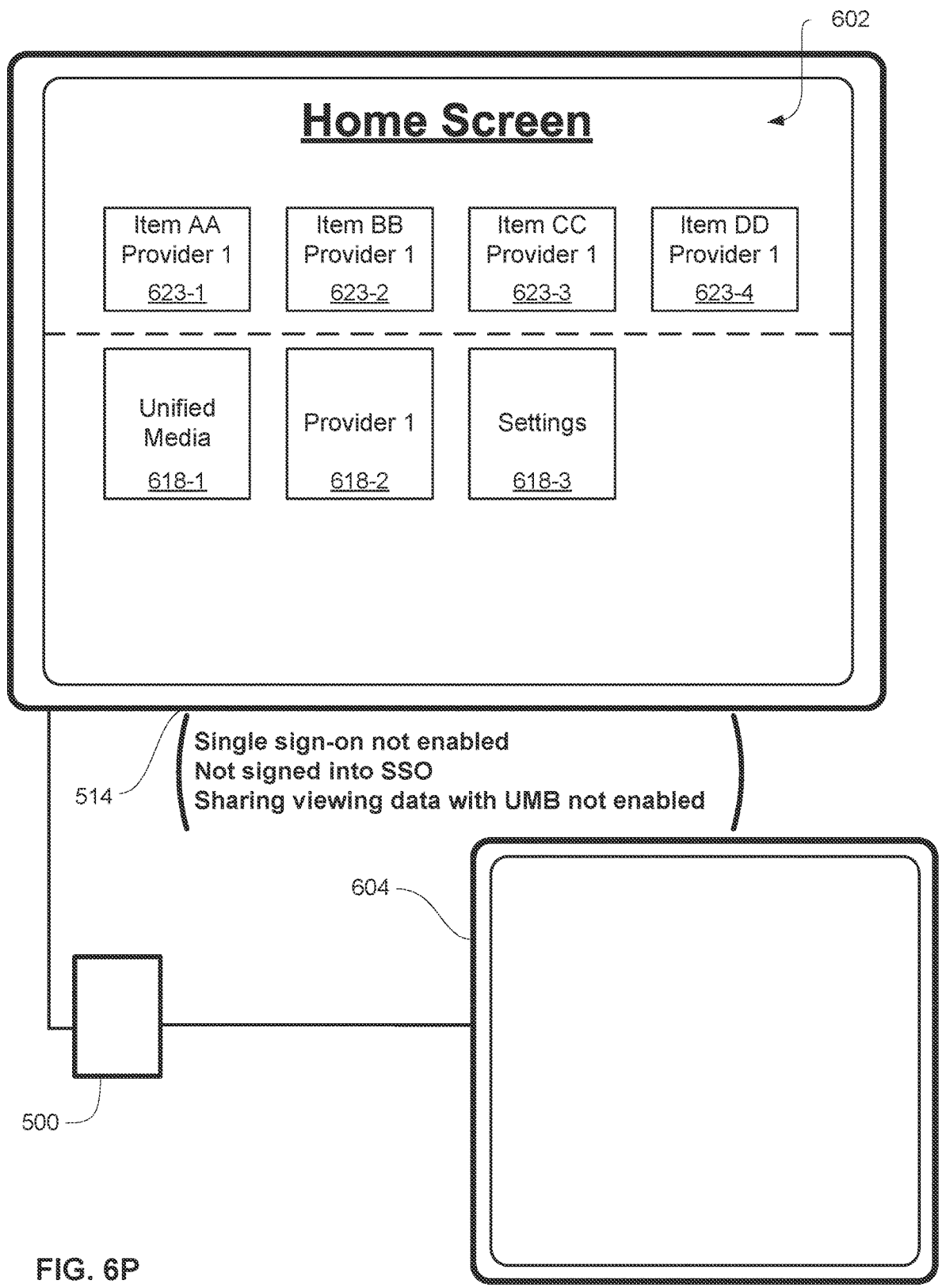

FIGS. 6N-6P illustrate another exemplary setup process for device 500, similar to that described in FIGS. 6A-6C, but in which device 500 was unsuccessful in signing into the primary content provider and device 500 is ineligible to use the unified media browsing application (e.g., either because device 500 is located in a unified media application ineligible geography or the user does not have a valid unified media application account). In such circumstances, device 500 optionally displays a primary content provider application installation page. For instance, in FIG. 6O, display 514 displays setup interface 601 with title 610 indicating to the user that device 500 will install the provider 1 application. Setup interface 601 optionally includes a representation 612 of provider 1 (e.g., a logo, a picture, a video clip, etc.) and setup description 614. Setup description 614 optionally informs the user of the steps that the setup will perform. For example, in FIG. 6O, setup description 614 indicates that assenting to the setup will install the provider 1 application.

In FIG. 6O, because device 500 was unsuccessful in signing into provider 1 and is also ineligible to use the unified media browsing application, continuing setup will install the provider 1 application (e.g., an application for the user's cable company via which the user is able to access content from the user's cable company), but will not set up single sign-on on device 500 (e.g., authorize device 500 with provider 1), authorize the provider 1 application to use single sign-on (e.g., grant access to the single sign-on authorization of the electronic device with provider 1 to the provider 1 application), nor configure the provider 1 application to share viewing data with the unified media browsing application (e.g., a catalog of content available from provider 1, content the user has previously watched, content the user is currently watching, the user's viewing preference data, etc.).

In FIG. 6O, device 500 detects a click input of contact 608 on touch-sensitive surface 604 while displaying setup interface 601, indicating selection of continue button 620. As a result of detecting the click input, device 500 optionally performs the above-mentioned setup steps (e.g., installs the provider 1 application, but does not set up single sign-on, authorize the provider 1 app to use the single sign-on credentials, nor configure the provider 1 app to share viewing data with the unified media browsing application) and completes the setup process. In some embodiments, upon completion of the setup process, device 500 replaces display of setup interface 601 with display of a home screen user interface 602, as shown in FIG. 6P.

In some embodiments, as shown in FIG. 6P, as a result of the setup process, device 500 installed the provider 1 application, but did not enable single sign-on (e.g., authorized device 500 with provider 1), sign into the single sign-on (e.g., granted access to the single sign-on authentication to the provider 1 application), nor enable sharing view data with the unified media browsing application. Although FIGS. 6N-6P illustrate certain setup interfaces and steps as one following the other, this is meant to be illustrative and not limiting. For example, the device setup process optionally includes other setup interfaces and steps before, after, or between any of the above-described setup interfaces and steps without departing from the scope of the disclosure.

In some embodiments, device 500 is not pre-associated with a primary content provider. Device 500 optionally is not pre-associated with a primary content provider because device 500 was purchased from the device's manufacturer rather than through the primary content provider or optionally because the user has skipped the setup step for automatically determining the primary content provider based on the predefined association (e.g., if the user desires to set up the device using a different primary content provider than the one that has been pre-associated, such as if the user selects "Not Now" 622 in FIG. 6B or similar figures). For instance, FIGS. 6Q-6V illustrate an exemplary setup process for device 500 in which device 500 is not pre-associated with a primary content provider.

Figure 6Q:
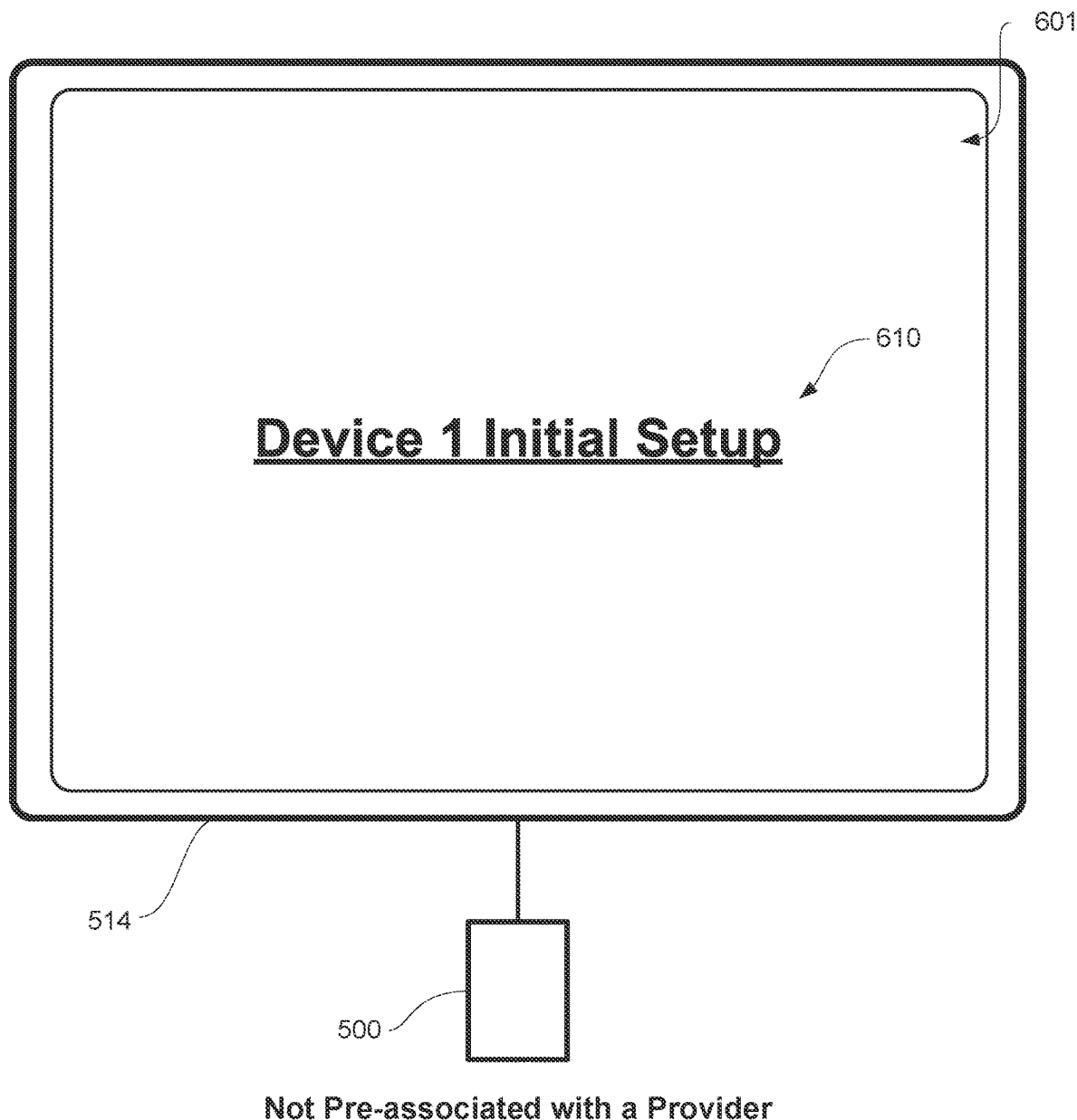
Figure 6R:
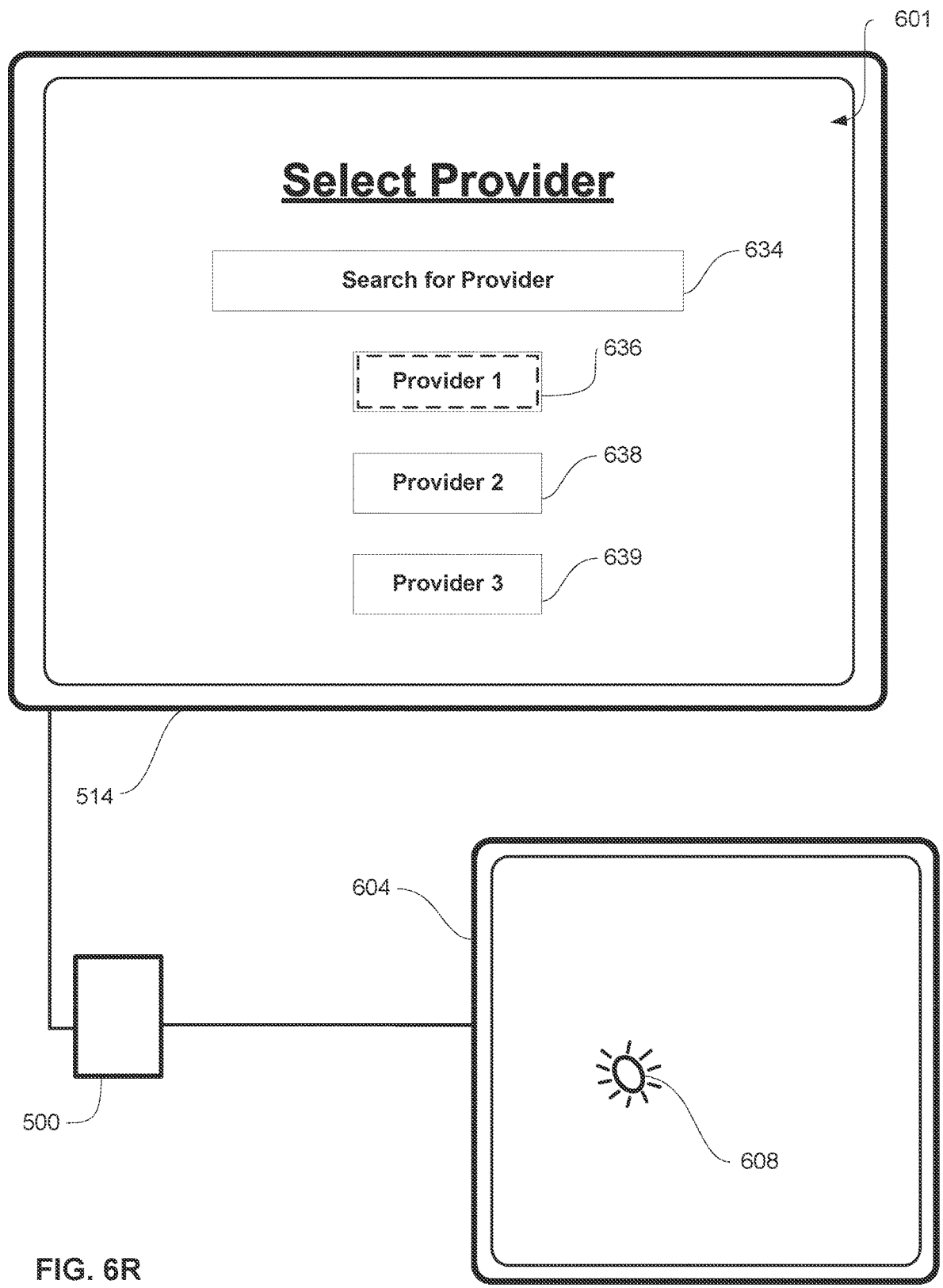
Figure 6S:
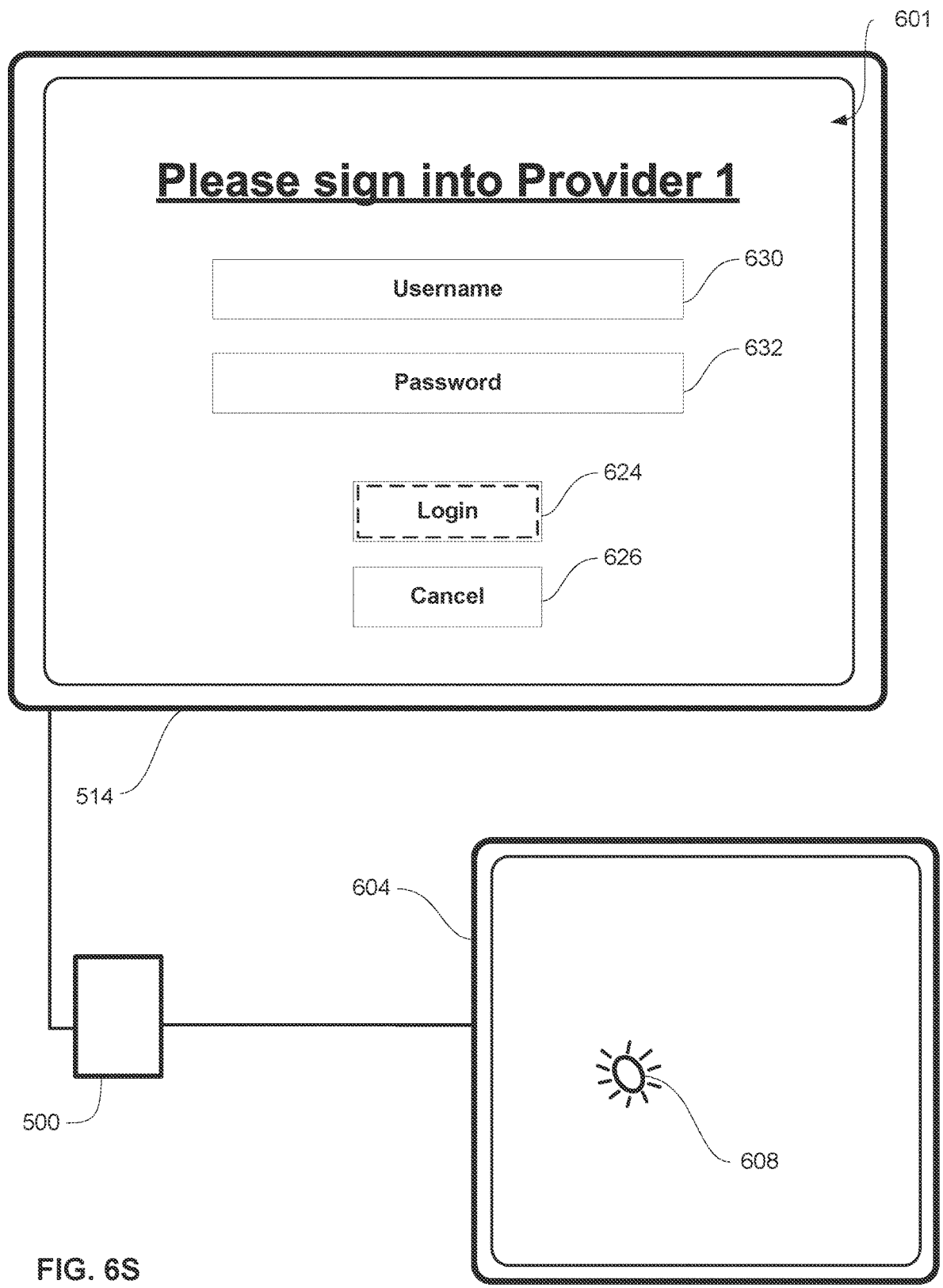

After device 500 displays the initial setup splash screen, as shown in FIG. 6Q, device 500 optionally displays a provider selection interface. For instance, in FIG. 6R, setup interface 601 includes a provider search field 634. The user is optionally able to enter, via an input device, the name of the user's primary content provider in search field 634 to search and select the proper primary content provider. Setup interface 601 optionally includes multiple quick-access provider buttons 636, 638, and 639, corresponding to provider 1, provider 2, and provider 3, respectively. The quick-access provider buttons 636, 638, and 639 optionally list the most popular primary search providers, the available primary search providers for the geography of device 500, or the top results of the provider search (e.g., the options update as the user enters letters into search field 634). In FIG. 6R, a click input of contact 608 is detected on touch-sensitive surface 604 indicative of the user selecting provider 1 as the primary content provider. As a result of detecting the click input, device 500 optionally updates display 514 to display a primary content provider login page. For example, in FIG. 6S, display 514 displays setup interface 601 with login fields (e.g., username field 630 and password field 632) for the user to provide login credentials for provider 1, login confirmation button 624, and login cancellation button 626. In FIG. 6S, device 500 detects a click input of contact 608 on touch-sensitive surface 604 while displaying setup interface 601 with login fields 630 and 632 and while login confirmation button 624 is currently highlighted. As a result, device 500 logs into provider 1 and verifies the user's login credentials with provider 1 (if correct). Device 500 also optionally determines whether device 500 is eligible to use the unified media browsing application (e.g., device 500 resides in a unified media browsing application eligible geography and the user has a valid unified media browsing application account).

After successfully signing into the primary content provider using the user-provided credentials and determining the eligibility of the unified media browsing application, device 500 optionally continues the setup process and recommends multiple applications to the user to install. For example, in FIG. 6T, setup interface 601 includes a grid of icons 616 suggesting applications for installation. In some embodiments, the suggested applications include the provider 1 application and optionally 8 other suggested applications. In some embodiments, the suggested applications are top-used or the most popular secondary content provider applications (e.g., a CBS content application, an HBO content application) that correspond to secondary content providers (e.g., CBS and HBO) that are included in the user's subscription to the primary content provider. For example, if the user's subscription with the primary content provider gives the user access to a first set of secondary content providers, device 500 optionally suggests a first set of secondary content provider applications to install, and if the user's subscription with the primary content provider gives the user access to a second set of secondary content providers, different from the first set (e.g., more or fewer channels or different channels), device 500 optionally suggests a second set of secondary content provider applications to install, different from the first set (e.g., more or fewer applications or different applications). In some embodiments, the suggested applications to install are not based on the user's subscription with the primary content provider. For example, the suggested applications are optionally the most popular content applications on the iTunes store (by Apple Inc. of Cupertino, California) without regard to the user's subscription with the primary content provider.

Figure 6T:
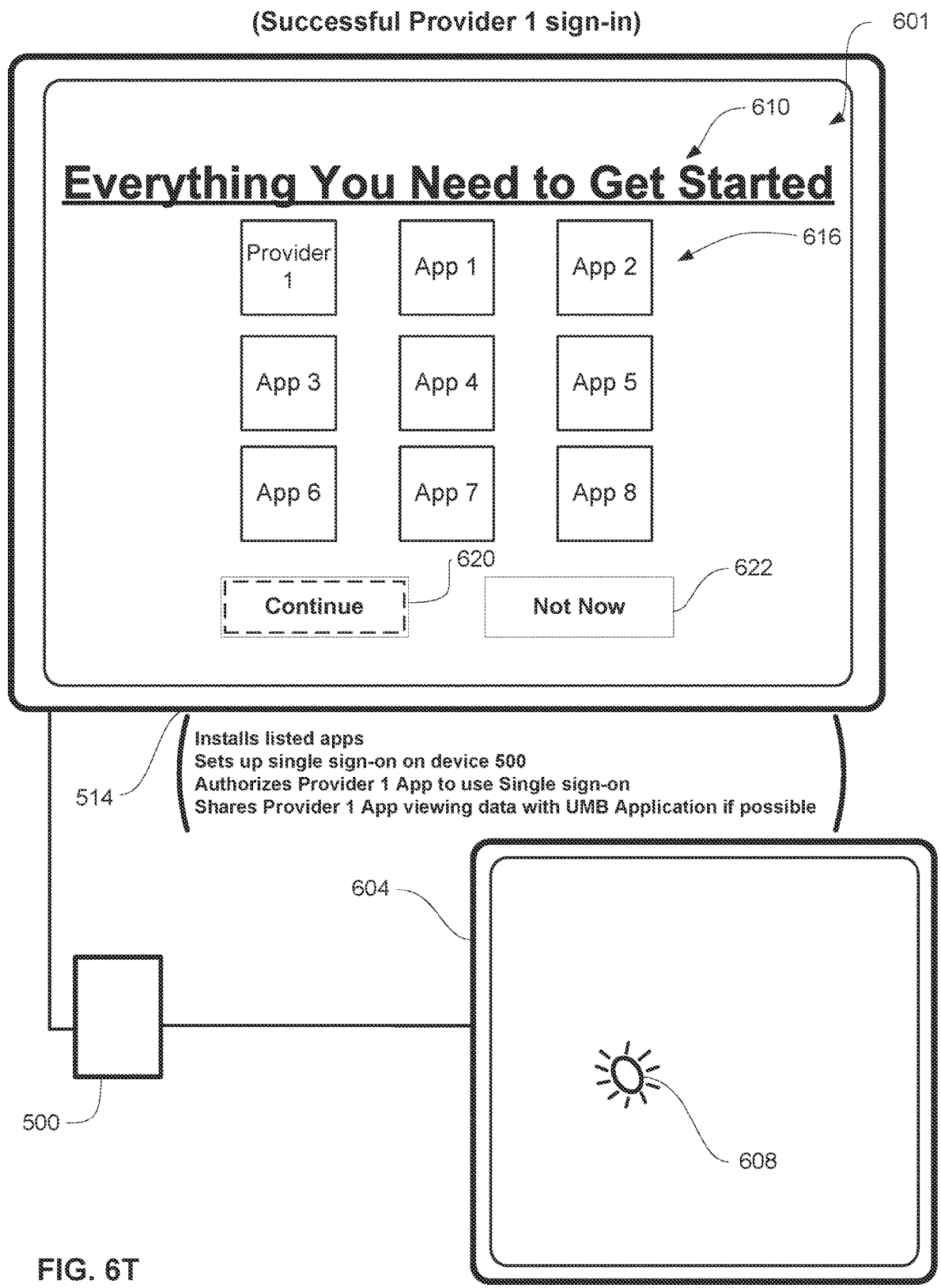

In FIG. 6T, after detecting a click input of contact 608, device optionally performs the setup steps of installing the listed applications, setting up single sign-on on the device, and authorizing the provider 1 application to use the single sign-on credentials. In some embodiments, device 500 also authorizes the suggested applications to use the single sign-on credentials if the suggested applications are included in the user's subscription with the primary content provider. In some embodiments, device 500 configures the provider 1 application (and optionally also the other suggested applications) to share viewing data with the unified media browsing application, if device 500 determines that it is eligible to use the unified media browsing application (e.g., device 500 is located in a unified media application ineligible geography and the user has a valid unified media application account). In some embodiments, device 500 does not configure the provider 1 application or the suggested applications to share viewing data with the unified media browsing, if device 500 determines that it is ineligible to use the unified media browsing application (e.g., either because device 500 is located in a unified media application ineligible geography or the user does not have a valid unified media application account). In some embodiments, upon completion of the setup process, device 500 replaces display of setup interface 601 with display of a home screen user interface 602, as shown in FIG. 6U.

Figure 6U:
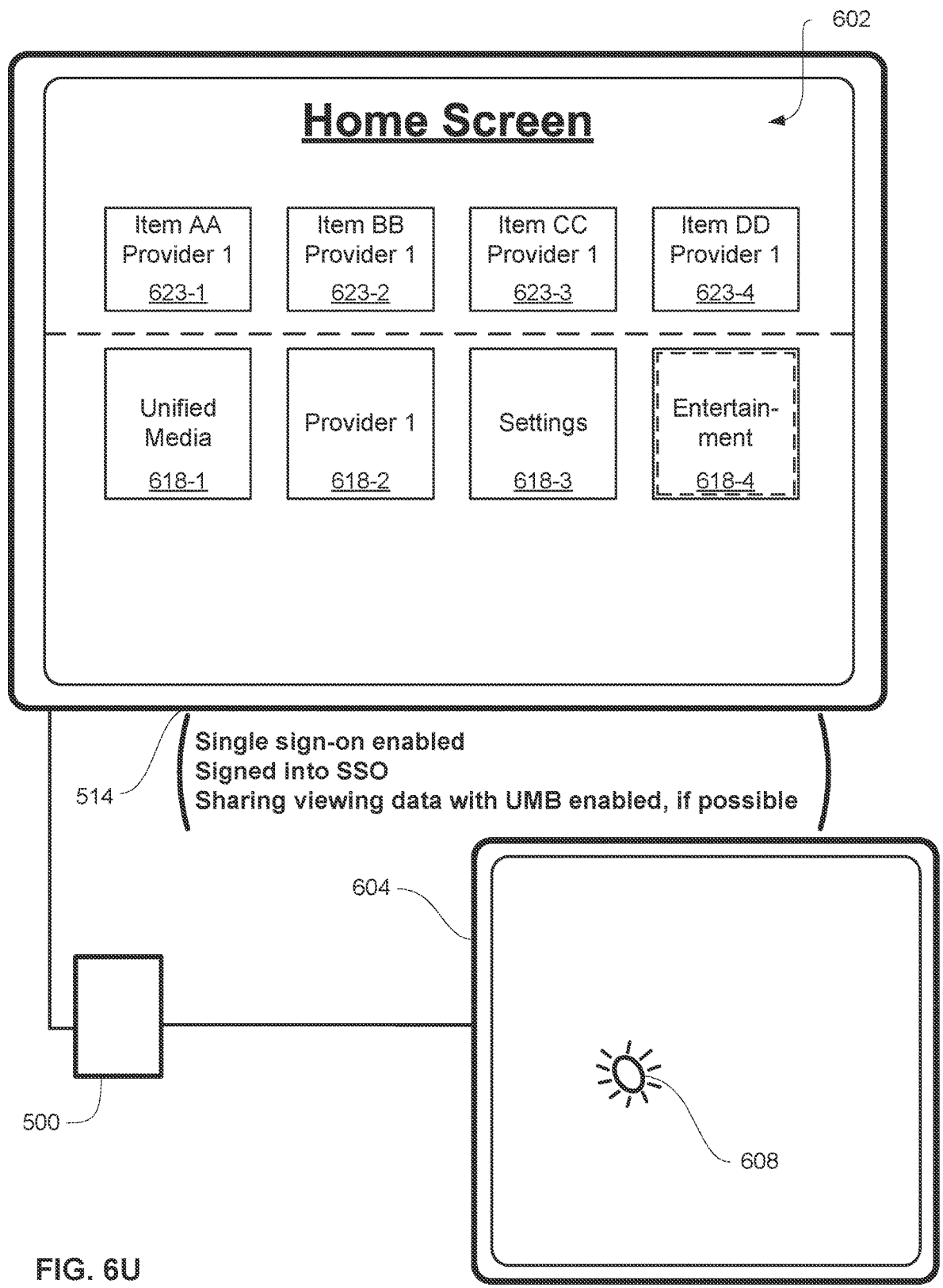
Figure 6V:
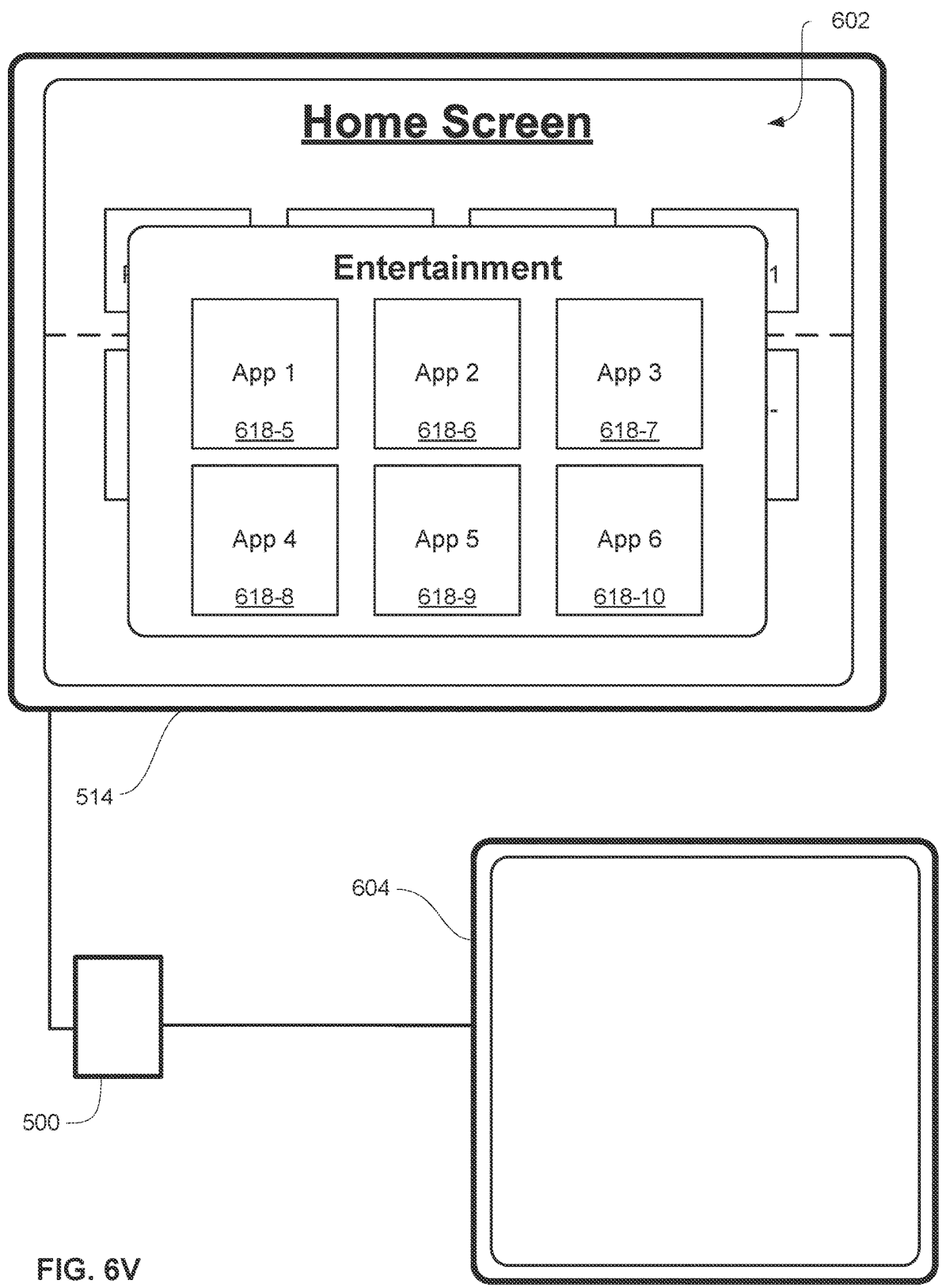

In some embodiments, as shown in FIG. 6U, as a result of the setup process, device 500 installed the provider 1 application, installed the suggested applications, enabled single sign-on (e.g., authorized device 500 with provider 1), signed into the single sign-on (e.g., granted access to the single sign-on authentication to the provider 1 application), and enabled sharing view data with the unified media browsing application. In some embodiments, device 500 creates an Entertainment folder (represented by icon 618-4) and installed the suggested applications within the folder. For example, a user is able to select icon 618-4 and with a click input, reveal the contents of the Entertainment folder, as illustrated in FIG. 6V. The contents of the Entertainment folder are optionally displayed in a popup overlaid on the home screen interface 602. In FIG. 6V, Entertainment folder displays six applications, represented by icons 618-5 through 618-10. In some embodiments, the popup is a scrollable list which optionally is able to be scrolled to reveal further icons of applications. In FIG. 6U, the provider 1 application (represented by icon 618-2) is installed in a prioritized location on user interface 602 and not located in the Entertainment folder. Although FIGS. 6Q-6U illustrate certain setup interfaces and steps as one following the other, this is meant to be illustrative and not limiting. For example, the device setup process optionally includes other setup interfaces and steps before, after, or between any of the above-described setup interfaces and steps without departing from the scope of the disclosure.

Figure 6W:
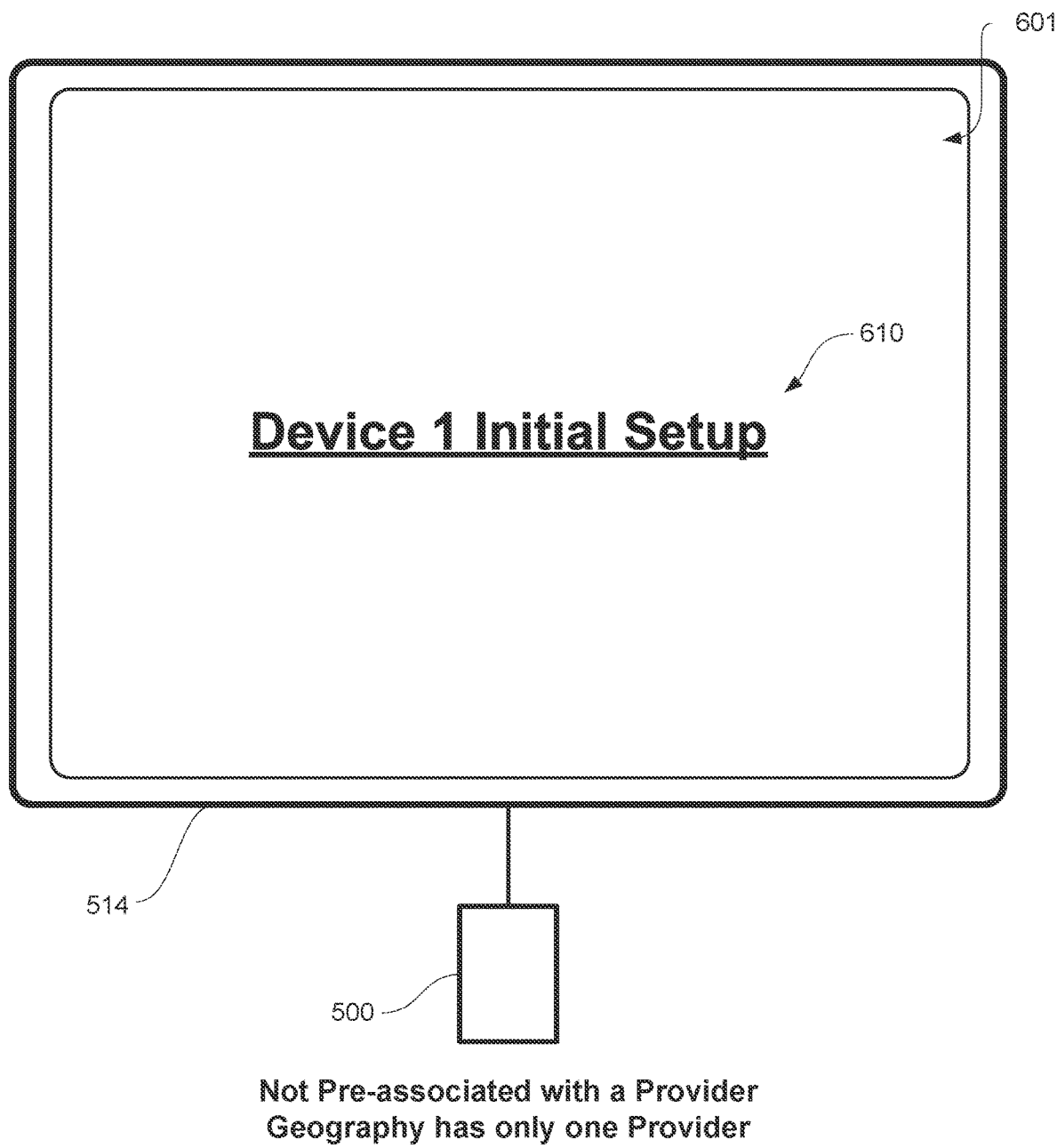
Figure 6X:
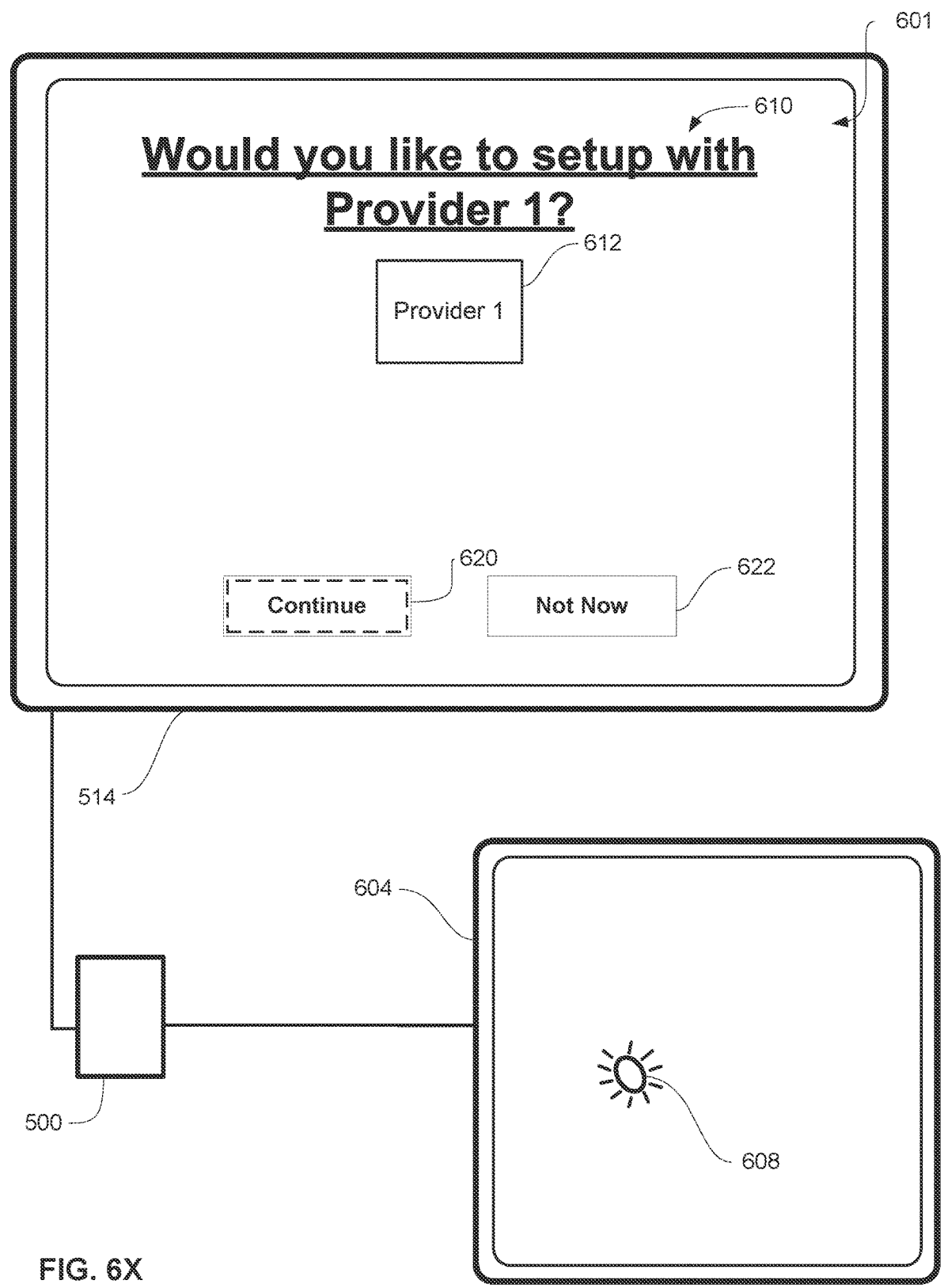
Figure 6Y:
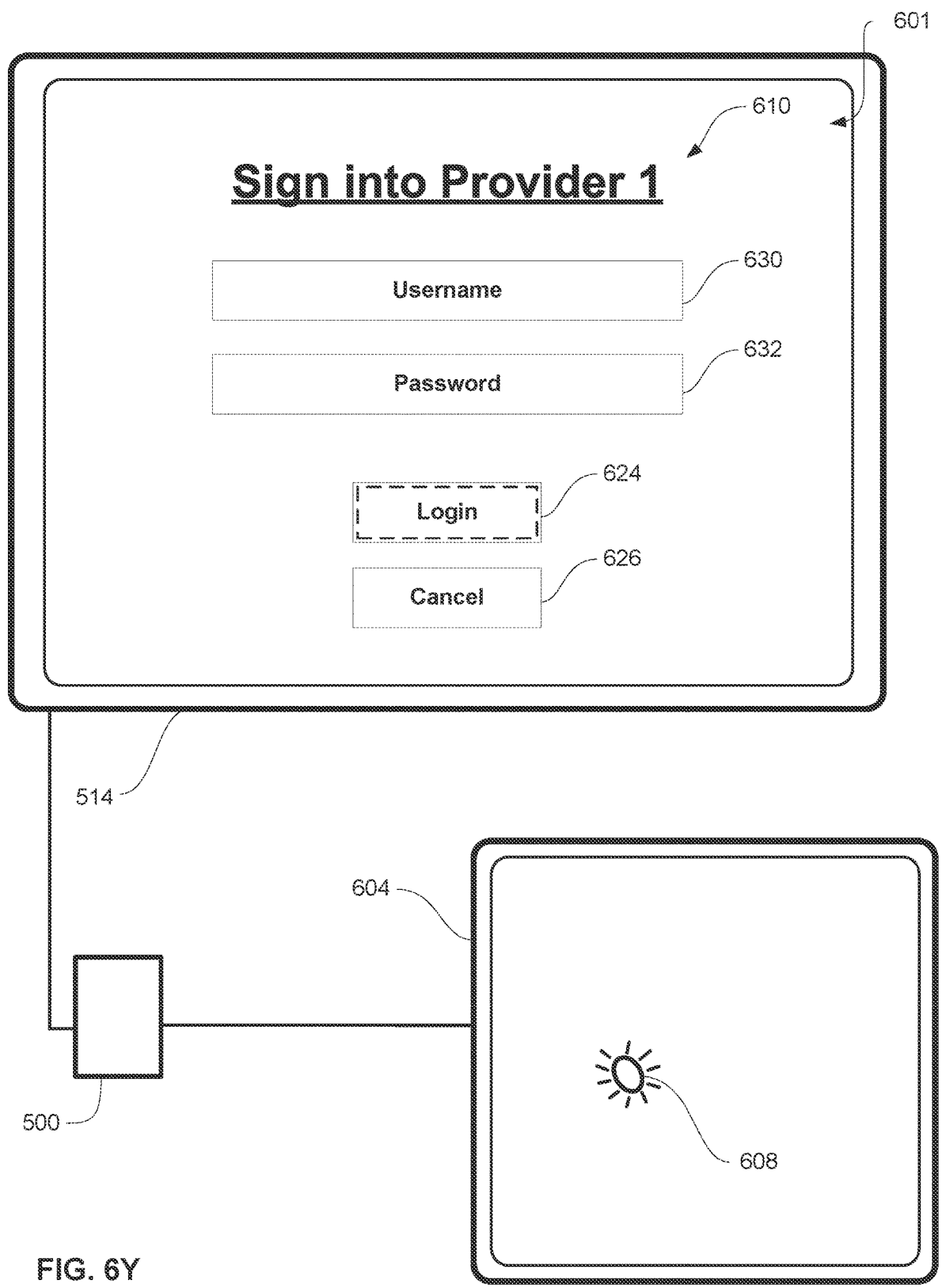

FIGS. 6W-6AA illustrate another exemplary setup process for device 500, similar to that described in FIGS. 6O-6V, but in which the geographic location of device 500 only has one primary content provider. In such circumstances, device 500 optionally determines the current location of the device (e.g., querying an internet service provider, querying an IP address geolocation service, receiving GPS data, or other suitable location determination mechanism) and determines that there is only one primary content provider servicing the location of the device (e.g., optionally querying a server or via a lookup table). In some embodiments, this determination occurs before any setup steps occur (e.g., before or during the initial setup splash screen, or otherwise before device 500 automatically displays a primary content provider login page). After displaying the initial setup splash screen, device 500 optionally automatically displays a primary content provider login page for the only primary content provider in the location (e.g., without user input identifying of selecting the primary content provider). For example, as shown in FIG. 6X, the only provider is provider 1. Thus, device 500 optionally displays a prompt for setting up the device with provider 1 in setup interface 601. Upon detecting a click input of contact 608 on touch-sensitive surface 604 while continue button 620 is highlighted, display 514 changes to displaying a primary content provider login page in FIG. 6Y, similar to that displayed in FIG. 6K. In FIG. 6Y, display 514 displays setup interface 601 with login fields (e.g., username field 630 and password field 632) for the user to provide login credentials for provider 1, login confirmation button 624, and login cancellation button 626. In FIG. 6Y, device 500 detects a click input of contact 608 on touch-sensitive surface 604 while displaying setup interface 601 with login fields 630 and 632 and while login confirmation button 624 is currently highlighted. As a result, device 500 logs into provider 1 and verifies the user's login credentials (if correct). Device 500 also optionally determines whether device 500 is eligible to use the unified media browsing application (e.g., device 500 resides in a unified media browsing application eligible geography and the user has a valid unified media browsing application account).

After successfully signing into the primary content provider using the user-provided credentials and determining the eligibility of the unified media browsing application, device 500 optionally continues the setup process and recommends multiple applications to the user to install. For example, in FIG. 6Z, setup interface 601 includes a grid of icons 616 suggesting applications for installation. In some embodiments, the suggested applications include the provider 1 application and optionally 8 other suggested applications. In some embodiments, the suggested applications are top-used or the most popular secondary content provider applications (e.g., a CBS content application, an HBO content application) that correspond to secondary content providers (e.g., CBS and HBO) that are included in the user's subscription to the primary content provider. For example, if the user's subscription with the primary content provider gives the user access to a first set of secondary content providers, device 500 optionally suggests a first set of secondary content provider applications to install, and if the user's subscription with the primary content provider gives the user access to a second set of secondary content providers, different from the first set (e.g., more or fewer channels or different channels), device 500 optionally suggests a second set of secondary content provider applications to install, different from the first set (e.g., more or fewer applications or different applications). In some embodiments, the suggested applications to install are not based on the user's subscription with the primary content provider. For example, the suggested applications are optionally the most popular content applications on the iTunes store (by Apple Inc. of Cupertino, California) without regard to the user's subscription with the primary content provider.

Figure 6Z:
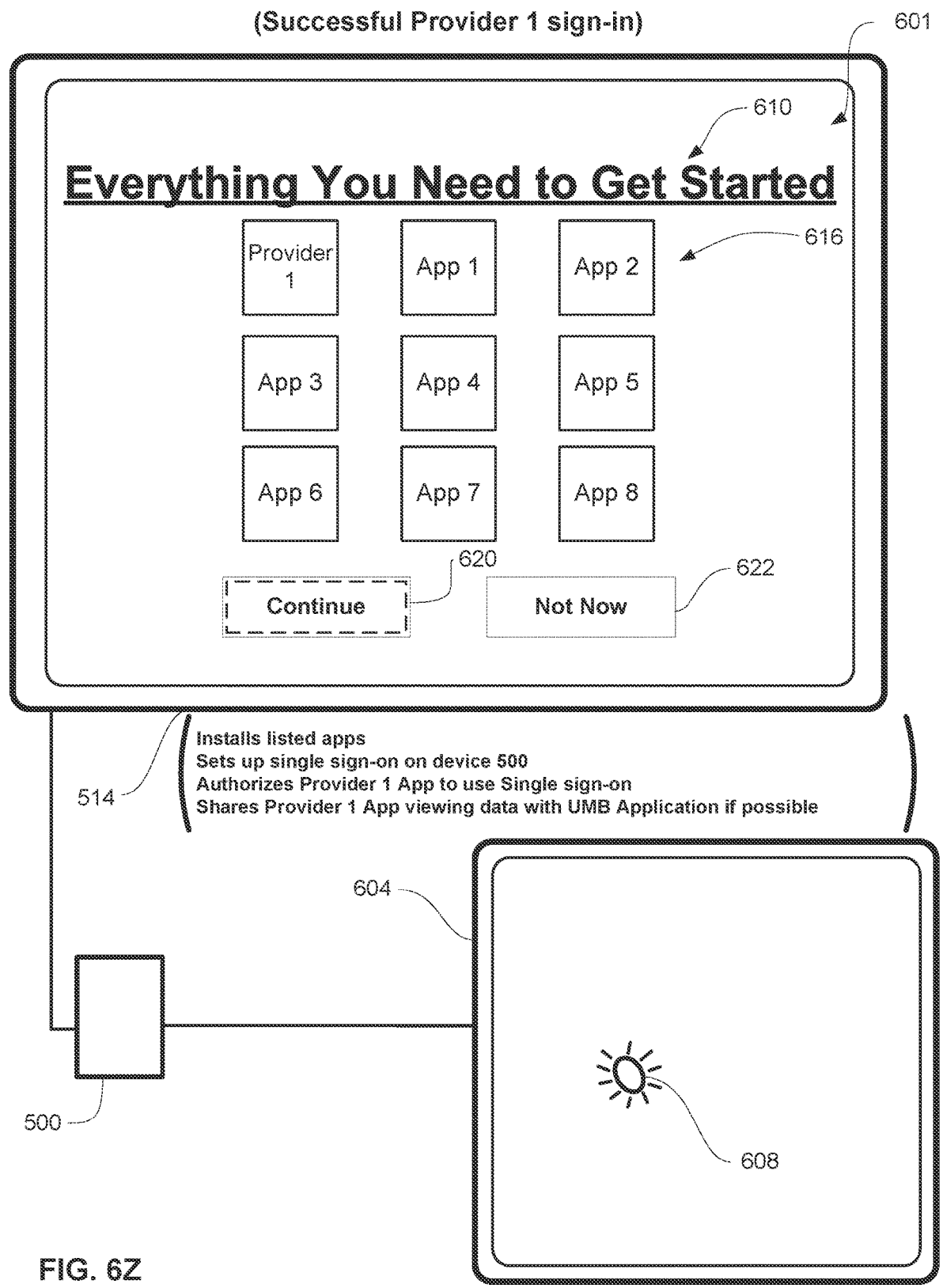
Figure 6A:
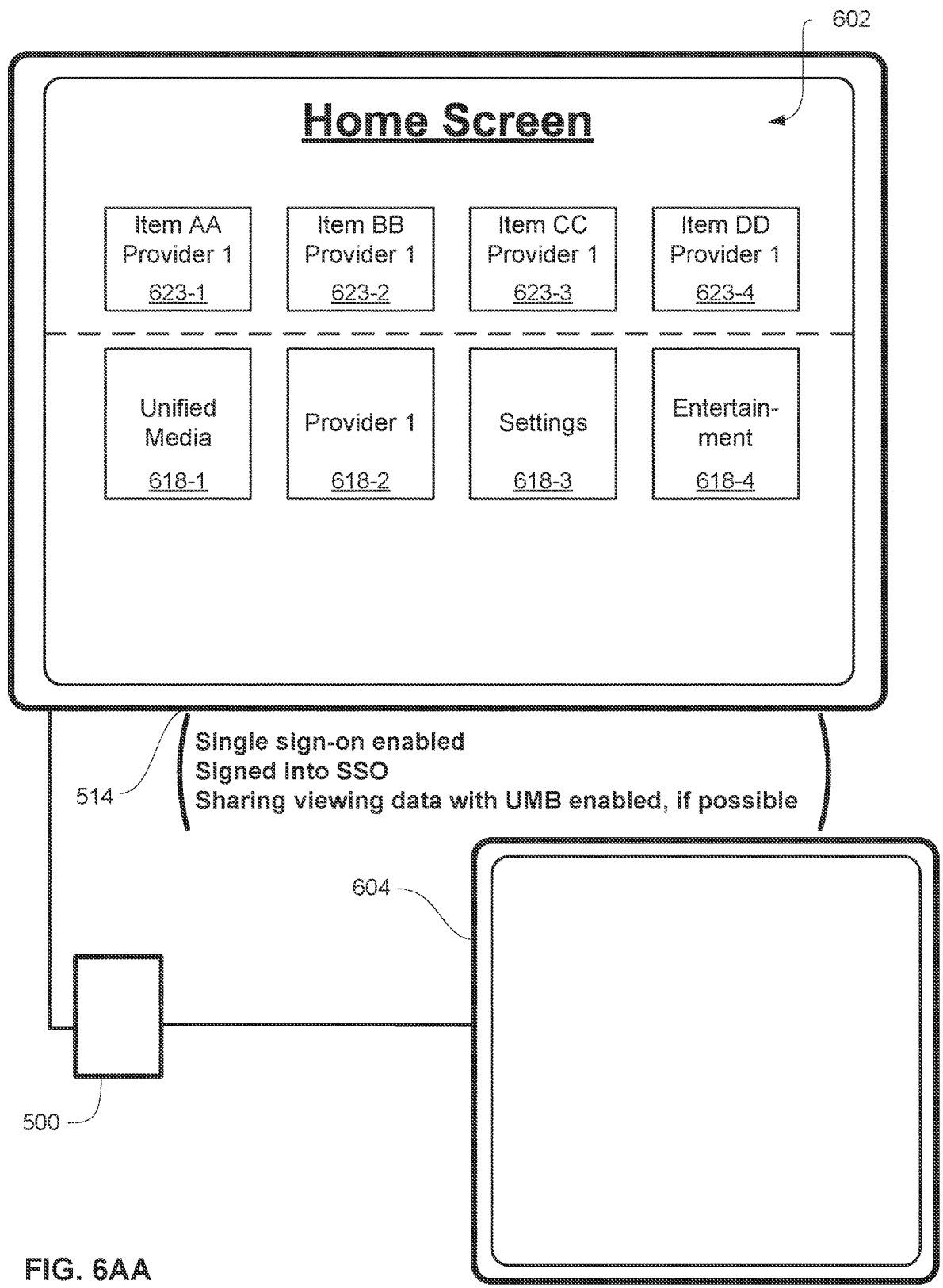
Figure 6B:
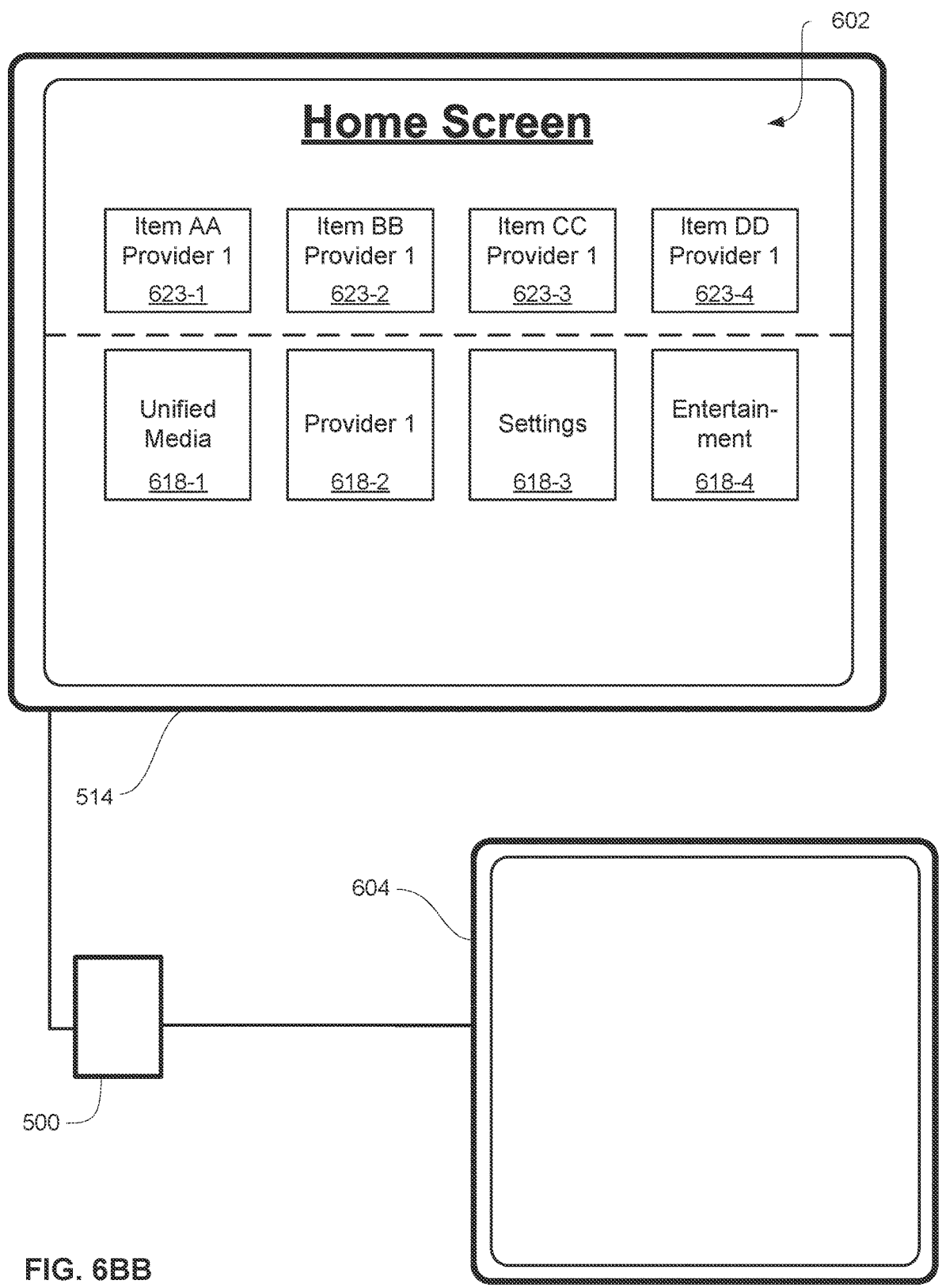
Figure 6C:
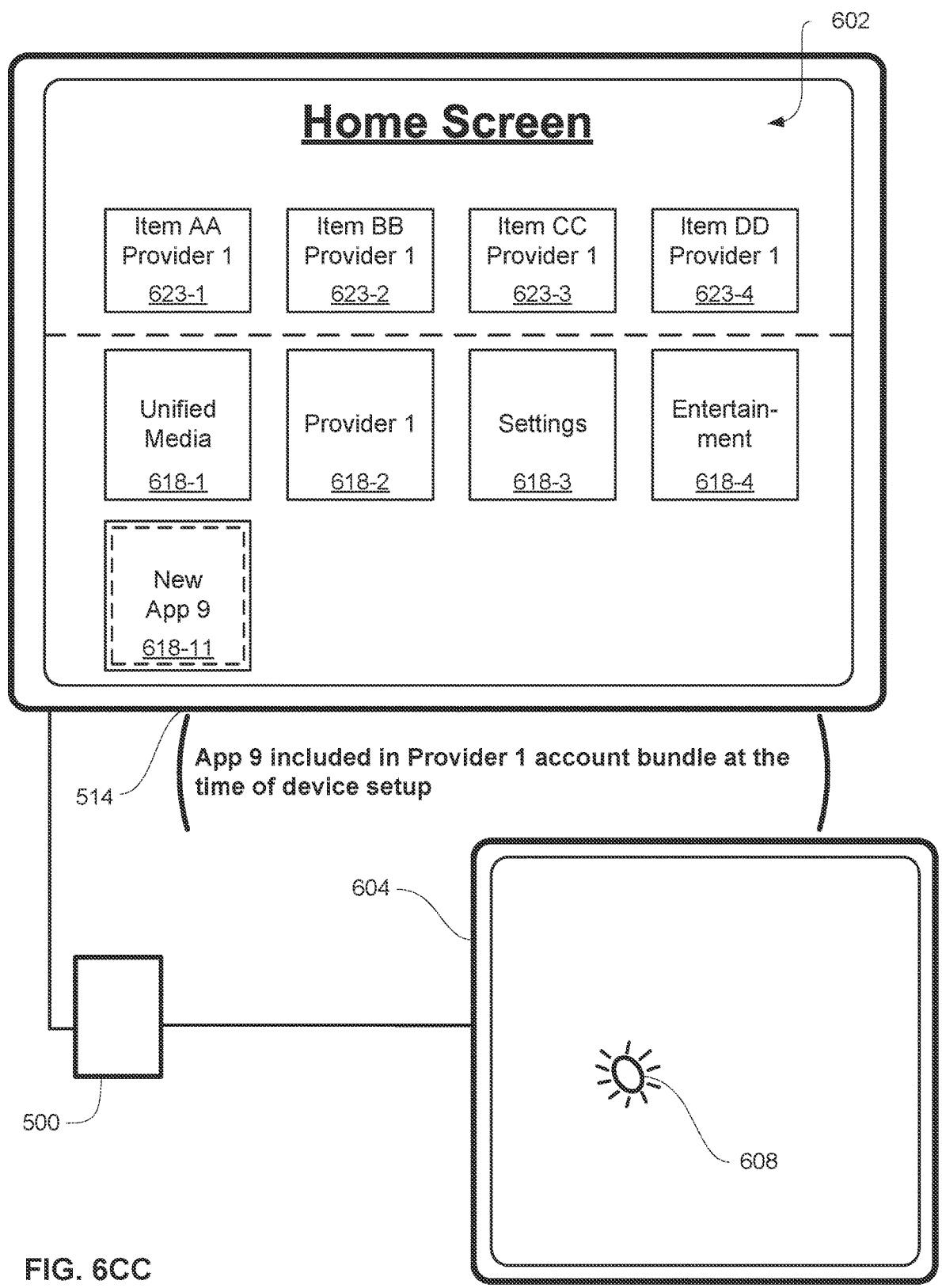
Figure 6D:
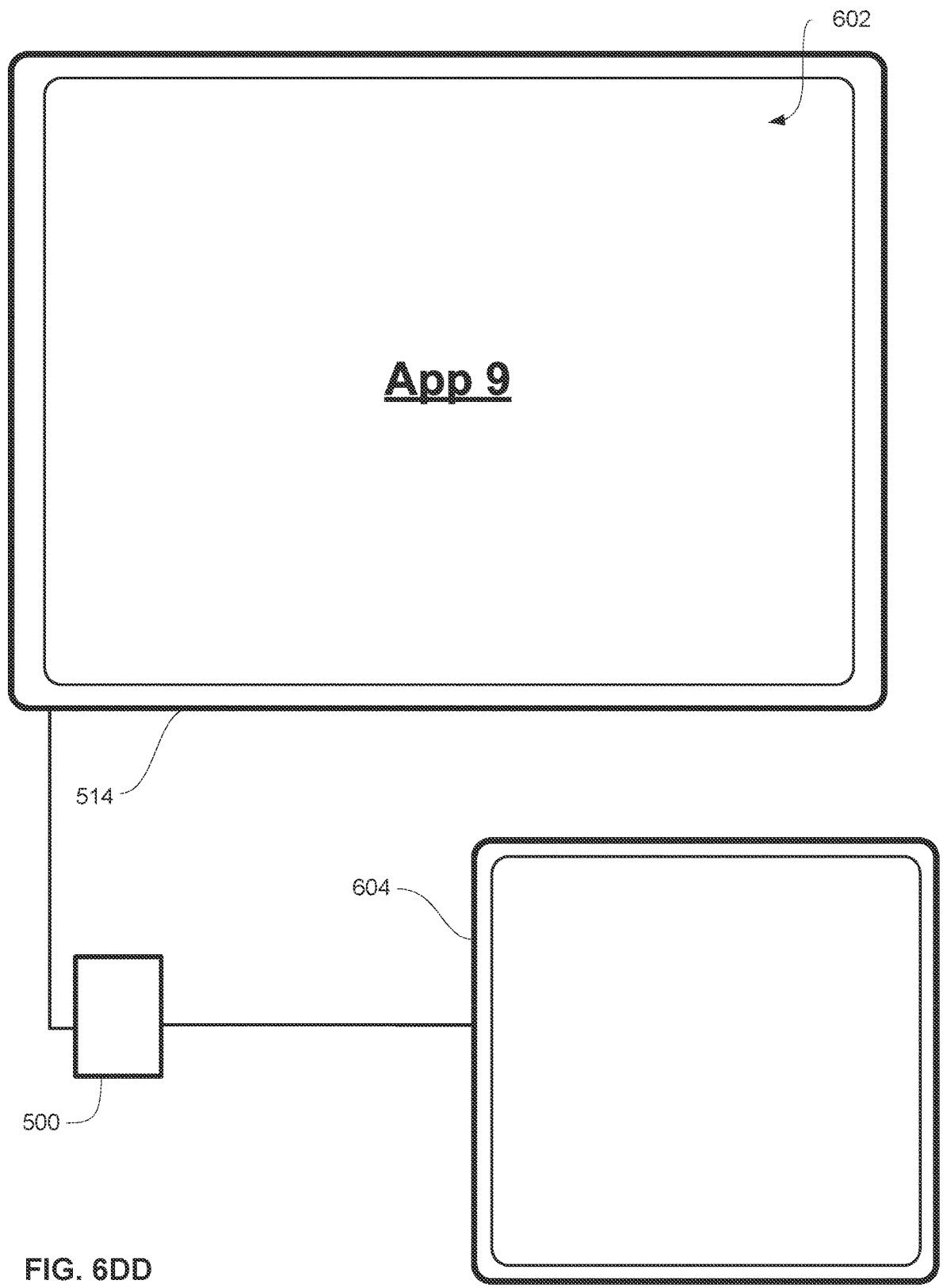
Figure 6E:
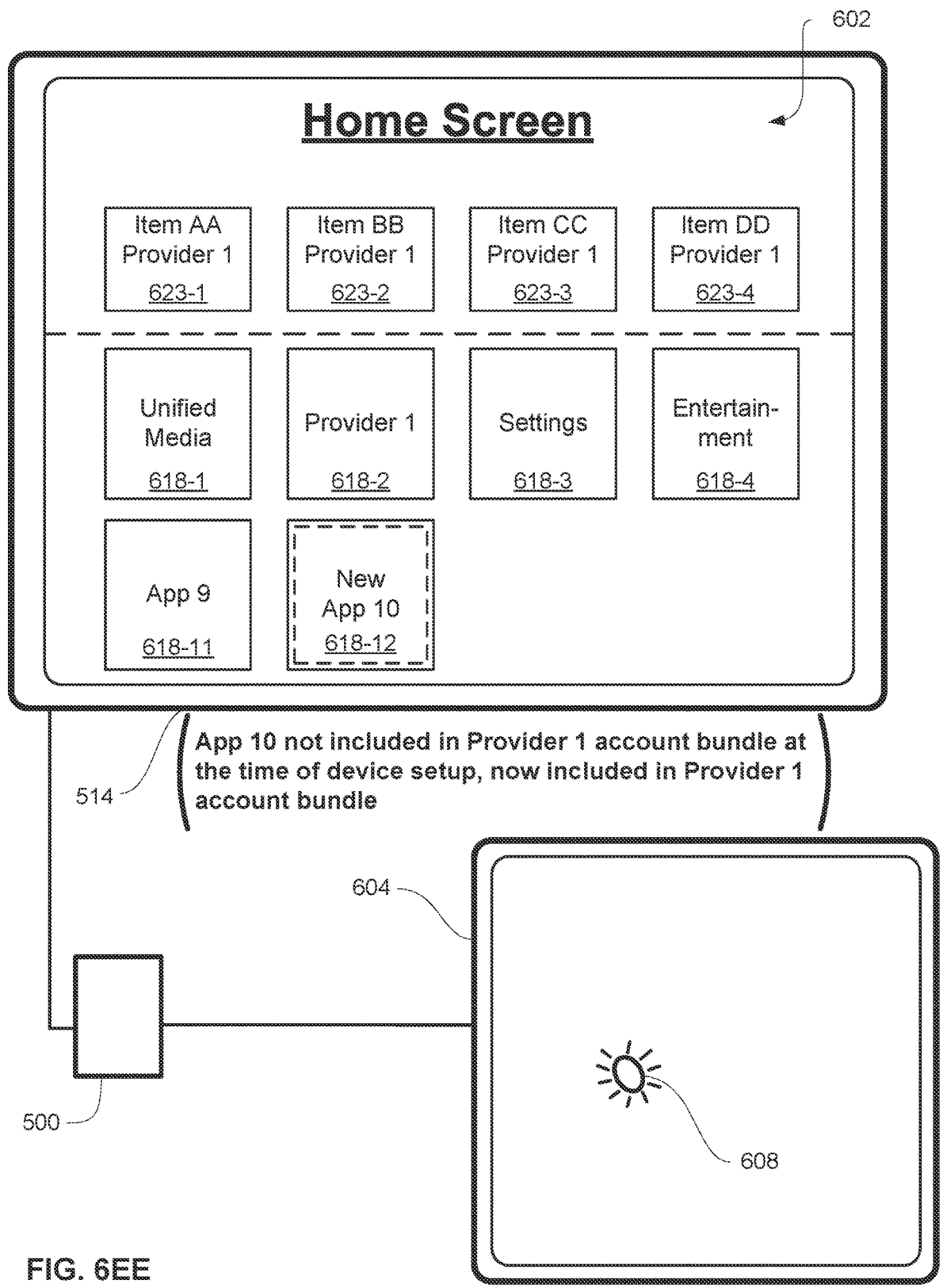
Figure 6F:
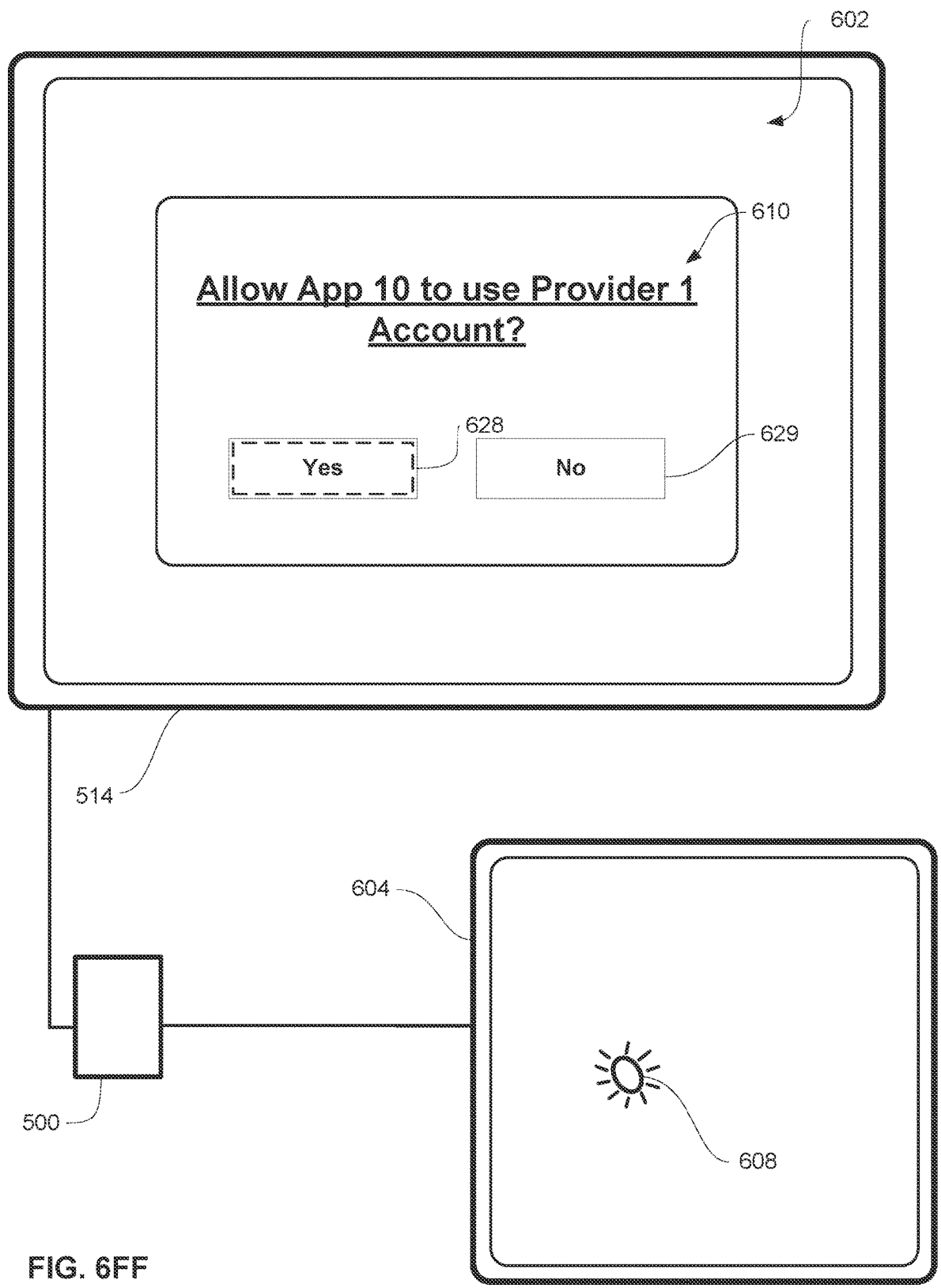
Figure 6G:
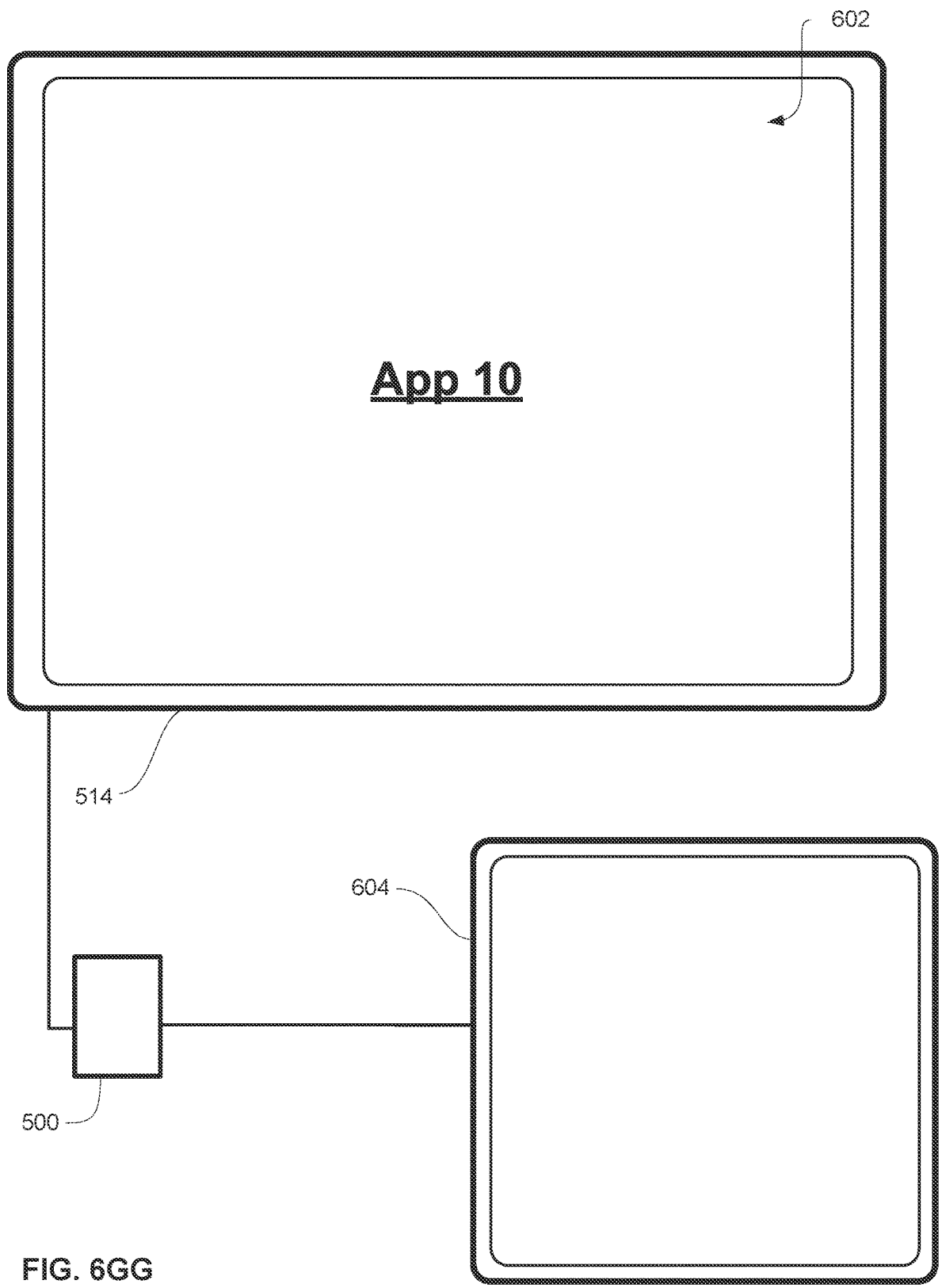
Figure 7A:
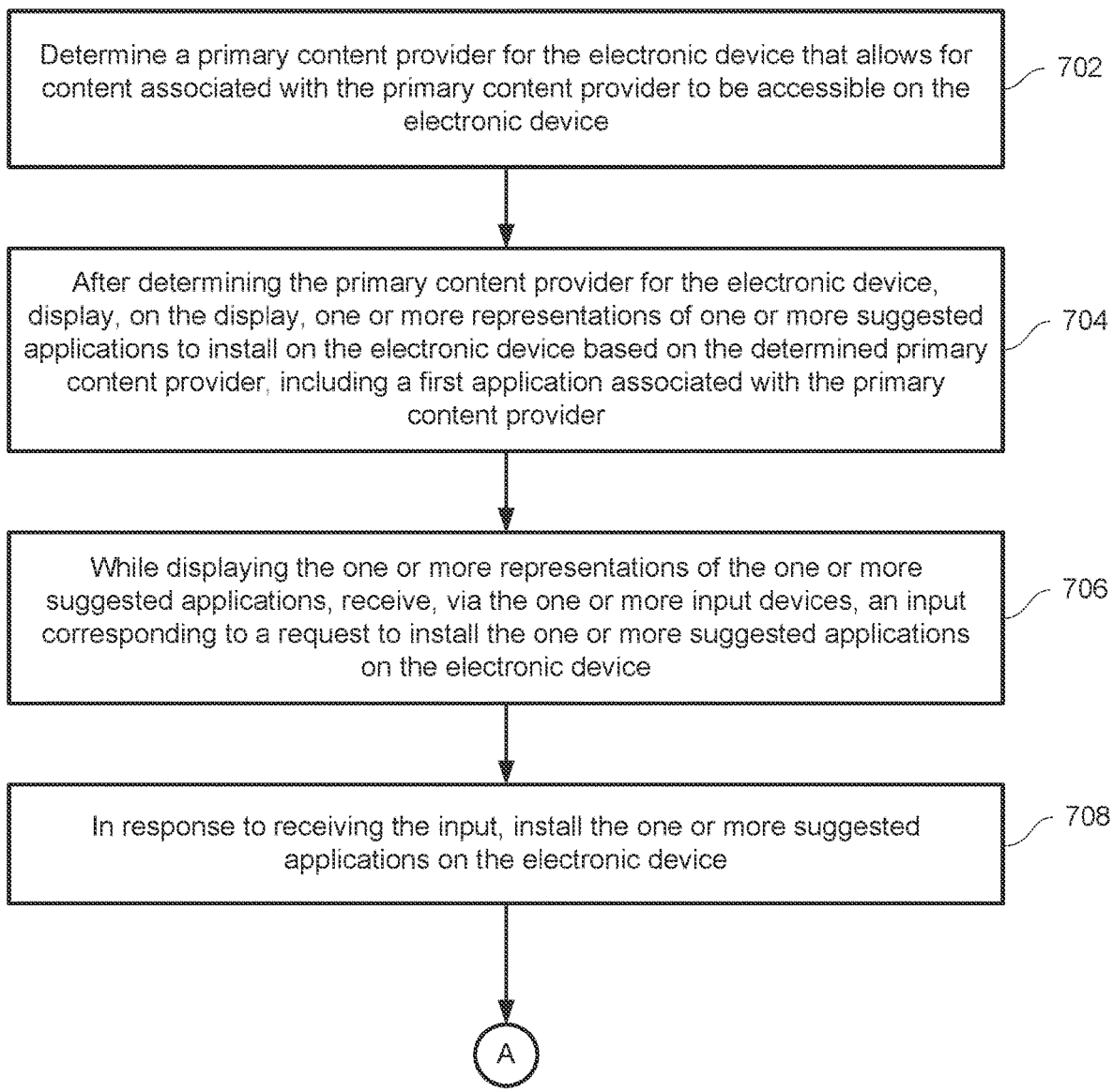
Figure 7B:
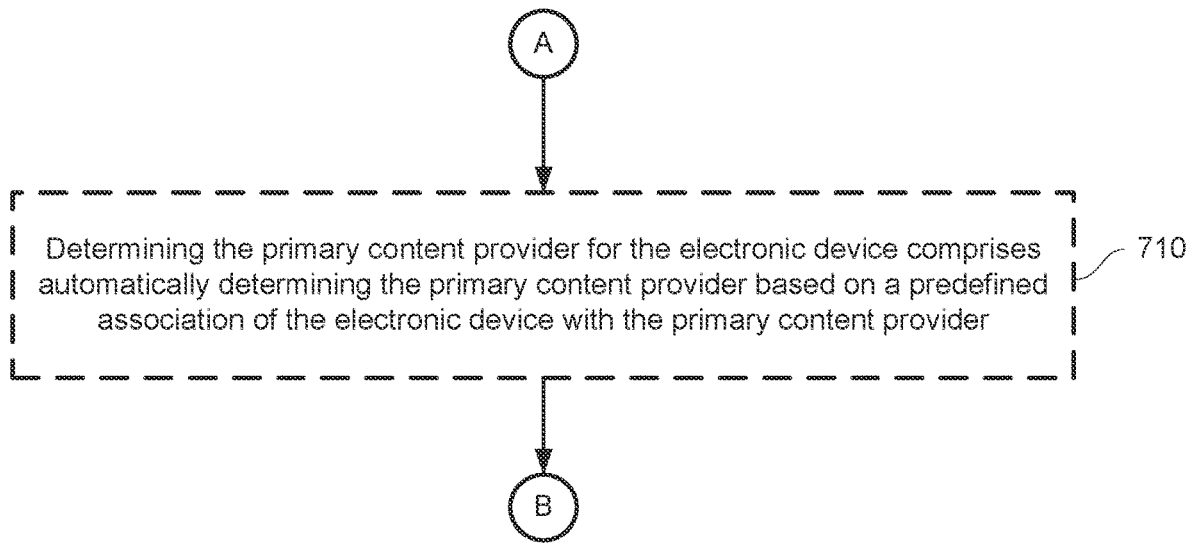
Figure 7C:
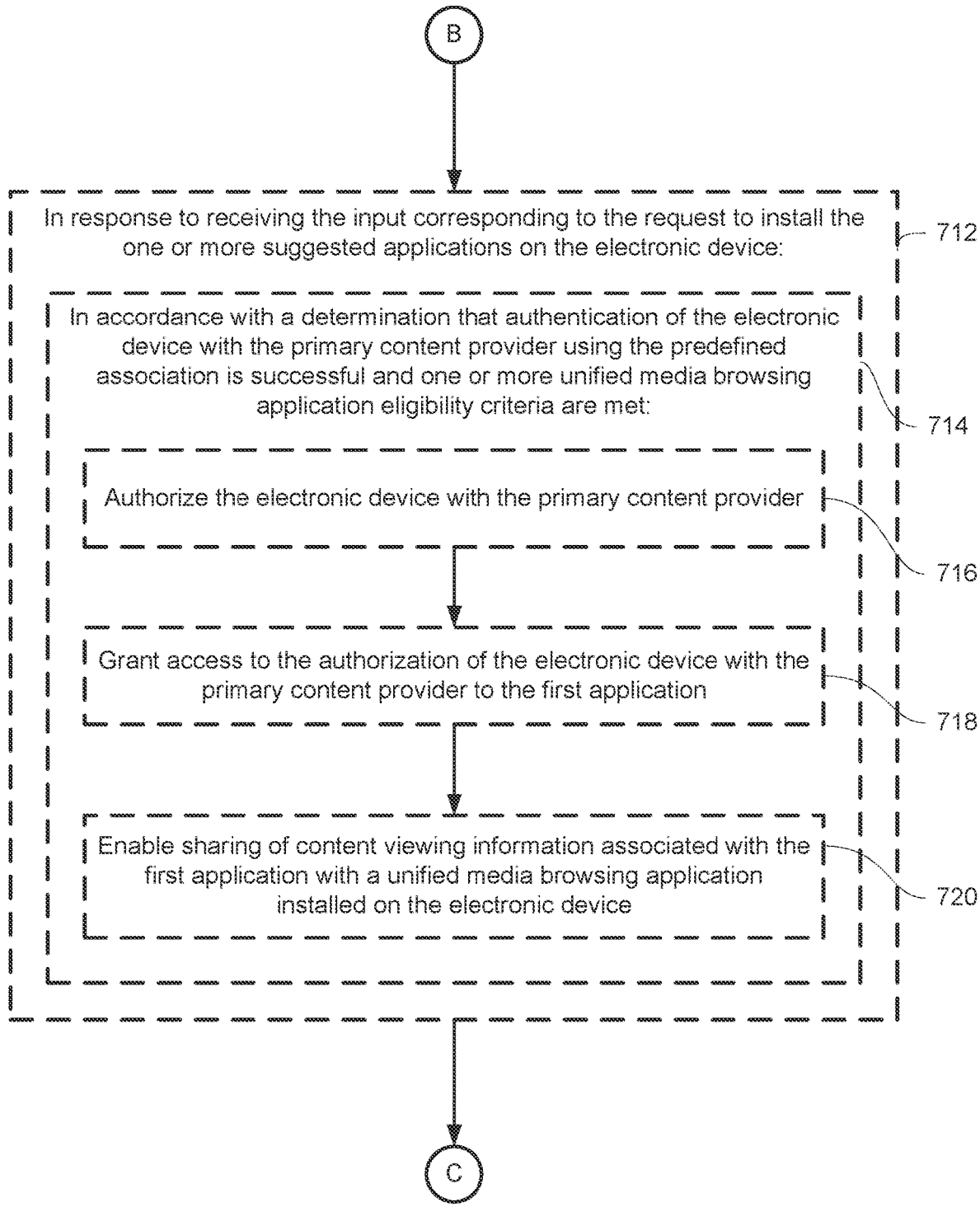
Figure 7D:
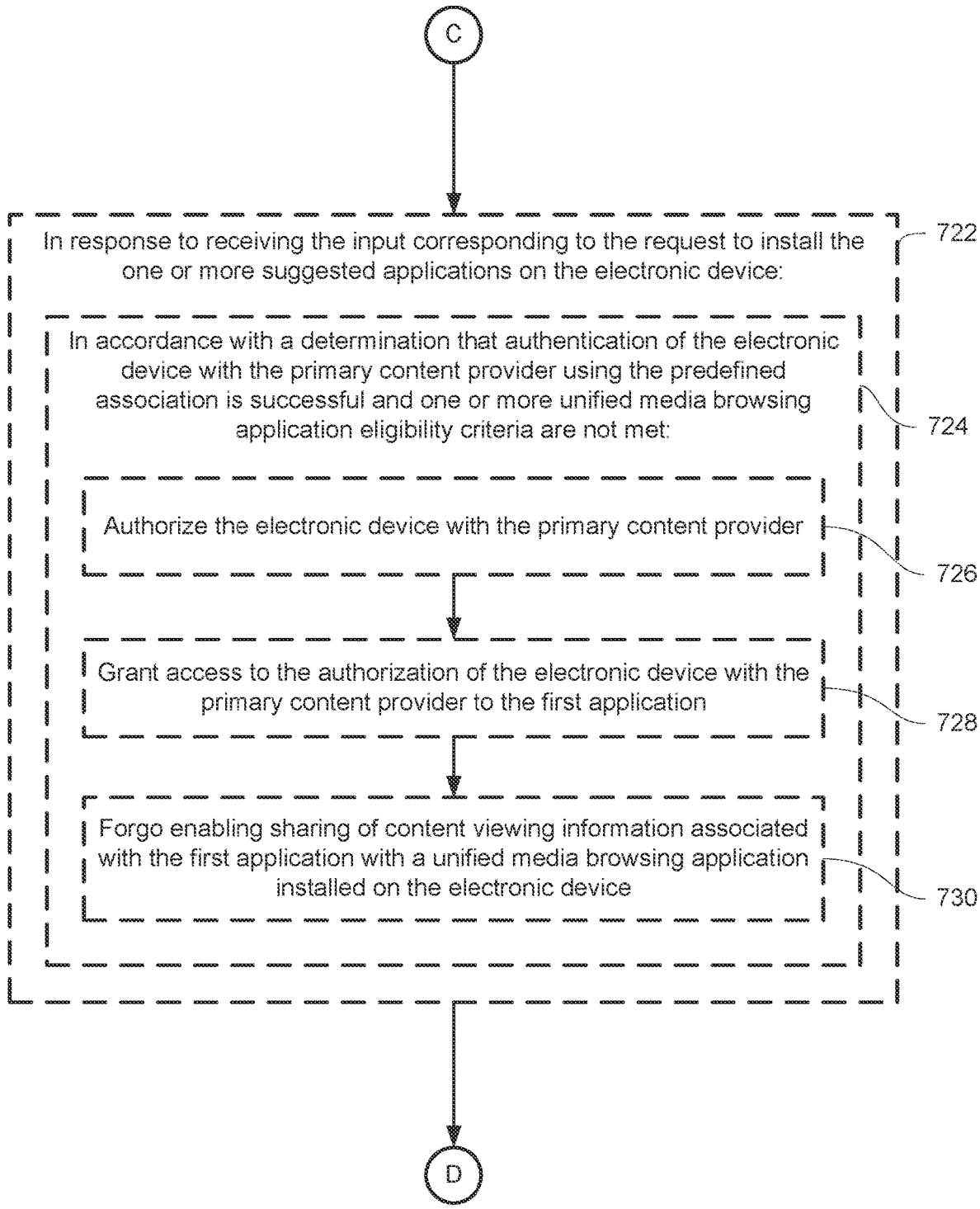
Figure 7E:
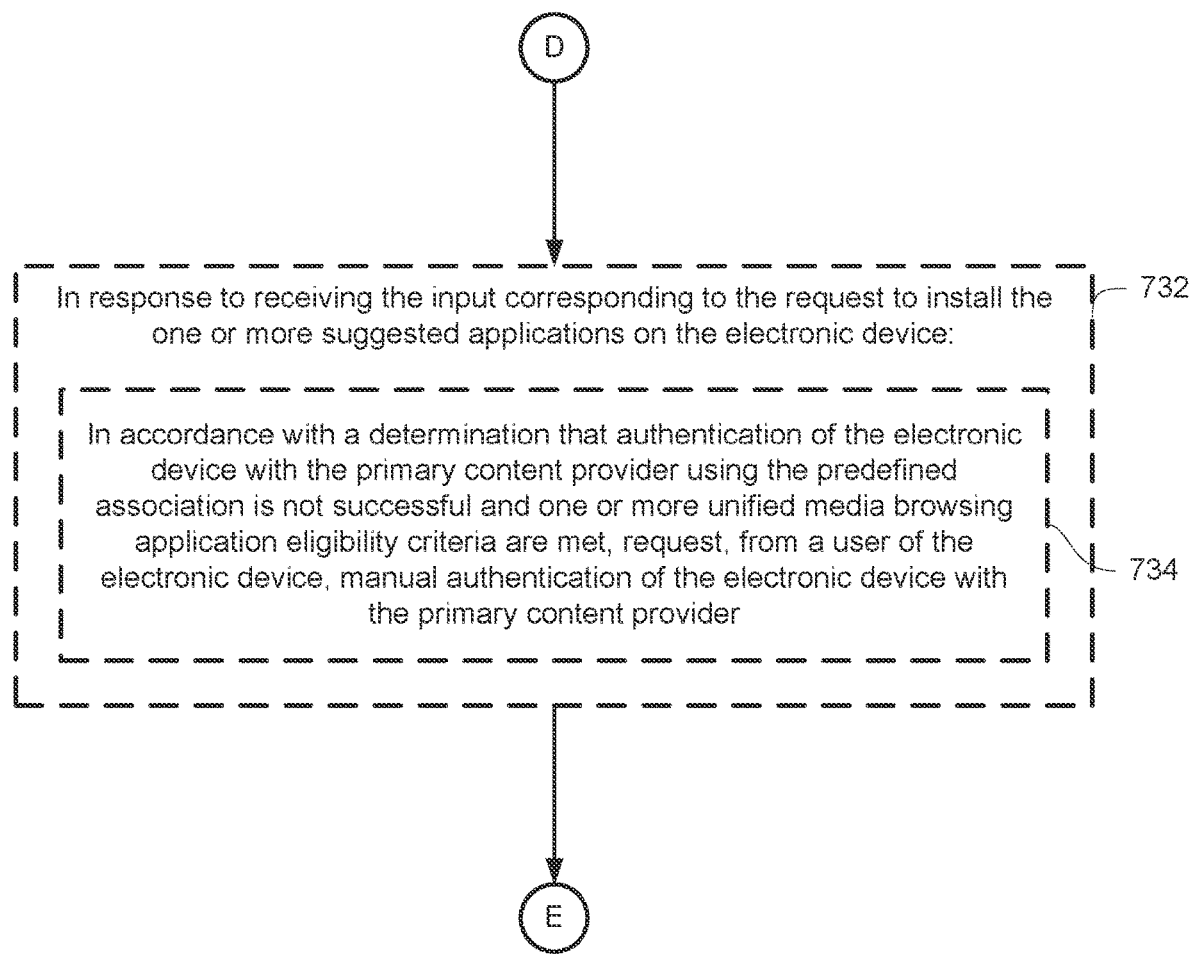
Figure 7F:
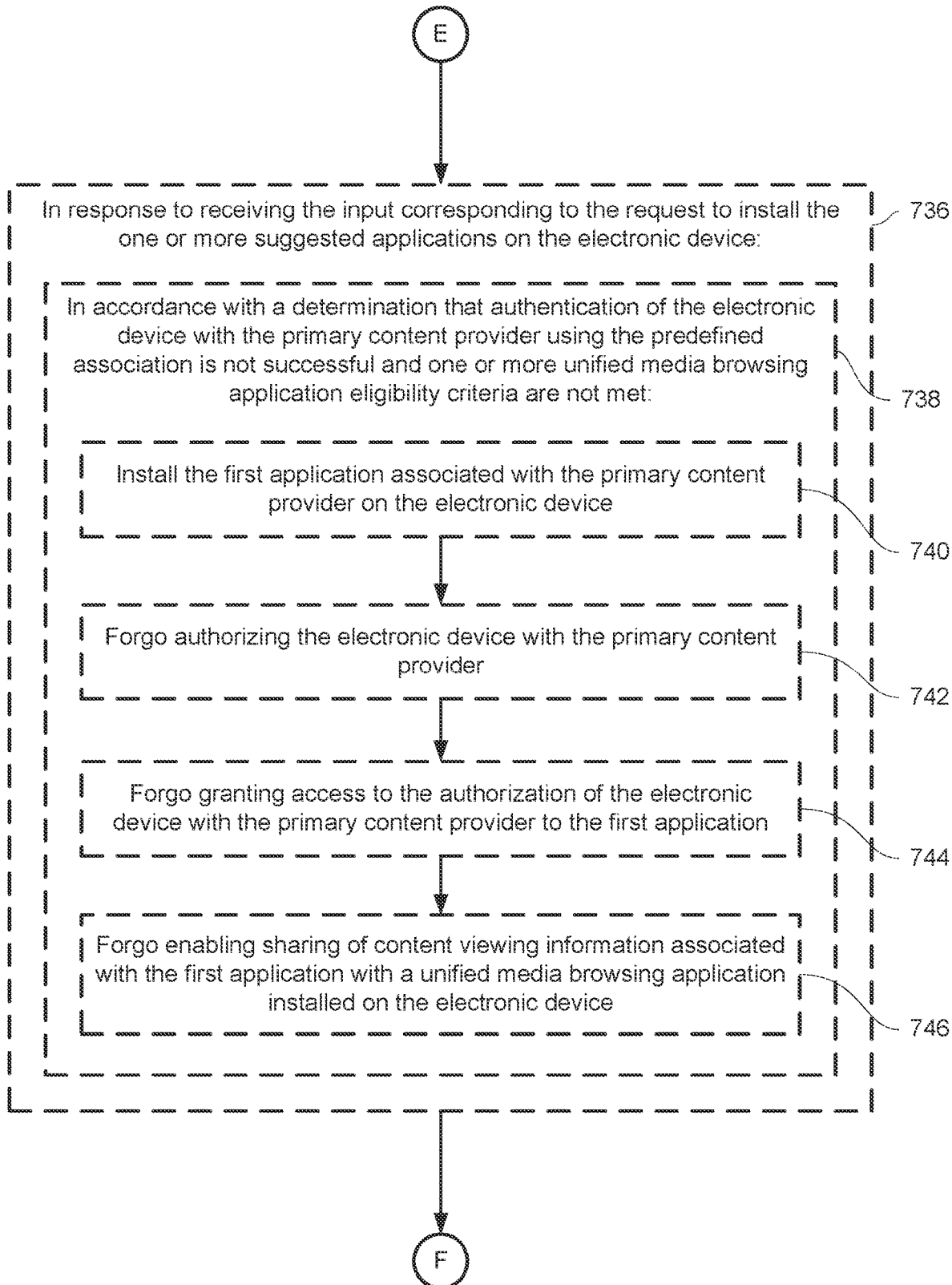
Figure 7G:
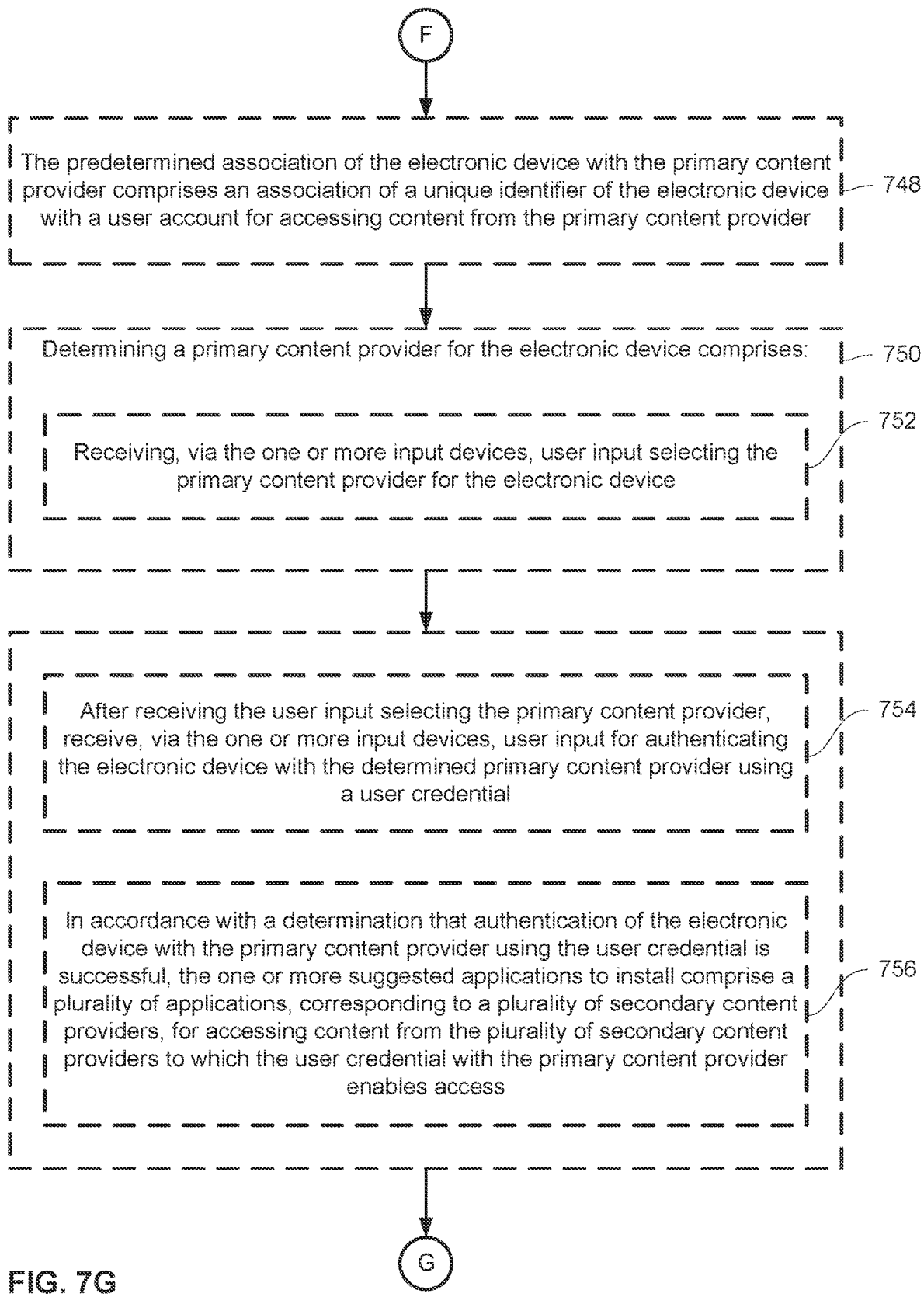
Figure 7H:
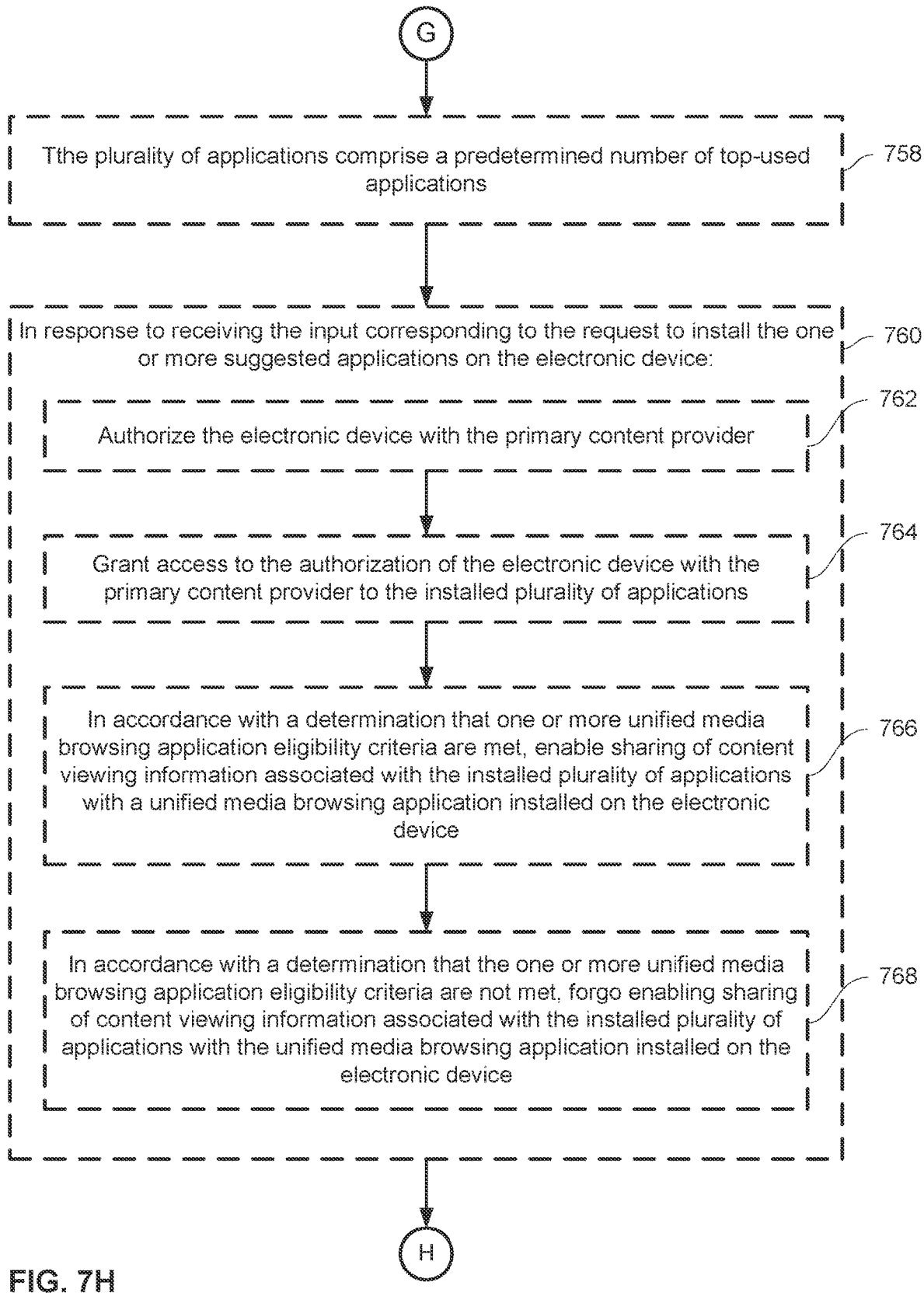
Figure 71:
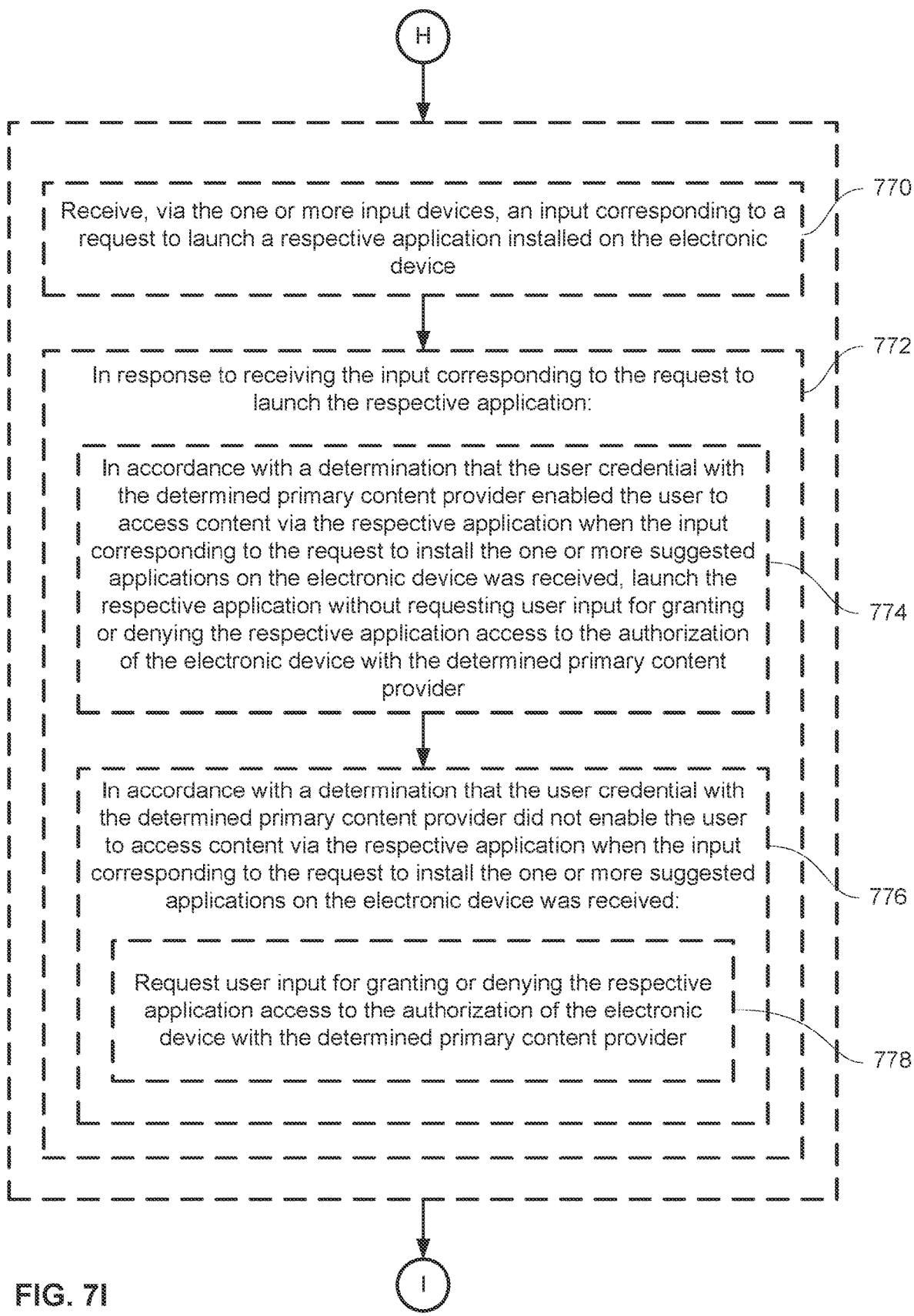
Figure 7J:
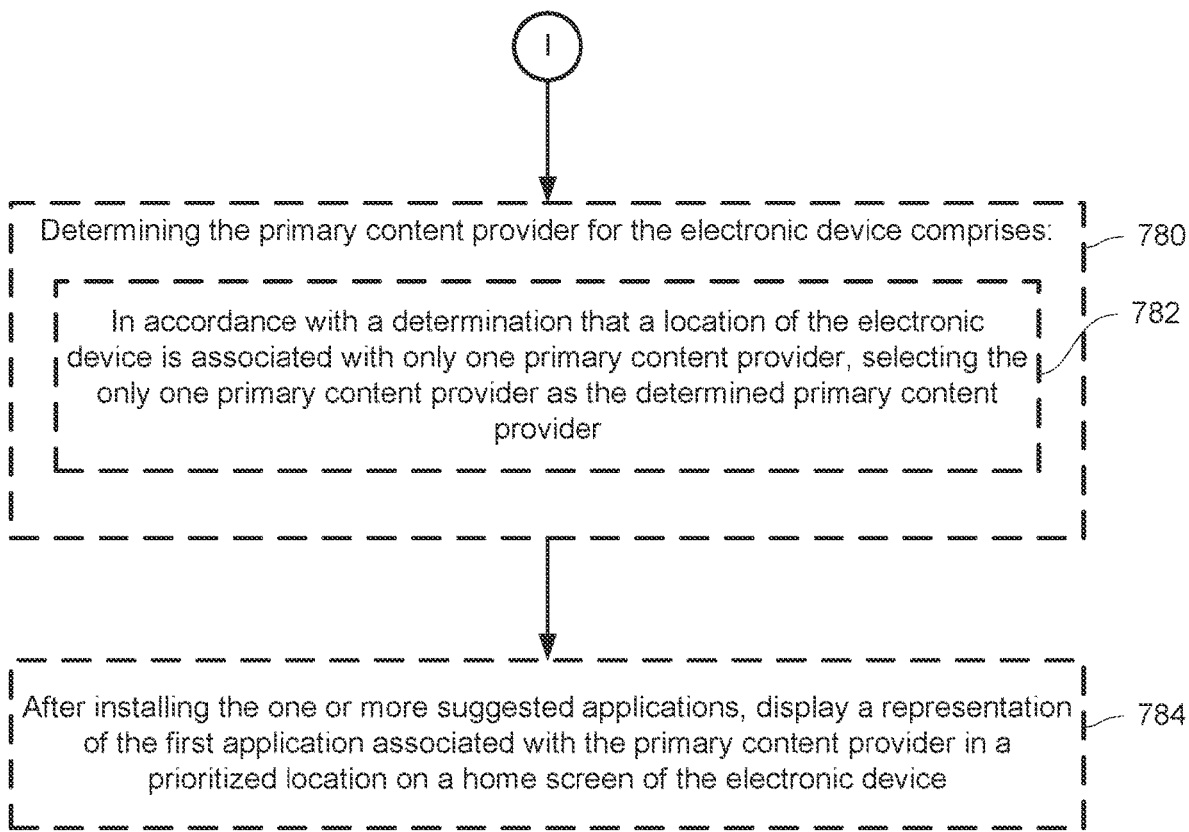

In FIG. 6Z, after detecting a click input of contact 608, device optionally performs the setup steps of installing the listed applications, setting up single sign-on on the device, and authorizing the provider 1 application to use the single sign-on credentials. In some embodiments, device 500 also authorizes the suggested applications to use the single sign-on credentials if the suggested applications are included in the user's subscription with the primary content provider. In some embodiments, device 500 configures the provider 1 application (and optionally also the other suggested applications) to share viewing data with the unified media browsing application, if device 500 determines that it is eligible to use the unified media browsing application (e.g., device 500 is located in a unified media application ineligible geography and the user has a valid unified media application account). In some embodiments, device 500 does not configure the provider 1 application or the suggested applications to share viewing data with the unified media browsing, if device 500 determines that it is ineligible to use the unified media browsing application (e.g., either because device 500 is located in a unified media application ineligible geography or the user does not have a valid unified media application account). In some embodiments, upon completion of the setup process, device 500 replaces display of setup interface 601 with display of a home screen user interface 602, as shown in FIG. 6AA.

In some embodiments, as shown in FIG. 6AA, as a result of the setup process, device 500 installed the provider 1 application, installed the suggested applications, enabled single sign-on (e.g., authorized device 500 with provider 1), signed into the single sign-on (e.g., granted access to the single sign-on authentication to the provider 1 application), and enabled sharing view data with the unified media browsing application. In some embodiments, device 500 creates an Entertainment folder (represented by icon 618-4) and installed the suggested applications within the folder. For example, a user is able to select icon 618-4 and with a click input, reveal the contents of the Entertainment folder, similar to that described in FIG. 6V. In FIG. 6AA, the provider 1 application (represented by icon 618-2) is installed in a prioritized location on user interface 602 and not located in the Entertainment folder. Although FIGS. 6W-6AA illustrate certain setup interfaces and steps as one following the other, this is meant to be illustrative and not limiting. For example, the device setup process optionally includes other setup interfaces and steps before, after, or between any of the above-described setup interfaces and steps without departing from the scope of the disclosure.

In some embodiments, device 500 displays home screen interface 602 on display 514 after completion of it setup process (e.g., as described above), as shown in FIG. 6BB. The user optionally installs a new application associated with a secondary content provider to which the user's subscription with the primary content provider (e.g., provider 1) gives the user access (e.g., the user's cable bundle includes the secondary content provider). For example, in FIG. 6CC, device 500 installs new application 9, represented by icon 618-11. Application 9 optionally was included in the user's primary content provider (e.g., provider 1) account bundle at the time of device setup. In some embodiments, if application 9 was included in the user's subscription with the primary content provider at the time device 500 enabled single sign-on (e.g., when device 500 created the authentication token for provider 1), the device's single sign-on authorization includes authentication privileges for application 9 (e.g., the authentication token for provider 1 includes access to the secondary content source corresponding to application 9). In FIG. 6CC, device 500 detects a click input of contact 608 on touch-sensitive surface 604 while displaying interface 602 and icon 618-11 is highlighted, indicating a desire to launch application 9.

In some embodiments, because application 9 was included in the user's subscription with the primary content provider at the time that single sign-on for the primary content provider occurred, device 500 is able to launch and display application 9 as a result of detecting the click input. Application 9 is optionally able to use the authorization of the device and launch without further input from the user, as shown in FIG. 6DD.

In some embodiments, the user optionally installs another new application associated with a secondary content provider to which the user's subscription with the primary content provider (e.g., provider 1) gives the user access (e.g., the user's cable bundle includes the secondary content provider). For example, in FIG. 6EE, device 500 installs new application 10, represented by icon 618-12. Application 10 optionally was not included in the user's primary content provider (e.g., provider 1) account bundle at the time of device setup, but is optionally included in the user's primary content provider account bundle currently. For example, the user's subscription with the primary content provider optionally changed to now include the secondary content provider associated with application 10 (e.g., the user's cable bundle now includes more channels). In some embodiments, if application 10 was not included in the user's subscription with the primary content provider at the time device 500 enabled single sign-on (e.g., when device 500 created the authentication token for provider 1), the device's single sign-on authorization does not include authentication privileges for application 10 (e.g., the authentication token for provider 1 does not include access to the secondary content source corresponding to application 10). In FIG. 6EE, device 500 detects a click input of contact 608 on touch-sensitive surface 604 while displaying interface 602 and icon 618-12 is highlighted, indicating a desire to launch application 10.

In some embodiments, because application 10 was not included in the user's subscription with the primary content provider at the time that single sign-on for the primary content provider occurred, device 500 optionally displays an authentication pop-up window before launching and displaying application 10. The authentication pop-up window requests, from the user, permission to allow application 10 to use the authentication of device 500 with provider 1 (e.g., to grant or deny access, to application 10, to the authorization of device 500 with provider 1 (single sign-on)). The authentication pop-up window includes a yes button 628 and no button 629. In FIG. 6FF, device 500 detects a click input of touch 608 when yes button 628 is highlighted. As a result, device 500 optionally authorizes application 10 to use single sign-on (e.g., grant access to the single sign-on authorization of the electronic device with provider 1 to application 10). After application 10 is granted access to single sign-on, device 500 is optionally able to use the authorization of the device and launch application 10, as shown in FIG. 6GG. In some embodiments, in response to the user selecting no button 629, device 500 does not grant application 10 access to the single sign-on authorization. In some embodiments, as a result of not having access to the single sign-on authorization, the user must individually authorize application 10 with the primary content provider to access content on application 10 that is included in the user's subscription with the primary content provider.

FIGS. 7A-7J are flow diagrams illustrating a method 700 of facilitating suggesting and installing applications on the electronic device during initial device setup in accordance with some embodiments of the disclosure. The method 700 is optionally performed at an electronic device such as device 100, device 300 or device 500 as described above with reference to FIGS. 1A-1B, 2-3 and 5A-5B. Some operations in method 700 are, optionally, combined and/or the order of some operations is, optionally, changed.

As described below, the method 700 provides ways of facilitating suggesting and installing applications on the electronic device during initial device setup. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., a set top box, such as device 100, device 300, or device 500) in communication with a display (e.g., a television, such as display 514) and one or more input devices (e.g., a remote control device, separate from the electronic device, such as remote 510, or a smartphone, separate from the electronic device, such as device 511), determines (702) a primary content provider (e.g., cable provider, satellite provider, etc.) for the electronic device that allows for content associated with the primary content provider to be accessible on the electronic device, such as in FIG. 6A (e.g., the electronic device is optionally associated with one or more primary content providers). In some embodiments, the electronic device is a tablet computer, a smartphone, a wearable device, etc., and the display and/or input devices are a touch screen included in those devices. In some embodiments, the electronic device is optionally pre-associated with a primary content provider. For example, the device's serial number is optionally registered with a primary content provider if the device was purchased from the primary content provider. In some embodiments, the user identifies a primary content provider with which to associate the electronic device. In some embodiments, the electronic device is authorized with the primary content provider (e.g., based on a user's subscription to receive content from the primary content provider). In some embodiments, authorizing the electronic device with the primary content provider allows one or more secondary content provider (e.g., CBS, Fox, HBO, etc. or any other content provider) that the user has access to via their subscription with the primary content provider (e.g., cable provider, satellite providers, etc.) applications installed on the electronic device to provide content on the electronic device via corresponding respective secondary content providers to which the primary content provider, and the user's subscription to the primary content provider, give the user access. In particular, if an application (e.g., a CBS content application) on the electronic device is granted access to the authorization of the electronic device with the primary content provider (e.g., cable provider), and the user's subscription with the primary content provider gives the user access to the secondary content provider associated with the application (e.g., the user's cable bundle includes CBS), then that application is optionally able to display content from the secondary content provider on the electronic device (e.g., the user is able to view CBS content on the electronic device using the CBS application). If an application is not granted access to the authorization of the electronic device, the application optionally must be individually authorized with the primary content provider (e.g., the user must login to their cable provider from within the CBS application) in order to display content from the secondary content provider associated with the application on the electronic device.

In some embodiments, after determining the primary content provider for the electronic device, the electronic device displays (704), on the display, one or more representations of one or more suggested applications to install on the electronic device based on the determined primary content provider (e.g., displaying icons for content source specific applications that are optionally included in the user's service package or bundle with the primary content provider), including a first application associated with the primary content provider, such as in FIG. 6T (e.g., the primary content provider's application, such as an application for the user's cable company via which the user is able to access content from the user's cable company).

In some embodiments, the suggested applications are highly rated or popular applications for subscribers of the determined primary content provider. In some embodiments, the suggested applications are top rated or popular applications and are not associated with the primary content provider (e.g., top-rated or popular applications within an application store accessible on the electronic device, independent of the applications' popularity with subscribers of the determined primary content provider). The number of suggested applications to install is optionally one, two, six, nine, ten or more. The primary content provider's application is optionally a content viewing application, a primary content provider account management application, or any other suitable application associated with the primary content provider. In some embodiments, if the primary content provider is a first primary content provider, the electronic device suggests a first application, and if the primary content provider is a second primary content provider, the electronic device suggests a second application, different than the first application (e.g., which primary content provider application the electronic device suggests is based on which primary content provider the determined primary content provider is).

In some embodiments, while displaying the one or more representations of the one or more suggested applications, the electronic device receives (706), via the one or more input devices, an input corresponding to a request to install the one or more suggested applications on the electronic device, such as in FIG. 6T (e.g., the user selects one or more of the one or more suggested applications to install or the user agrees to install all of the one or more suggested applications). In some embodiments, in response to receiving the input, the electronic device installs (708) the one or more suggested applications on the electronic device, such as in FIG. 6U (e.g., the installed one or more suggested applications are optionally authorized with the primary content provider as part of the installation).

For example, the suggested applications are optionally given access to the authorization of the electronic device, as a whole, with the primary content provider. In some embodiments, the installation authorizes the electronic device with the primary content provider and allows the installed one or more suggest applications to provide content on the electronic device via corresponding respective secondary content providers to which the primary content provider, and the user's subscription to the primary content provider, give the user access. In some embodiments, as a result of the user's request to install the suggested application, the installed one or more suggested applications are also configured to share their viewing history data with a unified media browser application installed on the electronic device. In some embodiments, the unified media browsing application provides a centralized location for browsing, viewing, or otherwise accessing content on the electronic device. The unified media browsing application optionally receives content viewing information from multiple content providers and/or applications for viewing content from those content providers that are installed on the electronic device (e.g., the content providers that have enabled sharing of content viewing information with the unified media browsing application, such as a separate CBS application, a separate Fox application, a separate ESPN application, etc.). In some embodiments, the shared content viewing information includes a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates all the shared information to provide a better and more cohesive interface and dataset for the user. In some embodiments, the unified media browsing application allows the user to browse the content available on the electronic device via the content providers (e.g., CBS, Fox, HBO, etc. or any other content provider), via the unified media browsing application's own service (e.g., iTunes Store by Apple, Inc. of Cupertino, California), or via the user's own accounts (e.g., previously purchased, currently rented, or otherwise owned content that is accessible from a server or locally stored on the electronic device). In some embodiments, the user optionally is able to scroll or navigate through a list or grid of, or otherwise search for, content available to the user. The list or grid of content is optionally sorted by recommendation based on the aggregated user viewing preference data, the user's viewing history, or top ranked or trending content items (e.g., based on how often the show is being watched, purchased, or discussed by other users). In some embodiments, the unified media browsing application provides an interface for the user to select content items that the user desires to view. Upon selection of the content item, the electronic device optionally determines the respective application from where the content item is available, launches the respective application, and causes playback of the selected content item. In some embodiments, if multiple applications provide access to the content item, the electronic device automatically selects one to launch based on factors such as the user's preferences, the user's past usage history with the respective applications, and price of the content. In some embodiments, instead of launching the respective application, the unified media browsing application causes playback within the unified media browsing application itself without exiting the unified media browsing application or launching the respective application.

The above-described manner of suggesting and installing applications on an electronic device (e.g., automatically, by determining a primary content provider for accessing content) allows the electronic device to provide the user with the ability to efficiently install one or more suggested applications (e.g., using one interface, without requiring the user to navigate to a separate app or interface and perform research on what applications are appropriate or popular for the user's primary content provider), which simplifies the interaction between the user and the device and enhances the operability of the device and makes the user-device interface more efficient (e.g., by suggesting applications to the user to install and installing the suggested applications in response to the user's request to install them), which additionally reduces power usage and improves the battery life of the device by enabling the user to use the device more quickly and efficiently.

In some embodiments, determining the primary content provider for the electronic device comprises automatically determining (710) the primary content provider based on a predefined association of the electronic device with the primary content provider, such as in FIG. 6A (e.g., a unique identifier that uniquely identifies the device with the primary content provider). For example, the serial number of the electronic device is optionally linked or otherwise associated with the primary content provider. The association with the primary content provider optionally includes the customer or user's login credentials for the primary content provider. In some embodiments, the association of the serial number of the electronic device with the primary content provider is stored on a server and the electronic device determines the primary content provider by querying the server to retrieve the associated primary content provider. In some embodiments, the association is pre-programmed into the electronic device and the electronic device determines the primary content provider by accessing the pre-programming (e.g., stored in ROM, solid state storage, or any other suitable non-volatile memory). The predefined association is optionally set before the end-user or consumer of the electronic device receives the electronic device. In other words, the predefined association is optionally independent of any user input to the electronic device and is optionally a setting set by the vendor or manufacturer of the electronic device. The customer or user optionally purchased the electronic device from the primary content provider (e.g., as opposed to purchasing the device directly from the manufacturer, who is optionally is not associated with the primary content provider) and the primary content provider associated the unique identifier with the primary content provider and with the customer or user's login credentials.

The above-described manner of determining the primary content provider for the electronic device (e.g., automatically, based on a predetermined association with the primary content provider) allows the electronic device to efficiently and automatically determine the primary content provider (e.g., by requiring no user input) while setting up the electronic device, which simplifies the interaction between the user and the device and enhances the operability of the device and makes the user-device interface more efficient (e.g., by automatically determining the primary content provider without any user input, thus avoiding user errors and mistakes and ensuring a smooth and fast setup process with fewer user inputs), which additionally reduces power usage and improves the battery life of the device by enabling the user to use the device more quickly and efficiently.

In some embodiments, in response to receiving (712) the input corresponding to the request to install the one or more suggested applications on the electronic device, such as in FIG. 6B, in accordance with a determination (714) that authentication of the electronic device with the primary content provider using the predefined association is successful (e.g., the device successful signed into the primary content provider using the user's login credentials (or otherwise verified that the user's login credentials are valid for accessing content from the primary content provider)) and one or more unified media browsing application eligibility criteria are met, such as in FIG. 6B (e.g., the unified media browsing application eligibility criteria includes a criterion that requires the location or geography of the electronic device to support sharing content viewing information with a unified media browsing application and a criterion that requires the user of the electronic device to have a valid content access account (e.g., iCloud account and/or iTunes account and/or Apple ID by Apple Inc. of Cupertino, California)), the electronic device authorizes (716) the electronic device with the primary content provider, such as in FIG. 6C (e.g., enabling single sign-on to the primary content provider on the electronic device). Enabling single sign-on on the electronic device optionally includes storing the user's subscription data and/or login credentials on the electronic device or in the user's content access account settings on an external server. In some embodiments, authorizing the electronic device with the primary content provider comprises creating an authentication token after successful authorization with the primary content provider. The authentication token is optionally stored on the electronic device or in the user's content access account settings on an external server. In some embodiments, multiple applications or services are able to be granted access to the authentication key. Granting access to the authentication key optionally allows the respective application or service to authenticate using the credentials associated with the authentication token (e.g., if the authentication token authenticated the device with the primary content provider, granting access allows other applications to access that same authentication with the primary content provider). In some embodiments, granting access to the authentication token is available if the respective application or service supports single sign-on authentication.

In some embodiments, the user's credentials are automatically determined when the electronic device determines the primary content provider. For example, the electronic device optionally queries a server using the device's serial number, and receives, in response to the query, the primary content provider and the customer or user's login credentials for the primary content provider (e.g., via a lookup table). In some embodiments, the electronic device is authenticated with the primary content provider merely with the serial number of the electronic device (e.g., providing its serial number to the primary content provider, which authenticates (or not) the serial number as being an authenticated serial number), without the need to use the account credentials of the user with the primary content provider). In some embodiments, the content access account is an account or subscription with a respective entity corresponding to the unified media browsing application (e.g., an account the allows the user to login to and use the unified media browsing application, which is optionally created by and/or controlled by the respective entity), where the respective entity is different than the primary content provider and/or the second content providers. In some embodiments, certain locations or geographies do not support sharing content viewing information with a unified media browsing application. The location or geography of the electronic device is optionally stored on the electronic device (e.g., region codes) or optionally the electronic device determines the current location of the device (e.g., querying an internet service provider, querying an IP address geolocation service, receiving GPS data, or other suitable location determination mechanism). The content access account is optionally one account (e.g., Apple ID) or a combination of two accounts (e.g., iCloud and iTunes account). For example, if the geography of the device supports sharing viewing content information with a unified media browsing application and the user has a valid Apple ID, then the unified media browsing application eligibility criteria are met. In some embodiments, if the geography of the device supports sharing viewing content information with a unified media browsing application and the user does not have a valid Apple ID, but does have valid iTunes and iCloud accounts, then the unified media browsing application eligibility criteria are met.)

In some embodiments, in response to receiving (712) the input corresponding to the request to install the one or more suggested applications on the electronic device, such as in FIG. 6B, in accordance with a determination (714) that authentication of the electronic device with the primary content provider using the predefined association is successful (e.g., the device successful signed into the primary content provider using the user's login credentials (or otherwise verified that the user's login credentials are valid for accessing content from the primary content provider)) and one or more unified media browsing application eligibility criteria are met, such as in FIG. 6B (e.g., the unified media browsing application eligibility criteria includes a criterion that requires the location or geography of the electronic device to support sharing content viewing information with a unified media browsing application and a criterion that requires the user of the electronic device to have a valid content access account (e.g., iCloud account and/or iTunes account and/or Apple ID by Apple Inc. of Cupertino, California)), the electronic device grants (718) access to the authorization of the electronic device with the primary content provider to the first application, such as in FIG. 6C (e.g., optionally enabling the primary content provider application to use the authorization of the electronic device with the primary content provider to access its respective content (e.g., enable the primary content provider application to use the authentication token) without additionally requiring the user to individually authenticate the first application using the user's credentials with the primary content provider).

In some embodiments, in response to receiving (712) the input corresponding to the request to install the one or more suggested applications on the electronic device, such as in FIG. 6B, in accordance with a determination (714) that authentication of the electronic device with the primary content provider using the predefined association is successful (e.g., the device successful signed into the primary content provider using the user's login credentials (or otherwise verified that the user's login credentials are valid for accessing content from the primary content provider)) and one or more unified media browsing application eligibility criteria are met, such as in FIG. 6B (e.g., the unified media browsing application eligibility criteria includes a criterion that requires the location or geography of the electronic device to support sharing content viewing information with a unified media browsing application and a criterion that requires the user of the electronic device to have a valid content access account (e.g., iCloud account and/or iTunes account and/or Apple ID by Apple Inc. of Cupertino, California)), the electronic device enables (720) sharing of content viewing information associated with the first application with a unified media browsing application installed on the electronic device, such as in FIG. 6C (e.g., configure the primary content provider application to share data with the unified media browsing application).

Sharing content viewing information with the unified media browsing application optionally includes sharing a catalog of content that is available from the respective content provider (e.g., included in the user's subscription, or able to be purchased or rented), content that the user has previously watched (e.g., user viewing history), content the user is currently watching (e.g., content the user has begun watching and paused or currently watching on the electronic device or another device), and the user's viewing preference data (e.g., the user's selected ratings for the content, or preferences determined by the user's viewing patterns). In some embodiments, the unified media browsing application aggregates shared information from multiple content applications to provide a single cohesive interface for browsing content.).

The above-described manner of setting up the electronic device (e.g., setting up the device to use single sign-on, setting up the primary content provider account to use single sign-on, and enabling sharing information with the unified media browsing application, all in one step) allows the electronic device to provide the user with the ability to efficiently set up the electronic device for optimal content viewing (e.g., enabling multiple features in one step without requiring the user to navigate to a separate app or interface to enable the same features), which simplifies the interaction between the user and the device and enhances the operability of the device and makes the user-device interface more efficient (e.g., by setting up the device with multiple features in response to a single user request), which additionally reduces power usage and improves the battery life of the device by enabling the user to use the device more quickly and efficiently.

In some embodiments, in response to receiving (722) the input corresponding to the request to install the one or more suggested applications on the electronic device, such as in FIG. 6E, in accordance with a determination (724) that authentication of the electronic device with the primary content provider using the predefined association is successful (e.g., the device successful signed into the primary content provider using the user's login credentials (or otherwise verified that the user's login credentials are valid for accessing content from the primary content provider)), and one or more unified media browsing application eligibility criteria are not met, such as in FIG. 6E (e.g., optionally the location or geography of the electronic device does not support sharing content viewing information with a unified media browsing application), the electronic device authorizes (726) the device with the primary content provider, such as in FIG. 6F (e.g., enabling single sign-on to the primary content provider on the electronic device).

In some embodiments, the user's credentials are automatically determined when the electronic device determines the primary content provider. For example, the electronic device optionally queries a server using the device's serial number, and receives, in response to the query, the primary content provider and the customer or user's login credentials for the primary content provider (e.g., via a lookup table). In some embodiments, the electronic device is authenticated with the primary content provider merely with the serial number of the electronic device (e.g., providing its serial number to the primary content provider, which authenticates (or not) the serial number as being an authenticated serial number), without the need to use the account credentials of the user with the primary content provider. In some embodiments, the unified media browsing application eligibility criteria is not met if the user of the electronic device does not have a valid content access account. In some embodiments, having a valid content access account consists of having a valid Apple ID (by Apple Inc. of Cupertino, California). In some embodiments, having a valid content access account consists of having at least one of or both an iCloud account and an iTunes account (both by Apple Inc. of Cupertino, California). For example, if the geography of the device does not support sharing viewing content information with a unified media browsing application, the unified media browsing application eligibility criteria are not met, regardless of the existence or not of valid content access accounts. In some embodiments, if the geography of the device does support sharing viewing content information with a unified media browsing application and the user does not have a valid Apple ID account and/or does not have valid iCloud and iTunes accounts, then the unified media browsing application eligibility criteria are not met). In some embodiments, authorizing the electronic device with the primary content provider comprises creating an authentication token after successful authorization with the primary content provider.

In some embodiments, in response to receiving (722) the input corresponding to the request to install the one or more suggested applications on the electronic device, such as in FIG. 6E, in accordance with a determination (724) that authentication of the electronic device with the primary content provider using the predefined association is successful (e.g., the device successful signed into the primary content provider using the user's login credentials (or otherwise verified that the user's login credentials are valid for accessing content from the primary content provider)), and one or more unified media browsing application eligibility criteria are not met, such as in FIG. 6E (e.g., optionally the location or geography of the electronic device does not support sharing content viewing information with a unified media browsing application), the electronic device grants (728) access to the authorization of the electronic device with the primary content provider to the first application, such as in FIG. 6F (e.g., optionally enabling the primary content provider application to use the authorization of the electronic device with the primary content provider to access its respective content (e.g., enable the primary content provider application to use the authentication token) without additionally requiring the user to individually authenticate the first application using the user's credentials with the primary content provider).

In some embodiments, in response to receiving (722) the input corresponding to the request to install the one or more suggested applications on the electronic device, such as in FIG. 6E, in accordance with a determination (724) that authentication of the electronic device with the primary content provider using the predefined association is successful (e.g., the device successful signed into the primary content provider using the user's login credentials (or otherwise verified that the user's login credentials are valid for accessing content from the primary content provider)), and one or more unified media browsing application eligibility criteria are not met, such as in FIG. 6E (e.g., optionally the location or geography of the electronic device does not support sharing content viewing information with a unified media browsing application), the electronic device forgoes (730) enabling sharing of content viewing information associated with the first application with a unified media browsing application installed on the electronic device, such as in FIG. 6F (e.g., optionally do not configure the primary content application to share data with the unified media browsing application).

In some embodiments, the geography does not permit sharing content viewing information with a unified media browsing application. In some embodiments, the user does not have a valid content access account. In some embodiments, if, at a later time, the geography supports sharing content viewing information with a unified media browsing application and the user later acquires a valid content access account (e.g., the one or more unified media browsing application eligibility criteria are met), sharing of content viewing information with a unified media browsing application is able to be enabled at that time.

The above-described manner of setting up the electronic device (e.g., setting up the device to use single sign-on and setting up the primary content provider account to use single sign-on, all in one step) allows the electronic device to provide the user with the ability to efficiently set up the electronic device for optimal content viewing (e.g., enabling multiple features in one step without requiring the user to navigate to a separate app or interface to enable the same features), which simplifies the interaction between the user and the device and enhances the operability of the device and makes the user-device interface more efficient (e.g., by setting up the device with multiple features in response to a single user request), which additionally reduces power usage and improves the battery life of the device by enabling the user to use the device more quickly and efficiently.

In some embodiments, in response (732) to receiving the input corresponding to the request to install the one or more suggested applications on the electronic device, such as in FIG. 6J, in accordance with a determination that authentication of the electronic device with the primary content provider using the predefined association is not successful (e.g., the device did not successfully sign into the primary content provider using the user's login credentials or the serial number of the electronic device), and one or more unified media browsing application eligibility criteria are met, such as in FIG. 6J (e.g., optionally the location or geography of the electronic device supports sharing content viewing information with a unified media browsing application and the user of the electronic device has a valid content access account), the electronic device requests (734), from a user of the electronic device, manual authentication of the electronic device with the primary content provider, such as in FIG. 6K (e.g., providing a login screen or other mechanism for the user to provide login credentials to the electronic device to authenticate the electronic device with the primary content provider).

For example, the serial number of the device is optionally associated with the wrong primary content provider, the user no longer has a valid account with the primary content provider, or any other scenarios that would cause an unsuccessful authentication such as the electronic device being unable to communicate with the primary content provider at this time due to connectivity issues. For example, if the geography of the device supports sharing viewing content information with a unified media browsing application and the user has a valid Apple ID, then the unified media browsing application eligibility criteria are met. In some embodiments, if the geography of the device supports sharing viewing content information with a unified media browsing application and the user does not have a valid Apple ID, but does have a valid iTunes and iCloud accounts, then the unified media browsing application eligibility criteria are met. In some embodiments, if manual authentication is successful, the device optionally is able to authorize the device with the primary content provider, grant access to the authorization of the electronic device with the primary content provider to the first application, and enable sharing of content viewing information associated with the first application with the unified media browsing application (if the one or more unified media browsing application eligibility criteria are met) (e.g., the device is able to optionally perform all the same functions as when authentication using the predefined association is successful). In some embodiments, after manual authentication is successful, the user is able to manually enable single sign-on functionality.

The above-described manner of setting up the electronic device (e.g., requesting manual authentication with the primary content provider if authentication with the predefined association is not successful)) allows the electronic device to provide the user with the ability to manually authenticate the device and efficiently set up the electronic device for optimal content viewing (e.g., associate the device with the primary content provider without requiring the user to navigate to a separate app or interface to enable the same features), which simplifies the interaction between the user and the device and enhances the operability of the device and makes the user-device interface more efficient, which additionally reduces power usage and improves the battery life of the device by enabling the user to use the device more quickly and efficiently.

In some embodiments, in response to receiving (736) the input corresponding to the request to install the one or more suggested applications on the electronic device, such as in FIG. 6O, in accordance with a determination (738) that authentication of the electronic device with the primary content provider using the predefined association is not successful (e.g., the device did not successfully sign into the primary content provider using the user's login credentials or the serial number of the electronic device) and one or more unified media browsing application eligibility criteria are not met, such as in FIG. 6O (e.g., optionally the location or geography of the electronic device does not support sharing content viewing information with a unified media browsing application or the user of the electronic device does not have a valid content access account), the electronic device installs (740) the first application associated with the primary content provider on the electronic device, such as in FIG. 6P (e.g., the primary content provider's application). In some embodiments, the electronic device forgoes installing the other applications of the one or more suggested applications that are not the primary content provider's application.

In some embodiments, in response to receiving (736) the input corresponding to the request to install the one or more suggested applications on the electronic device, such as in FIG. 6O, in accordance with a determination (738) that authentication of the electronic device with the primary content provider using the predefined association is not successful (e.g., the device did not successfully sign into the primary content provider using the user's login credentials or the serial number of the electronic device) and one or more unified media browsing application eligibility criteria are not met, such as in FIG. 6O (e.g., optionally the location or geography of the electronic device does not support sharing content viewing information with a unified media browsing application or the user of the electronic device does not have a valid content access account), the electronic device forgoes (742) authorizing the device with the primary content provider, such as in FIG. 6P (e.g., do not enable single sign-on to the primary content provider on the electronic device). In some embodiments, the user is able to manually enable single sign-on functionality at a future time when the one or more unified media browsing application eligibility criteria are met and authentication with the primary content provider is successful (e.g., via manual authentication).

In some embodiments, in response to receiving (736) the input corresponding to the request to install the one or more suggested applications on the electronic device, such as in FIG. 6O, in accordance with a determination (738) that authentication of the electronic device with the primary content provider using the predefined association is not successful (e.g., the device did not successfully sign into the primary content provider using the user's login credentials or the serial number of the electronic device) and one or more unified media browsing application eligibility criteria are not met, such as in FIG. 6O (e.g., optionally the location or geography of the electronic device does not support sharing content viewing information with a unified media browsing application or the user of the electronic device does not have a valid content access account), the electronic device forgoes (744) granting access to the authorization of the electronic device with the primary content provider to the first application, such as in FIG. 6P (e.g., do not enable the primary content provider application to use the single sign-on authorization). In some embodiments, at a future time, the user is able to manually grant access to the single sign-on authorization after manually enabling the single sign-on functionality.

In some embodiments, in response to receiving (736) the input corresponding to the request to install the one or more suggested applications on the electronic device, such as in FIG. 6O, in accordance with a determination (738) that authentication of the electronic device with the primary content provider using the predefined association is not successful (e.g., the device did not successfully sign into the primary content provider using the user's login credentials or the serial number of the electronic device) and one or more unified media browsing application eligibility criteria are not met, such as in FIG. 6O (e.g., optionally the location or geography of the electronic device does not support sharing content viewing information with a unified media browsing application or the user of the electronic device does not have a valid content access account), the electronic device forgoes (746) enabling sharing of content viewing information associated with the first application with a unified media browsing application installed on the electronic device, such as in FIG. 6P (e.g., optionally do not configure the primary content application to share data with the unified media browsing application). In some embodiments, if, at a later time, the geography supports sharing content viewing information with a unified media browsing application and the user later acquires a valid content access account (e.g., the one or more unified media browsing application eligibility criteria are met), sharing of content viewing information with a unified media browsing application is able to be enabled at that time.

The above-described manner of setting up the electronic device (e.g., installing the primary provider application) allows the electronic device to provide the user with the ability to efficiently set up the electronic device for optimal content viewing (e.g., automatically installing the primary provider application for the user to use without requiring the user to navigate to a separate app or interface to download and install the application), which simplifies the interaction between the user and the device and enhances the operability of the device and makes the user-device interface more efficient (e.g., requiring fewer user inputs), which additionally reduces power usage and improves the battery life of the device by enabling the user to use the device more quickly and efficiently.

In some embodiments, the predetermined association of the electronic device with the primary content provider comprises an association (748) of a unique identifier of the electronic device with a user account for accessing content from the primary content provider, such as in FIG. 6A (e.g., the serial number of the electronic device is optionally linked or otherwise associated with the primary content provider). The association with the primary content provider optionally includes the customer or user's login credentials for the primary content provider. For example, the user optionally purchased the electronic device from the user's primary content provider (e.g., as opposed to purchasing the device directly from the manufacturer, who is optionally not associated with the primary content provider) and the primary content provider associated the unique identifier with the user's login credentials or merely the user's account (e.g., on a server of the primary content provider) before delivering the electronic device to the user.

The above-described manner of associating an electronic device with a primary content provider (e.g., using a unique identifier to identify a user's account for the primary content provider) allows the electronic device to efficiently and automatically determine and authenticate itself with the primary content provider (e.g., without user input) while setting up the electronic device, which simplifies the interaction between the user and the device and enhances the operability of the device and makes the user-device interface more efficient (e.g., by automatically determining the primary content provider, thus avoiding user errors and mistakes and ensuring a smooth and fast setup process with fewer user inputs), which additionally reduces power usage and improves the battery life of the device by enabling the user to use the device more quickly and efficiently.

In some embodiments, determining (750) a primary content provider for the electronic device comprises receiving (752), via the one or more input devices, user input selecting the primary content provider for the electronic device, such as in FIG. 6R (e.g., providing a list of available primary content providers for the user to select from). The list of available primary content providers is optionally sorted alphabetically or by popularity. In some embodiments, the user is able to search for the appropriate primary content provider by entering the name or partial name of the primary content provider. In some embodiments, only primary content providers available in the user's geography or location are able to be selected. In some embodiments, if the geography only contains one primary content provider, the user is prompted to select only the one primary content provider. The user is prompted to manually select the primary content provider optionally because the electronic device does not have a predefined association (e.g., the user purchased the device from the device's manufacturer rather than through the primary content provider) or optionally because the user has skipped the setup step for automatically determining the primary content provider based on a predefined association. For example, the device has a predefined association but the user wants to set up the device with another primary content provider, such as if the device was purchased through a user's primary content provider but was given as a gift to the ultimate user, who subscribes to a different primary content provider.

The above-described manner of determining a primary content provider (e.g., manually, by the user selecting the primary content provider) allows the electronic device to provide the user with the ability to select exactly which primary content provider is associated with the device (e.g., using the same setup interface, without requiring the user to complete the automated setup and navigating to a separate interface to change the primary content provider to the desired one or, if there is no predefined association, without forfeiting the benefits of setting up the device with an associated primary content provider), which simplifies the interaction between the user and the device and enhances the operability of the device and makes the user-device interface more efficient (e.g., by providing the user an opportunity to select a primary content provider during initial device setup), which additionally reduces power usage and improves the battery life of the device by enabling the user to use the device more quickly and efficiently.

In some embodiments, after receiving the user input selecting the primary content provider, the electronic device receives (754), via the one or more input devices, user input for authenticating the electronic device with the determined primary content provider using a user credential, such as in FIG. 6S (e.g., after the user selects the primary content provider, the electronic device provides username and password fields ready for user input to log into or otherwise authenticate with the primary content provider or, in some embodiments, a mechanism for the user to provide credentials for authenticating with the primary content provider).

In some embodiments, in accordance with a determination (756) that authentication of the electronic device with the primary content provider using the user credential is successful (e.g., the electronic device successfully logged in to or authenticated with the primary content provider using the user provided credentials for the primary content provider), the one or more suggested applications to install comprise a plurality of applications, corresponding to a plurality of secondary content providers, for accessing content from the plurality of secondary content providers to which the user credential with the primary content provider enables access, such as in FIG. 6T (e.g., each application of the plurality of applications is associated with a respective secondary content provider). The applications selected for inclusion in the plurality of applications optionally depend on the content that is accessible within the user's subscription with the primary content provider. For example, the plurality of applications optionally includes a CBS content application for accessing content from CBS, an HBO content application for accessing content from HBO, etc. In some embodiments, the plurality of applications comprises applications for secondary content providers that are included in the user's bundle or subscription with the primary content provider. For example, if the user's primary content provider subscription includes access to CBS and HBO, then the plurality of applications optionally comprise the CBS content application and the HBO content application. In some embodiments, if the user's subscription with the primary content provider includes a first bundle of secondary content providers, the plurality of applications include a first set of applications (e.g., for accessing the first bundle of secondary content providers). In some embodiments, if the user's subscription with the primary content provider includes a second bundle of secondary content providers (e.g., includes more channels or different channels than the first bundle), the plurality of applications include a second set of applications (e.g., for accessing the second bundle of secondary content providers), different than the first set of applications.

The above-described method of suggesting applications to install on the electronic device (e.g., by suggesting applications for content sources that are included in the user's subscription with the primary content provider) allows the electronic device to provide the user with the ability to efficiently install the applications accessible due to the user's subscription (e.g., using one interface, without requiring the user to navigate to a separate app or interface and perform research on which applications are included in the user's primary content provider), which simplifies the interaction between the user and the device and enhances the operability of the device and makes the user-device interface more efficient, which additionally reduces power usage and improves the battery life of the device by enabling the user to use the device more quickly and efficiently.

In some embodiments, the plurality of applications comprise a predetermined number of top-used applications (758), such as in FIG. 6T (e.g., suggest to the user to install the most used or most popular secondary content provider applications (e.g., a CBS content application, an HBO content application) corresponding to respective secondary content providers (e.g., CBS, HBO, Fox, etc. or any other content provider) to which the primary content provider, and the user's subscription to the primary content provider, give the user access (e.g., the user's cable bundle includes CBS and HBO)). The predetermined number of top-used applications is optionally 2, 4, 6, 9, 10, or any other number. In some embodiments, the suggested applications include applications to which the user's subscription with the primary content provider does not provide the user access, and in some embodiments, the suggested applications only include applications to which the user's subscription with the primary content provider does provide the user access.

The above-described manner of suggesting applications to install on the electronic device (e.g., by suggesting the most used or most popular applications) allows the electronic device to provide the user with the ability to efficiently install a plurality of popular applications (e.g., using one interface, without requiring the user to navigate to a separate app or interface and perform research on which applications are appropriate or popular for the user's primary content provider), which simplifies the interaction between the user and the device and enhances the operability of the device and makes the user-device interface more efficient (e.g., by suggesting popular applications to the user to install), which additionally reduces power usage and improves the battery life of the device by enabling the user to use the device more quickly and efficiently.

In some embodiments, in response to receiving (760) the input corresponding to the request to install the one or more suggested applications on the electronic device, such as in FIG. 6T, the electronic device authorizes (762) the electronic device with the primary content provider, such as in FIG. 6U (e.g., enabling single sign-on to the primary content provider on the electronic device). In some embodiments, authorizing the electronic device with the primary content provider comprises creating an authentication token after successful authorization with the primary content provider. In some embodiments, in response to receiving (760) the input corresponding to the request to install the one or more suggested applications on the electronic device, such as in FIG. 6T, the electronic device grants (764) access to the authorization of the electronic device with the primary content provider to the installed plurality of applications, such as in FIG. 6U (e.g., optionally enabling each of the installed plurality of applications to use the authorization of the electronic device with the primary content provider to access its respective content (e.g., enable the applications to use the authentication token) without additionally requiring the user to individually authenticate each of the applications using the user's credentials with the primary content provider).

In some embodiments, in response to receiving (760) the input corresponding to the request to install the one or more suggested applications on the electronic device, such as in FIG. 6T, in accordance with a determination that one or more unified media browsing application eligibility criteria are met, the electronic device enables (766) sharing of content viewing information associated with the installed plurality of applications with a unified media browsing application installed on the electronic device, such as in FIG. 6T (e.g., optionally configure each of the plurality of applications to share data with the unified media browsing application). In some embodiments, the unified media browsing application eligibility criteria are met when the location or geography of the electronic device supports sharing content viewing information with a unified media browsing application and the user of the electronic device has a valid content access account.

In some embodiments, in response to receiving (760) the input corresponding to the request to install the one or more suggested applications on the electronic device, such as in FIG. 6T, in accordance with a determination that the one or more unified media browsing application eligibility criteria are not met, the electronic device forgoes (768) enabling sharing of content viewing information associated with the installed plurality of applications with the unified media browsing application installed on the electronic device, such as in FIG. 6T (e.g., optionally do not configure the content applications to share data with the unified media browsing application). In some embodiments, if, at a later time, the geography supports sharing content viewing information with a unified media browsing application and the user later acquires a valid content access account (e.g., the one or more unified media browsing application eligibility criteria are met), sharing of content viewing information with a unified media browsing application is able to be enabled at that time.

The above-described manner of setting up the electronic device (e.g., setting up the device to use single sign-on, setting up the primary content provider account to use single sign-on, and optionally enabling sharing information with the unified media browsing application, all in one step) allows the electronic device to provide the user with the ability to efficiently set up the electronic device for optimal content viewing (e.g., enabling multiple features in one step without requiring the user to navigate to a separate app or interface to enable the same features), which simplifies the interaction between the user and the device and enhances the operability of the device and makes the user-device interface more efficient (e.g., by setting up the device with multiple features in response to a single user request), which additionally reduces power usage and improves the battery life of the device by enabling the user to use the device more quickly and efficiently.

In some embodiments, the electronic device receives (770), via the one or more input devices, an input corresponding to a request to launch a respective application installed on the electronic device, such as in FIG. 6CC (e.g., the user selects an application to run). In some embodiments, the application was one of the suggested applications that were installed during the device setup. In some embodiments, the application was manually installed by the user after initial device setup.

In some embodiments, in response to receiving (772) the input corresponding to the request to launch the respective application, such as in FIG. 6CC, in accordance with a determination that the user credential with the determined primary content provider enabled the user to access content via the respective application when the input corresponding to the request to install the one or more suggested applications on the electronic device was received (e.g., if the application was one of the applications that was suggested and installed during initial device setup and granted access to the authorization with the primary content provider, or if the application corresponds to a secondary content provider to which the user's subscription with the primary content provider gave access at the time of device setup (e.g., the secondary content provider was in the user's subscription bundle with the primary content provider when the electronic device was authorized with the primary content provider to enable single sign-on during setup)), the electronic device launches (774) the respective application without requesting user input for granting or denying the respective application access to the authorization of the electronic device with the determined primary content provider, such as in FIG. 6DD (e.g., the application optionally is able to authenticate itself and access its respective content because it has already been granted access to the authorization with the primary content provider). In such a case, the application optionally is able to launch without further input from the user.

In some embodiments, in response to receiving (772) the input corresponding to the request to launch the respective application, such as in FIG. 6EE, in accordance with a determination (776) that the user credential with the determined primary content provider did not enable the user to access content via the respective application when the input corresponding to the request to install the one or more suggested applications on the electronic device was received, such as in FIG. 6EE (e.g., if the application was not one of the applications that was suggested and installed during initial device setup, or if the application corresponds to a secondary content provider to which the user's subscription with the primary content provider did not provide access at the time of device setup (e.g., the secondary content provider was not in the user's subscription bundle with the primary content provider when the electronic device was authorized with the primary content provider to enable single sign-on during setup)), the electronic device requests (778) user input for granting or denying the respective application access to the authorization of the electronic device with the determined primary content provider, such as in FIG. 6FF (e.g., ask the user whether to grant access to the single sign-on authentication token).

In some embodiments, the respective application was included in the user's primary content provider bundle at the time of initial device setup but was otherwise not suggested or was otherwise not installed during initial device setup. In some embodiments, the respective application was not included in the user's primary content provider bundle at the time of initial device setup, so the respective application was not suggested or installed during initial device setup, but is now included in the user's primary content provider bundle (e.g., the user changed his or her subscription package or the bundle otherwise changed to include the respective application). In some embodiments, the respective application does not have access to the authorization with the primary content provider or has not otherwise been individually authenticated using the user's credentials with the primary content provider. In some embodiments, after receiving a user input indicative of a desire to grant the respective application access to the authorization of the electronic device with the determined primary content provider, the electronic device grants access to the authorization of the electronic device and launches the application, which is then able to provide access, on the electronic device, to its corresponding content. If the user denies access to the authorization of the device with the primary content provider to the respective application, then the user optionally must first manually authenticate the respective application with the primary content provider (e.g., using the user's primary content provider credentials) before the respective application is able to provide access to its content—otherwise, the respective application is optionally unable to provide access to its content.

The above-described manner of launching an application (e.g., launching the application without further user input if it has access to the single sign-on authentication and asking the user to authenticate the application if it does not have access to the single sign-on authentication) allows the electronic device to provide the user with a convenient interface to grant authorization (e.g., by requesting the user's input to grant or deny authorization when the application is launched without requiring the user to navigate to a separate app or interface to grant or deny authorization), which simplifies the interaction between the user and the device and enhances the operability of the device and makes the user-device interface more efficient (e.g., by requesting the user's input at a time when the user is most likely to understand what functionality is requested to be enabled or disabled), which additionally reduces power usage and improves the battery life of the device by enabling the user to use the device more quickly and efficiently.

In some embodiments, determining (780) the primary content provider for the electronic device comprises in accordance with a determination that a location of the electronic device is associated with only one primary content provider, selecting (782) the only one primary content provider as the determined primary content provider, such as in FIG. 6X (e.g., if the geography or location of the electronic device only has a single primary content provider, then optionally suggest to the user whether the user desires to authenticate with the primary content provider).

The above-described manner of setting up the electronic device (e.g., selecting the one primary content provider in the electronic device's geographic location) allows the electronic device to provide the user with a simple and convenient method of selecting the appropriate primary content provider (e.g., without requiring the user to browse through a list of possibly irrelevant primary content providers or otherwise search for the appropriate primary content provider), which simplifies the interaction between the user and the device and enhances the operability of the device and makes the user-device interface more efficient (e.g., by suggesting only one primary content provider when it is likely that the user has a subscription to that primary content provider), which additionally reduces power usage and improves the battery life of the device by enabling the user to use the device more quickly and efficiently.

In some embodiments, after installing the one or more suggested applications, the electronic device displays (784) a representation of the first application associated with the primary content provider in a prioritized location on a home screen of the electronic device, such as in FIG. 6C (e.g., place the primary content provider in a prioritized location on the home screen with respect to other applications installed on the electronic device). In some embodiments, the prioritized location is the second location in the grid of installed applications. In some embodiments, the unified media browsing application is in the first location in the grid of installed applications, and the primary content provider application is placed next to the unified media browsing application on the home screen.

The above-described manner of organizing the applications installed on the electronic device (e.g., by placing the primary content provider application in a prioritized location) allows the electronic device to provide the user with a convenient method of finding and accessing the primary content provider application (e.g., without requiring the user to browse for or otherwise find the primary content provider application), which simplifies the interaction between the user and the device and enhances the operability of the device and makes the user-device interface more efficient (e.g., by placing the application in a location that is easy to find and access), which additionally reduces power usage and improves the battery life of the device by enabling the user to use the device more quickly and efficiently.

It should be understood that the particular order in which the operations in FIGS. 7A-7J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 900) are also applicable in an analogous manner to method 700 described above with respect to FIGS. 7A-7J. For example, the user interfaces, user interface elements, processes for suggesting and installing applications, processes for authorizing devices and applications with primary content providers, sharing viewing data with the unified media browsing application, etc., described above with reference to method 700 optionally have one or more of the characteristics of the user interfaces, user interface elements, processes for suggesting and installing applications, processes for authorizing devices and applications with primary content providers, sharing viewing data with the unified media browsing application, etc. described herein with reference to other methods described herein (e.g., method 900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIGS. 7A-7J are, optionally, implemented by components depicted in FIGS. 1A-1B. For example, determining operation 702, displaying operation 704, receiving operation 706, and installing operation 708 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Set Top Box Express Setup

Users interact with electronic devices in many different manners, including interacting with media (e.g., music, movies, etc.) that may be available (e.g., stored or otherwise accessible) on the electronic devices. For example, a user may browse and play media that is accessible on an electronic device. During device setup or after a factory reset, the electronic device provides an interface for guiding the user through the setup process. In some circumstances, the user of the electronic device has already provided certain settings and information relevant to setting up the electronic device to another electronic device. Thus, the user may desire to perform an express setup by transferring settings and information from the other electronic device to the electronic device being set up. The embodiments described below provide ways in which an electronic device facilitates transferring settings and information from another electronic device during device setup, thereby enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 8A-8DD illustrate exemplary ways in which an electronic device facilitates transferring settings and information from another electronic device during device setup in accordance with some embodiments of the disclosure. The embodiments in these figures are used to illustrate the processes described below, including the processes described with reference to FIGS. 9A-9F.

Figure 8A:
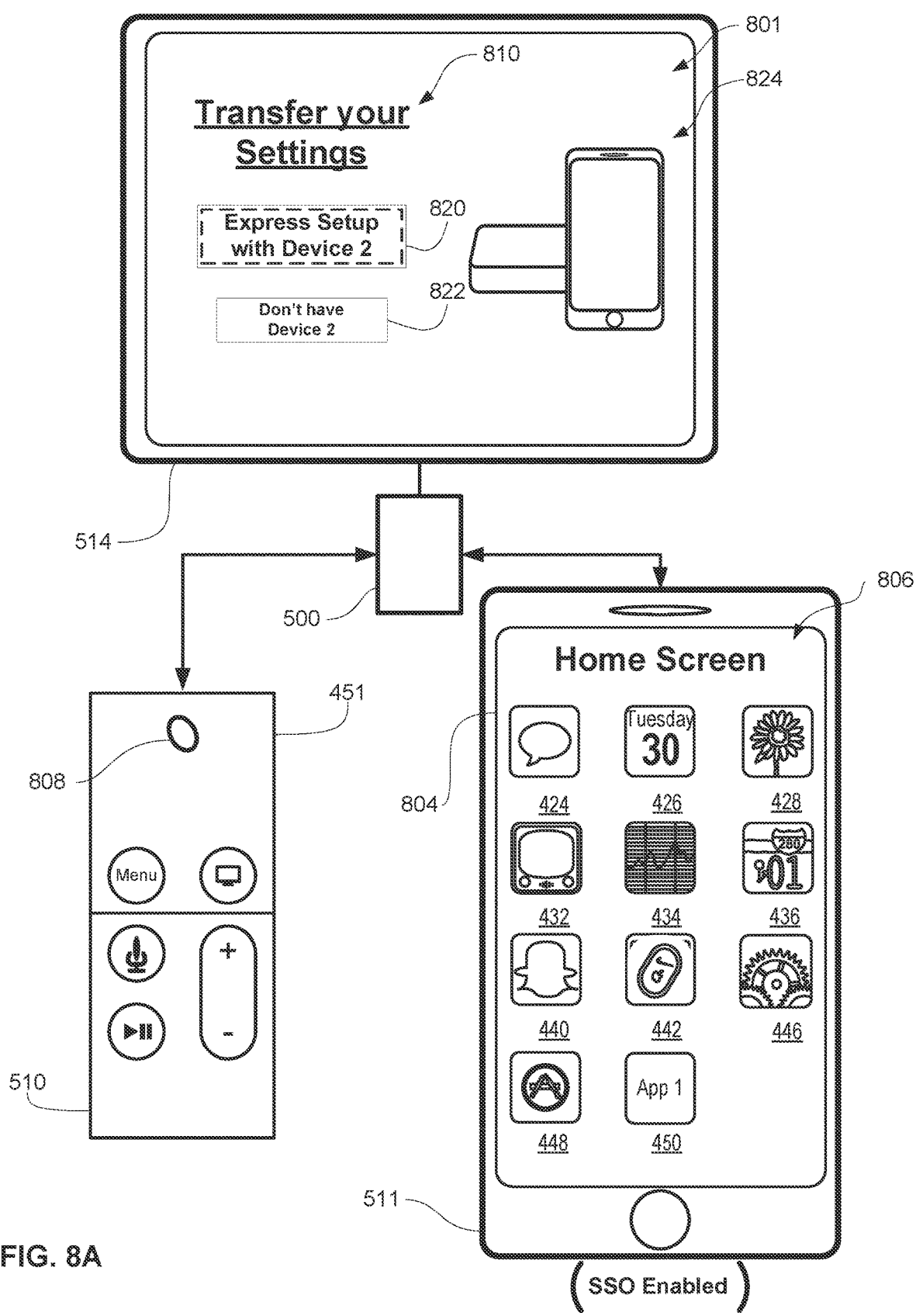
FIGS. 8A-8DD illustrate exemplary ways in which an electronic device facilitates transferring settings and information from another electronic device during device setup in accordance with some embodiments of the disclosure.

FIG. 8A illustrates an exemplary setup environment for an electronic device (e.g., electronic device 500 of FIG. 5A), of which display 514 is a part, or to which display 514 is connected. Device 500 is optionally in communication (e.g., one-way communication or two-way communication) with a remote control device (e.g., remote control 510 of FIG. 5B) and a smartphone device (e.g., multifunctional device 511 of FIG. 5A). In some embodiments, remote control 510 and multifunctional device 511 serve as input devices to device 500. Display 514 optionally displays one or more user interfaces that include various content. In the example illustrated in FIG. 8A, display 514 displays a setup interface 801. In some embodiments, device 500 enters a device setup procedure and display 514 displays a setup interface (e.g., in response to the device being powered on or booted up for the first time or after a factory reset). In some embodiments, display 514 displays an initial setup splash screen or other user interfaces before proceeding to an express setup procedure, such as those described in FIG. 6A.

In some embodiments, device 500 is able to perform an express setup procedure. An express setup procedure optionally involves transferring settings from a second device (e.g., multifunctional device 511) to device 500 to facilitate, enhance, or otherwise accelerate the device setup process. In some embodiments, a user of device 500 has already set up a second device with applications and settings that are relevant to the setup of device 500. For example, device 511 optionally has installed application 1 (represented by icon 450 on smartphone display 804). In some embodiments, application 1 is authenticated with a primary content provider (e.g., cable provider, satellite provider, etc.). In some embodiments, application 1 is a primary content provider application or an application for a secondary content provider which is included in the user's subscription with the primary content provider (e.g., CBS, Fox, HBO, etc. or any other content provider) as part of a bundled service to the user. In some embodiments, multifunction device 511 is authorized with a primary content provider (e.g., single sign-on to a primary content provider is enabled on multifunction device 511). In these and optionally other scenarios, express setup procedure optionally is able to retrieve primary content provider credentials or subscription information from multifunction device 511 and transfer the data to device 500 to facilitate setup of device 500. In some embodiments, other data is able to be transferred from multifunction device 511 to device 500, such as content access accounts (e.g., iCloud accounts and/or iTunes accounts and/or Apple IDs by Apple Inc. of Cupertino, California) and installed applications (e.g., primary content provider application, secondary content provider application, or optionally applications unrelated to the primary content provider).

Turning back to FIG. 8A, device 500 optionally displays express setup interface 801. In some embodiments, express setup interface 801 includes title 810, conveying to the user the option of proceeding with either express setup or manual setup. In some embodiments, title 810 is a text title or artwork (e.g., a logo, a picture, an illustration, etc.). Express setup interface 801 optionally includes express setup button 820 and manual setup button 822. In some embodiments, express setup button 820 is more prominently displayed than manual setup button 822 (e.g., larger and/or contains text with larger fonts). In some embodiments, express setup interface 801 displays a setup representation 824 representing the device to use for controlling setup. For example, in FIG. 8A, express setup button 820 has current focus (as indicated by the dashed-line box within express setup button 820), so setup representation 824 displays a representation of device 500 and multifunction device 511, indicating that multifunction device 511 will be used for performing setup of device 500. In FIG. 8A, multifunction device 511 includes application 1 and the device has enabled single sign-on (e.g., multifunction device 511 is authorized with a primary content provider).

Figure 8B:
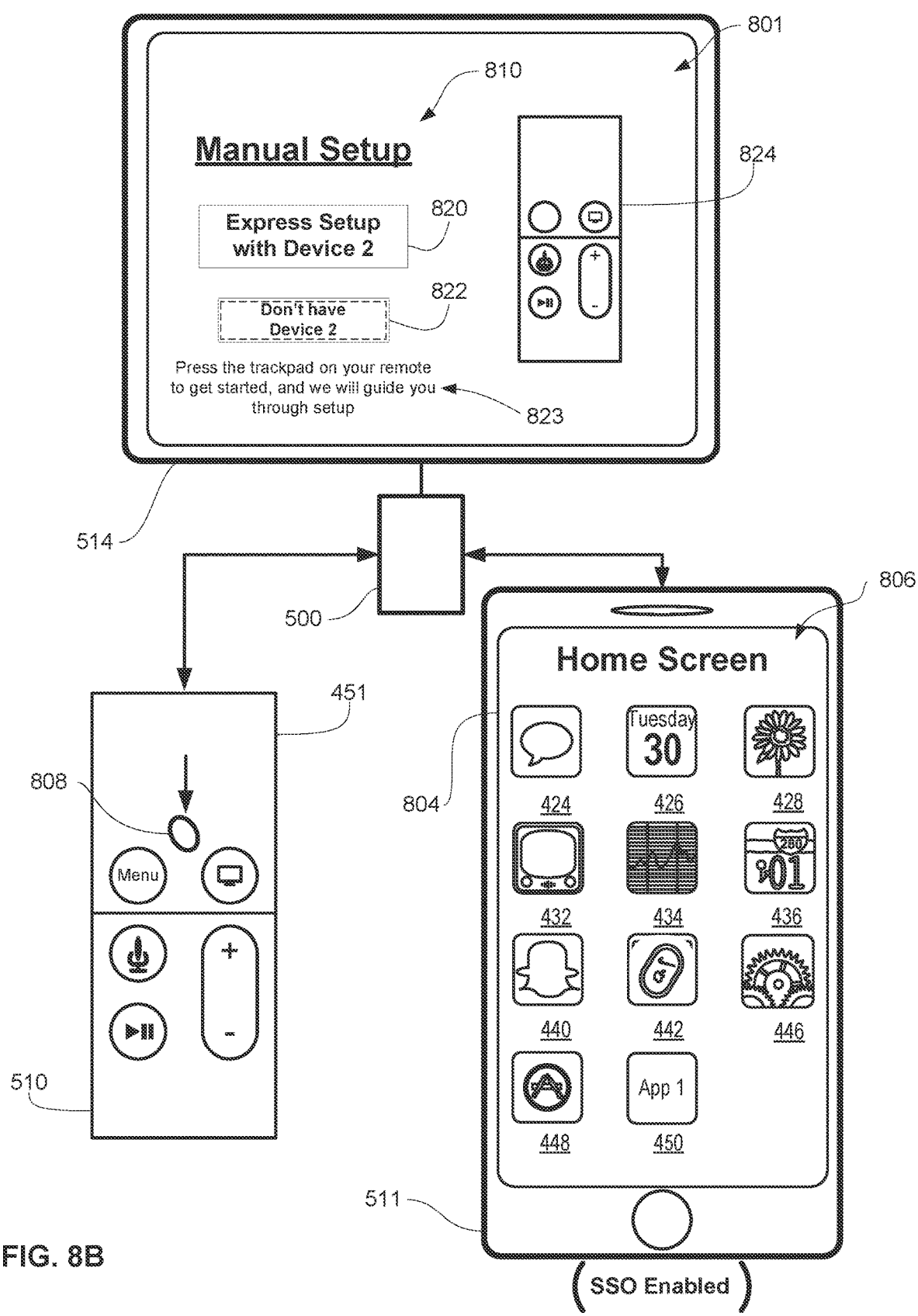

In FIGS. 8A-8B, a top-to-bottom swipe of contact 808 has been detected on touch-sensitive surface 451 of remote control 510. In response, device 500 moves the current focus from express setup button 820 to manual setup button 822, as shown in FIG. 8B. Accordingly, device 500 modifies setup representation 824 to display a representation of remote control 510, indicating that remote control 510 will be used for performing setup of device 500. In some embodiments, in response to detecting the top-to-bottom swipe, display 514 updates title 810 to represent the manual setup option highlighted by the user. Display 514 optionally displays an instructive text 823 instructing the user how to proceed with manual setup.

Figure 8C:
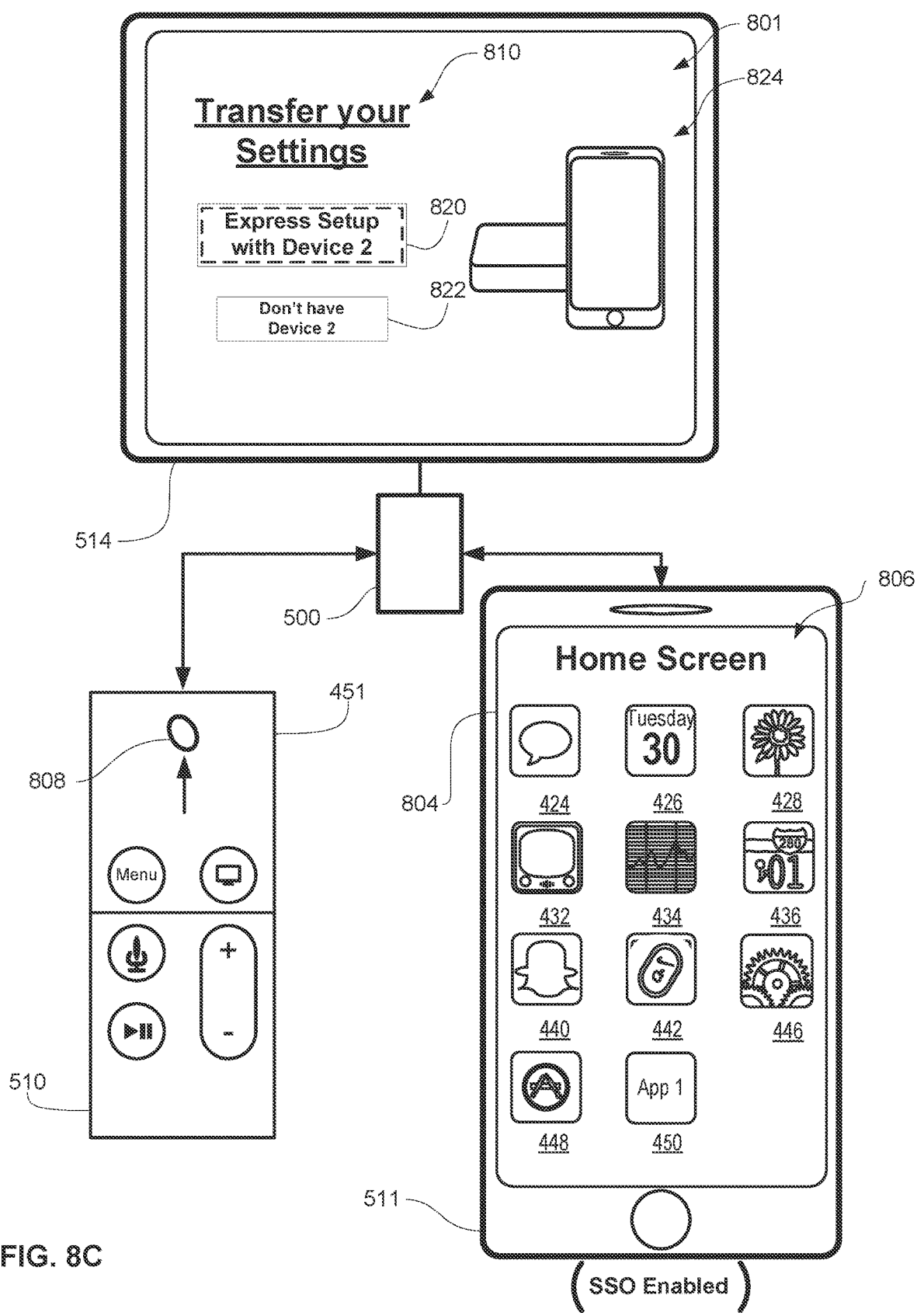

In FIGS. 8B-8C, a bottom-to-top swipe of contact 808 has been detected on touch-sensitive surface 451 of remote control 510. In response, device 500 moves the current focus from manual setup button 822 to express setup button 820, as shown in FIG. 8C. Accordingly, device 500 modifies setup representation 824 to display a representation of device 500 and multifunction device 511, indicating that multifunction device 511 will be used for performing setup of device 500. In some embodiments, in response to detecting the top-to-bottom swipe, display 514 updates title 810 to represent the express setup option highlighted by the user.

Figure 8D:
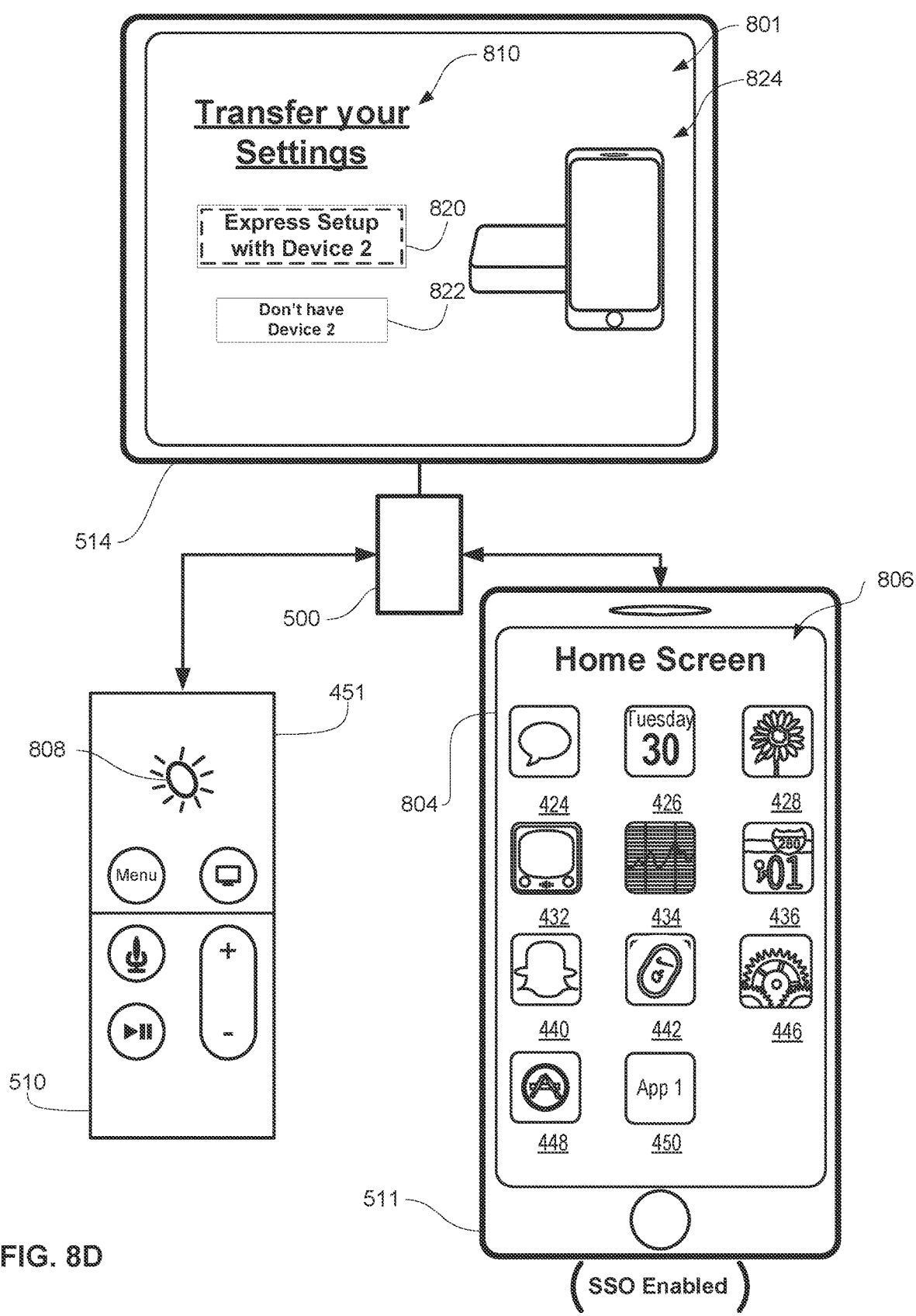
Figure 8E:
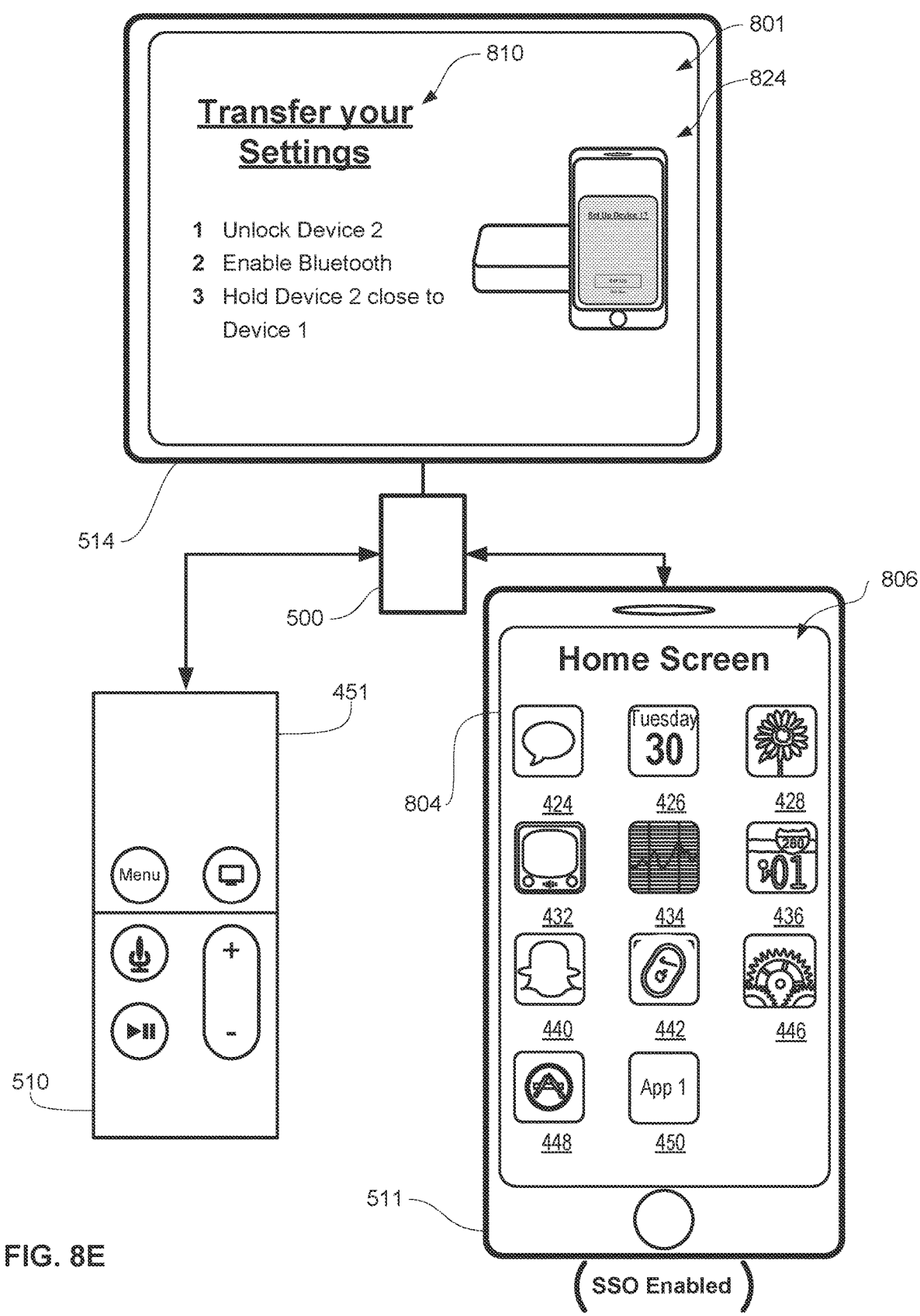

In FIG. 8D, a click input of contact 808 has been detected on touch-sensitive surface 451 of remote control 510 while express setup button 820 is highlighted. In response, device 500 optionally begins the express setup procedure. Device 500 optionally displays, on display 514, instructions for linking the second device (e.g., multifunction device 511 which will be used to set up device 500) to device 500, as shown in FIG. 8E. For example, to proceed with express setup, device 500 optionally requests the user to unlock multifunction device 511, enable Bluetooth connectivity on multifunction device 511, and hold multifunction device 511 near device 500 (e.g., optionally to establish a near-field communication (NFC) connection). In some embodiments, setup representation 824 is modified to include a preview of a pop-up setup card on the representation of multifunction device 511.

Figure 8F:
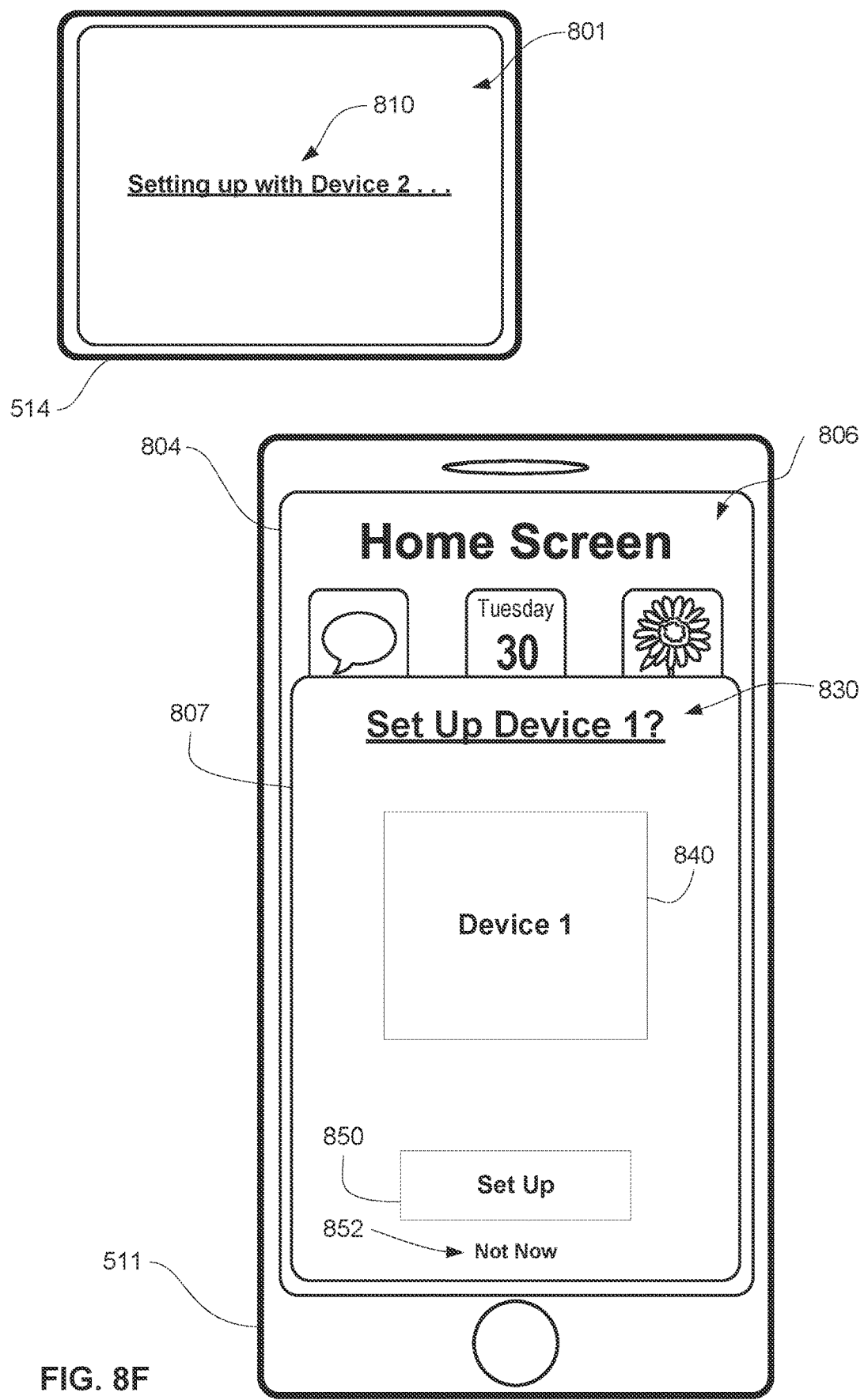

In some embodiments, express setup procedure will proceed when the user performs the requested steps (e.g., unlock multifunction device 511, enable Bluetooth connectivity on multifunction device 511, and place multifunction device 511 near device 500), as shown in FIG. 8F. As a result, a connection is optionally created between multifunction device 511 and device 500 (e.g. the devices are paired). In some embodiments, device 500 updates express setup interface 801 to indicate that express setup is in progress (e.g., update title 810). In some embodiments, in response to beginning express setup of device 500 using multifunction device 511, multifunction device 511 displays a setup card interface 807 overlaid over the home screen interface 806 (or any other user interface being displayed by device 511 at the time express setup is commenced). Setup card interface 807 optionally includes a title 830 and a representation 840 of the device being set up. Representation 840 optionally is an image of device 500. In some embodiments, setup card interface 807 includes a set up button 850 and a cancellation button 852. In some embodiments, cancellation button 852 is not a button, but rather an exit icon (e.g., an "x" icon in the top right corner of the setup card). In some embodiments, actuating cancel button 852 ends the express setup procedure and device 500 optionally displays the initial express setup interface 801, similar to that described in FIG. 8A, or device 500 optionally proceeds with manual setup.

Figure 8G:
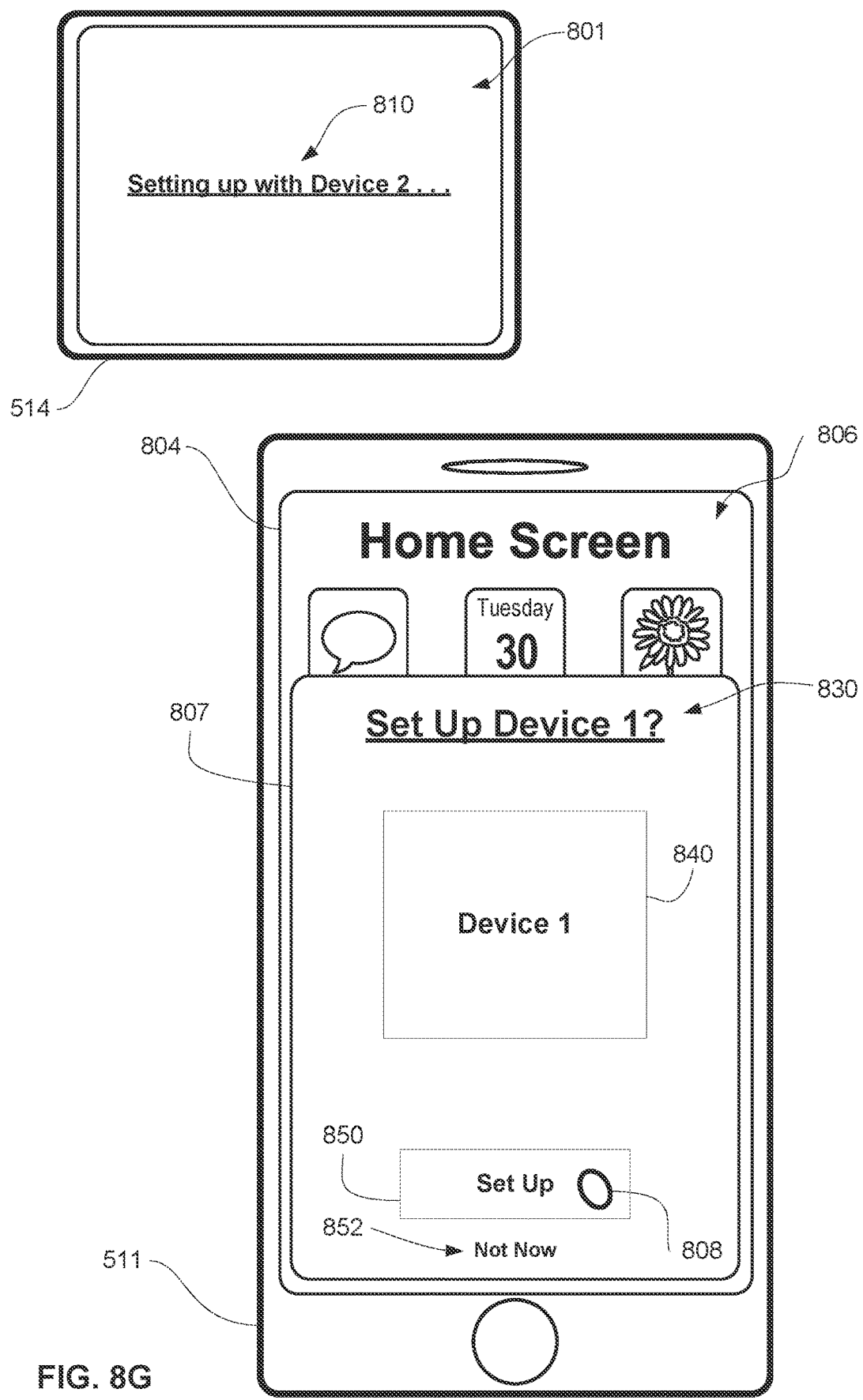

In FIG. 8G, multifunction device 511 detects a tap of contact 808 on touch-sensitive surface 804, selecting setup button 850 and indicating the user's desire to proceed with express setup of device 1 (e.g., device 500) using device 2 (e.g., multifunction device 511). In response, multifunction device 511 optionally updates setup card interface 807 to display a content access account sharing card. In some embodiments, multifunction device 511 determines whether multifunction device 511 contains a content access account and what type of content access account. For example, multifunction device 511 optionally contains an Apple ID account and/or an iTunes account and/or an iCloud account. In some embodiments, different content access accounts include different user settings and data. For example, an iTunes account optionally includes music or media settings and data, an iCloud account optionally includes user settings such as contacts, calendars, mail, etc., and an Apple ID account optionally include settings available on both iTunes and iCloud accounts.

Figure 8H:
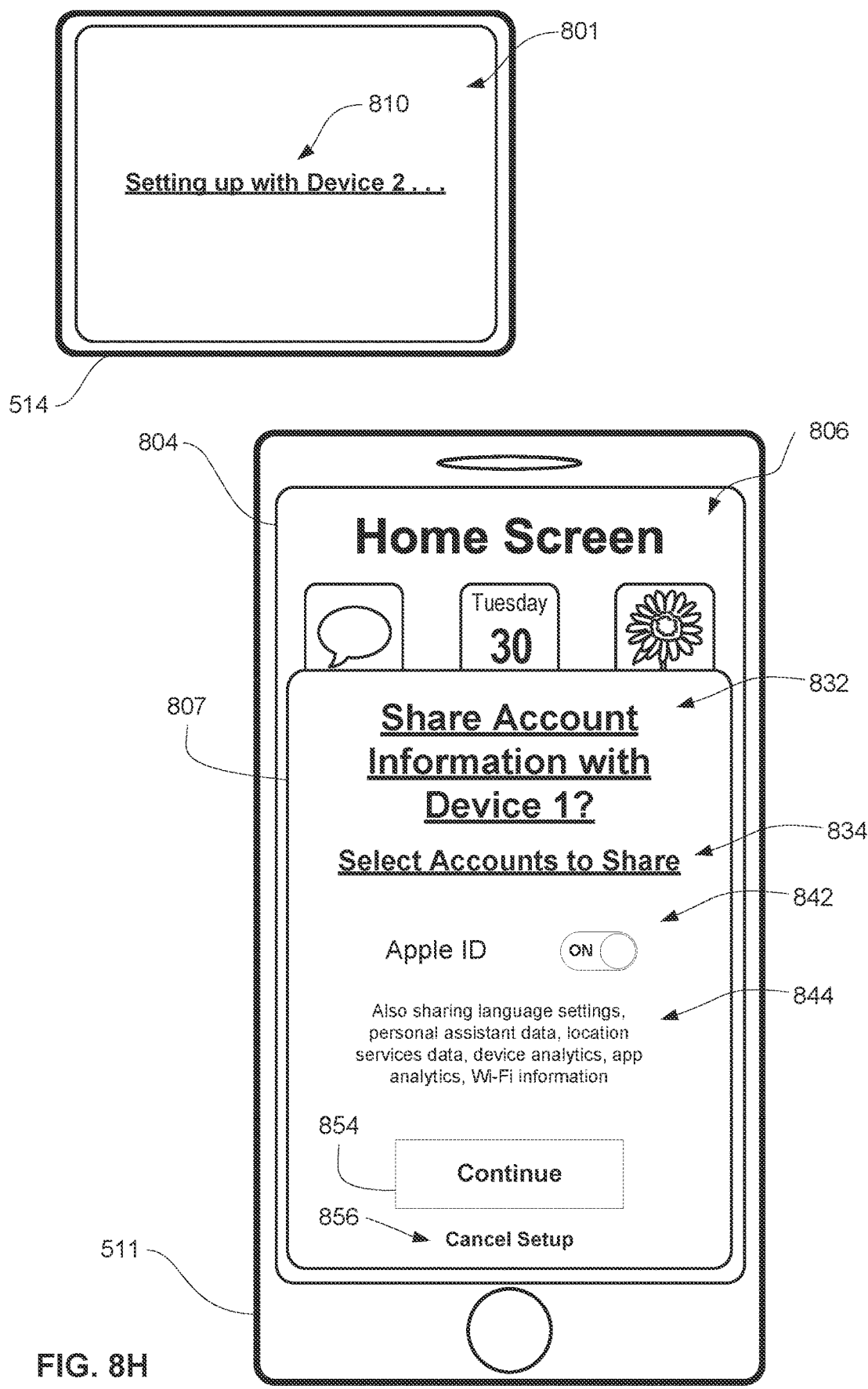

For instance, in FIG. 8H, multifunction device 511 determines that multifunction device 511 includes an Apple ID account and setup card interface 807 includes a toggle element 842 to enable or disable sharing the Apple ID content access account with device 500. Setup card interface 807 optionally includes descriptive text 844 of what is included in the sharing (e.g., language settings, personal assistant data, location services data, device analytics, app analytics, Wi-Fi information, etc.). In some embodiments, setup card interface 807 includes a continue button 854 and a cancellation button 856. In some embodiments, cancellation button 856 is not a button, but rather an exit icon (e.g., an "x" icon in the top right corner of the setup card). In some embodiments, actuating cancel button 856 ends the express setup procedure and device 500 optionally displays the initial express setup interface 801, similar to that described in FIG. 8A, or device 500 optionally proceeds with manual setup.

In some embodiments, multifunction device 511 determines that multifunction device 511 does not include an Apple ID account, but includes iCloud and iTunes accounts. As a result, the content access account sharing card optionally includes two toggle elements 842 to independently enable or disable sharing of the iCloud and iTunes content access accounts, respectively, with device 500. In some embodiments, enabling or disabling sharing (e.g., via the toggle elements) of the content access accounts causes modification of descriptive text 844 to indicate what settings and data is shared. For example, in FIG. 8I, the iCloud account toggle element is toggled to the "off" position, indicating a desire not to share the iCloud account and its accompanying settings with device 500. In some embodiments, based on the toggle selections of the toggle elements 842, the respective content access accounts are transferred to device 500 (e.g., if the iTunes account toggle element is enabled, multifunction device 511 will transfer the iTunes account to device 500, if the iCloud account toggle element is enabled, multifunction device 511 will transfer the iCloud account to device 500, and if both account toggles elements are enabled, multifunction device 511 will transfer both accounts to device 500), the procedure of which will be described below.

Figure 8I:
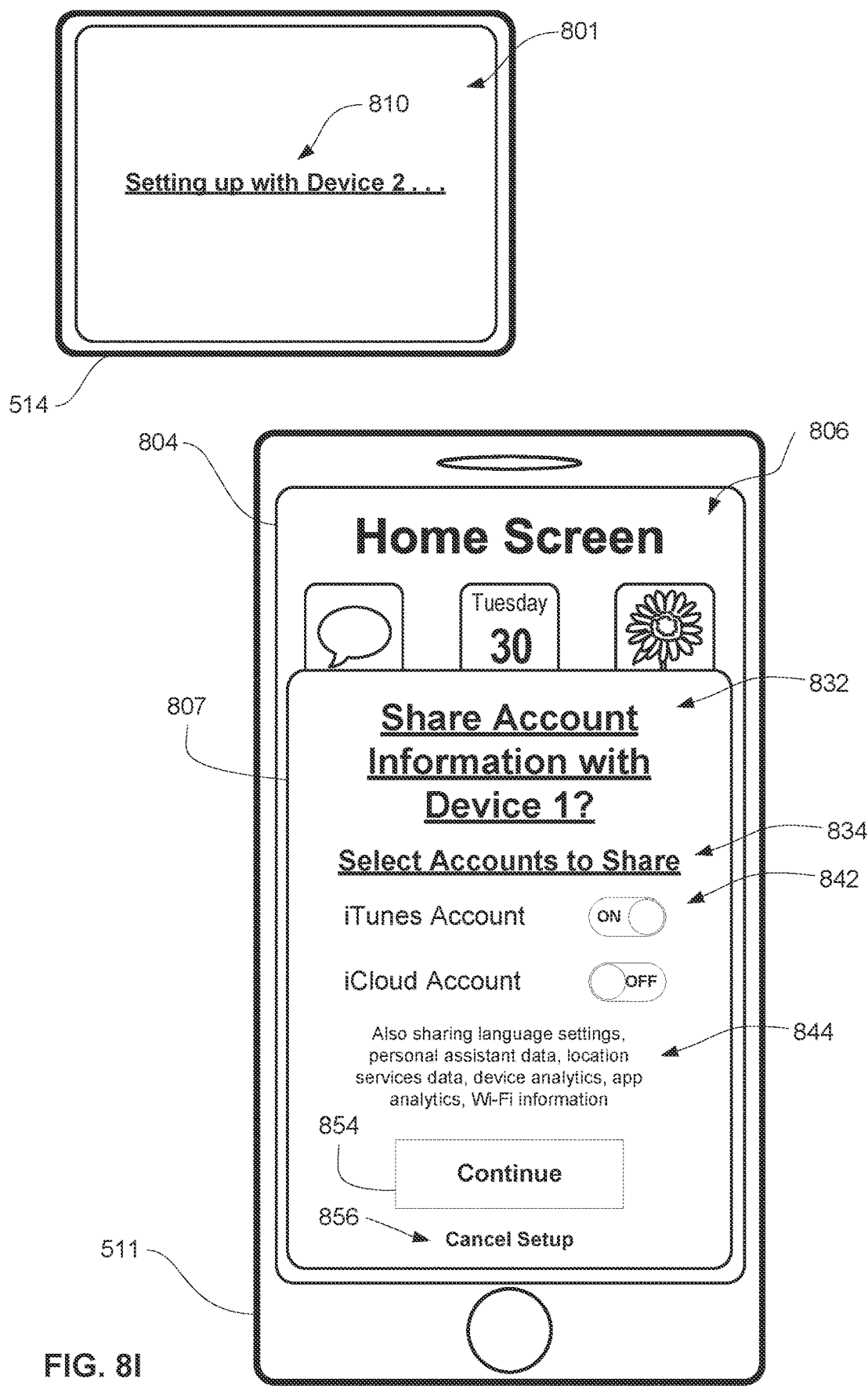
Figure 8J:
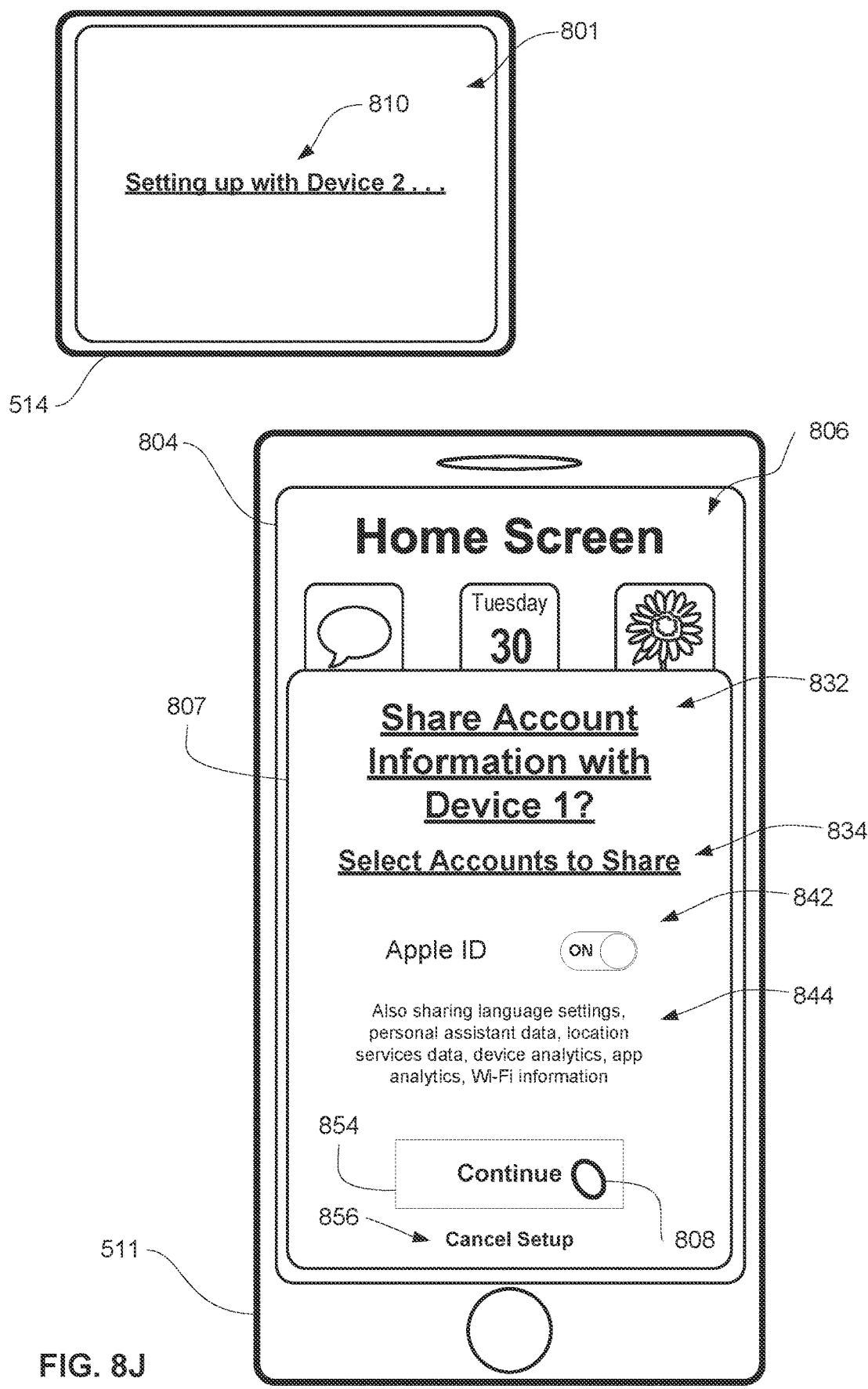

Moving now to FIG. 8J, which illustrates the setup interface described in FIG. 8H, multifunction device 511 detects a tap of contact 808 on touch-sensitive surface 804. As a result, multifunction device 511 will transfer the content access account information to device 511. In some embodiments, transferring the content access account information involves transferring the content access account login credentials (e.g., username and password) and settings associated with the content access account (e.g., language settings, personal assistant data, location services data, device analytics, app analytics, Wi-Fi settings, etc.). In some embodiments, device 500 implements the same settings that were transferred (e.g., device 500 will use the same language settings or connect to the same Wi-Fi networks).

Figure 8K:
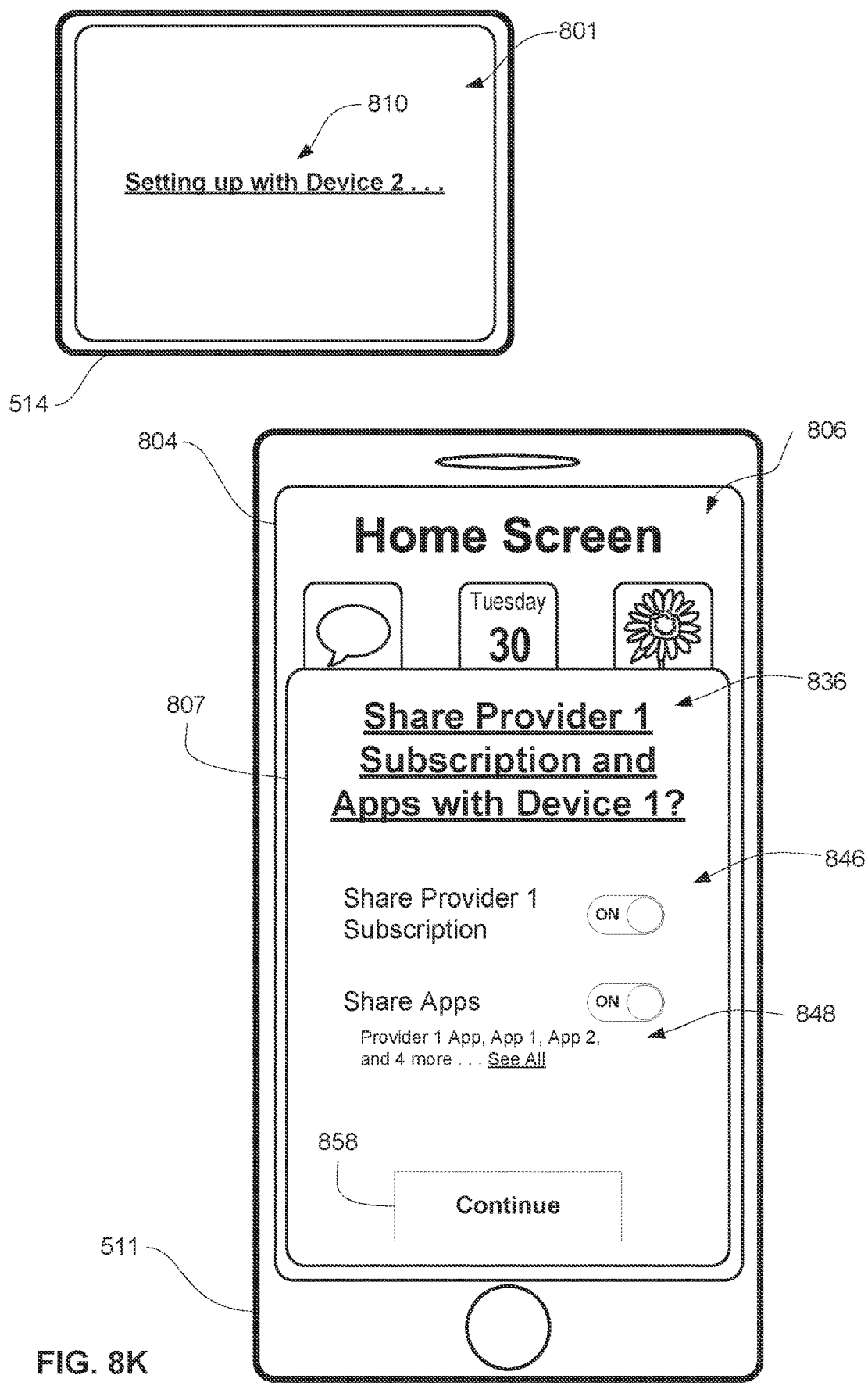
Figure 8L:
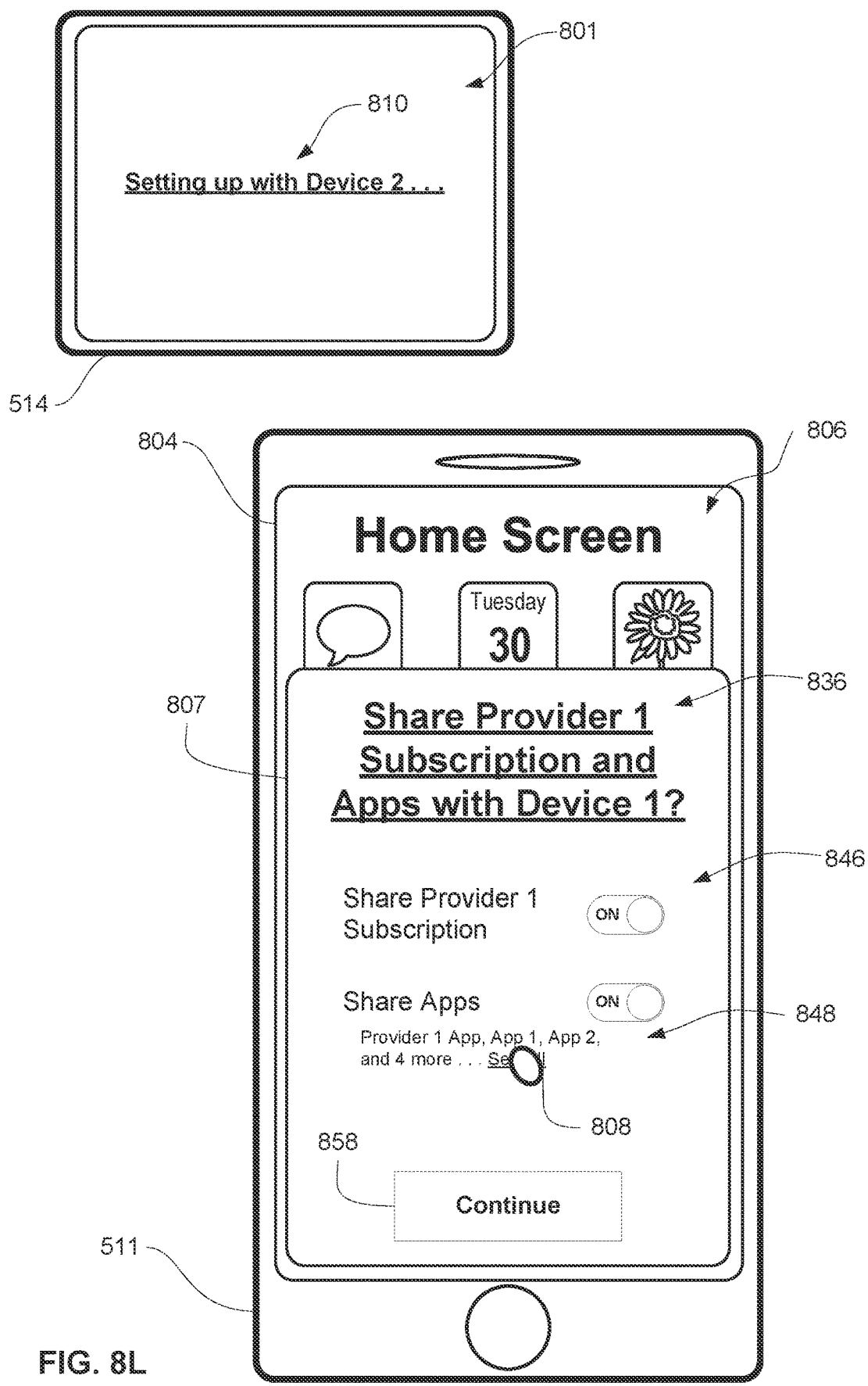
Figure 8M:
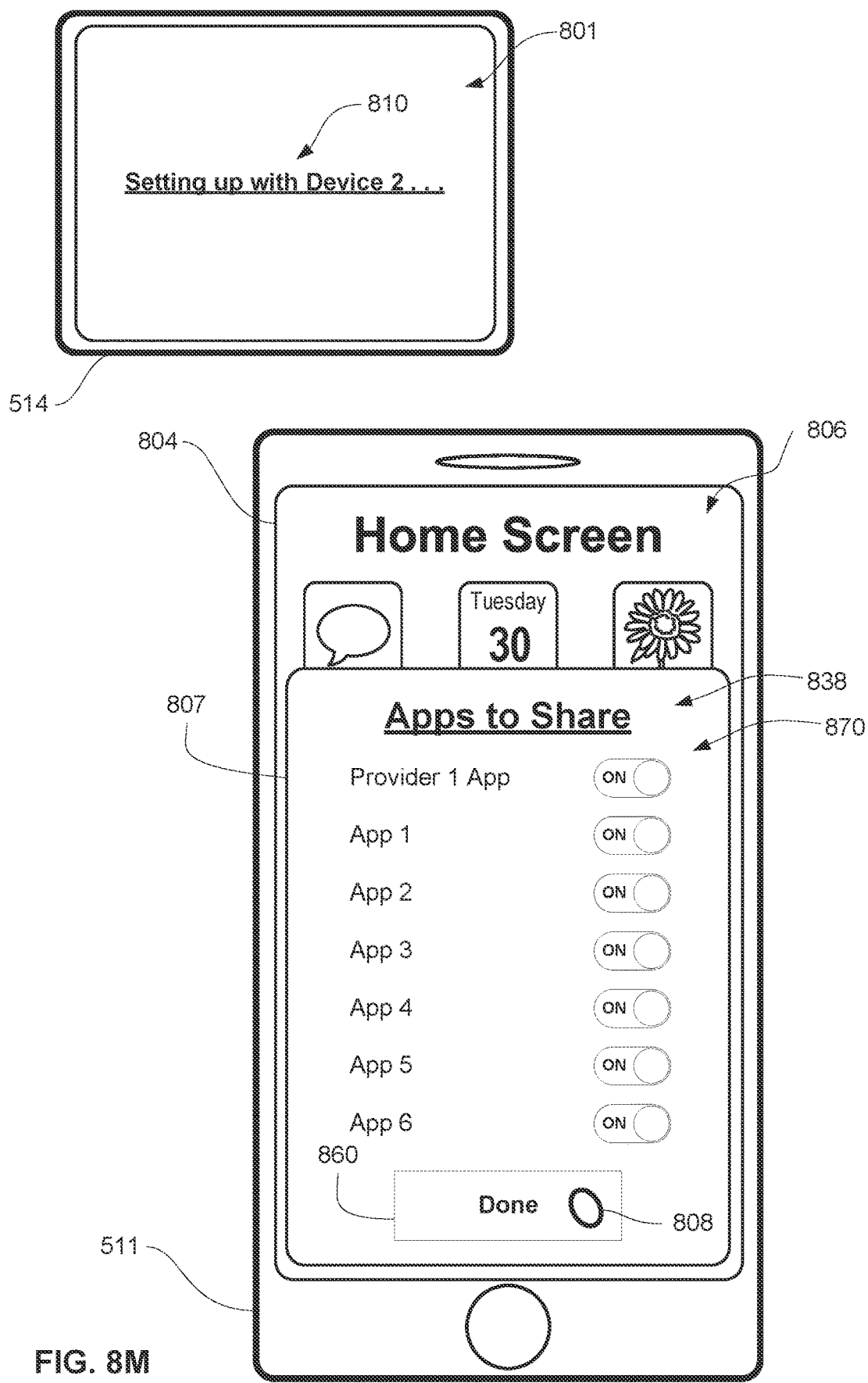

In some embodiments, multifunction device 511 next displays a setup card interface 807 for sharing a primary content provider subscription and associated applications with device 500, as shown in FIG. 8K. In FIG. 8K, setup card interface 807 includes toggle buttons 846 for sharing provider 1 subscription and sharing associated applications, respectively. In some embodiments, setup card interface 807 also includes a list of applications 848 underneath the share application toggle, indicating which applications will be shared with device 500. In some embodiments, the list of applications 848 includes a "See All" selectable link. FIG. 8L illustrates detecting a tap of contact 808 on the "See All" link in the list of applications 848. As a result, setup card interface 807 displays a list of the applications included to be shared with associated toggle buttons for each application in FIG. 8M. A user optionally is able to individually select which applications to share with device 500. Upon detecting a tap of contact 808 on "Done" button 860, setup card interface 807 will return to displaying the interface for sharing a primary content provider subscription and associated applications, as shown in FIG. 8N.

In some embodiments, the applications suggested to be shared are top-used or the most popular secondary content provider applications (e.g., a CBS content application, an HBO content application) that correspond to secondary content providers (e.g., CBS and HBO) that are included in the user's subscription to the primary content provider. For example, if the user's subscription with the primary content provider gives the user access to a first set of secondary content providers, multifunction device 511 optionally suggests a first set of secondary content provider applications to share, and if the user's subscription with the primary content provider gives the user access to a second set of secondary content providers, different from the first set (e.g., more or fewer channels or different channels), multifunction device 511 optionally suggests a second set of secondary content provider applications to share, different from the first set (e.g., more or fewer applications or different applications).

Figure 8N:
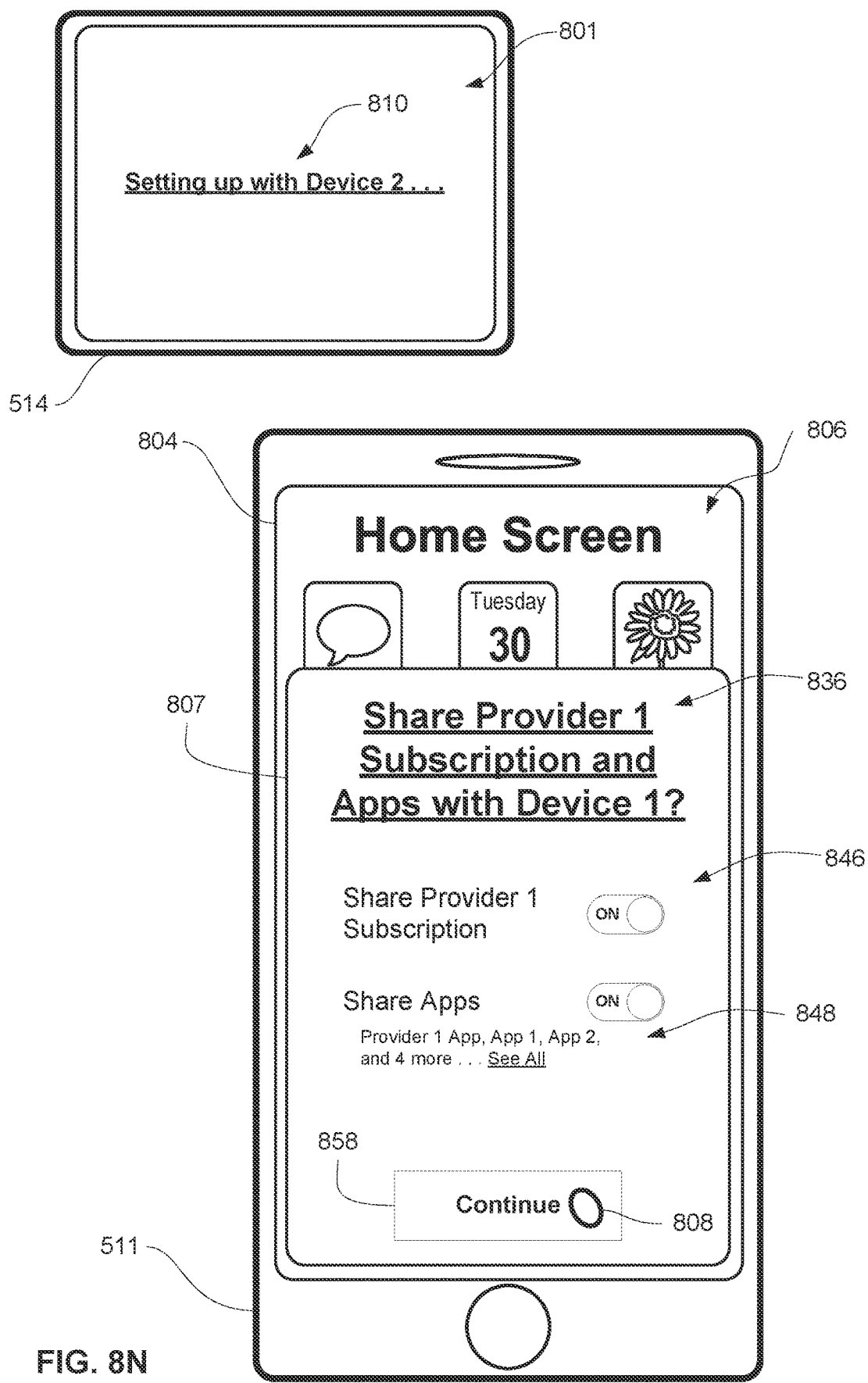

In some embodiments, multifunction device 511 determines the primary content provider suggested for sharing with device 500 in FIG. 8N by the single sign-on feature that is enabled on multifunction device 511. For example, multifunction device 511 optionally enabled single sign-on with a primary content provider (e.g., provider 1). As a result, multifunction device 511 selects the primary content provider associated with the single sign-on feature (e.g., provider 1) for sharing with device 500 on setup card interface 807. In some embodiments, multifunction device 511 contains an authentication token associated with the successful single sign-on authentication with the primary content provider. In some embodiments, transferring the primary content provider subscription involves transferring the authentication token from multifunction device 511 to device 500. In some embodiments, transferring the primary content provider subscription involves transferring the user credential for the primary content provider (e.g., login and password) to device 500 and device 500 performs its own authentication and creation of the authentication token.

In some embodiments, sharing applications with device 500 involves installing applications on device 500. In some embodiments, application bundles are transferred from multifunction device 511 to device 500 (e.g., if the applications are installed on multifunction device 511), installation packages are transferred from multifunction device 511 to device 500 (e.g., optionally transferring installation packages that are stored on multifunction device 511 or multifunction device 511 downloads the installation packages from an applications store and transfers them to device 500), or optionally multifunction device 511 sends a command to device 500 for device 500 to download and install the applications from an applications store (e.g., iTunes). In some embodiments, settings for setup and usage of the shared applications are additionally transferred to device 500.

Figure 8O:
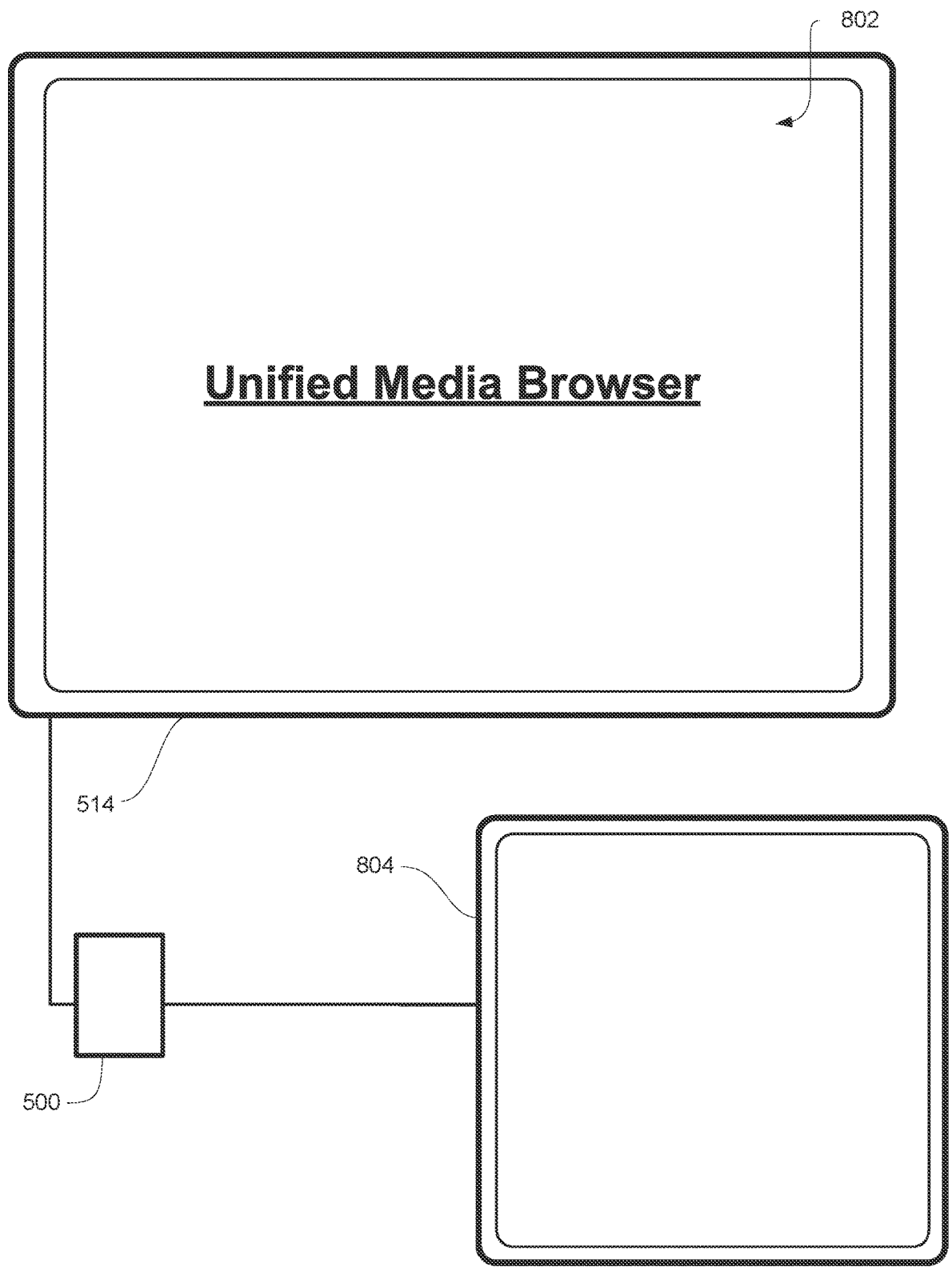
Figure 8P:
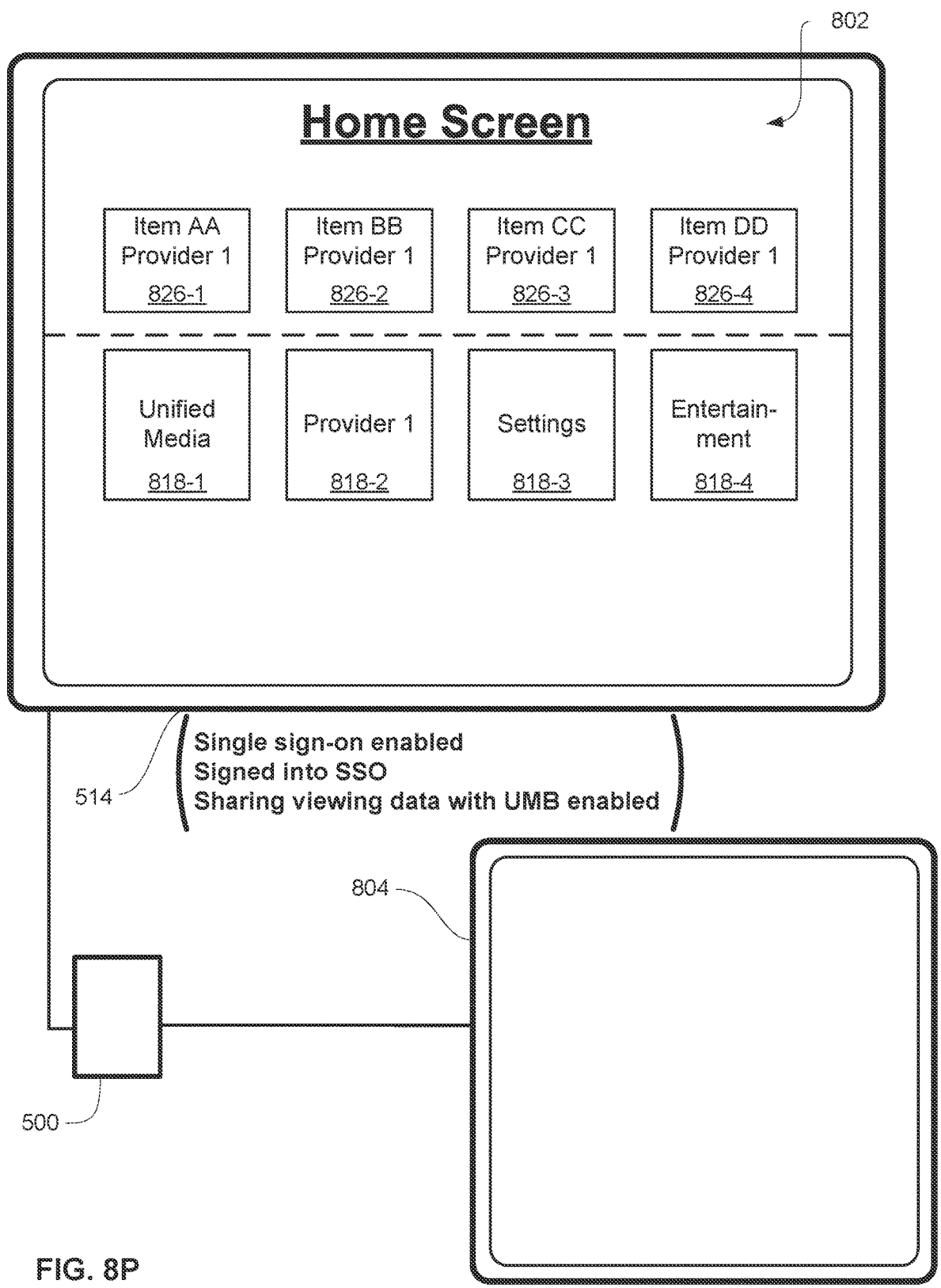

After multifunction device 511 transfers provider 1 subscription and applications to device 500, express setup optionally concludes. Upon conclusion of express setup, device 500 optionally launches and displays, on display 514, the unified media browser application, as shown in FIG. 8O. In some embodiments, as shown in FIG. 8P, as a result of the setup process, device 500 installed the provider 1 application, installed the shared applications, enabled single sign-on (e.g., authorized device 500 with provider 1), signed the one or more applications into the single sign-on (e.g., granted access to the single sign-on authentication to the provider 1 application), and enabled sharing viewing data of the provider 1 application and of the installed suggested applications with the unified media browsing application (as described in more detail in FIGS. 6T-6U and method 700). In some embodiments, device 500 creates an Entertainment folder (represented by icon 818-4) and installed the shared applications within the folder. For example, a user is able to select icon 818-4 and with a click input, reveal the contents of the Entertainment folder, similar to that described in FIG. 6V. In FIG. 8P, the provider 1 application (represented by icon 818-2) is installed in a prioritized location on user interface 802 and not located in the Entertainment folder.

Figure 8Q:
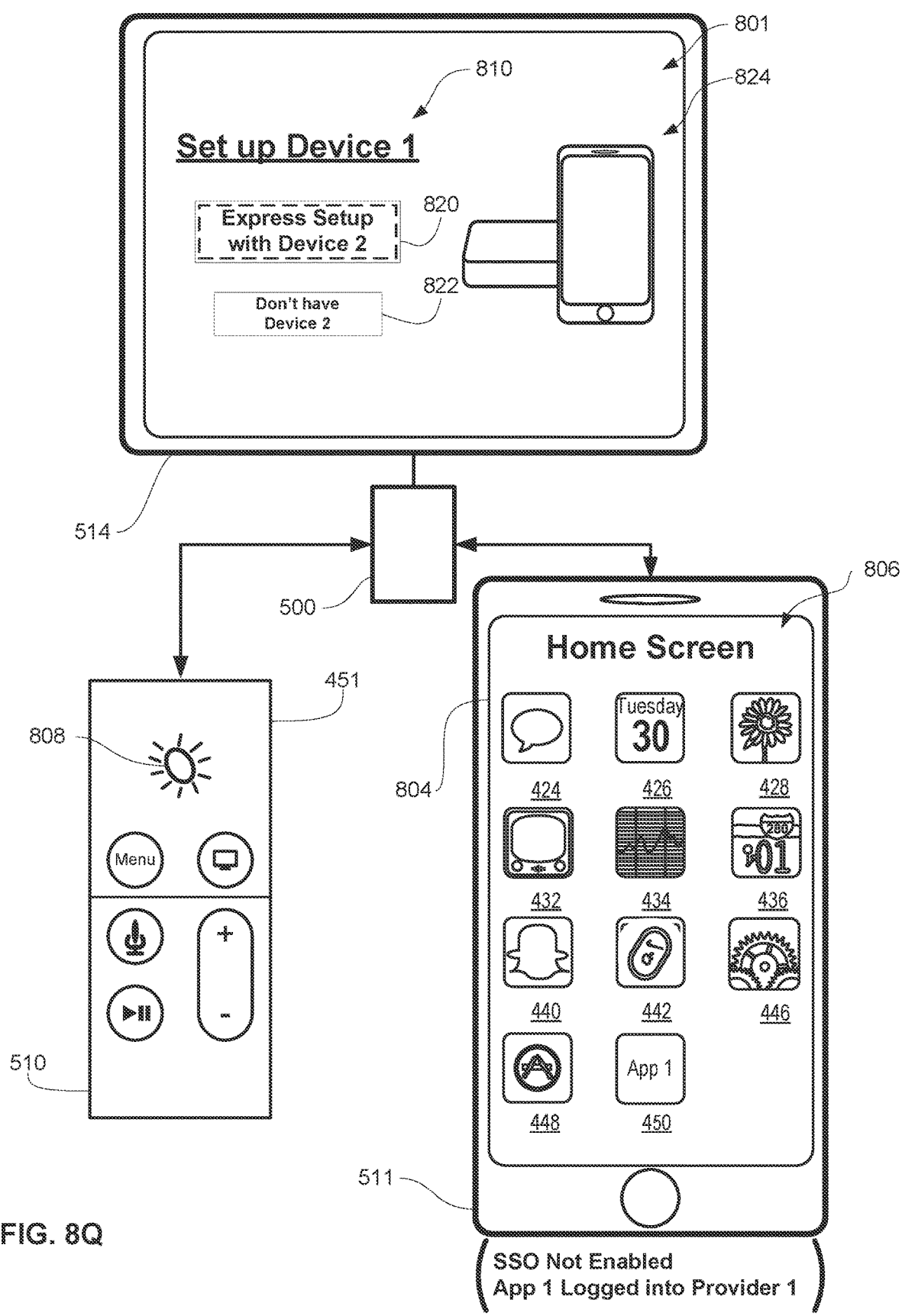
Figure 8R:
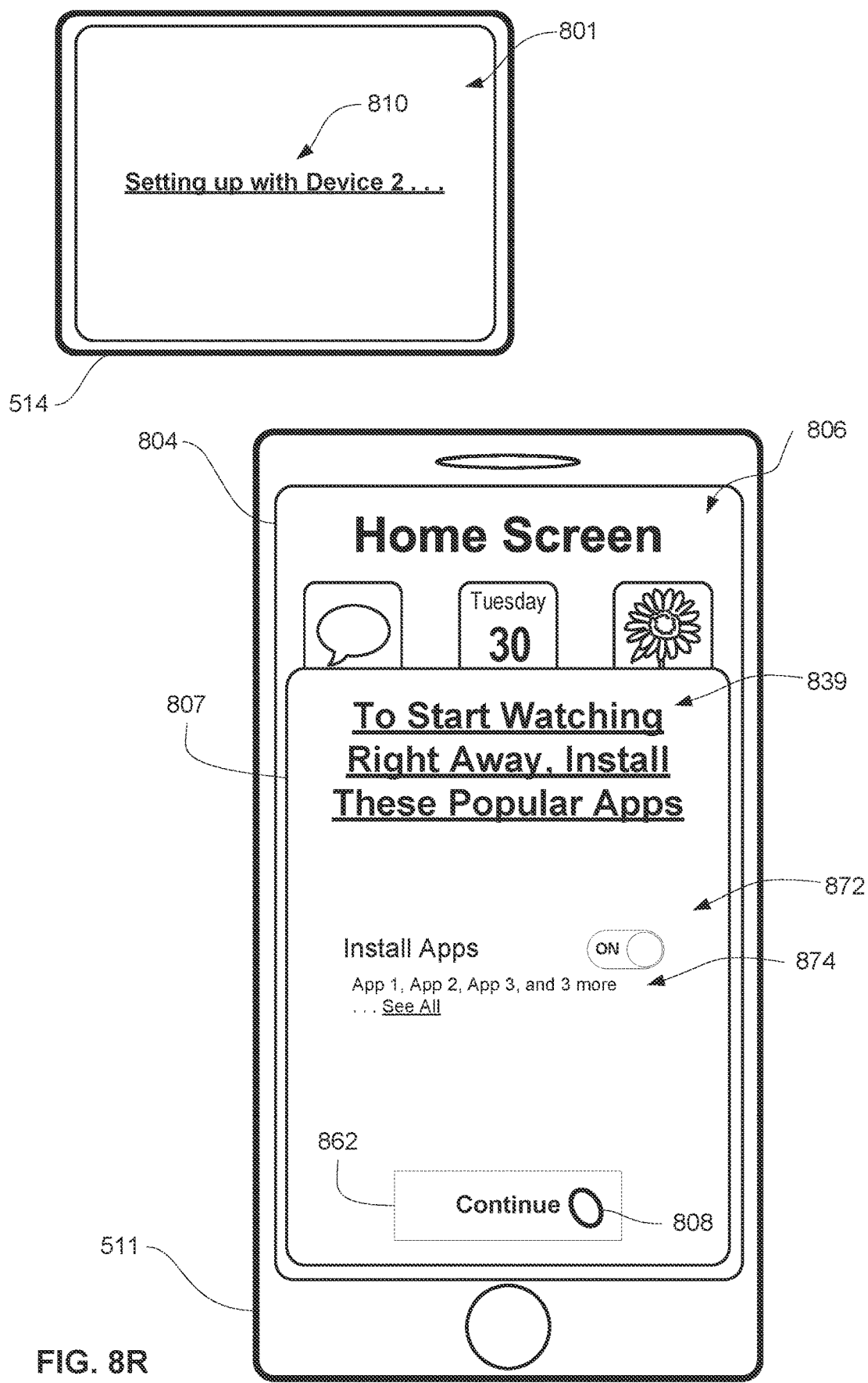
Figure 8S:
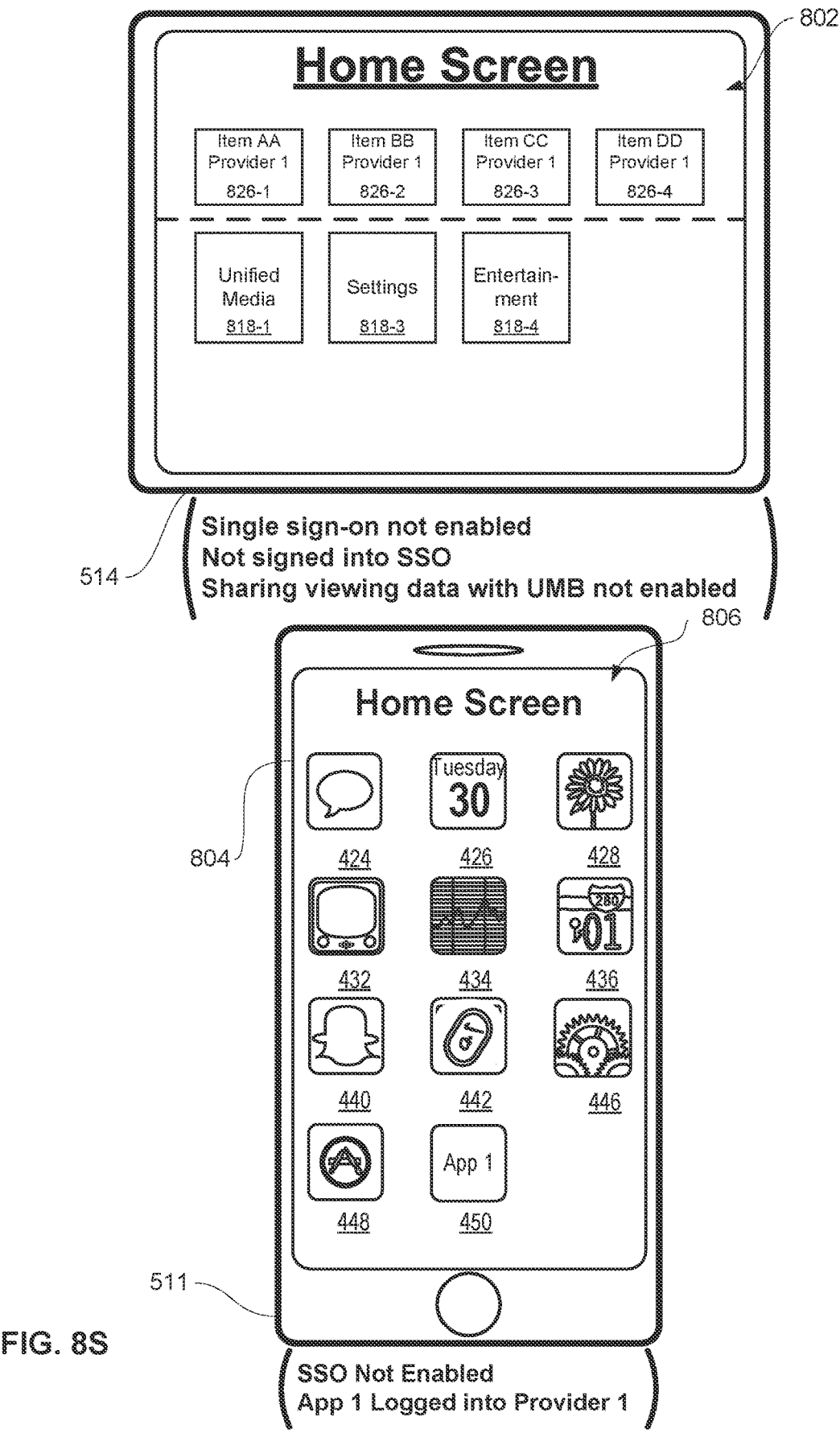

FIGS. 8Q-8S illustrate another exemplary express setup process in which single sign-on is not enabled on multifunction device 511, but multifunction device 511 includes an application (e.g., application 1) that is individually authenticated using the user's credentials with a primary content provider (illustrated by icon 450). In FIG. 8Q, a click input of contact 808 is detected on touch-sensitive surface 451 of remote control 510 while express setup button 820 is highlighted. In response, device 500 optionally begins the express setup procedure. After the multifunction device 511 is paired with device 500 (e.g., in a procedure similar to that described in FIG. 8E), multifunction device 511 optionally displays express setup card 807 in FIG. 8Q. In some embodiments, the express setup card suggests a number of applications to install on device 500, as shown in FIG. 8Q. In some embodiments, the suggested applications are not associated with the primary content provider. The suggested applications are optionally the most popular content applications on the iTunes store (by Apple Inc. of Cupertino, California) without regard to the user's subscription with the primary content provider. In some embodiments, the user is able to actuate toggle 872 to disable installing applications on device 500. The user is optionally also able to select the "See all" link in the list of applications 874 to display an interface with list of suggested applications to install, similar to that described in FIGS. 8L-8M. In FIG. 8R, multifunction device 511 detects a tap of contact 808 on "Continue" button 862, indicating a desire to install the suggested applications and complete setup.

In some embodiments, as shown in FIG. 8S, as a result of the setup process, device 500 installed the shared applications (but does not install the provider 1 application), but did not enable single sign-on (e.g., authorized device 500 with provider 1), sign the one or more applications into the single sign-on (e.g., granted access to the single sign-on authentication to the provider 1 application), nor enable sharing viewing data for the installed shared applications with the unified media browsing application. In some embodiments, device 500 creates an Entertainment folder (represented by icon 818-4) and installed the shared applications within the folder. For example, a user is able to select icon 818-4 and with a click input, reveal the contents of the Entertainment folder, similar to that described in FIG. 6V.

Figure 8T:
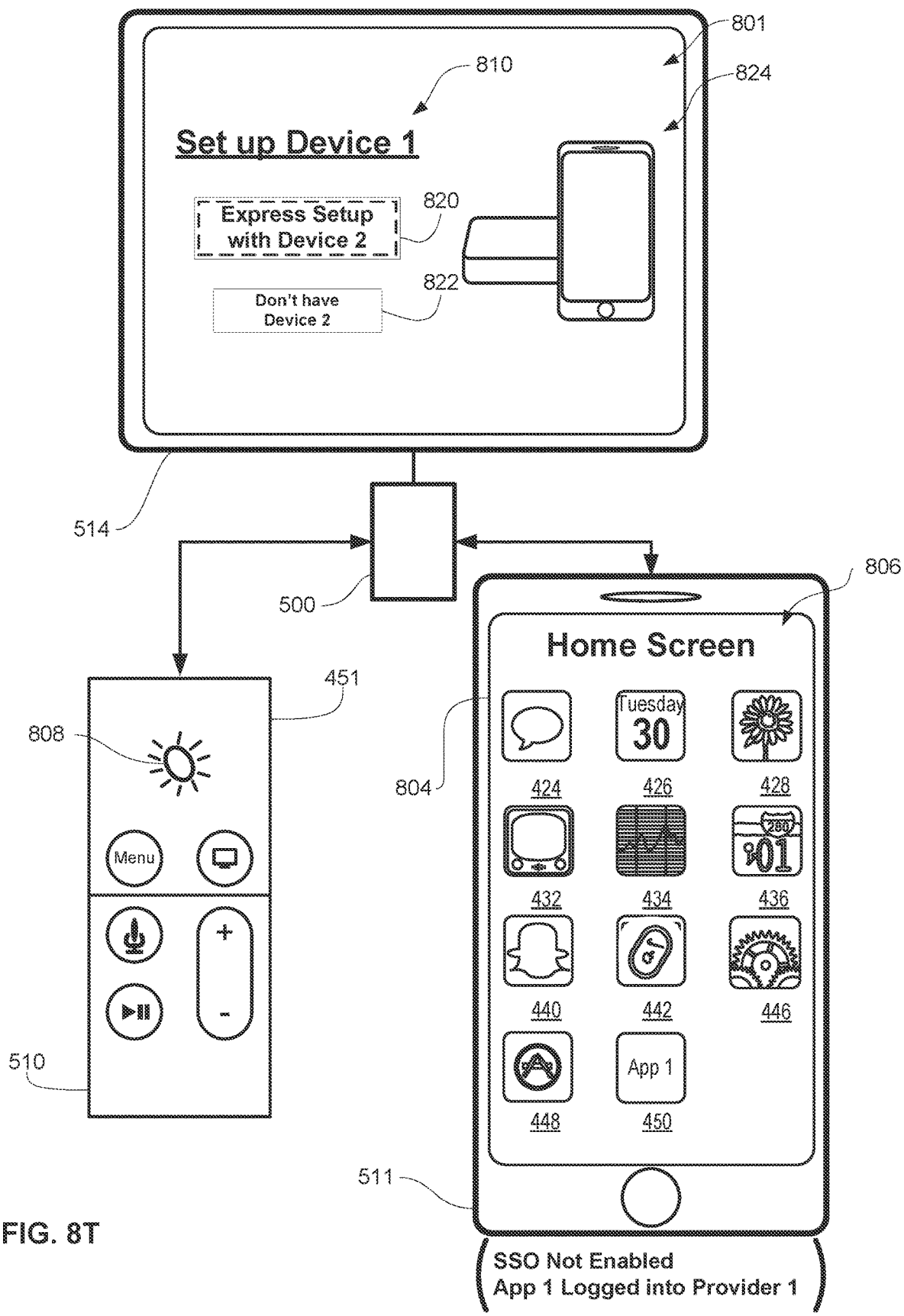
Figure 8U:
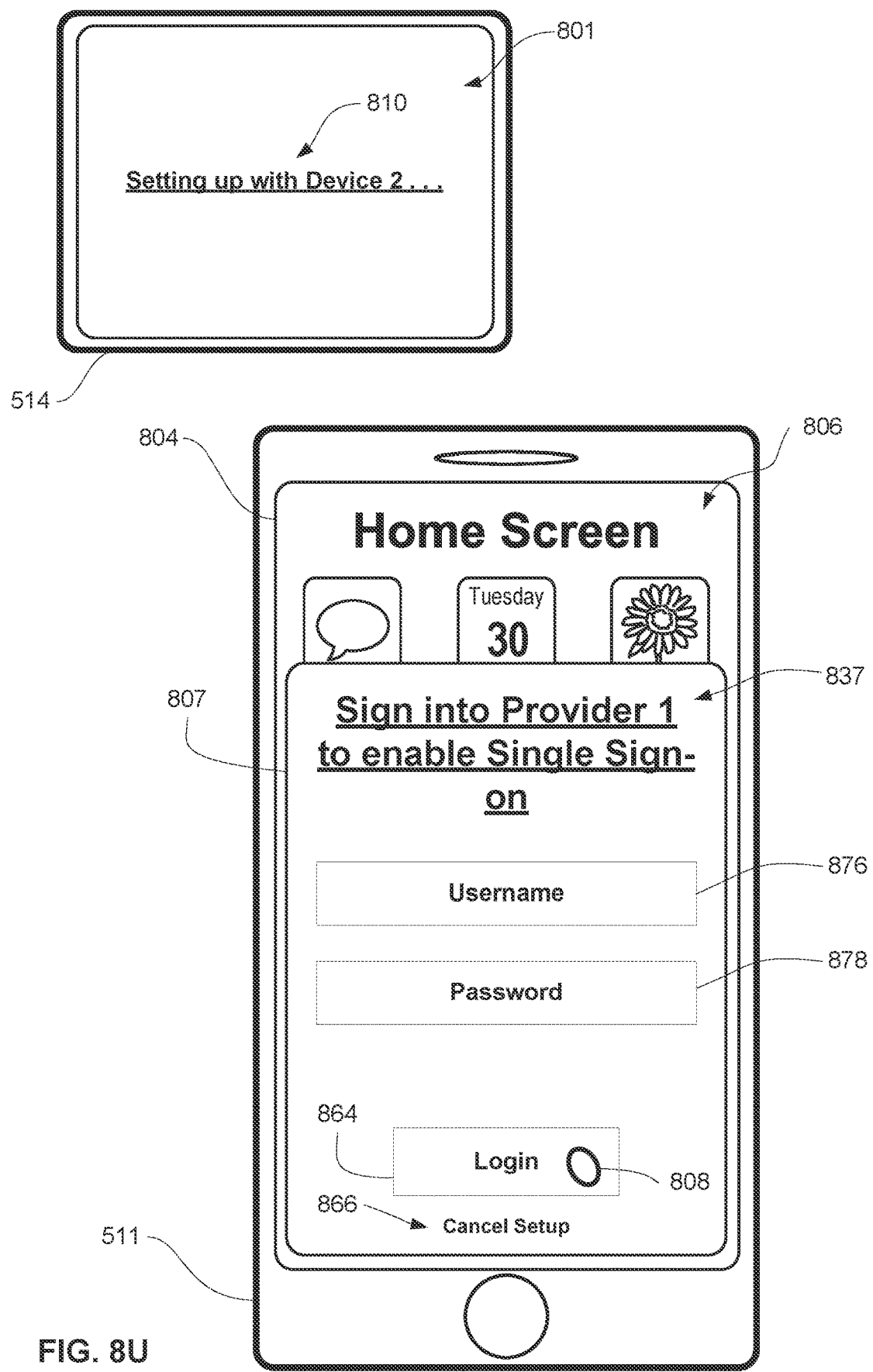

FIGS. 8T-8Z illustrate another exemplary express setup process in which single sign-on is not enabled on multifunction device 511, but multifunction device 511 includes an application (e.g., application 1) that is individually authenticated using the user's credentials with a primary content provider (illustrated by icon 450). In FIG. 8T, a click input of contact 808 is detected on touch-sensitive surface 451 of remote control 510 while express setup button 820 is highlighted. In response, device 500 optionally begins the express setup procedure. After the multifunction device 511 is paired with device 500 (e.g., in a procedure similar to that described in FIG. 8E), multifunction device 511 optionally displays express setup card 807 in FIG. 8U. In FIG. 8U, express setup card 807 providers a login interface to sign into the primary content provider (e.g., provider 1). The login interface optionally includes a username field 876 and password field 878 for the user to enter credentials for the primary content provider. The login interface optionally includes a login button 864 and an exit button 866. Upon detecting a tap of contact 808 on "Login" button 864, the multifunction device 511 optionally verifies the user provided credentials with the primary content provider (if correct).

Figure 8V:
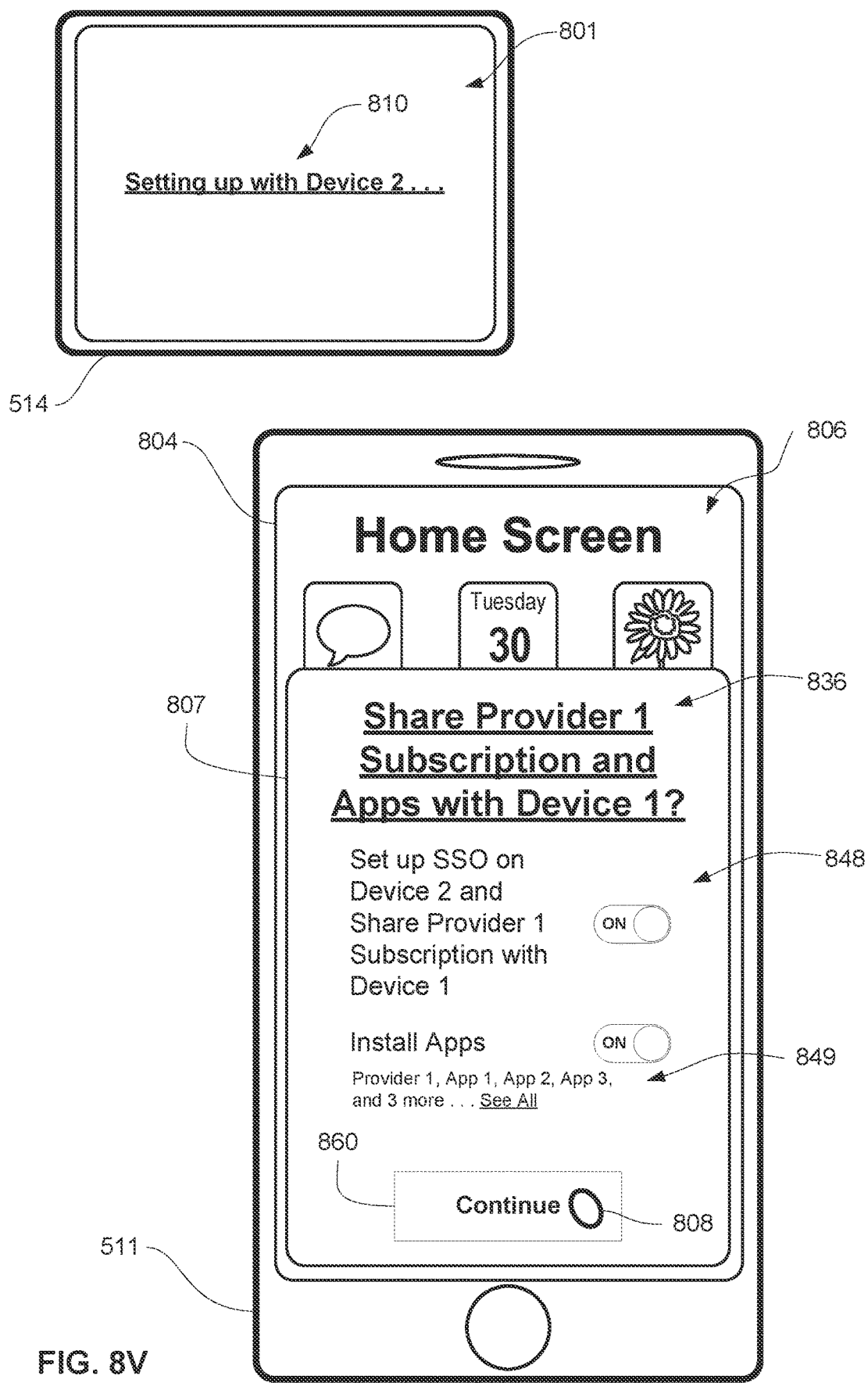

In response to verifying the user's credentials with the primary content provider (e.g., provider 1), express setup card 807 displays the subscription and application sharing interface in FIG. 8V. For example, in FIG. 8V, express setup card 807 includes a toggle for enabling setting up single sign-on for provider 1 on both device 500 and multifunction device 511 and a toggle for installing suggested applications. As a result of enabling the toggle for setting up single sign-on for both device 500 and multifunction device 511, multifunction device 511 optionally will authorize itself with provider 1 (e.g., enable single sign-on), and device 500 optionally will also authorize with provider 1 (e.g., enable single sign-on), resulting in both devices being authorized with provider 1. In some embodiments, each device performs their own authorizations independently of the other device or optionally one device performing an authorization and transferring the authorization to the other device (such as that described above in FIG. 8N). In some embodiments, as a result of enabling single sign-on, multifunction device 511 and device 500 will grant access to the single sign-on authentication to any applications installed on the respective devices that are included in the user's subscription with provider 1.

Figure 8W:
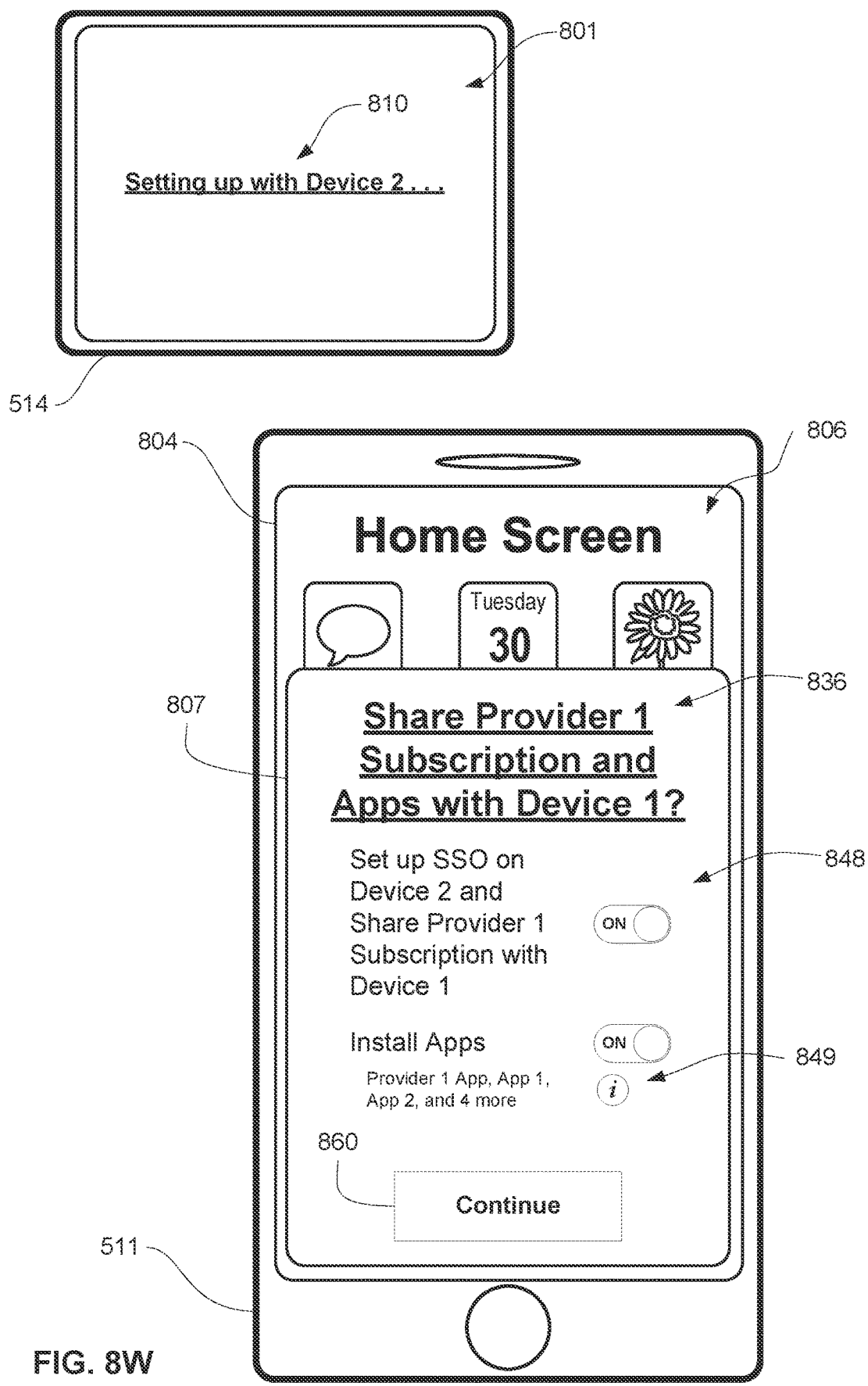
Figure 8X:
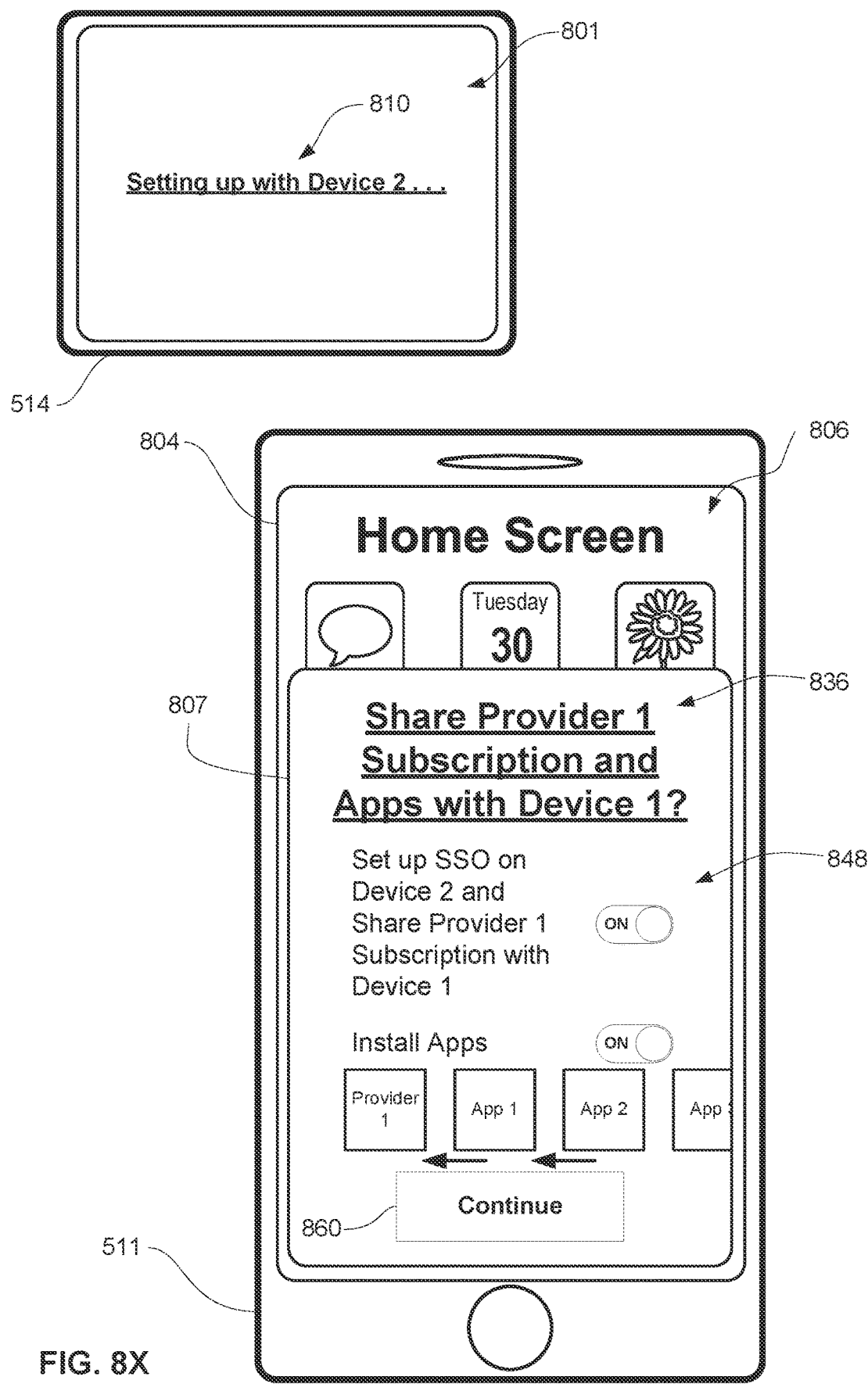
Figure 8Y:
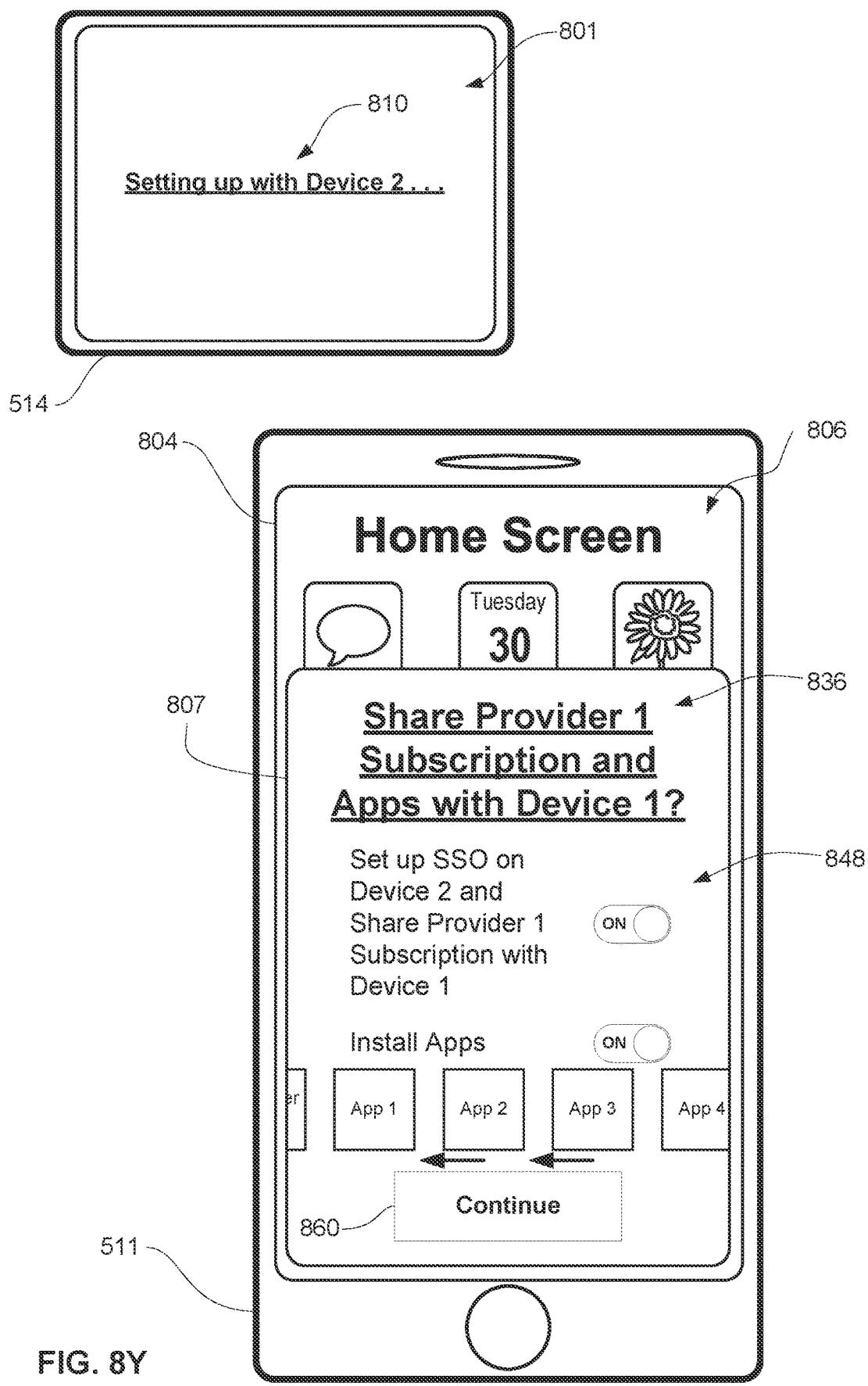

FIG. 8W illustrates an exemplary alternative express setup card 807 for the subscription and application sharing interface. In FIG. 8W, the list of suggested applications includes an information icon 849 (e.g., instead of a "See All" Link). Activation of the information icon 849 triggers display of an application interface similar to that described in FIG. 8M. FIGS. 8X-8Y illustrate yet another exemplary alternative express setup card 807 for the subscription and application sharing interface. In FIG. 8X, the list of suggested applications include a marquee of icons (e.g., logos, pictures, etc.) representing the applications suggested for installation. The marquee of icons optionally automatically move from right to left (or optionally from left to right), as displayed in FIG. 8Y. In some embodiments, the user is able to perform a left-to-right swipe or right-to-left swipe to scroll through the representations of suggested applications.

Figure 8Z:
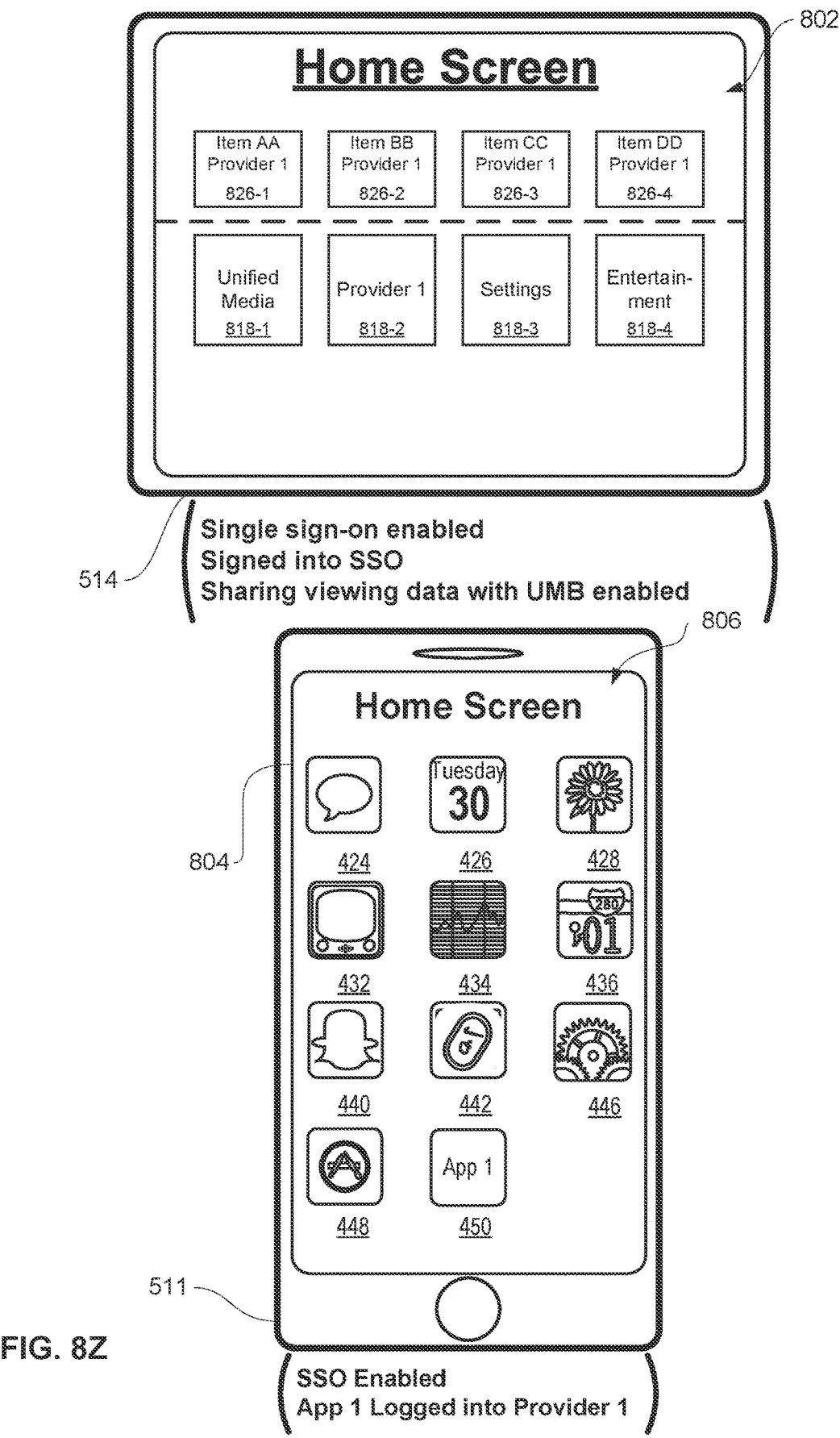
Figure 8A:
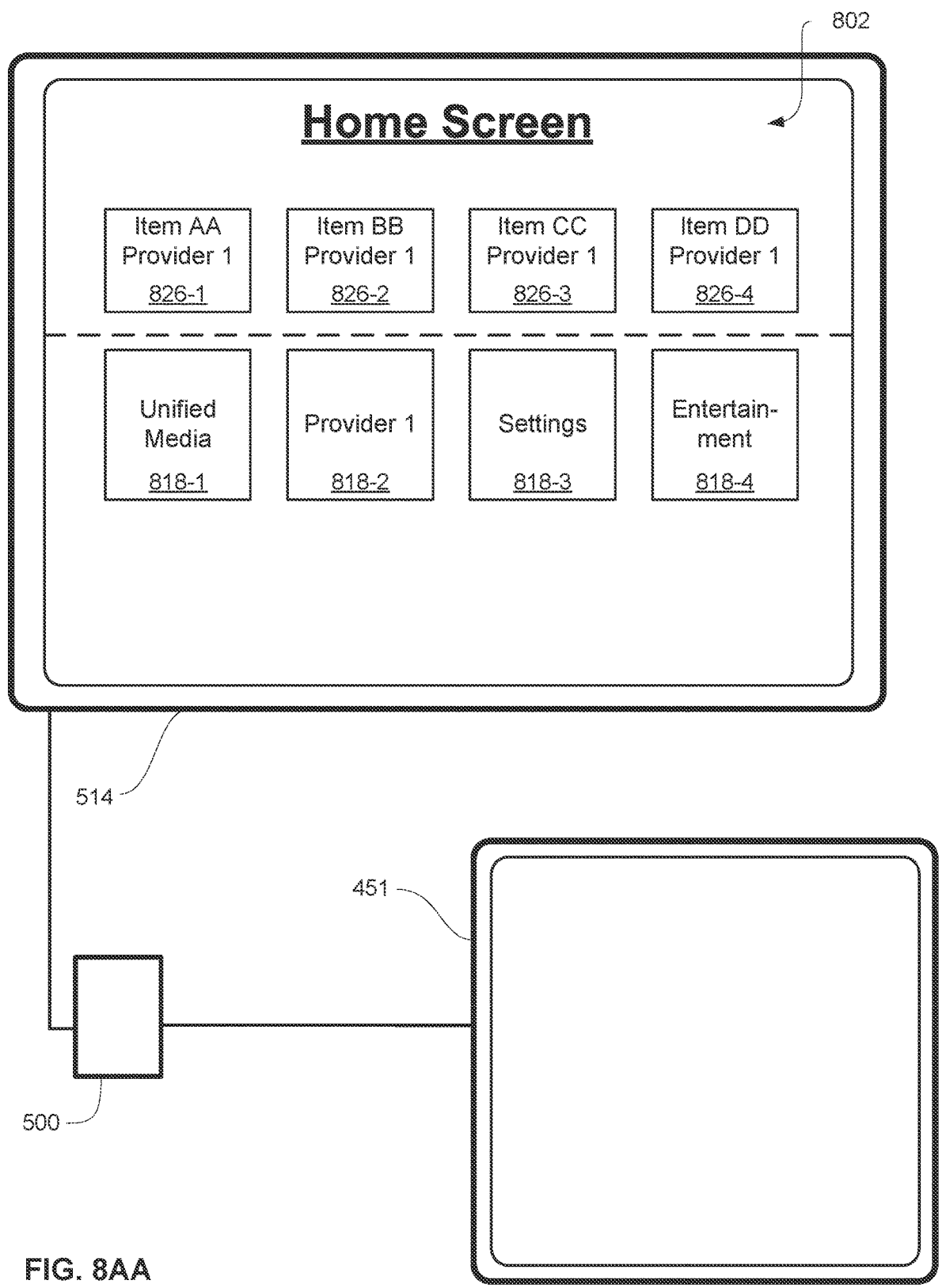
Figure 8B:
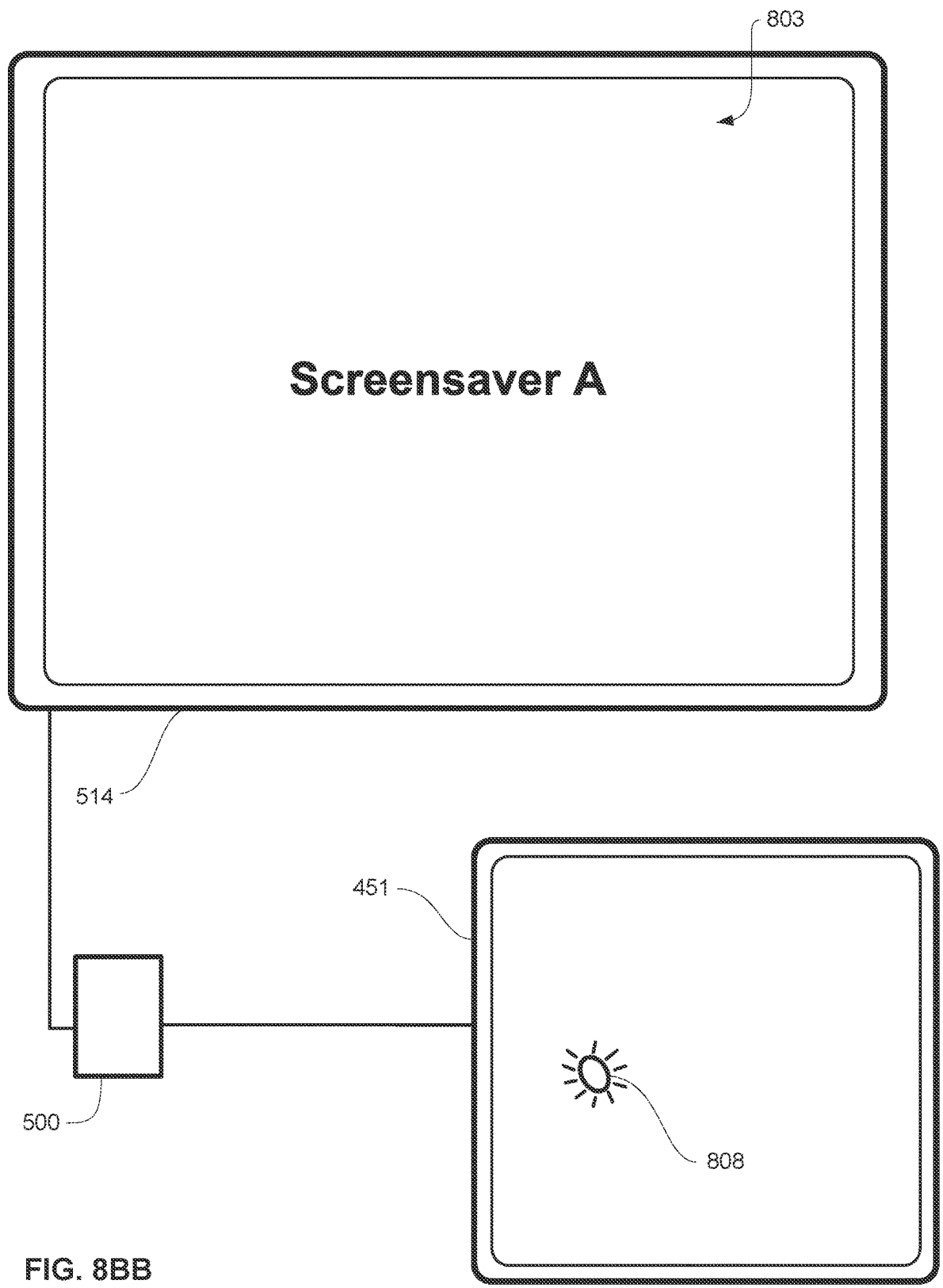
Figure 8C:
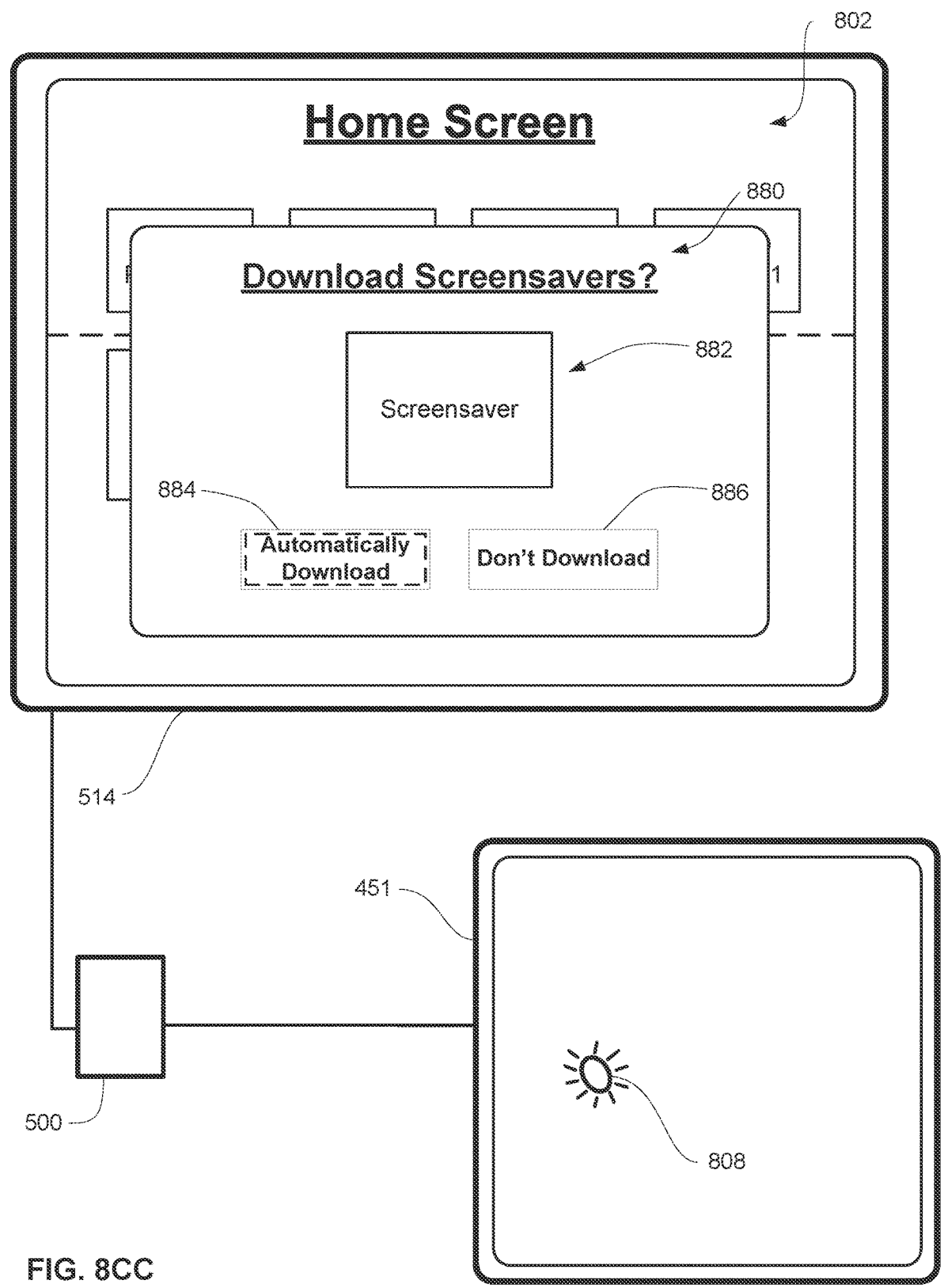
Figure 8D:
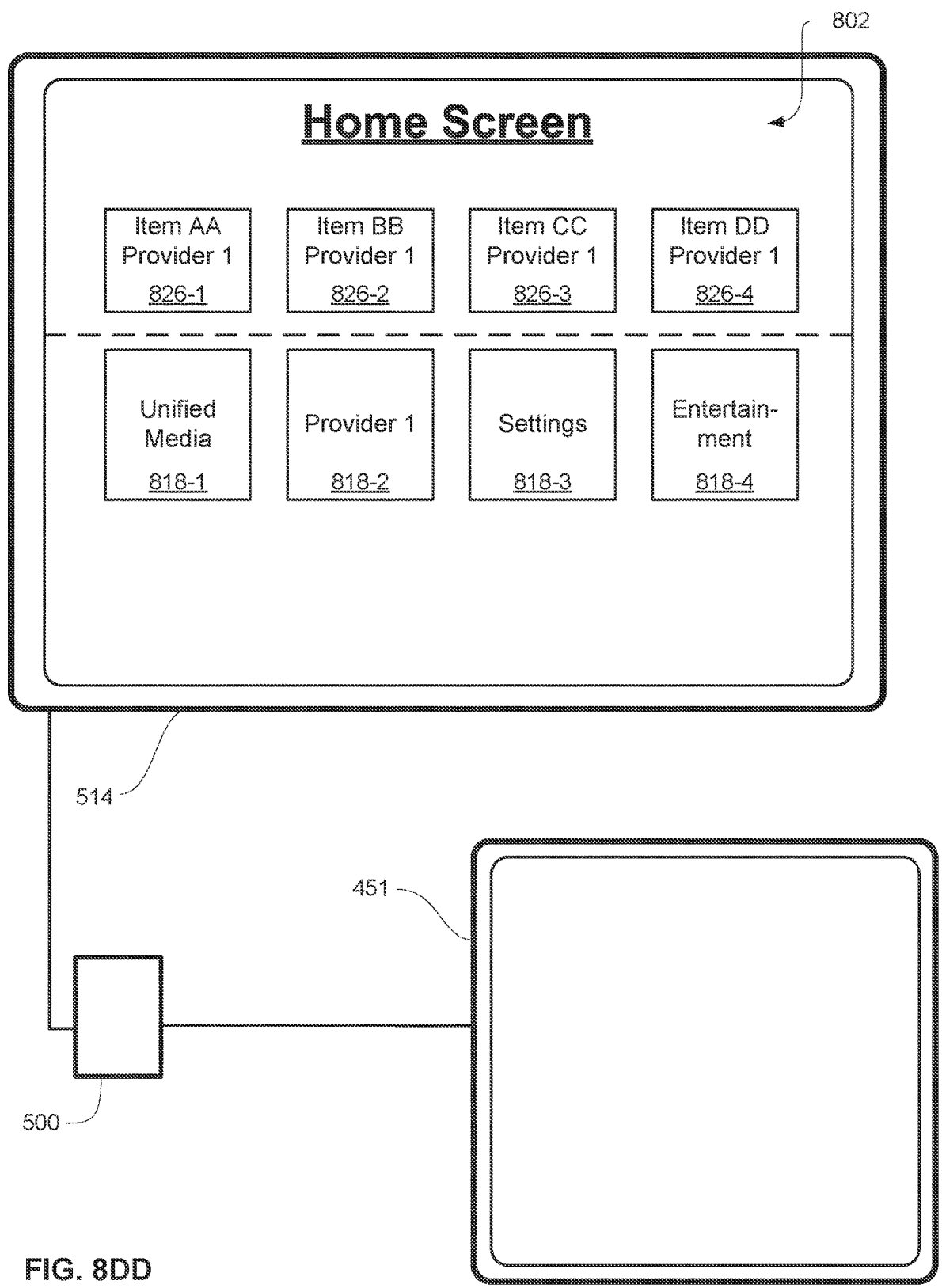
Figure 9A:
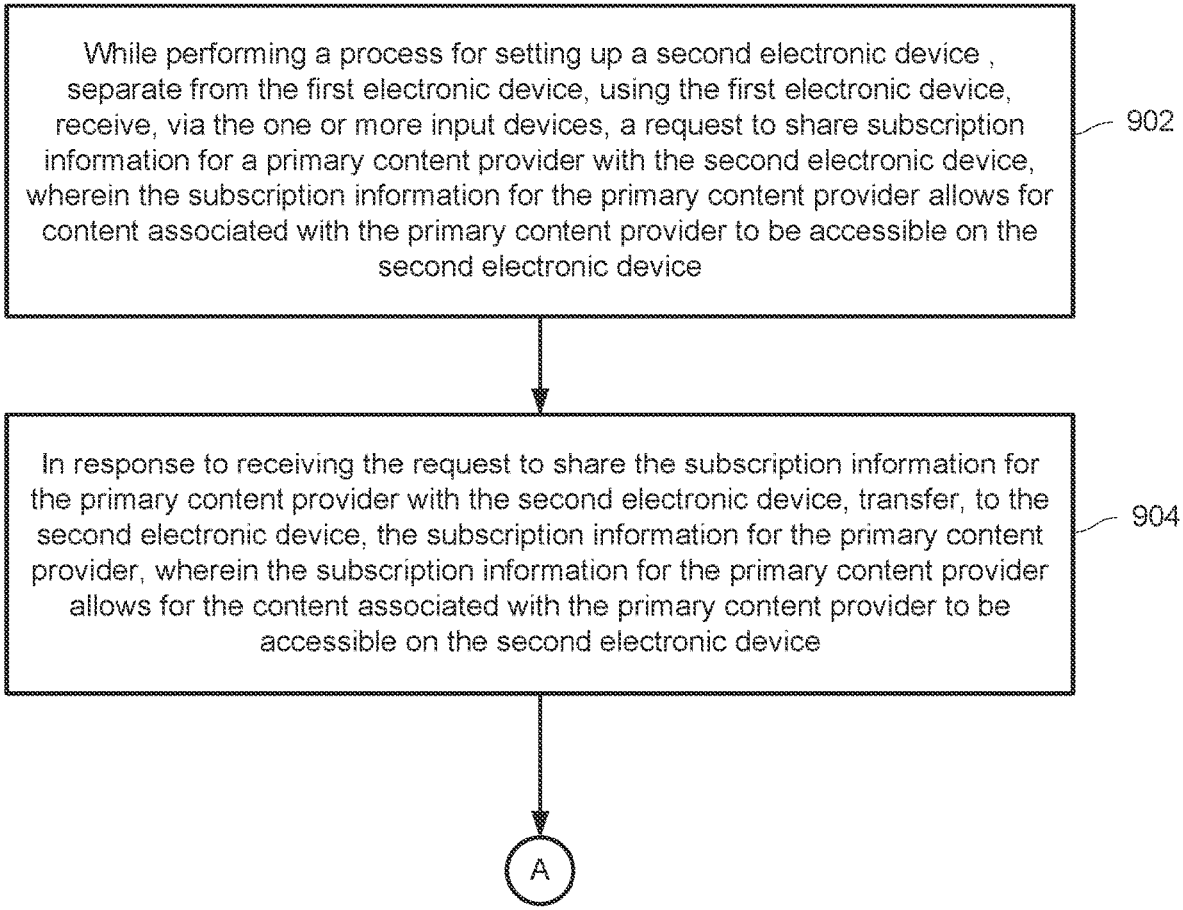
FIGS. 9A-9F are flow diagrams illustrating a method of facilitating transferring settings and information from another electronic device during device setup in accordance with some embodiments of the disclosure.
Figure 9B:
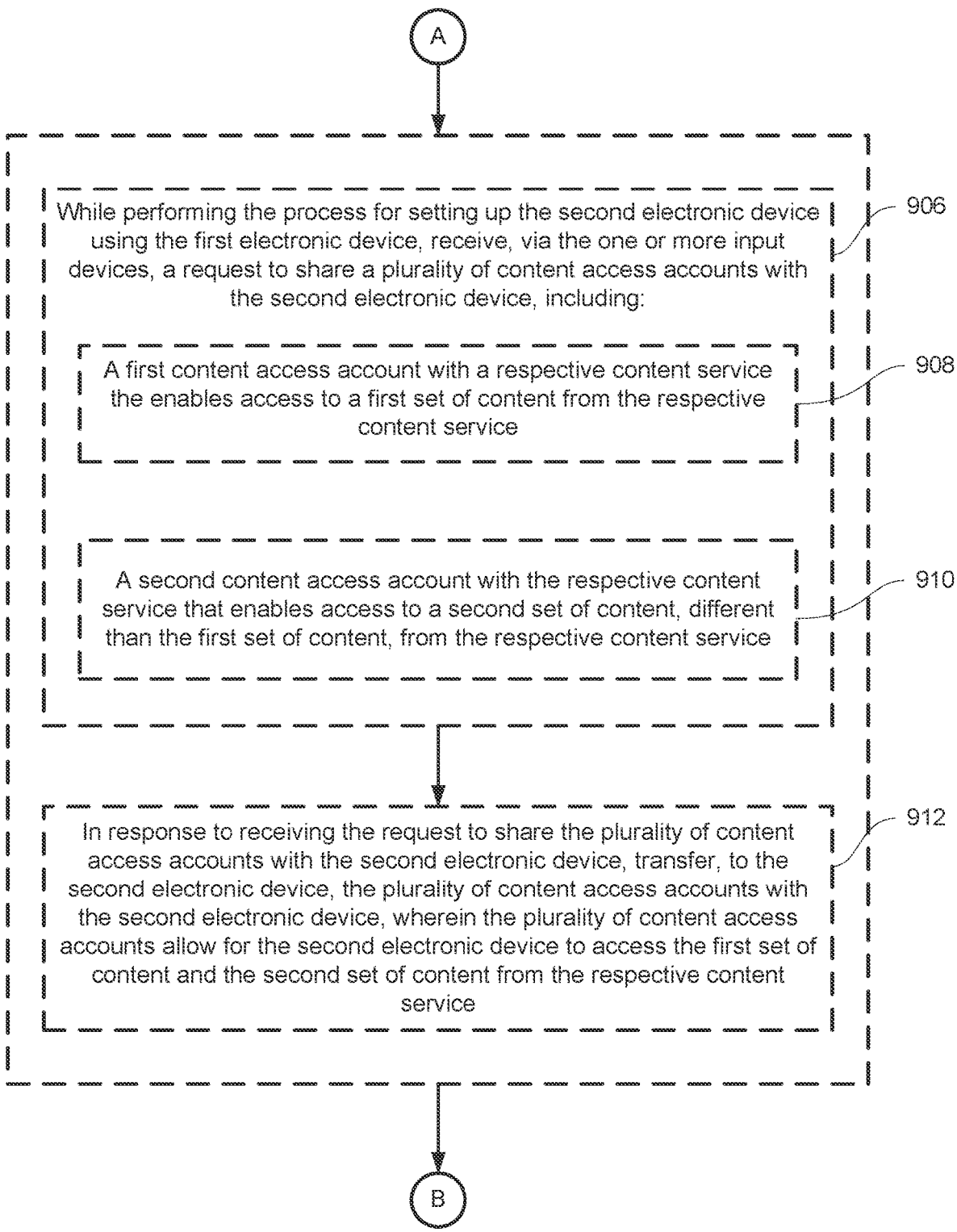
Figure 9C:
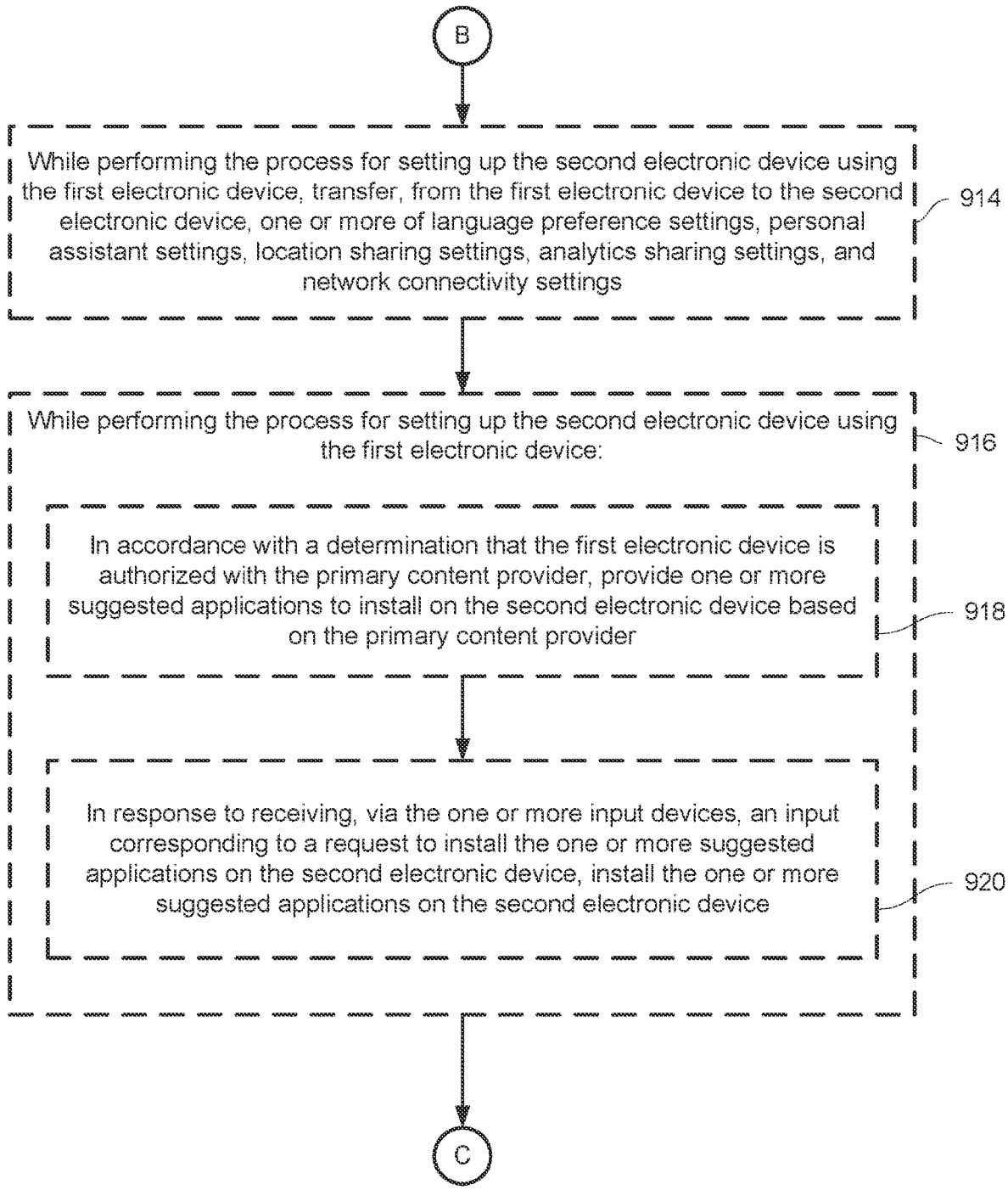
Figure 9D:
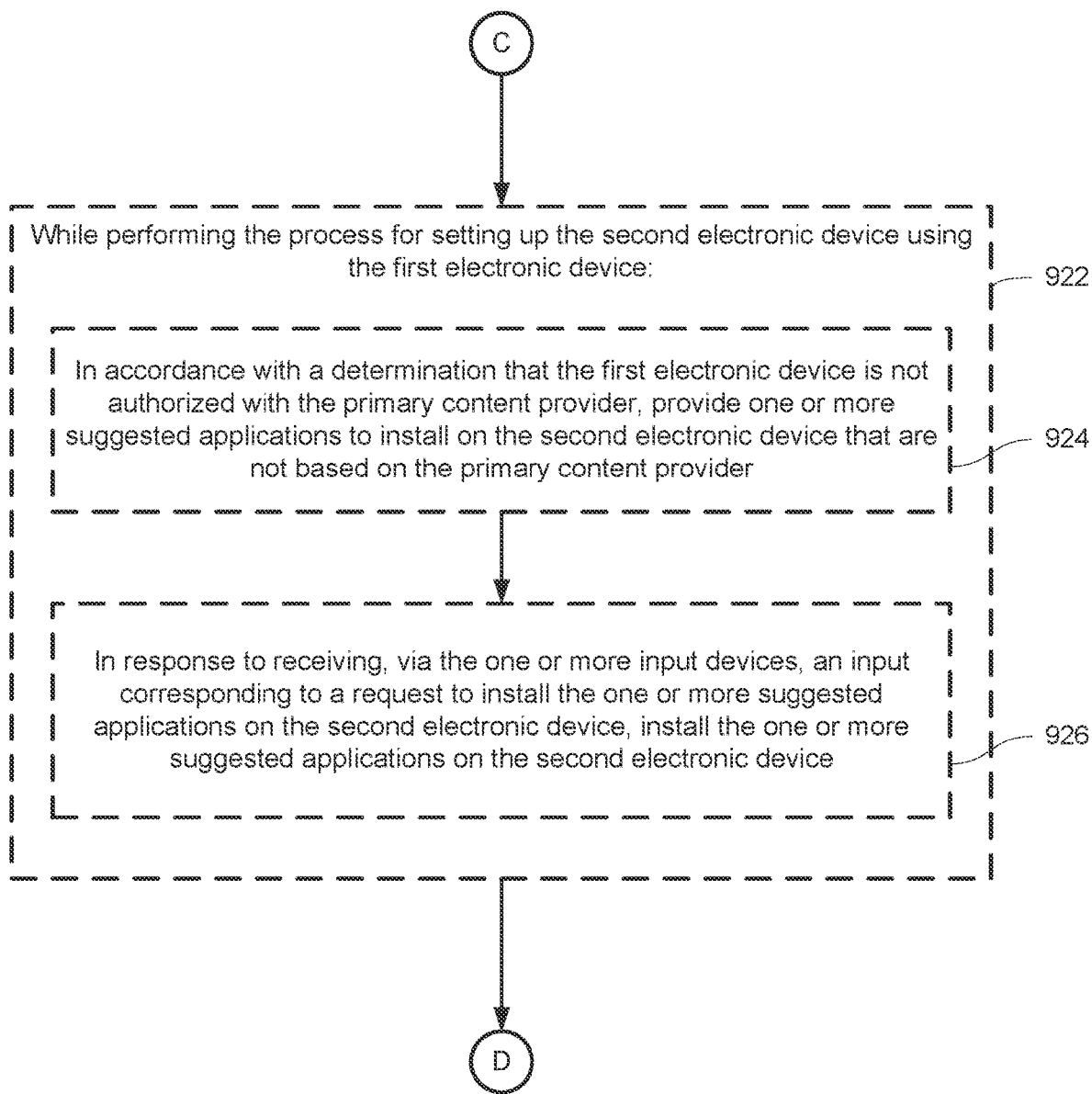
Figure 9E:
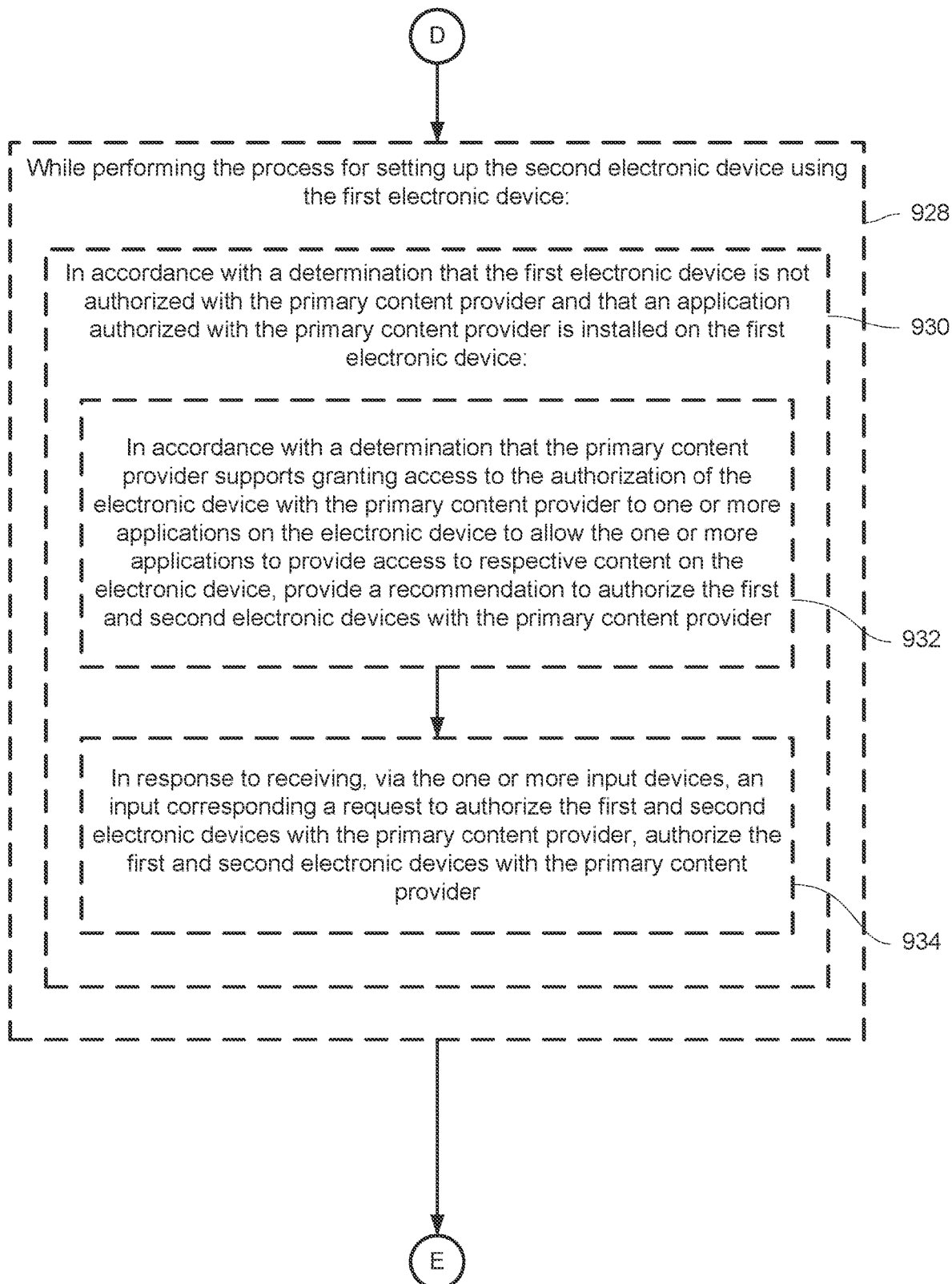
Figure 9F:
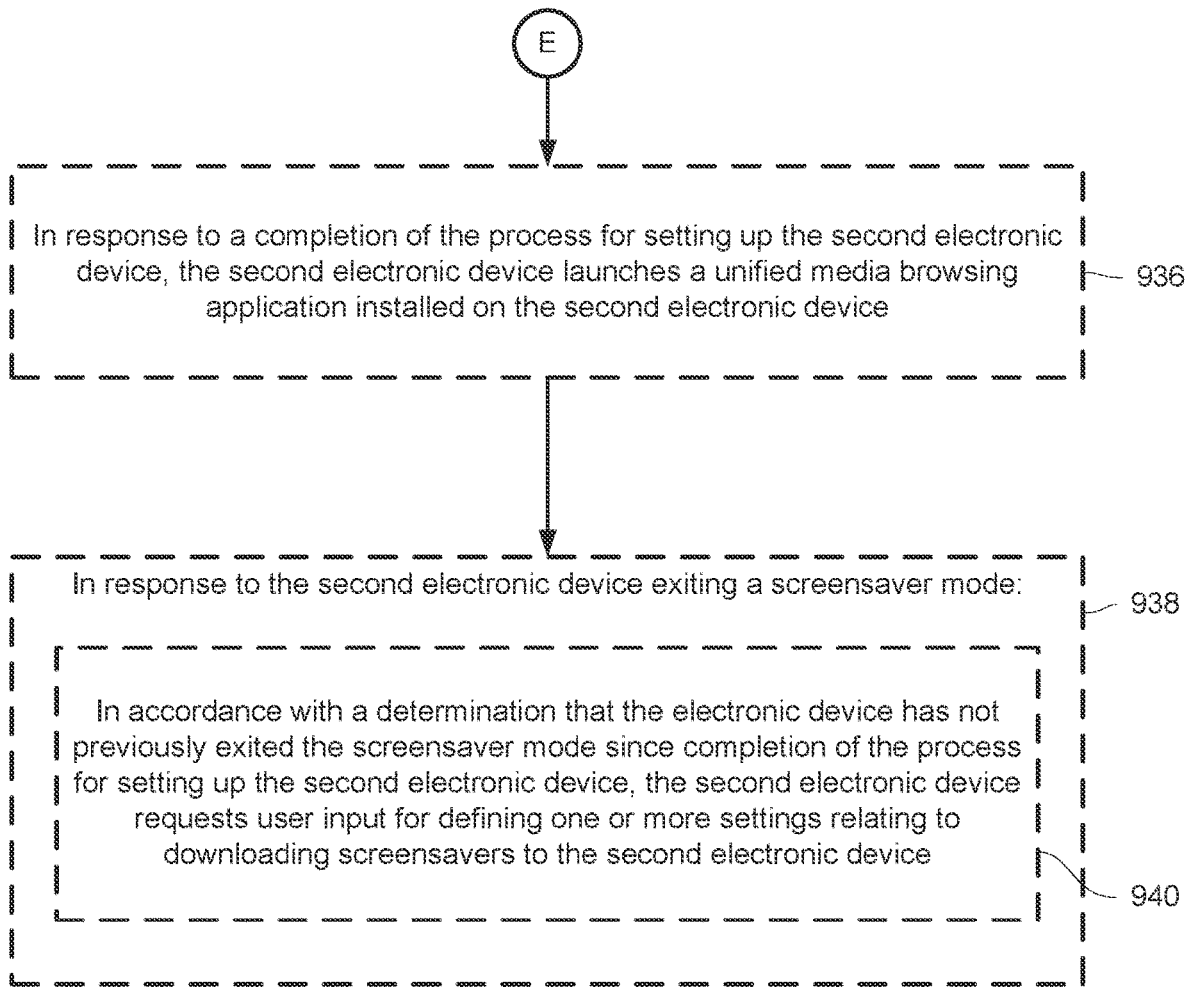

Turning back to FIG. 8V, multifunction device 511 detects a tap of contact 808 on "Continue" button 860 on touch-sensitive surface 804, indicating a desire to perform the selected options (e.g., setting up single sign-on and/or installing applications), and complete setup. As a result of the setup process, as shown in FIG. 8Z, device 500 installed the provider 1 application, installed the suggested applications, enabled single sign-on (e.g., authorized device 500 and multifunction device 511 with provider 1), signed the one or more applications into the single sign-on (e.g., granted access to the single sign-on authentication to the provider 1 and the suggested applications), and enabled sharing viewing data of the provider 1 application and of the installed suggested applications with the unified media browsing application. In some embodiments, device 500 creates an Entertainment folder (represented by icon 818-4) and installed the shared applications within the folder. For example, a user is able to select icon 818-4 and with a click input, reveal the contents of the Entertainment folder, similar to that described in FIG. 6V. In FIG. 8Z, the provider 1 application (represented by icon 818-2) is installed in a prioritized location on user interface 802 and not located in the Entertainment folder.

In some embodiments, device 500 displays home screen interface 802 on display 514 after being setup (e.g., as described above), as shown in FIG. 8AA. For example, after a certain amount of time without user input, device 500 optionally enters screensaver mode and replaces user interface 802 with a screensaver interface. In some embodiments, device 500 enters screensaver mode in response to a user request to enter screensaver mode. For instance, in FIG. 8BB, display 514 displays screensaver A on screensaver interface 803. In FIG. 8BB, while in screensaver mode, device 500 detects a click of contact 808 on touch-sensitive surface 451. In response to detecting the click, device 500 optionally exits screensaver mode. In some embodiments, if device 500 exits screensaver mode after the first time the device displays a screensaver (e.g., device 500 has never displayed a screensaver before), display 514 displays a screensaver download popup dialog overlaid on the home screen interface 802 (or any other user interface being displayed by device 500 at the time when the screensaver was first displayed), as shown in FIG. 8CC. In some embodiments, the screensaver download popup dialog includes a title 880 asking the user whether the user desires to download screensavers. In some embodiments, the screensaver download popup dialog includes a representation 882 of the screensaver that was just being displayed (e.g., screensaver A). The representation is optionally a picture, snapshot, or a preview video of the screensaver. The screensaver download popup dialog optionally includes an "Automatically Download" option button 884 and a "Don't Download" option button 886. In some embodiments, selection of the "Automatically Download" option causes automatic periodic querying for and downloading new screensavers (e.g., from an external server or from an application store). Automatic download of screensavers optionally occurs daily, weekly, monthly, or any other suitable frequency. In some embodiments, selection of the "Don't Download" option causes device 500 to never automatically download new screensavers. In some embodiments, when device 500 is configured to never automatically download new screensavers, new screensavers are downloaded only upon manual request by the user. In FIG. 8CC, device 500 detects a click of contact 808 on touch-sensitive surface 451 while "Automatically Download" option button 884 is currently highlighted, indicating the user's desire to automatically download screensavers to device 500. In some embodiments, after the user selects either automatic download or to not automatically download screensavers, display 514 returns to the home screen interface 802 (or any other user interface being displayed by device 500 at the time when the screensaver was first displayed), as shown in FIG. 8DD. By presenting the screensaver download dialog after the first time a screensaver is displayed by device 500 (e.g., as opposed to during a setup process for device 500), device 500 is able to better ensure that the user knows what the screensavers that are automatically downloadable would look like (e.g., because device 500 was just displayed screensaver A), thus improving the likelihood that the user will make the correct choice and increasing the efficiency of the human-machine interface.

FIGS. 9A-9F are flow diagrams illustrating a method 900 of facilitating transferring settings and information from another electronic device during device setup in accordance with some embodiments of the disclosure. The method 900 is optionally performed at an electronic device such as device 100, device 300 or device 500 as described above with reference to FIGS. 1A-1B, 2-3 and 5A-5B. Some operations in method 900 are, optionally, combined and/or the order of some operations is, optionally, changed.

As described below, the method 900 provides ways of facilitating transferring settings and information from another electronic device during device setup. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, a first electronic device in communication with a display and one or more input devices (e.g., tablet computer, a smartphone, a wearable device, etc., such as device 511, and the display and/or input devices are a touch screen included in those devices), while performing a process for setting up a second electronic device (e.g., initializing or setting up a set top box, such as device 100, device 300, or device 500 in communication with the first electronic device), separate from the first electronic device, using the first electronic device, receives (902), via the one or more input devices, a request to share subscription information for a primary content provider with the second electronic device, wherein the subscription information for the primary content provider allows for content associated with the primary content provider to be accessible on the second electronic device, such as in FIG. 8K (e.g., the user requests to perform express setup via the first electronic device instead of manual setup).

In some embodiments, the setup is the first time the second electronic device is powered on. In some embodiments, the setup is performed after the second electronic device performs a factory reset. In some embodiments, setup of the set top box is initiated at the set top box (e.g., via a remote control of the set top box, or via another device, such as a smart phone (e.g., the first electronic device), acting as a remote control for the set top box), and then at some point after being initiated at the set top box, at least a portion of the setup procedure for the set top box is performed at the first electronic device (e.g., remotely from the set top box). In some embodiments, manual setup involves the user providing the second electronic device with subscription information for a primary content provider. The subscription information optionally is the user's account information associated with the primary content provider that allows the user to receive content from the primary content provider (e.g., login information and/or the content included in the user's bundle). In some embodiments, the subscription information is able to be used to log the device into the user's account for the primary content provider. Subscription information optionally enables the user to access one or more secondary content providers via the subscription with the primary content provider. In some embodiments, the user has already entered subscription information for a primary content provider on the first electronic device. For example, the first electronic device optionally has one or more applications that access content using a subscription with a primary content provider. If the user has already provided the first electronic device with this subscription information, express setup of the second electronic device allows the user to share the subscription information stored on the first electronic device with the second electronic device and avoid redundancies.

In some embodiments, in response to receiving the request to share the subscription information for the primary content provider with the second electronic device, the first electronic device transfers (904), to the second electronic device, the subscription information for the primary content provider, wherein the subscription information for the primary content provider allows for the content associated with the primary content provider to be accessible on the second electronic device, such as in FIG. 8P (e.g., when the user requests to perform express setup of the second electronic device using the first electronic device, the first electronic device optionally determines whether the user has provided subscription information for a primary content provider to the first electronic device). If the first electronic device has subscription information for a primary content provider, the first electronic device optionally transfers the subscription information to the first electronic device. This transfer is optionally performed using any suitable electronic communication protocol, such as Wi-Fi, Bluetooth, or near-field communication (NFC), to name a few, or any combination of protocols. In some embodiments, determining whether the user has provided subscription information for a primary content provider includes determining if the first electronic device is authorized to share subscription information with secondary content providers (e.g., whether single sign-on feature is enabled). If the device is authorized to share subscription information, the first electronic device optionally retrieves subscription information from the single sign-on feature, shares the subscription information with the second electronic device, authorizes the second electronic device, and grants access to the authorization to the secondary content providers. In some embodiments, if the first electronic device is not authorized to share subscription information with secondary content providers, the first electronic device determines whether the first electronic device has logged into a primary content provider account in an application installed on the first electronic device (e.g., either the primary content provider application or a secondary content provider application). In some embodiments, the first electronic device retrieves the subscription information from these applications, shares the subscription information with the second electronic device, authorizes the second electronic device, and grants access to the authorization to the secondary content providers (e.g., enables single sign-on feature on the second electronic device). In some embodiments, the express setup process also transfers device settings and application specific settings and suggests applications to install on the set top box.

The above-described manner of performing setup for the set top box (e.g., by requesting subscription information for a primary content provider from the first electronic device and transferring the subscription information from the first electronic device to the set top box) allows the first electronic device to perform a faster setup of the set top box (e.g., by transferring settings already provided by the user to the second electronic device and without the user having to perform manual set up of the set top box), which simplifies the interaction between the user and the device and reduces the setup time and effort of the set top box and makes the user-device interface more efficient (e.g., by eliminating redundant setup steps), which additionally reduces power usage and improves battery life of the device by enabling the user to use the device more quickly and efficiently.

In some embodiments, while performing the process for setting up the second electronic device using the first electronic device, the first electronic device receives (906), via the one or more input devices, a request to share a plurality of content access accounts with the second electronic device (e.g., the user requests for the first electronic device to share content access accounts, such as in FIG. 8H (e.g., iCloud account and/or iTunes account and/or Apple ID by Apple Inc. of Cupertino, California) stored on the first electronic device with the second electronic device), including a first content access account (908) with a respective content service the enables access to a first set of content from the respective content service, such as in FIG. 8H (e.g., optionally an iTunes account or an iCloud account). In some embodiments, an iTunes account enables access to media content such as movies, games, music, etc. In some embodiments, an iCloud account enables access to user settings and data, such as device settings, contacts, calendars, mail, etc.

In some embodiments, the request is for one or more content access accounts. In some embodiments, during the setup process, the user is able to select which content access accounts to share with the second electronic device. In some embodiments, the content access account is an account or subscription with a respective entity corresponding to the unified media browsing application (e.g., an account the allows the user to login to and use the unified media browsing application, which is optionally created by and/or controlled by the respective entity), where the respective entity is different than the primary content provider and/or the second content providers. The content access account is optionally one account (e.g., Apple ID) or a combination of two accounts (e.g., iCloud and iTunes account).

In some embodiments, while performing the process for setting up the second electronic device using the first electronic device, the first electronic device receives (906), via the one or more input devices, a request to share a plurality of content access accounts with the second electronic device, such as in FIG. 8I (e.g., the user requests for the first electronic device to share content access accounts (e.g., iCloud account and/or iTunes account and/or Apple ID by Apple Inc. of Cupertino, California) stored on the first electronic device with the second electronic device), including a second content access account (910) with the respective content service that enables access to a second set of content, different than the first set of content, from the respective content service, such as in FIG. 8H (e.g., in some embodiments, the other of the iTunes and iCloud accounts).

In some embodiments, in response to receiving the request to share the plurality of content access accounts with the second electronic device, the first electronic device transfers (912), to the second electronic device, the plurality of content access accounts with the second electronic device, wherein the plurality of content access accounts allow for the second electronic device to access the first set of content and the second set of content from the respective content service, such as in FIG. 8I (e.g., transferring accounts provides the second electronic device with the ability to access those accounts on the second electronic device). In some embodiments, transferring the accounts transfers information and data stored within those accounts. For example, transferring an iTunes account optionally provides the second electronic device with media purchase history and transferring an iCloud account provides the second electronic device with respective settings and data. In some embodiments, the user is able to select which account to transfer and transferring only one of the one or more content access accounts transfers only the corresponding set of content. After transfer, the transferred account and accompanying account information and data is optionally accessible on the second electronic device without requiring any further data or input from the first electronic device (e.g., the account information is fully transferred and the second electronic device can access the account and its settings independently of the first electronic device).

The above-described manner of performing setup for the set top box (e.g., by transferring content access accounts to the second electronic device) allows the first electronic device to perform a faster setup of the set top box (e.g., by transferring content associated with the content access accounts), which simplifies the interaction between the user and the device and reduces the setup time and effort of the set top box and makes the user-device interface more efficient (e.g., by eliminating redundant setup steps), which additionally reduces power usage and improves battery life of the device by enabling the user to use the device more quickly and efficiently.

In some embodiments, while performing the process for setting up the second electronic device using the first electronic device, the first electronic device transfers (914), from the first electronic device to the second electronic device, one or more of language preference settings, personal assistant settings, location sharing settings, analytics sharing settings, and network connectivity settings, such as in FIG. 8H (e.g., transferring device and user preference settings stored on the first electronic device). In some embodiments, language preference settings include the user's primary language, all user selected languages, and user preferred languages. In some embodiments, personal assistant settings include personal assistant usage history (e.g. previous queries), personal assistant preferences and other settings. In some embodiments, location sharing settings include device-level location services settings (e.g., whether to collect and share device location information) and application level location services settings (e.g., whether to share device location information with applications). In some embodiments, analytics sharing settings include preferences for sharing device or application usage, crashes and bugs, or other useful analytics with developers of the device or application. In some embodiments, network connectivity settings include preferred or saved Wi-Fi network IDs and passwords.

The above-described manner of performing setup for the set top box (e.g., by transferring user settings to the second electronic device) allows the first electronic device to perform a faster setup of the set top box (e.g., by transferring settings already set by the user to the second electronic device and without the user having to perform manual set up of the set top box), which simplifies the interaction between the user and the device and reduces the setup time and effort of the set top box and makes the user-device interface more efficient (e.g., by eliminating redundant setup steps), which additionally reduces power usage and improves battery life of the device by enabling the user to use the device more quickly and efficiently.

In some embodiments, while performing (916) the process for setting up the second electronic device using the first electronic device, such as in FIG. 8F, in accordance with a determination that the first electronic device is authorized with the primary content provider (e.g., single sign-on to the primary content provider is enabled on the first electronic device), the first electronic device provides (918) one or more suggested applications to install on the second electronic device based on the primary content provider, such as in FIG. 8K (e.g., suggesting content source specific applications that are optionally included in the user's service package or bundle with the primary content provider).

Enabling single sign-on on an electronic device optionally includes storing the user's subscription data and/or login credentials on the electronic device or in the user's content access account settings on an external server. In some embodiments, authorizing the electronic device with the primary content provider comprises creating an authentication token after successful authorization with the primary content provider. The authentication token is optionally stored on the electronic device or in the user's content access account settings on an external server. In some embodiments, multiple applications or services are able to be granted access to the authentication key. Granting access to the authentication key optionally allows the respective application or service to authenticate using the credentials associated with the authentication token (e.g., if the authentication token authenticated the device with the primary content provider, granting access allows other applications to access that same authentication with the primary content provider). In some embodiments, granting access to the authentication token is available if the respective application or service supports single sign-on authentication. In some embodiments, if the primary content provider is a first primary content provider, then suggest a first set of applications to install. In some embodiments, if the primary content provider is a second primary content provider, different from the first content provider, then suggest a second set of applications to install, different from the first set of applications (e.g., different applications or more or less applications). In some embodiments, if the user's subscription with the primary content provider includes access to a first bundle of content sources, then suggest a first set of applications to install. In some embodiments, if the user's subscription with the primary content provider includes access to a second bundle of content sources, different from the first bundle (e.g., different channels or more or less channels), then suggest a second set of applications to install, different from the first set (e.g., different applications or more or less applications). In some embodiments, the suggested applications are top rated or popular applications and are not associated with the primary content provider (e.g., top-rated or popular applications within an application store accessible on the second electronic device, independent of the applications' popularity with subscribers of the determined primary content provider). The number of suggested applications to install is optionally one, two, six, nine, ten or more. In some embodiments, suggesting applications to install is in the form of displaying representations of the applications to the user. For example, icons depicting the suggested applications are optionally presented to the user or in some embodiments, a list of suggested applications is presented to the user. In some embodiments, the suggested applications are highly rated or popular applications for subscribers of the determined primary content provider. In some embodiments, if the first electronic device is not authorized with the primary content provider, do not suggest any applications to install.

In some embodiments, while performing (916) the process for setting up the second electronic device using the first electronic device, such as in FIG. 8F, in response to receiving, via the one or more input devices, an input corresponding to a request to install the one or more suggested applications on the second electronic device, the first electronic device installs (920) the one or more suggested applications on the second electronic device, such as in FIG. 8P (e.g., installing the one or more suggested applications optionally involves transferring the application from the first electronic device to the second electronic device).

In some embodiments, installing the applications involves downloading and installing the applications from an external application server or provider (e.g., App Store or iTunes by Apple Inc. of Cupertino, California) and not from the first electronic device (e.g., if the first electronic device does not have the application installed or if the suggested application is not compatible with the first electronic device). The installed one or more suggested applications are optionally authorized with the primary content provider (e.g., are given access to the authorization of the second electronic device, as a whole, with the primary content provider) as part of the installation. In some embodiments, the installation authorizes the second electronic device with the primary content provider and allows the installed one or more suggest applications to provide content on the second electronic device via corresponding respective secondary content providers to which the primary content provider, and the user's subscription to the primary content provider, give the user access. In some embodiments, as a result of the user's request to install the suggested application, the installed one or more suggested applications are also configured to share their viewing history data with a unified media browser application installed on the second electronic device. In some embodiments, the user is able to select which of the suggested applications to install and which applications to not install.

The above-described manner of setting up the set top box (e.g., by suggesting and installing applications on the set top box) allows the first electronic device to provide the user with the ability to efficiently install one or more suggested applications on the second electronic device (e.g., using one interface, without requiring the user to navigate to a separate app or interface and perform research on what applications are appropriate or popular for the user's primary content provider), which simplifies the interaction between the user and the device and enhances the operability of the device and makes the user-device interface more efficient (e.g., by suggesting applications to the user to install and installing the suggested applications in response to the user's request to install them), which additionally reduces power usage and improves the battery life of the device by enabling the user to use the device more quickly and efficiently.

In some embodiments, while performing (922) the process for setting up the second electronic device using the first electronic device, such as in FIG. 8F, in accordance with a determination that the first electronic device is not authorized with the primary content provider (e.g., single sign-on to the primary content provider is not enabled on the first electronic device), the first electronic device provides (924) one or more suggested applications to install on the second electronic device that are not based on the primary content provider, such as in FIG. 8R (e.g., in some embodiments, the suggested applications are top rated or popular applications and are not associated with the primary content provider (e.g., top-rated or popular applications within an application store accessible on the electronic device, independent of the applications' popularity with subscribers of the determined primary content provider)).

In some embodiments, while performing (922) the process for setting up the second electronic device using the first electronic device, such as in FIG. 8F, in response to receiving, via the one or more input devices, an input corresponding to a request to install the one or more suggested applications on the second electronic device, the first electronic device installs (926) the one or more suggested applications on the second electronic device, such as in FIG. 8S (e.g., installing the one or more suggested applications optionally involves transferring the application from the first electronic device to the second electronic device). In some embodiments, installing the applications involves downloading and installing the applications from an external application server or provider (e.g., App Store or iTunes by Apple Inc. of Cupertino, California) and not from the first electronic device (e.g., if the first electronic device does not have the application installed or if the suggested application is not compatible with the first electronic device). In some embodiments, the installed one or more suggested applications are optionally not authorized with the primary content provider (e.g., not given access to the authorization of the second electronic device with the primary content provider). In some embodiments, the installed one or more suggested applications are optionally not configured to share their viewing history data with a unified media browser application.

The above-described manner of setting up the set top box (e.g., by suggesting and installing applications on the set top box) allows the first electronic device to provide the user with the ability to efficiently install one or more suggested applications on the second electronic device even when the first device is not authorized with a primary content provider (e.g., using one interface, without requiring the user to navigate to a separate app or interface and perform research on what applications are appropriate or popular for the user's primary content provider), which simplifies the interaction between the user and the device and enhances the operability of the device and makes the user-device interface more efficient (e.g., by suggesting applications to the user to install and installing the suggested applications in response to the user's request to install them), which additionally reduces power usage and improves the battery life of the device by enabling the user to use the device more quickly and efficiently.

In some embodiments, while performing (928) the process for setting up the second electronic device using the first electronic device, such as in FIG. 8F, in accordance with a determination (930) that the first electronic device is not authorized with the primary content provider (e.g., single sign-on to the primary content provider is not enabled on the first electronic device) and that an application authorized with the primary content provider is installed on the first electronic device, such as in FIG. 8T (e.g., installed on the first electronic device is a content application which the user has individually authenticated using the user's credentials with the primary content provider rather than authenticated the content application using the device's authorization with the primary content provider (because that authorization optionally does not exist)), in accordance with a determination that the primary content provider supports granting access to the authorization of the electronic device with the primary content provider to one or more applications on the electronic device to allow the one or more applications to provide access to respective content on the electronic device (e.g., the primary content provider supports single sign-on functionality), the first electronic device provides (932) a recommendation to authorize the first and second electronic devices with the primary content provider, such as in FIG. 8V (e.g., suggest to the user to enable single sign-on for both the first and the second electronic devices).

In some embodiments, if the primary content provider does not support granting access to the authorization of the first and/or second electronic devices with the primary content provider (e.g., does not support single sign-on functionality), then do not recommend authorizing the first and/or second electronic devices with the primary content provider. In some embodiments, if the first electronic device does not have installed an application authorized with the primary content provider or if the primary content provider with which the installed application is individually authorized does not support single sign-on functionality, do not recommend authorizing the first and second electronic devices with the primary content provider.

In some embodiments, while performing (928) the process for setting up the second electronic device using the first electronic device, such as in FIG. 8F, in accordance with a determination (930) that the first electronic device is not authorized with the primary content provider (e.g., single sign-on to the primary content provider is not enabled on the first electronic device) and that an application authorized with the primary content provider is installed on the first electronic device, such as in FIG. 8T (e.g., installed on the first electronic device is a content application which the user has individually authenticated using the user's credentials with the primary content provider rather than authenticated the content application using the device's authorization with the primary content provider (because that authorization optionally does not exist)), in response to receiving, via the one or more input devices, an input corresponding a request to authorize the first and second electronic devices with the primary content provider, the first electronic device authorizes (934) the first and second electronic devices with the primary content provider, such as in FIG. 8Z (e.g., enable single sign-on functionality for both the first and second electronic devices).

In some embodiments, one or more applications are installed on the second electronic device. In some embodiments, the installed one or more suggested applications are optionally authorized with the primary content provider (e.g., are given access to the authorization of the second electronic device, as a whole, with the primary content provider) as part of the installation. In some embodiments, the authorization allows the installed one or more applications to provide content on the second electronic device via corresponding respective secondary content providers to which the primary content provider, and the user's subscription to the primary content provider, give the user access. In some embodiments, the installed one or more applications are also configured to share their viewing history data with a unified media browser application installed on the second electronic device.

The above-described manner of setting up the set top box (e.g., by determining the primary content provider using an installed application which is already individually authorized with the primary content provider, and enabling single sign-on on both electronic devices) allows the first electronic device to provide the user with the ability to efficiently enable authorizing the electronic devices (e.g., using one interface, without requiring the user to navigate to a separate app or interface to perform the same function), which simplifies the interaction between the user and the device and enhances the operability of the device and makes the user-device interface more efficient, which additionally reduces power usage and improves the battery life of the device by enabling the user to use the device more quickly and efficiently.

In some embodiments, in response to a completion of the process for setting up the second electronic device, the second electronic device launches (936) a unified media browsing application installed on the second electronic device, such as in FIG. 8O (e.g., upon completion of setup, the set top box will automatically launch and display the unified media browsing application). The above-described manner of launching the unified media browsing application (e.g., automatically, after device setup is completed) allows the second electronic device to provide the user with the ability to efficiently familiarize with the newly setup capabilities of the device (e.g., by enabling the user to immediately interact with the application without requiring the user to navigate to a separate app or interface to search for and experience the new capabilities), which simplifies the interaction between the user and the device and enhances the operability of the device and makes the user-device interface more efficient, which additionally reduces power usage and improves the battery life of the device by enabling the user to use the device more quickly and efficiently.

In some embodiments, in response to (938) the second electronic device exiting a screensaver mode, in accordance with a determination that the electronic device has not previously exited the screensaver mode since completion of the process for setting up the second electronic device (e.g., exiting the screensaver after the first time the device displays a screensaver), the second electronic device requests (940) user input for defining one or more settings relating to downloading screensavers to the second electronic device, such as in FIG. 8CC (e.g., provide the user with the option to select how to download further screensavers to the second electronic device). In some embodiments, the user is able to select automatic downloading of screensavers. In some embodiments, if the second electronic device has previously exited screensaver mode (e.g., it is not the first time that screensaver has been activated on the device), then do not provide the user with the option to automatically download screensavers.

The above-described manner of requesting user setting for further downloading of screensavers (e.g., immediately after exiting screensaver after the first time the device enters screensaver mode) allows the second electronic device to provide the user with the ability to efficiently define settings for downloading screensavers (e.g., by asking the user to define the setting immediately after exiting the screensaver, thus increasing the likelihood that the user understands the setting and can make an informed decision, without having to navigate to a separate app or interface to perform the same function), which simplifies the interaction between the user and the device and enhances the operability of the device and makes the user-device interface more efficient (e.g., by requesting definition of screensaver download settings), which additionally reduces power usage and improves the battery life of the device by enabling the user to use the device more quickly and efficiently.

It should be understood that the particular order in which the operations in FIGS. 9A-9F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 900 described above with respect to FIGS. 9A-9F. For example, the user interfaces, user interface elements, processes for suggesting and installing applications, processes for authorizing devices and applications with primary content providers, sharing viewing data with the unified media browsing application, etc., described above with reference to method 900 optionally have one or more of the characteristics of the user interfaces, user interface elements, processes for suggesting and installing applications, processes for authorizing devices and applications with primary content providers, sharing viewing data with the unified media browsing application, etc. described herein with reference to other methods described herein (e.g., method 700). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIGS. 9A-9F are, optionally, implemented by components depicted in FIGS. 1A-1B. For example, receiving operation 902 and transferring operation 904 are, optionally, implemented by event sorter 170, event recognizer 180, and event handler 190. Event monitor 171 in event sorter 170 detects a contact on touch screen 804 and/or touch-sensitive surface 451, and event dispatcher module 174 delivers the event information to application 136-1. A respective event recognizer 180 of application 136-1 compares the event information to respective event definitions 186, and determines whether a first contact at a first location on the touch screen and/or touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content delivery services, the present technology can be configured to allow users to select to "opt in" or "opt out" of participation in the collection of personal information data during registration for services or anytime thereafter. In another example, users can select not to provide friend-associated data, or content taste data, for targeted content delivery services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at a first electronic device in communication with a display and one or more input devices:
while performing a process for setting up a second electronic device, separate from the first electronic device, using the first electronic device, wherein the process for setting up the second electronic device includes establishing a near-field communication link between the first electronic device and the second electronic device, and transferring one or more settings from the first electronic device to the second electronic device to configure the second electronic device for operation, displaying, via the display, a user interface that includes a first selectable option that is selectable to control sharing of one or more suggested applications with the second electronic device and a second selectable option that is selectable to control sharing of subscription information for a primary content provider with the second electronic device, wherein the subscription information for the primary content provider allows for content associated with the primary content provider to be accessible on the second electronic device;
while displaying the user interface, receiving, via the one or more input devices of the first electronic device, one or more inputs corresponding to a request to share the one or more suggested applications and/or the subscription information for the primary content provider with the second electronic device; and
in response to receiving the one or more inputs:
in accordance with a determination that the one or more inputs correspond to allowing the one or more suggested applications to be shared with the second electronic device, initiating sharing of the one or more suggested applications with the second electronic device;
in accordance with a determination that the one or more inputs correspond to allowing the subscription information for the primary content provider to be shared with the second electronic device, initiating sharing of the subscription information for the primary content provider with the second electronic device.

2. The method of claim 1, wherein in response to receiving the one or more inputs, the one or more suggested applications are shared with the second electronic device without sharing of the subscription information for the primary content provider with second the electronic device.

3. The method of claim 1, wherein in response to receiving the one or more inputs, the subscription information for the primary content provider is shared with the second electronic device without sharing the one or more suggested applications with the second electronic device.

4. The method of claim 1, wherein in response to receiving the one or more inputs, the one or more suggested applications are shared with the second electronic device and the subscription information for the primary content provider is shared with the second electronic device.

5. The method of claim 1, wherein the one or more suggested applications are installed on the first electronic device.

6. The method of claim 1, wherein the user interface further comprises a third selectable option that is selectable to display a first listing of one or more applications for sharing with the second electronic device.

7. The method of claim 6, further comprising:
while displaying the first listing of the one or more suggested applications, receiving, via the one or more input devices, a first input corresponding to a request to create a second listing, different from the first listing, of one or more applications for sharing with the second electronic device,
wherein in response to receiving the one or more inputs, the second listing of the one or more applications is shared with the second electronic device.

8. The method of claim 1, wherein sharing the one or more suggested applications with the second electronic device causes the one or more suggested applications to be installed on the second electronic device.

9. The method of claim 1, wherein sharing of the subscription information for the primary content provider with the second electronic device includes transferring an authentication token associated with the primary content provider to the second electronic device.

10. The method of claim 1, wherein sharing of the subscription information for the primary content provider with the second electronic device includes transferring a user credential for the primary content provider to the second electronic device.

11. The method of claim 1, wherein sharing of the one or more suggested applications with the second electronic device includes transferring installation packages associated with the one or more suggested applications to the second electronic device.

12. The method of claim 1, wherein sharing of the one or more suggested applications with the second electronic device includes downloading the one or more suggested applications from an application store on the second electronic device.

13. The method of claim 1, wherein sharing of the one or more suggested applications with the second electronic device includes transferring one or more settings for setup and usage of the one or more suggested applications to the second electronic device.

14. The method of claim 1, wherein the process for setting up the second electronic device includes the second electronic device being located within a threshold distance from the first electronic device.

15. A first electronic device, comprising:
one or more processors;
memory; and
one or more programs, wherein the one or more programs are stored in the memory and configured to be executed by the one or more processors, the one or more programs including instructions for:
while performing a process for setting up a second electronic device, separate from the first electronic device, using the first electronic device, wherein the process for setting up the second electronic device includes establishing a near-field communication link between the first electronic device and the second electronic device, and transferring one or more settings from the first electronic device to the second electronic device to configure the second electronic device for operation, displaying, via the display, a user interface that includes a first selectable option that is selectable to control sharing of one or more suggested applications with the second electronic device and a second selectable option that is selectable to control sharing of subscription information for a primary content provider with the second electronic device, wherein the subscription information for the primary content provider allows for content associated with the primary content provider to be accessible on the second electronic device;
while displaying the user interface, receiving, via one or more input devices of the first electronic device, one or more inputs corresponding to a request to share the one or more suggested applications and/or the subscription information for the primary content provider with the second electronic device; and
in response to receiving the one or more inputs:
in accordance with a determination that the one or more inputs correspond to allowing the one or more suggested applications to be shared with the second electronic device, initiating sharing of the one or more suggested applications with the second electronic device;
in accordance with a determination that the one or more inputs correspond to allowing the subscription information for the primary content provider to be shared with the second electronic device, initiating sharing of the subscription information for the primary content provider with the second electronic device.

16. The first electronic device of claim 15, wherein the one or more programs include instructions for:
in response to receiving the one or more inputs, sharing the one or more suggested applications with the second electronic device without sharing of the subscription information for the primary content provider with second the electronic device.

17. The first electronic device of claim 15, wherein the one or more programs include instructions for:
in response to receiving the one or more inputs, sharing the subscription information for the primary content provider with the second electronic device without sharing the one or more suggested applications with the second electronic device.

18. The first electronic device of claim 15, wherein the one or more programs include instructions for:
in response to receiving the one or more inputs, sharing the one or more suggested applications with the second electronic device and sharing the subscription information for the primary content provider with the second electronic device.

19. The first electronic device of claim 15, wherein the one or more suggested applications are installed on the first electronic device.

20. The first electronic device of claim 15, wherein the one or more programs include instructions for:
displaying the user interface, wherein the user interface further comprises a third selectable option that is selectable to display a first listing of one or more applications for sharing with the second electronic device.

21. The first electronic device of claim 20, wherein the one or more programs further comprise instructions for:
while displaying the first listing of the one or more suggested applications, receiving, via the one or more input devices, a first input corresponding to a request to create a second listing, different from the first listing, of one or more applications for sharing with the second electronic device,
wherein in response to receiving the one or more inputs, the second listing of the one or more applications is shared with the second electronic device.

22. The first electronic device of claim 15, wherein sharing the one or more suggested applications with the second electronic device causes the one or more suggested applications to be installed on the second electronic device.

23. The first electronic device of claim 15, wherein sharing of the subscription information for the primary content provider with the second electronic device includes transferring an authentication token associated with the primary content provider to the second electronic device.

24. The first electronic device of claim 15, wherein sharing of the subscription information for the primary content provider with the second electronic device includes transferring a user credential for the primary content provider to the second electronic device.

25. The first electronic device of claim 15, wherein sharing of the one or more suggested applications with the second electronic device includes transferring installation packages associated with the one or more suggested applications to the second electronic device.

26. The first electronic device of claim 15, wherein sharing of the one or more suggested applications with the second electronic device includes downloading the one or more suggested applications from an application store on the second electronic device.

27. The first electronic device of claim 15, wherein sharing of the one or more suggested applications with the second electronic device includes transferring one or more settings for setup and usage of the one or more suggested applications to the second electronic device.

28. The first electronic device of claim 15, wherein setting up the second electronic device includes the second electronic device being located within a threshold distance from the first electronic device.

29. A non-transitory computer readable storage medium storing one or more programs, the one or more programs comprising instructions, which when executed by one or more processors of a first electronic device, cause the first electronic device to perform a method comprising:

while performing a process for setting up a second electronic device, separate from the first electronic device, using the first electronic device, wherein the process for setting up the second electronic device includes establishing a near-field communication link between the first electronic device and the second electronic device, and transferring one or more settings from the first electronic device to the second electronic device to configure the second electronic device for operation, displaying, via the display, a user interface that includes a first selectable option that is selectable to control sharing of one or more suggested applications with the second electronic device and a second selectable option that is selectable to control sharing of subscription information for a primary content provider with the second electronic device, wherein the subscription information for the primary content provider allows for content associated with the primary content provider to be accessible on the second electronic device;

while displaying the user interface, receiving, via one or more input devices of the first electronic device, one or more inputs corresponding to a request to share the one or more suggested applications and/or the subscription information for the primary content provider with the second electronic device; and in response to receiving the one or more inputs:
in accordance with a determination that the one or more inputs correspond to allowing the one or more suggested applications to be shared with the second electronic device, initiating sharing of the one or more suggested applications with the second electronic device;
in accordance with a determination that the one or more inputs correspond to allowing the subscription information for the primary content provider to be shared with the second electronic device, initiating sharing of the subscription information for the primary content provider with the second electronic device.

30. The non-transitory computer readable storage medium of claim 29, wherein the method further comprises:
in response to receiving the one or more inputs, the one or more suggested applications are shared with the second electronic device without sharing of the subscription information for the primary content provider with second the electronic device.

31. The non-transitory computer readable storage medium of claim 29, wherein the method further comprises:
in response to receiving the one or more inputs, the subscription information for the primary content provider is shared with the second electronic device without sharing the one or more suggested applications with the second electronic device.

32. The non-transitory computer readable storage medium of claim 29, wherein the method further comprises:
in response to receiving the one or more inputs, the one or more suggested applications are shared with the second electronic device and the subscription information for the primary content provider is shared with the second electronic device.

33. The non-transitory computer readable storage medium of claim 29, wherein the method further comprises:
the one or more suggested applications are installed on the first electronic device.

34. The non-transitory computer readable storage medium of claim 29, wherein the method further comprises:
the user interface further comprises a third selectable option that is selectable to display a first listing of one or more applications for sharing with the second electronic device.

35. The non-transitory computer readable storage medium of claim 34, wherein the method further comprises:
while displaying the first listing of the one or more suggested applications, receiving, via the one or more input devices, a first input corresponding to a request to create a second listing, different from the first listing, of one or more applications for sharing with the second electronic device,
wherein in response to receiving the one or more inputs, the second listing of the one or more applications is shared with the second electronic device.

36. The non-transitory computer readable storage medium of claim 29, wherein the method further comprises:
sharing the one or more suggested applications with the second electronic device causes the one or more suggested applications to be installed on the second electronic device.

37. The non-transitory computer readable storage medium of claim 29, wherein the method further comprises:
sharing of the subscription information for the primary content provider with the second electronic device includes transferring an authentication token associated with the primary content provider to the second electronic device.

38. The non-transitory computer readable storage medium of claim 29, wherein the method further comprises:
sharing of the subscription information for the primary content provider with the second electronic device includes transferring a user credential for the primary content provider to the second electronic device.

39. The non-transitory computer readable storage medium of claim 29, wherein the method further comprises:
sharing of the one or more suggested applications with the second electronic device includes transferring installation packages associated with the one or more suggested applications to the second electronic device.

40. The non-transitory computer readable storage medium of claim 29, wherein the method further comprises:
sharing of the one or more suggested applications with the second electronic device includes downloading the one or more suggested applications from an application store on the second electronic device.

41. The non-transitory computer readable storage medium of claim 29, wherein the method further comprises:
sharing of the one or more suggested applications with the second electronic device includes transferring one or more settings for setup and usage of the one or more suggested applications to the second electronic device.

42. The non-transitory computer readable storage medium of claim 29, wherein the method further comprises:
the process for setting up the second electronic device includes the second electronic device being located within a threshold distance from the first electronic device.

* * * * *